(12) United States Patent
Bowman et al.

(10) Patent No.: US 11,535,713 B2
(45) Date of Patent: Dec. 27, 2022

(54) NETWORK POLYMERS AND METHODS OF MAKING AND USING SAME

(71) Applicant: THE REGENTS OF THE UNIVERSITY OF COLORADO, A BODY CORPORATE, Denver, CO (US)

(72) Inventors: Christopher N. Bowman, Boulder, CO (US); Brady T. Worrell, Boulder, CO (US); Gayla Berg Lyon, Medford, MA (US); Matthew K. McBride, Boulder, CO (US); Chen Wang, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 842 days.

(21) Appl. No.: 16/326,567

(22) PCT Filed: Aug. 23, 2017

(86) PCT No.: PCT/US2017/048195
§ 371 (c)(1),
(2) Date: Feb. 19, 2019

(87) PCT Pub. No.: WO2018/039331
PCT Pub. Date: Mar. 1, 2018

(65) Prior Publication Data
US 2021/0292482 A1 Sep. 23, 2021

Related U.S. Application Data

(60) Provisional application No. 62/378,447, filed on Aug. 23, 2016.

(51) Int. Cl.
*C08G 75/26* (2006.01)
*C08G 18/38* (2006.01)
(Continued)

(52) U.S. Cl.
CPC ......... *C08G 75/26* (2013.01); *C08G 18/3876* (2013.01); *C08G 18/775* (2013.01); *C08G 18/8166* (2013.01); *C08G 75/045* (2013.01)

(58) Field of Classification Search
CPC .............................. C08G 75/26; C08G 75/045
See application file for complete search history.

(56) References Cited

U.S. PATENT DOCUMENTS

| 2005/0261421 | A1 | 11/2005 | Schmitt et al. |
| 2006/0036110 | A1 | 2/2006 | Brown et al. |
| 2009/0092676 | A1* | 4/2009 | Richard .............. C08G 75/045 424/501 |

FOREIGN PATENT DOCUMENTS

| EP | 2740755 A1 | 6/2014 |
| EP | 2896644 A1 | 7/2015 |

(Continued)

OTHER PUBLICATIONS

International Search Report and Written Opinion dated Dec. 29, 2017 for PCT International Appln. No. PCT/US2017/048195.
(Continued)

*Primary Examiner* — Michael L Leonard
(74) *Attorney, Agent, or Firm* — Saul Ewing Arnstein & Lehr LLP; Kathryn Doyle; Domingos J. Silva

(57) ABSTRACT

The present invention relates to covalent adaptable networks (CANs) having exchangeable crosslinks that are able to undergo repeated covalent bond reshuffling through photoactivation at ambient temperatures. The invention provides covalent adaptable network forming compositions as well as methods of forming, remolding and recycling the CANs of the invention.

8 Claims, 46 Drawing Sheets

(51) Int. Cl.
*C08G 18/77* (2006.01)
*C08G 18/81* (2006.01)
*C08G 75/045* (2016.01)

(56) References Cited

FOREIGN PATENT DOCUMENTS

| WO | WO-9422053 A1 * | 9/1994 | ............... C08F 8/30 |
|---|---|---|---|
| WO | WO-0116210 A1 * | 3/2001 | ........... A61L 17/145 |

OTHER PUBLICATIONS

Supplementary European Search Report dated Mar. 27, 2020 for European Appln. No. EP 17 84 4337.
Amamoto, et al., "Self-Healing of Covalently Cross-Linked Polymers by Reshuffling Thiuram Disulfide Moieties in Air under Visible Light", Adv. Mater., 24, 2012, 3975.
Bannin, et al., "Poly(thioester) by Organocatalytic Ring-Opening Polymerization", Macromolecules, 48, 2015, 5481.
Fenoli, C. R., et al., "Controllable Reversible Addition-Fragmentation Termination Monomers for Advances in Photochemically Controlled Covalent Adaptable Networks", Macromolecules, vol. 47, 2014, pp. 907-915.
Ghobril, et al., "A Dendritic Thioester Hydrogel Based on Thiol-Thioester Exchange as a Dissolvable Sealant System for Wound Closure", Angew. Chem. Int. Ed., 52, 2013, 14070.
Hoyle, et al., "Thiol-ene click chemistry", Angew. Chern. Int. Ed., 49, 2010, 1540.
Kade, et al., "The Power of Thiol-ene Chemistry", J. Polym. Sci., Part A: Polym. Chem., 48, 2010, 743.
Lei, et al., "Room-Temperature Self-Healable and Remoldable Cross-linked Polymer Based on the Dynamic Exchange of Disulfide Bonds", Chem. Mater., 26, 2038, 2014.
Lowe, "Thiol-ene "click" reactions and recent applications in polymer and materials synthesis: a first update", Polym. Chem., 5, 2014, 4820.
Lu, et al., "Investigations of step-growth thiol-ene polymerizations for novel dental restoratives", Dent. Mater. 21, 2005, 1129.
Nair, et al., "The Thiol-Michael Addition Click Reaction: A Powerful and Widely Used Tool in Materials Chemistry", Chem. Mater., 2013.
Rekondo, et al., "Catalyst-free room-temperature self-healing elastomers based on aromatic disulfide metathesis", Mater. Horiz., 1, 2014, 237.
Salinas, et al., "Mixed Mode Thiol-Acrylate Photopolymerizations for the Synthesis of PEG-Peptide Hydrogels", Macromolecules, 41, 2008, 6019.
Shih, et al., "Crosslinking and degradation of step-growth hydrogels formed by thiol-ene photo-click chemistry", Biomacromolecules, 13, 2012, 2003.
Shipp, et al., "Elastomeric and degradable polyanhydride network polymers by step-growth thiol-ene photopolymerization", Chem. Commun., 2009, 6415.
Suzuki, et al., "Thiol-Mediated Controlled Ring-Opening Polymerization of Cysteine-Derived β-Thiolactone and Unique Features of Product Polythioester", Biomacromolecules, 17, 2016, 1135.

* cited by examiner

NETWORK POLYMERS AND METHODS OF MAKING AND USING SAME

CROSS-REFERENCE TO RELATED APPLICATIONS

The present application is a 35 U.S.C. § 371 national phase application of, and claims priority to, International Application No. PCT/US2017/048195, filed Aug. 23, 2017, which claims priority under 35 U.S.C. § 119(e) to U.S. Provisional Patent Application No. 62/378,447, filed Aug. 23, 2016, all of which applications are incorporated herein by reference in their entireties.

STATEMENT REGARDING FEDERALLY SPONSORED RESEARCH OR DEVELOPMENT

This invention was made with government support under Award Nos. W91 INF-14-1-0605 awarded by the U.S. Army Research Office, DMR1310528 awarded by the National Science Foundation, and 1000600740/W00057 awarded by the National Science Foundation IUCRC. The government has certain rights in the invention.

BACKGROUND OF THE INVENTION

Covalent adaptable networks (CANs) represent an effective strategy to create polymeric materials that retain certain useful properties of crosslinked networks, yet offer a route towards recycling and remolding through covalent bond reshuffling reactions. In CANs with exchangeable crosslinks, a chain end with an active site attacks a specific moiety on the backbone of the polymer. A short-lived intermediate is formed, which quickly breaks apart in one of several locations to regenerate the original functionalities. The products of this exchange are chemically identical to the original reactants, but directional stress within the network drives the equilibrium towards a particular bond configuration to dissipate chain energy, which leads to macroscopic stress relaxation behavior. Unlike an addition-based CAN, which involves a shifting equilibrium that affects functional group conversion (as in a Diels-Alder network), an exchange-based CAN retains a constant crosslinking density during bond rearrangement.

Several chemistries have been previously explored for adaptable network polymers, including thermally activated reactions such as transesterification, transamination, and disulfide exchange, as well as light-triggered bond rearrangement using a reversible addition-fragmentation chain transfer (RAFT) mechanism.

Previous studies have taken advantage of light to instantaneously produce thiyl or carbon centered radicals that are capable of addition to unsaturated species within the crosslink and statistical fragmentation. Turning off the light results in rapid depletion of the radical concentration, thus, terminating the addition-fragmentation sequence. Although this method gives control over where (spatial) and when (temporal) plasticity is noted, issues such as inability to undergo multiple cycles, remold, flow in bulk, or yellowing/coloration of the material inherently limits the approach. Alternatively, scenarios where heat acts as the stimulus utilize degenerate exchange reactions which have high kinetic barriers. Application of sufficient heat overcomes these barriers and creates a distribution between reactants and products, cooling of these networks suppresses exchange. Typically, remoldability and multiple cycles are possible using thermally activated systems, however, spatial control is not inherently feasible, high heats (>120° C.) are required even with rubbery samples, and coloration of the material is often unavoidable.

There remains a need in the art for CANs that are capable of being remolded, recycled and repaired at ambient temperatures without degrading or discoloring the material. In certain embodiments, the CANs should be fabricated using photo-, thermal-, or redox-initiation processes. In other embodiments, the covalent bond reshuffling should be triggered photolytically and/or thermally, wherein light and/or heat, respectively, can be used to activate or deactivate the bond reshuffling. In yet other embodiments, the covalent bond reshuffling should be triggered with both spatial and temporal control. The present invention fulfills these needs.

BRIEF SUMMARY OF THE INVENTION

In one aspect, the invention provides compositions. In certain embodiments, the composition of the invention comprises at least one multifunctional thioester containing monomer of Formula (I):

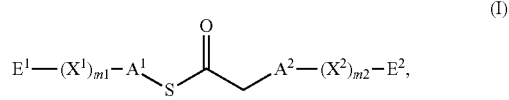

wherein in (I): $A^1$ and $A^2$ are each independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_{12}$-$C_{15}$ heteroalkylene, optionally substituted $C_2$-$C_{15}$ heteroalkenylene and optionally substituted $C_2$-$C_{15}$ heteroalkynylene; $E^1$ and $E^2$ are each independently selected from the group consisting of:

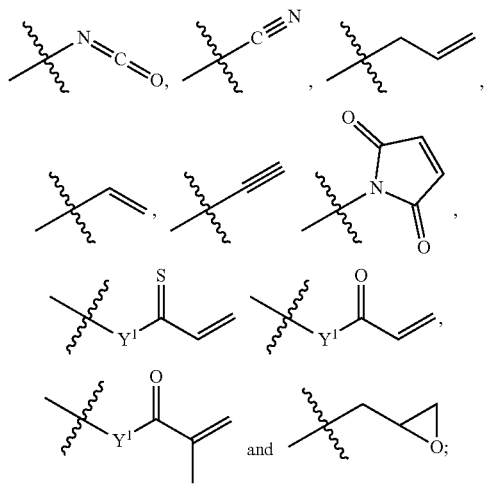

wherein each instance of $Y^1$ is independently selected from the group consisting of O and $NR^1$; and each instance of $R^1$ being independently selected from the group consisting of H and $C_1$-$C_6$ alkyl; m1 is 0 or 1; m2 is 0 or 1; $X^1$ is

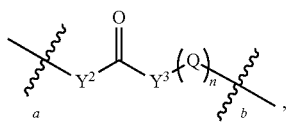

wherein: bond a is to $A^1$, bond b is to $E^1$, Q is $CH_2$ or

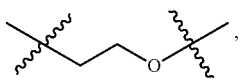 [SMILES: *CCO*]

and n is 0, 1, 2, 3, 4, 5 or 6; $X^2$ is

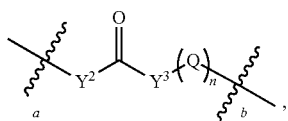

wherein: bond a is to $A^2$, bond b is to $E^2$, Q is $CH_2$ or

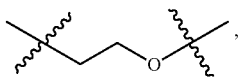 [SMILES: *CCO*]

and n is 0, 1, 2, 3, 4, 5 or 6; each instance of $Y^2$ and $Y^3$ is independently selected from the group consisting of $CR^1_2$, O and $NR^1$; and each instance of $R^1$ is independently selected from the group consisting of H and $C_1$-$C_6$ alkyl. In certain embodiments, the composition of the invention comprises at least one multifunctional thiol monomer. In certain embodiments, the composition of the invention comprises at least one of a base and a nucleophile.

In certain embodiments, the at least one multifunctional thioester containing monomer is a monomer of Formula (Ia):

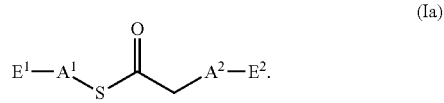

(Ia)

In certain embodiments, the at least one multifunctional thioester containing monomer is selected from the group consisting of: allyl 4-((3-(allyloxy)-3-oxopropyl)thio)-4-oxobutanoate; S-(2-isocyanatoethyl) 3-isocyanatopropanethioate; S-(2-(((allyloxy)carbonyl)amino)ethyl) 3-(((allyloxy)carbonyl)amino)propanethioate; S-(2-(3-allylureido)ethyl) 3-(3-allylureido)propanethioate; S-(2-(((oxiran-2-ylmethoxy)carbonyl)amino)ethyl) 3-(((oxiran-2-ylmethoxy)carbonyl)amino)propanethioate; S-(2-(3-allyl-3-(tert-butyl)ureido)ethyl) 3-(3-allyl-3-(tert-butyl)ureido)propanethioate; 4,9,13-trioxo-3,14-dioxa-8-thia-5,12-diazahexadecane-1,16-diyl diacrylate; 4,9,13-trioxo-3,14-dioxa-8-thia-5,12-diazahexadecane-1,16-diyl bis(2-methylacrylate); 2-(acryloyloxy)ethyl 4-((3-(2-(acryloyloxy)ethoxy)-3-oxopropyl)thio)-4-oxobutanoate; 2-(methacryloyloxy)ethyl 4-((3-(2-(methacryloyloxy)ethoxy)-3-oxopropyl)thio)-4-oxobutanoate;

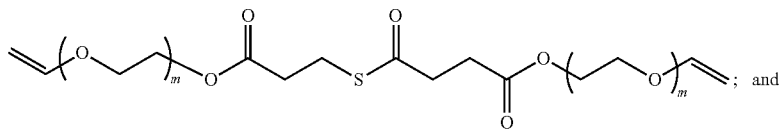; and wherein m is 0, 1, 2, 3, 4, 5 or 6.

In certain embodiments, the at least one multifunctional thiol monomer is selected from the group consisting of:

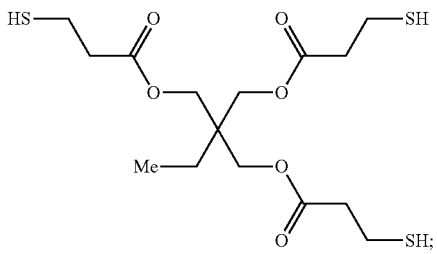

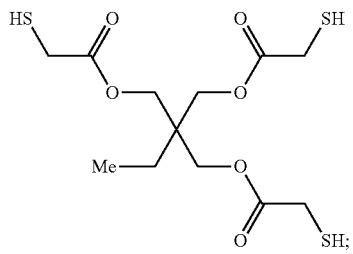

-continued
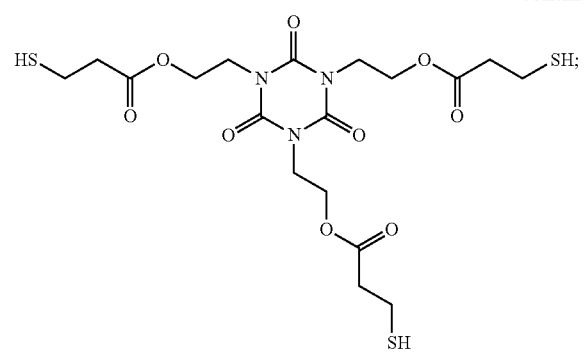
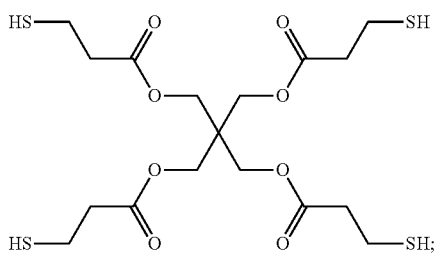
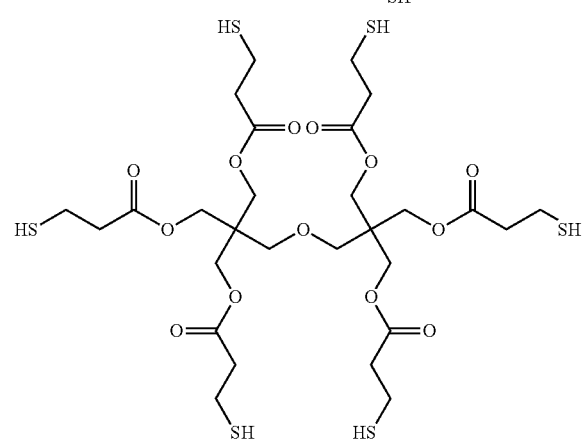
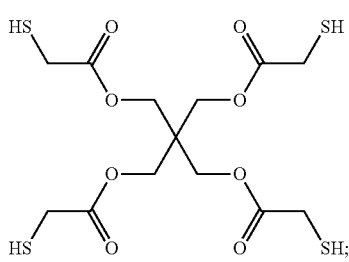
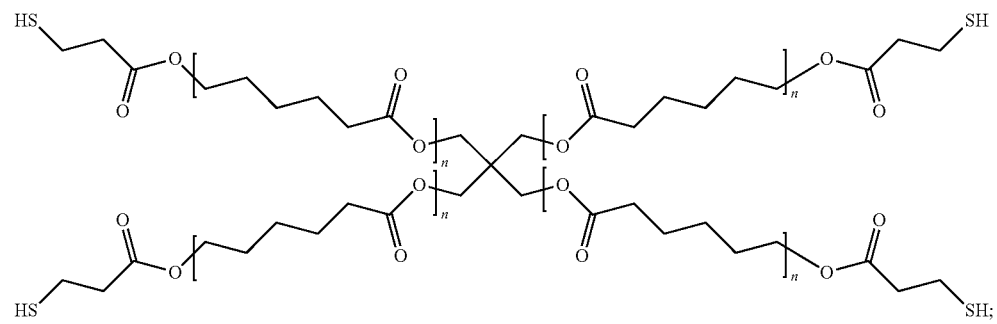
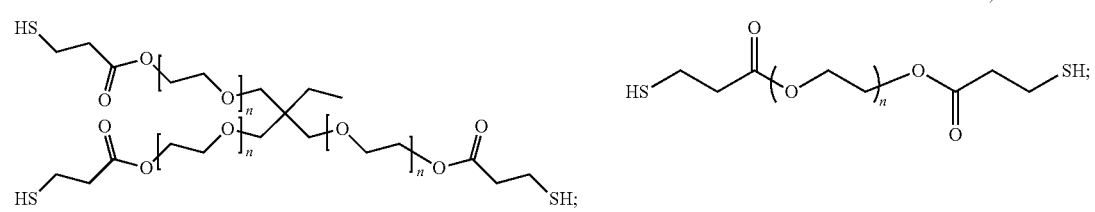
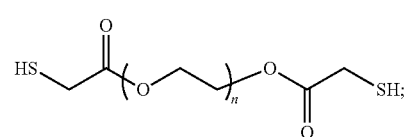
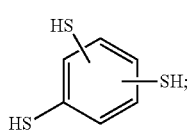
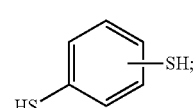
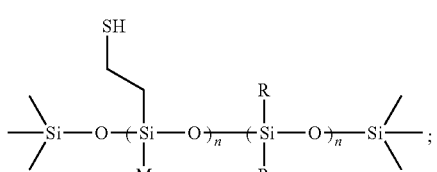
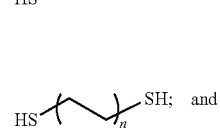 and
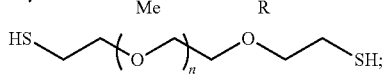

wherein each instance of n is independently an integer from 0 to 500.

In certain embodiments, the at least one multifunctional thiol monomer is selected from the group consisting of: pentaerythritol tetramercaptopropionate (PETMP); ethylene glycol bis(3-mercaptopropionate) (EGBMP); trimethylolpropane tris(3-mercaptopropionate) (TMPMP); 2,4,6-trioxo-1,3,5-triazina-triy (triethyl-tris (3-mercapto propionate); 1,2-ethanedithiol; 1,3-propanedithiol; 1,4-butanedithiol; 1,5-pentanedithiol; 1,6-hexanedithiol; 1,8-octanedithiol; 1,9-nonanedithiol; 1,11-undecanedithiol; 1,16-hexadecanedithiol; 2,5-dimercaptomethyl-1,4-dithiane; pentaerythritol tetramercaptoacetate; trimethylolpropane trimercaptoacetate; glycol dimercaptoacetate; 2,3-dimercapto-1-propanol; DL-dithiothreitol; 2-mercaptoethylsulfide; 2,3-(dimercaptoethylthio)-1-mercaptopropane; 1,2,3-trimercaptopropane; toluenedithiol; benzenedithiol; biphenyldithiol; benzenedimethanethiol; xylylenedithiol; 4,4'-dimercaptostilbene; and glycol dimercaptopropionate.

In certain embodiments, the base is capable of deprotonating at least about 10% of the thiol groups in the multifunctional thiol monomers. In other embodiments, the base has a conjugate acid with a pKa from about 2 to about 15. In yet other embodiments, the base is capable of deprotonating at least about 10% of the thiol groups in the composition. In yet other embodiments, the base is selected from the group consisting of an alkylthiolate salt, tetramethylguanidine (TMG), 1,8-Diazabicyclo[5,4,0]undec-7-ene (DBU), N,N-Diisopropylethylamine (DIPEA or Hunig's base), 4-tert-butyl pyridine, triethylamine (TEA), and N,N,N',N'',N''-pentamethyldiethylenetriamine (PMDETA).

In certain embodiments, the nucleophile has a nucleophilicity value (N) greater than about 10. In other embodiments, the nucleophile is selected from the group consisting of quinuclidine, 1,4-diazabicyclo[2.2.2]octane (DABCO), 4-Dimethylaminopyridine (DMAP), IMes, IPr, Ender's carbene, $PPh_3$ $P(nBu)_3$, $P(tBu)_3$, $PCy_3$, and $PMe_3$.

In certain embodiments, the composition further comprises at least one polymerization initiator selected from the group consisting of a photoinitiator, a thermal initiator and a redox initiator.

In certain embodiments, the at least one photoinitiator is activated upon exposure to light in the IR range, visible range, and/or UV range. In yet other embodiments, the at least one photoinitiator is selected from the group consisting of: acetophenone, benzophenone, 2-phenylacetophenone, 2,2-dimethoxy-2-phenylacetophenone, Bis(2,4,6-trimethylbenzoyl)-phenylphosphineoxide, 2-Hydroxy-4'-(2-hydroxyethoxy)-2-methylpropiophenone, 2-methyl-(4-methylthienyl)-2-morpholinyl-1-propan-1-one, Diphenyl(2,4,6-trimethylbenzoyl)phosphine oxide, Ethyl (2,4,6-trimethylbenzoyl) phenyl phosphinate, lithium phenyl-2,4,6-trimethylbenzoylphosphinate,

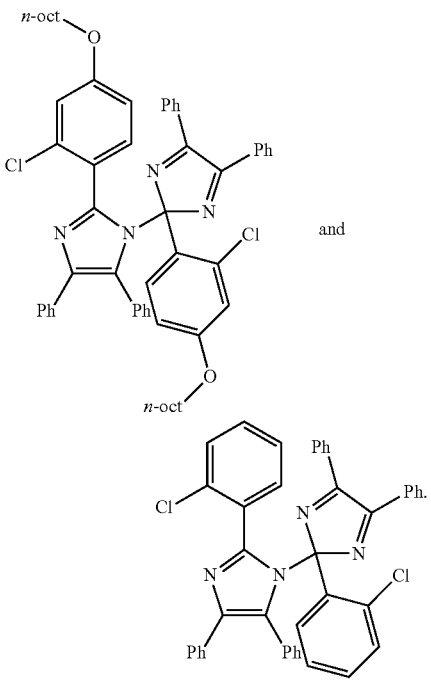

In certain embodiments, the at least one thermal initiator is reactive upon exposure to temperatures of about 30° C. to about 200° C. In yet other embodiments, the at least one thermal initiator is a compound selected from the group consisting of tert-Amyl peroxybenzoate, 4,4-Azobis(4-cyanovaleric acid), 1,1'-Azobis(cyclohexanecarbonitrile), 2,2'-Azobisisobutyronitrile (AIBN), Benzoyl peroxide, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

In certain embodiments, the at least one redox initiator is one or more compounds selected from the group consisting of: sodium iodide/hydrogen peroxide, potassium iodide/hydrogen peroxide, benzoyl peroxide/dimethylaniline, benzoyl peroxide/N,N-dimethyl p-toluidine, benzoyl peroxide/4-N,N-dimethylaminophenethyl alcohol, benzoyl peroxide/ethyl 4-dimethylaminobenzoate, glucose oxidase/oxygen/iron(II) sulfate and copper(II) sulfate/sodium ascorbate.

In certain embodiments, the relative ratio between the at least one multifunctional thioester containing monomer and the at least one multifunctional thiol monomer in a such that the total number of thiol functionalities present on the at least one multifunctional thiol monomer within the composition is greater than the total number of $E^1$ and $E^2$ functionalities present on the at least one multifunctional thioester containing monomer.

In certain embodiments, the base is selected from the group consisting of a photo-activatable base and a thermal-activatable base.

In certain embodiments, the photo-activatable base is a compound selected from the group consisting of:

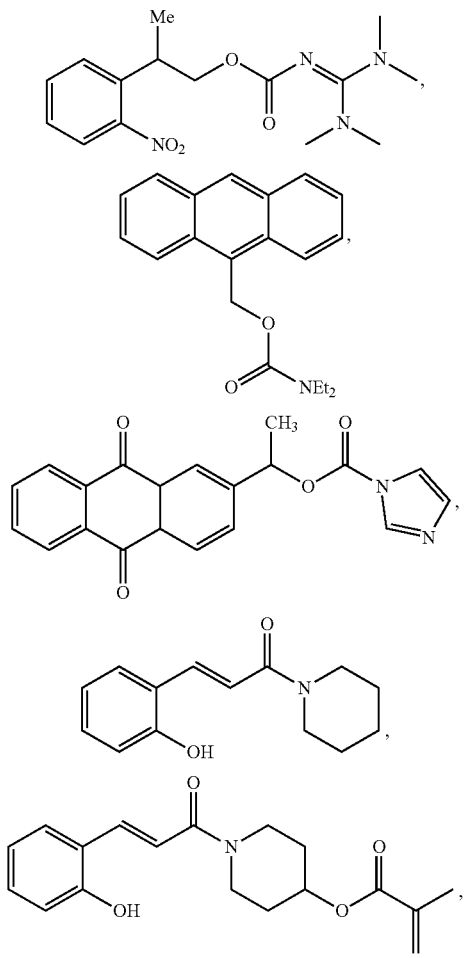

1,2-Diisopropyl-3-[Bis(dimethylamino) methylene]guanidium 2-(3-benzoylphenyl)propionate, 1,2-Dicyclohexyl-4,4,5,5-tetramethylbiguanidium n-butyltriphenylborate, and (Z)-{[Bis(dimethylamino)methylidene]amino}-N-cyclohexyl(cyclohexylamino)methaniminium tetrakis(3-fluorophenyl)borate.

In certain embodiments, the base is a thermal-activatable base selected from the group consisting of:

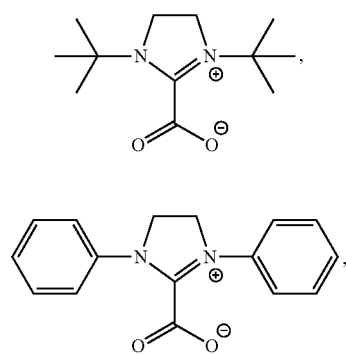

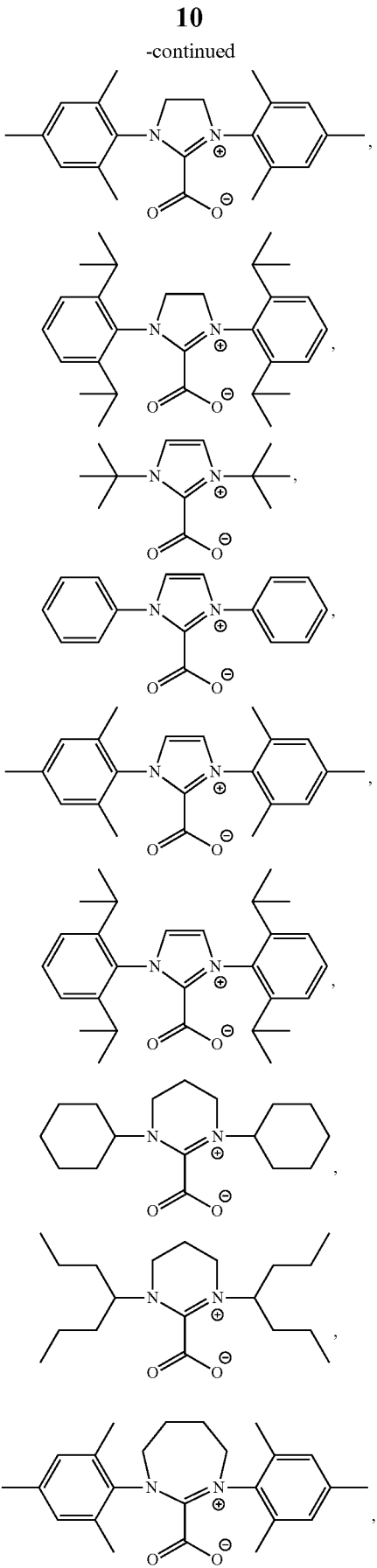

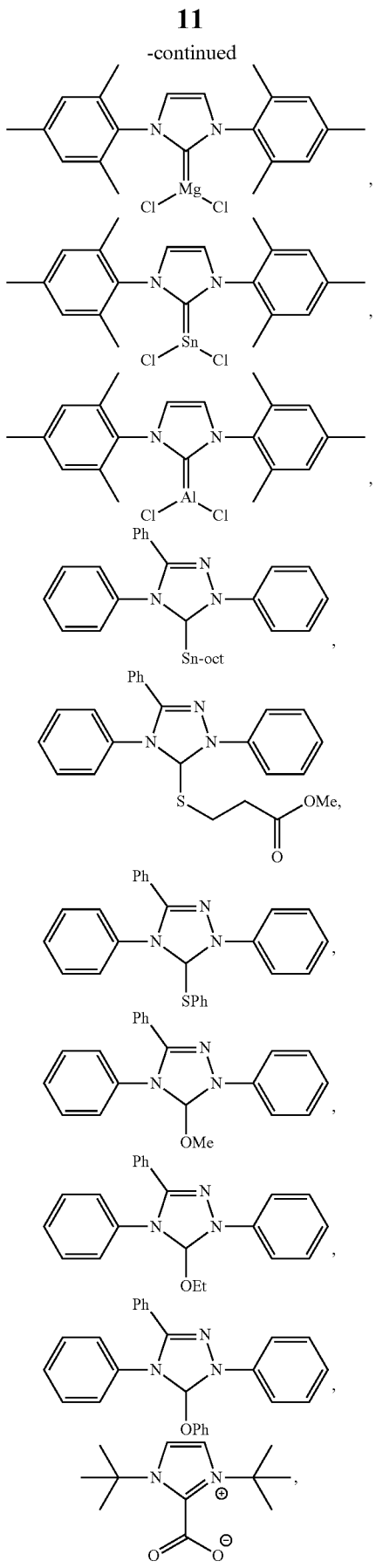

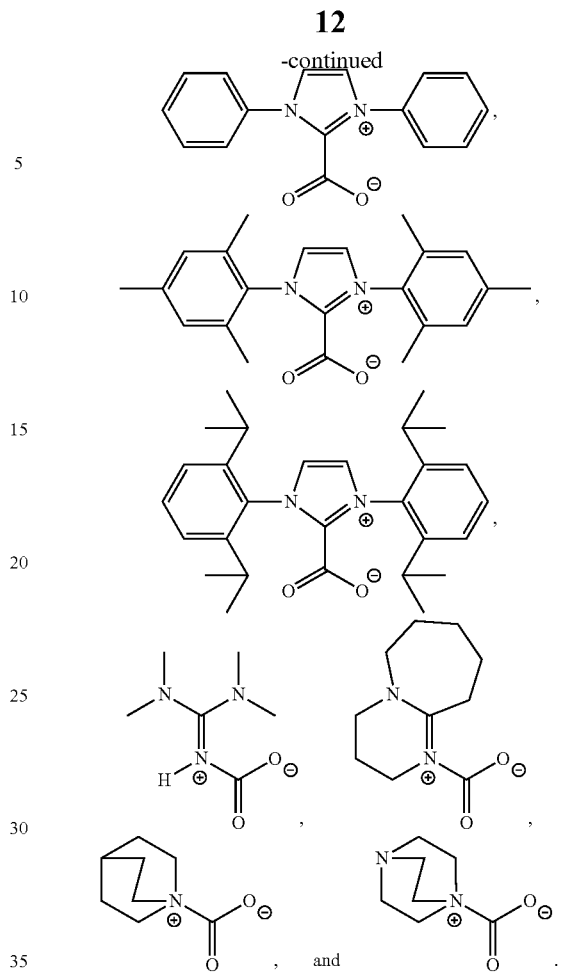

In certain embodiments, the composition further comprises an acid selected from the group consisting of a photo-activatable acid and a thermal-activatable acid. In other embodiments, the photo-activatable acid is a compound selected from the group consisting of:

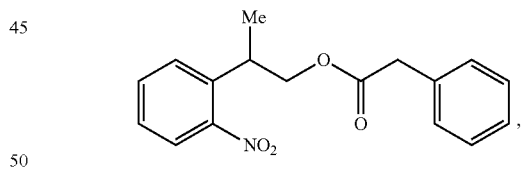

Bis(4-tert-butylphenyl)iodonium perfluoro-1-butanesulfonate, Bis(4-tert-butylphenyl)iodonium p-toluenesulfonate, Bis(4-tert-butylphenyl)iodonium, Boc-methoxyphenyldiphenylsulfonium triflate, (4-tert-Butylphenyl)diphenylsulfonium triflate, Diphenyliodonium hexafluorophosphate, Diphenyliodonium nitrate, Diphenyliodonium perfluoro-1-butanesulfonate, Diphenyliodonium p-toluenesulfonate, Diphenyliodonium triflate, (4-Fluorophenyl)diphenylsulfonium triflate, N-Hydroxynaphthalimide triflate, N-Hydroxy-5-norbornene-2,3-dicarboximide perfluoro-1-butanesulfonate, (4-Iodophenyl)diphenylsulfonium triflate, (4-Methoxyphenyl)diphenylsulfonium triflate, 2-(4-Methoxystyryl)-4,6-bis (trichloro methyl)-1,3,5-triazine, (4-Methylphenyl)diphenylsulfonium triflate, (4-Methylthio phenyl) methylphenyl sulfonium triflate, (4-Phenoxyphenyl)diphenylsulfonium triflate, (4-Phenylthio phenyl)

diphenylsulfonium triflate, Triaryl sulfonium hexafluorophosphate salts, Triphenyl sulfonium perfluoro-1-butanesulfonate, Triphenylsulfonium triflate, Tris(4-tert-butylphenyl) sulfonium perfluoro-1-butanesulfonate, and Tris(4-tert-butylphenyl)sulfonium triflate.

In other embodiments, the thermal-activatable acid selected from the group consisting of:

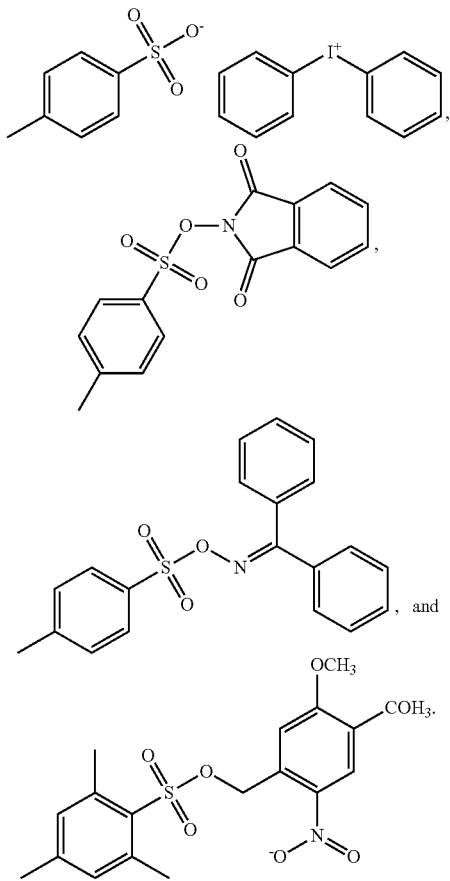

In certain embodiments, the monomers undergo at least partial polymerization to form a covalent adaptable network (CAN) polymer. In other embodiments, the CAN comprising an activatable base does not exhibit significant bond exchange before activation of the base. In yet other embodiments, the CAN comprising an activatable base exhibits bond exchange after activation of the base. In other embodiments, the CAN comprising an activatable acid exhibits bond exchange before activation of the acid. In yet other embodiments, the CAN comprising an activatable base does not exhibit significant bond exchange after activation of the acid.

The invention further provides a composition comprising a cross-linked CAN polymer comprising a plurality of thioester linkages and a plurality of free thiol groups, and further comprising at least one exchange catalyst selected from a base and a nucleophile.

In certain embodiments, the at least one exchange catalyst is covalently bound to the CAN polymer. In other embodiments, the at least one exchange catalyst is not covalently bound to the CAN polymer.

In certain embodiments, the base is capable of deprotonating at least about 10% of the free thiol groups in the CAN. In other embodiments, the nucleophile has a nucleophilicity value (N) greater than about 10.

In certain embodiments, the CAN is formed through one or more processes selected from the group consisting of thiol-ene polymerization, thiol-alkyne polymerization, thiol-acrylate polymerization, thiol-methacrylate, acrylate polymerization, methacrylate polymerization, styrene polymerization, alcohol-isocyanate polymerization, thiol-isocyanate polymerization, thiol-epoxide polymerization, thiol-isothiocyanate polymerization, thiol-halide polymerization, thiol-malemide, thiol-activated ester polymerization, copper-catalyzed azide alkyne polymerization, strain-promoted azide alkyne polymerization, and epoxide-carboxylic acid polymerization.

In certain embodiments, the polymer network undergoes bond exchange through nucleophilic attack on the thioester linkages by the free thiol groups.

In certain embodiments, the polymer exhibits plasticity. In other embodiments, the polymer can be reshaped after polymerization. In yet other embodiments, the polymer is capable of alleviating polymerization induced stress.

In certain embodiments, the base is selected from the group consisting of a photo-activatable base and a thermal-activatable base. In other embodiments, the photo-activatable base is a compound selected from the group consisting of:

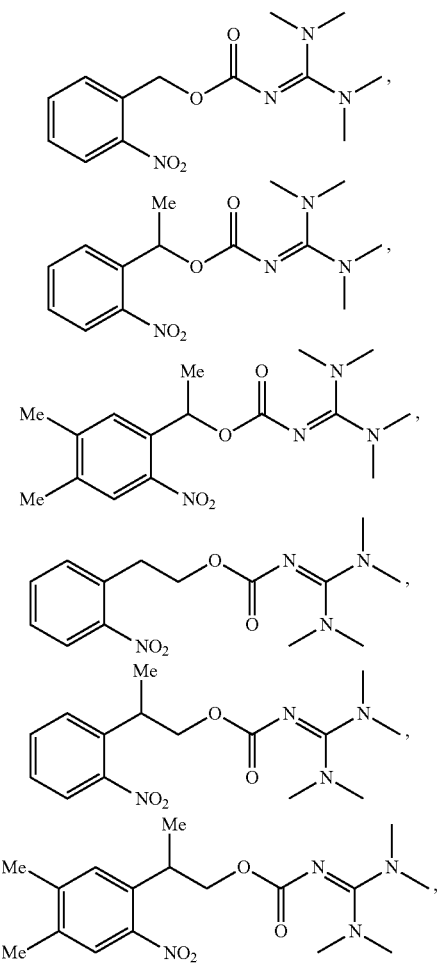

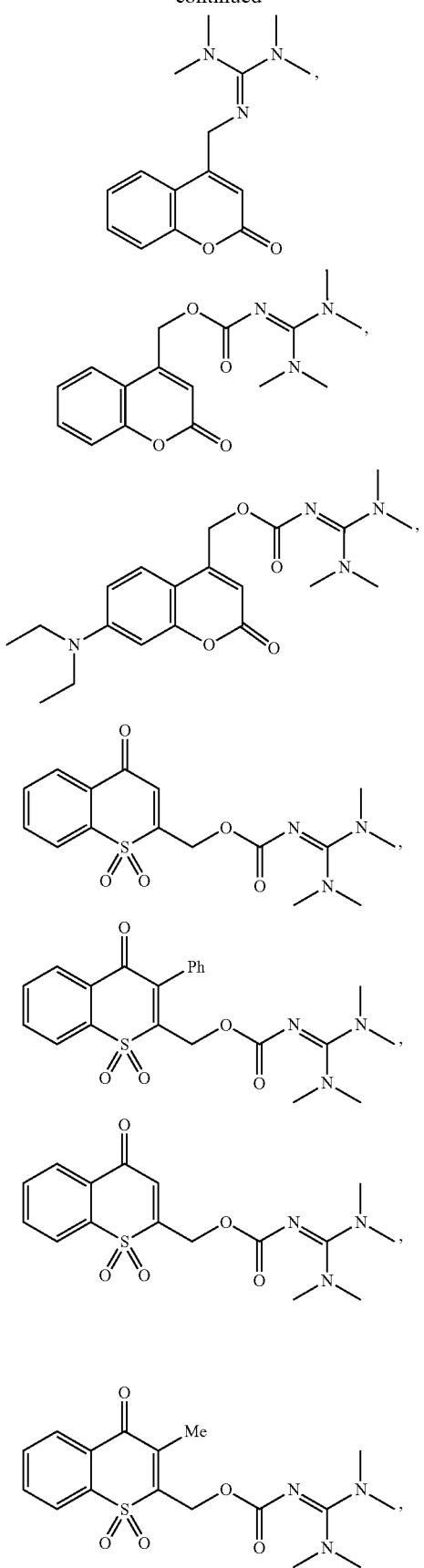
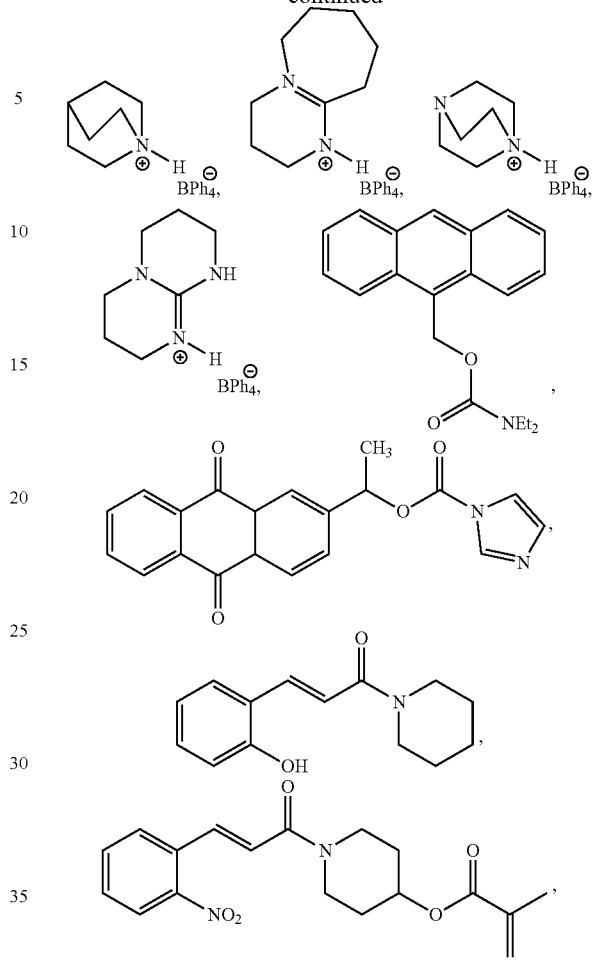

1,2-Diisopropyl-3-[Bis(dimethylamino)methylene]guanidium 2-(3-benzoylphenyl)propionate, 1,2-Dicyclohexyl-4,4,5,5-tetramethylbiguanidium n-butyltriphenylborate, and (Z)-{[Bis(dimethylamino)methylidene]amino}-N-cyclohexyl(cyclohexylamino)methaniminium tetrakis(3-fluorophenyl)borate.

In other embodiments, the base is a thermal-activatable base selected from the group consisting of:

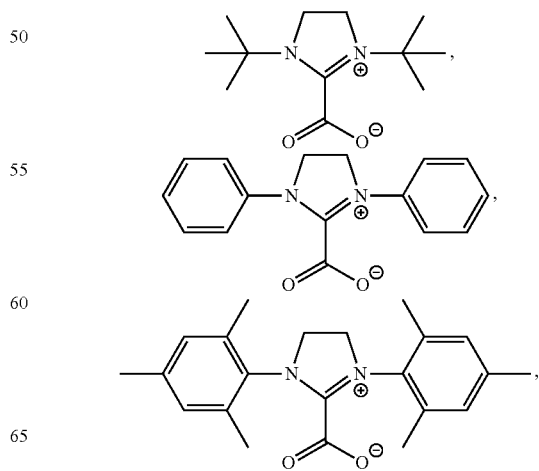

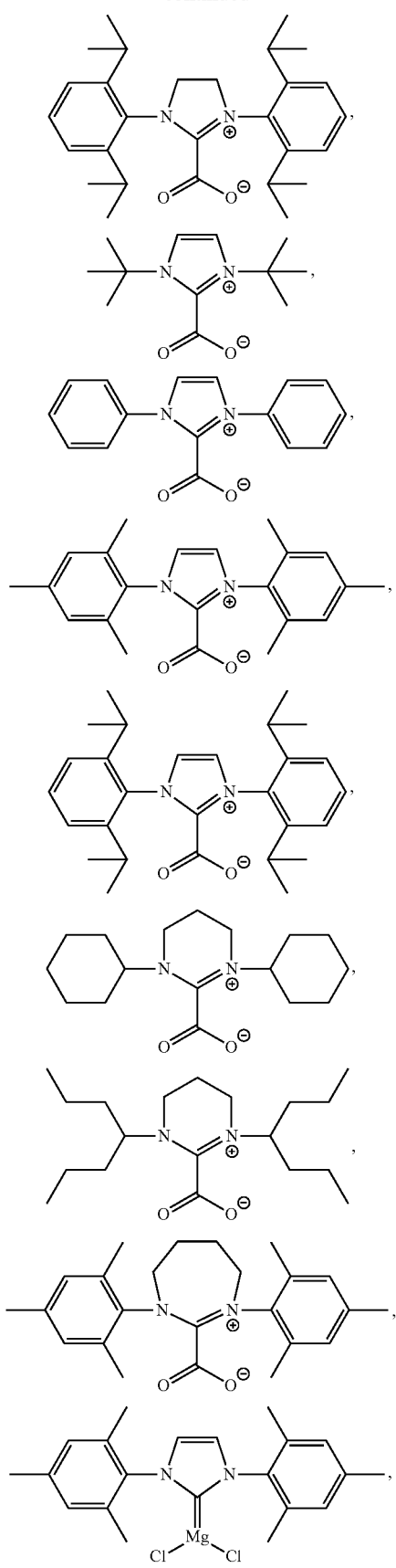
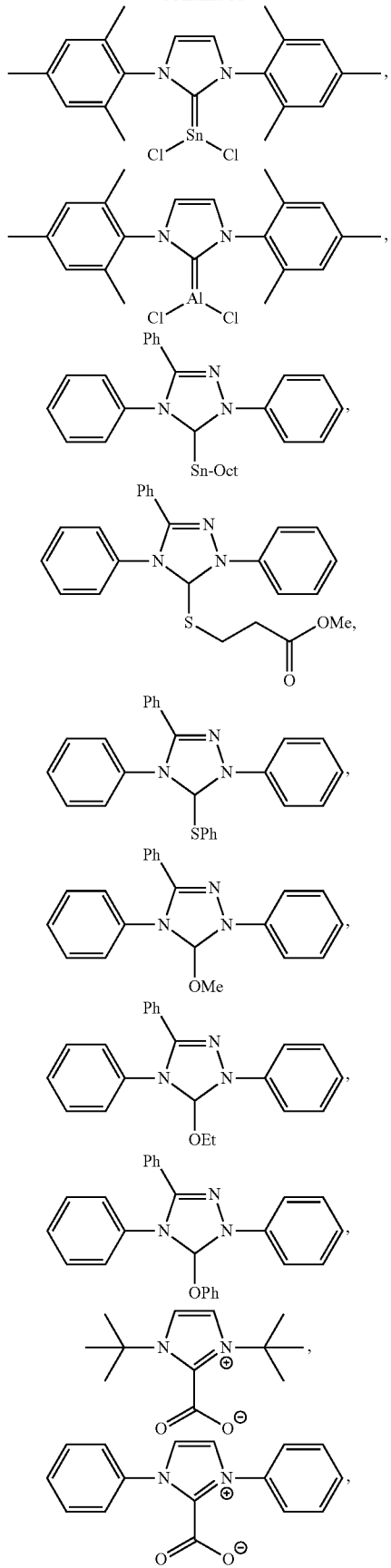

-continued

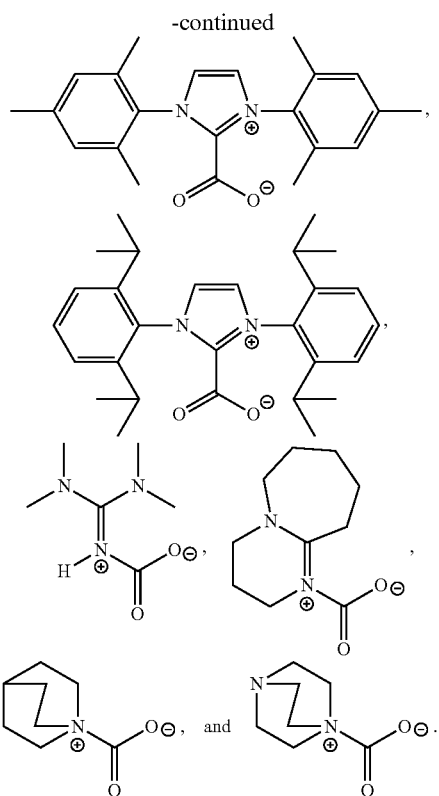

In certain embodiments, the CAN does not exhibit significant bond exchange before activation of the base. In other embodiments, the CAN exhibits bond exchange after activation of the base.

In certain embodiments, the CAN further comprises an acid selected from the group consisting of a photo-activatable acid and a thermal-activatable acid. In other embodiments, the photo-activatable acid is a compound selected from the group consisting of:

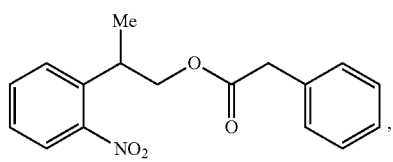 [SMILES: CC(COC(=O)Cc1ccccc1)c1ccccc1[N+](=O)[O-]]

Bis(4-tert-butylphenyl)iodonium perfluoro-1-butanesulfonate, Bis(4-tert-butylphenyl)iodonium p-toluenesulfonate, Bis(4-tert-butylphenyl)iodonium, Boc-methoxyphenyldiphenylsulfonium triflate, (4-tert-Butylphenyl)diphenylsulfonium triflate, Diphenyliodonium hexafluorophosphate, Diphenyliodonium nitrate, Diphenyliodonium perfluoro-1-butanesulfonate, Diphenyliodonium p-toluenesulfonate, Diphenyliodonium triflate, (4-Fluorophenyl)diphenylsulfonium triflate, N-Hydroxynaphthalimide triflate, N-Hydroxy-5-norbornene-2,3-dicarboximide perfluoro-1-butanesulfonate, (4-Iodophenyl)diphenylsulfonium triflate, (4-Methoxyphenyl)diphenylsulfonium triflate, 2-(4-Methoxystyryl)-4,6-bis(trichloro methyl)-1,3,5-triazine, (4-Methylphenyl)diphenylsulfonium triflate, (4-Methylthiophenyl)methyl phenyl sulfonium triflate, (4-Phenoxyphenyl)diphenylsulfonium triflate, (4-Phenylthiophenyl)diphenylsulfonium triflate, Triarylsulfonium hexafluorophosphate salts, Triphenylsulfonium perfluoro-1-butanesulfonate, Triphenylsulfonium triflate, Tris(4-tert-butylphenyl)sulfonium perfluoro-1-butanesulfonate, and Tris(4-tert-butylphenyl)sulfonium triflate.

In other embodiments, the thermal-activatable acid is selected from the group consisting of:

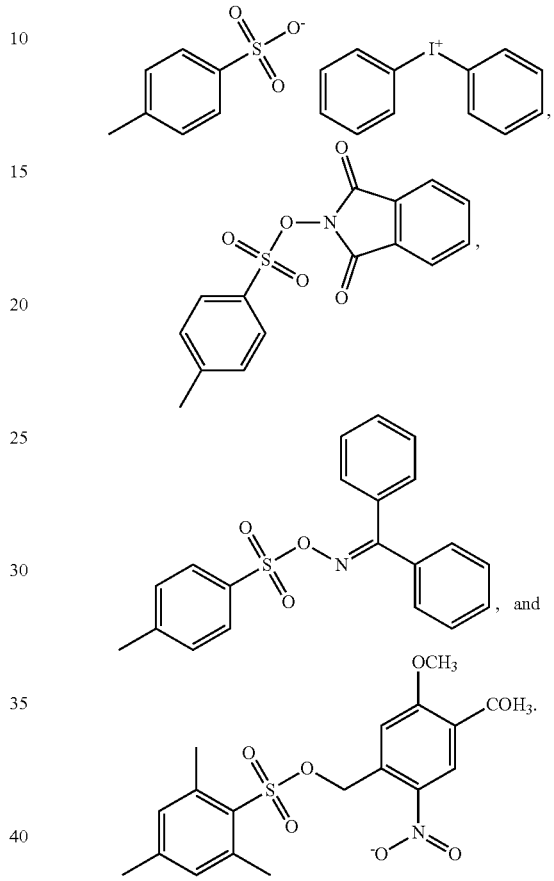

In certain embodiments, the CAN exhibits bond exchange before activation of the acid. In other embodiments, the CAN does not exhibit significant bond exchange after activation of the acid.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIG. 10A is a surface profile of the imprinted surface over time, continuously monitored by contact AFM and analyzed at various time points. FIG. 10B is a graph of the imprinted pattern height changes against elapsed time after imprinting. FIG. 10C is a 10×10 µm area topography of the imprinted surface. Surface defects are due to defects in the silicon master. FIG. 10D is a set of photographs demonstrating changes in the optical reflective properties of the film over time after imprinting. After 24 hours, the surface pattern had faded to the point where colored reflection was no longer visible at the same viewing angle.

FIG. 12A is a graph of a partial cure experiment with a stoichiometric thiol-ene resin, including stress relaxation of various conditions and a nanoimprint lithography demonstration. In films where the second stage light exposure was performed through a photomask, the areas that were not exposed to light retained thiols to undergo bond rearrangement; in irradiated areas, remaining free thiols were completely consumed. FIG. 12B shows that nanoimprint lithography on the entire film surface, followed by a floodcure, resulted in a colored reflection only in unexposed regions. Scale bar on photographic image is 5 mm; scale bar on optical micrograph inset is 100 µm. FIG. 12C is a graph showing a demonstration of a photoprotected base as an on-switch for bond rearrangement within the network. A creep experiment revealed that the network behaved as a typical crosslinked elastomer until it was exposed to low-wavelength UV light, which caused the release of the base TMG within the network.

FIG. 18A depicts the formation of the original lense. FIG. 18B is a set of images showing the lens depicted in FIG. 18A being cut. FIG. 18C is a set of images showing the compression and reformation of the cut polymeric material. FIG. 18D is an image of the reformed lens.

DETAILED DESCRIPTION OF THE INVENTION

Figure 1A:
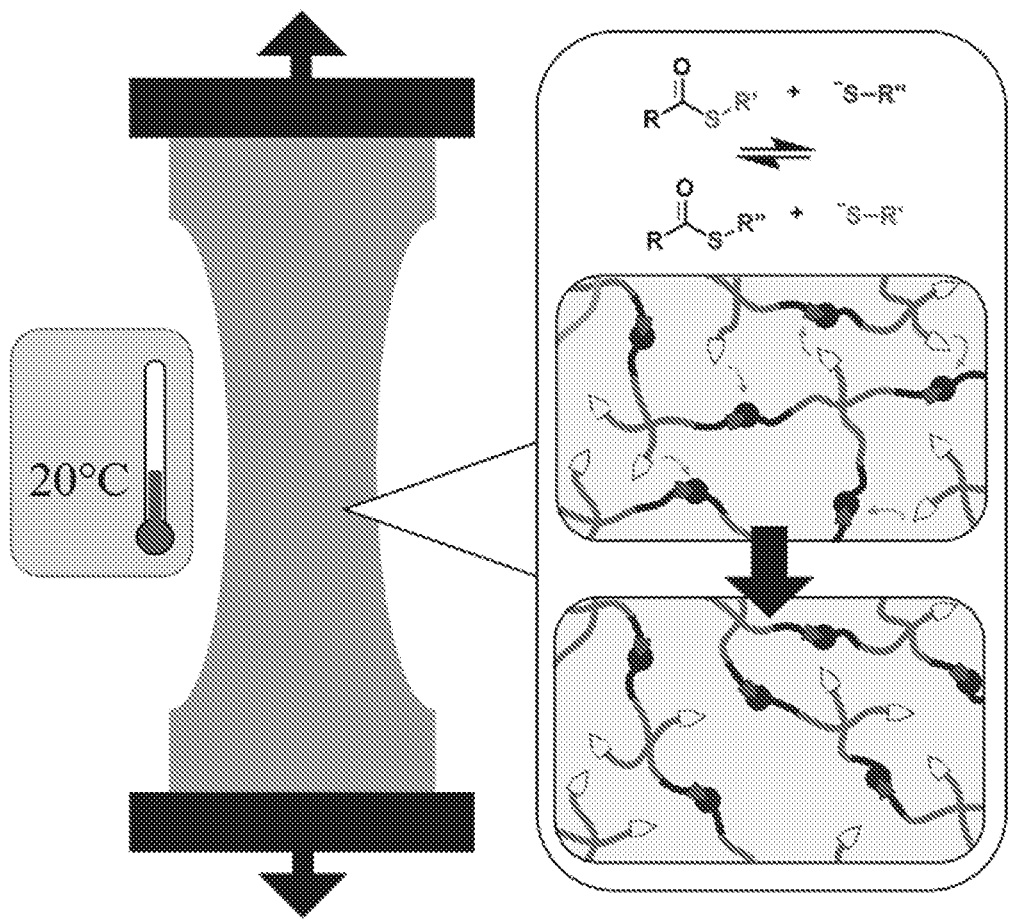
FIG. 1A is a diagram of the conceptual overview of stress relaxation in macroscopic networks via thiol-thioester exchange. When free thiol groups and a catalyst capable of creating a concentration of thiolate are present, exchange reactions occur continuously without external intervention at ambient temperature.
Figure 1B:
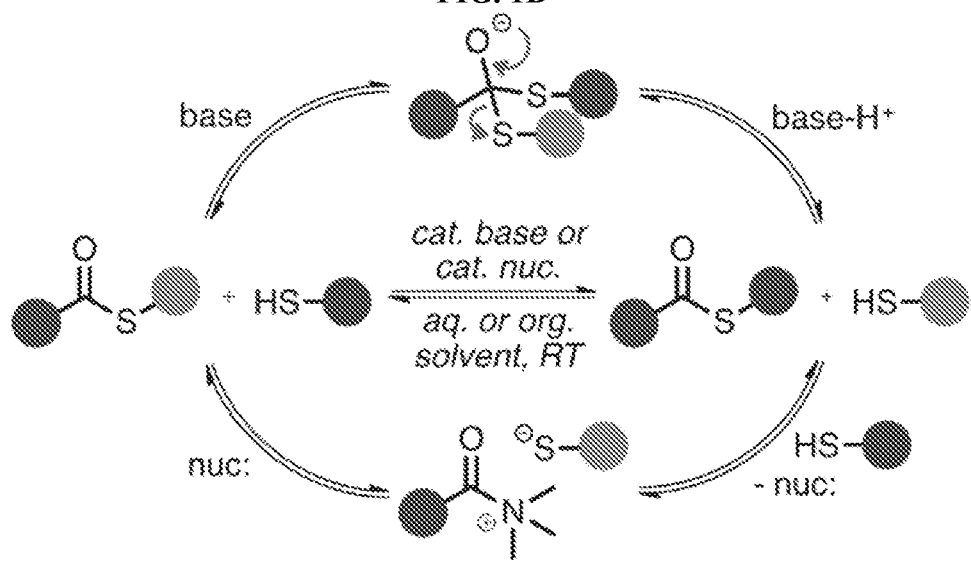
FIG. 1B is a simplified representation of mechanisms for the thiol-thioester exchange catalyzed by bases (top pathway) and nucleophiles (bottom pathway).

The present invention relates to the unexpected discovery of covalent adaptable networks (CANs) that have exchangeable crosslinks and are able to undergo repeated covalent bond reshuffling at ambient temperatures. The invention provides CAN-forming compositions as well as methods of forming, remolding and recycling the CANs of the invention.

Definitions

As used herein, each of the following terms has the meaning associated with it in this section.

Unless defined otherwise, all technical and scientific terms used herein generally have the same meaning as commonly understood by one of ordinary skill in the art to which this invention belongs. Generally, the nomenclature used herein and the laboratory procedures in cell culture, molecular genetics, and organic chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a concentration, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "alkene monomer" or "alkene-based substrate" refers to a small molecule or a polymeric molecule comprising at least one reactive alkenyl group. An "alkenyl group" is an unsaturated, linear or branched or cyclic hydrocarbon group consisting at least one carbon-carbon double bond. In certain embodiments, the ene-based substrate comprises at least one alkenyl group (C=C).

As used herein, the term "alkyne monomer" or "alkyne-based substrate" refers to a small molecule or a polymeric molecule comprising at least one reactive alkynyl group. An "alkynyl group" is an unsaturated, linear or branched or cyclic hydrocarbon group consisting at least one carbon-carbon triple bond. In certain embodiments, the alkyne-based substrate comprises at least one terminal alkynyl group (—C≡CH).

As used herein, the term "ene monomer" refers to a monomer comprising at least one reactive alkene group, or a reactive alkene equivalent, such as but not limited to an oxirane group.

As used herein, the term "depolymerization" refers to the reaction wherein a polymer is at least partially converted to at least one oligomer and/or a monomer, or an oligomer is at least partially converted to at least one smaller oligomer and/or a monomer.

The term "monomer" refers to any discreet chemical compound of any molecular weight. As used herein, the term "nucleophilicity value" is defined as those obtained from the equation: log $k_{20°\ C.} = s_N(N+E)$, wherein E=electrophilicty parameter, N=nucleophilicty parameter (solvent dependent), $s_N$=nucleophile-specific sensitivity parameter (solvent dependent). All nucleophilicity values were taken from Baidya, et al., 2007, Angew. Chem. Int. Ed. 46:6176, and are values obtained in MeCN.

As used herein, the term "Type I photoinitiator" refers to a compound that undergoes a unimolecular bond cleavage upon irradiation to yield free radicals. Non-limiting examples of Type I photoinitiators are benzoin ethers, benzyl ketals, α-dialkoxy-acetophenones, α-hydroxy-alkylphenones, α-amino-alkylphenones and acyl-phosphine oxides.

As used herein, the term "Type II photoinitiator" refers to a combination of compounds that undergo a bimolecular reaction where the excited state of the photoinitiator interacts with a second molecule (often known as "co-initiator") to generate free radicals.

As used herein, the term "pKa" refers to the –log of the acid dissociation constant (Ka) of a compound. All pKa values referred to herein are pKa values for a compound dissolved in water.

As used herein, the term "polymer" refers to a molecule composed of repeating structural units typically connected by covalent chemical bonds. The term "polymer" is also meant to include the terms copolymer and oligomers. In certain embodiments, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "polymerization" or "crosslinking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In certain embodiments, polymerization or crosslinking of at least one functional group results in about 100% consumption of the at least one functional group. In other embodiments, polymerization or crosslinking of at least one functional group results in less than about 100% consumption of the at least one functional group.

As used herein, the term "reaction condition" refers to a physical treatment, chemical reagent, or combination thereof, which is required or optionally required to promote a reaction. Non-limiting examples of reaction conditions are electromagnetic radiation (such as, but not limited to visible light), heat, a catalyst, a chemical reagent (such as, but not limited to, an acid, base, electrophile or nucleophile), and a buffer.

As used herein, the term "reactive" as applied to thiol, isocyanate, oxirane, alkyne or alkene groups indicate that these groups under appropriate conditions may take part in one or more reactions as defined in this application.

As used herein, the term "thiol-ene reaction" refers to an organic reaction between a thiol monomer and an ene/yne monomer. In certain embodiments, the ene monomer is an α,β-unsaturated ester, acid, sulfone, nitrile, ketone, amide, aldehyde, or nitro compound (Hoyle, et al, Angew. Chem. Inti Ed., 2010, 49(9):1540-1573); the thiol-ene reaction involving such reactants is known as "thiol-Michael reaction."

As used herein, the term "thiol-ene polymerization" refers to polymerization wherein at least one thiol-ene reaction takes place.

As used herein, the term "alkyl", by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is ($C_1$-$C_6$)

alkyl, such as, but not limited to, ethyl, methyl, isopropyl, isobutyl, n-pentyl, n-hexyl and cyclopropylmethyl.

As used herein, the term "cycloalkyl", by itself or as part of another substituent means, unless otherwise stated, a cyclic chain hydrocarbon having the number of carbon atoms designated (i.e., $C_3$-$C_6$ means a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Most preferred is ($C_3$-$C_6$)cycloalkyl, such as, but not limited to, cyclopropyl, cyclobutyl, cyclopentyl and cyclohexyl.

As used herein, the term "alkenyl", employed alone or in combination with other terms, means, unless otherwise stated, a stable mono-unsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkynyl", employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers.

As used herein, the term "alkylene" by itself or as part of another substituent means, unless otherwise stated, a straight or branched hydrocarbon group having the number of carbon atoms designated (i.e., $C_1$-$C_{10}$ means one to ten carbon atoms) and includes straight, branched chain, or cyclic substituent groups, wherein the group has two open valencies. Examples include methylene, 1,2-ethylene, 1,1-ethylene, 1,1-propylene, 1,2-propylene and 1,3-propylene. Heteroalkylene substituents can a group consisting of the stated number of carbon atoms and one or more heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group.

As used herein, the term "alkenylene", employed alone or in combination with other terms, means, unless otherwise stated, a stable mono-unsaturated or di-unsaturated straight chain or branched chain hydrocarbon group having the stated number of carbon atoms wherein the group has two open valencies.

As used herein, the term "alkynylene", employed alone or in combination with other terms, means, unless otherwise stated, a stable straight chain or branched chain hydrocarbon group with a triple carbon-carbon bond, having the stated number of carbon atoms wherein the group has two open valencies.

As used herein, the term "substituted alkyl", "substituted cycloalkyl", "substituted alkenyl", "substituted alkynyl", "substituted alkylene", "substituted alkenylene" or "substituted alkynylene" means alkyl, cycloalkyl, alkenyl, alkynyl, alkylene, alkenylene, alkynylene as defined above, substituted by one, two or three substituents selected from the group consisting of $C_1$-$C_{10}$ alkyl, halogen, =O, —OH, alkoxy, tetrahydro-2-H-pyranyl, —$NH_2$, —N($CH_3$)$_2$, (1-methyl-imidazol-2-yl), pyridin-2-yl, pyridin-3-yl, pyridin-4-yl, —C(=O)OH, trifluoromethyl, —C≡N, —C(=O) O($C_1$-$C_4$)alkyl, —C(=O)$NH_2$, —C(=O)NH($C_1$-$C_4$)alkyl, —C(=O)N(($C_1$-$C_4$)alkyl)$_2$; —$SO_2NH_2$, —C(=NH)$NH_2$, and —$NO_2$, preferably containing one or two substituents selected from halogen, —OH, alkoxy, —$NH_2$, trifluoromethyl, —N($CH_3$)$_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are ($C_1$-$C_3$) alkoxy, such as, but not limited to, ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—$CH_2$—$CH_2$—$CH_3$, —$CH_2$—$CH_2$—$CH_2$—OH, —$CH_2$—$CH_2$—NH—$CH_3$, —$CH_2$—S—$CH_2$—$CH_3$, and —$CH_2CH_2$—S(=O)—$CH_3$. Up to two heteroatoms may be consecutive, such as, for example, —$CH_2$—NH—$OCH_3$, or —$CH_2$—$CH_2$—S—S—$CH_3$.

As used herein, the term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH=CH—O—$CH_3$, —CH=CH—$CH_2$—OH, —$CH_2$—CH=N—$OCH_3$, —CH=CH—N($CH_3$)—$CH_3$, and —$CH_2$—CH=CH—$CH_2$—SH.

As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl", employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. Preferred are phenyl and naphthyl, most preferred is phenyl.

As used herein, the term "heterocycle" or "heterocyclyl" or "heterocyclic" by itself or as part of another substituent means, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group.

For aryl, aryl-($C_1$-$C_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two. In yet another embodiment, the substituents are independently selected from the group consisting of $C_{1-6}$ alkyl, —OH, $C_{1-6}$ alkoxy, halo, amino, acetamido and nitro. As used herein, where a substituent is an alkyl or alkoxy group, the carbon chain may be branched, straight or cyclic, with straight being preferred.

"Instructional material" as that term is used herein includes a publication, a recording, a diagram, or any other medium of expression that can be used to communicate the usefulness of the composition and/or compound of the invention in a kit. The instructional material of the kit may, for example, be affixed to a container that contains the compound and/or composition of the invention or be shipped together with a container that contains the compound and/or composition.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein: CAN(s)=covalent adaptable network(s); DAEC=diallyloctanedionate; DBU=1,8-Diazabicyclo[5,4,0]undec-7-ene; Di-PETMP=Dipentaerythritol hexa(3-mercaptopropionate); DMAP=4-Dimethylaminopyridine; DMPA=Irgacure 651 (2,2-Dimethoxy-2-phenylacetophonone); DSDAE=disulfide di-allylether; ETTMP=Ethoxilated-Trimethylolpropan Tri(3-Mercaptopropionate); FT-IR=Fourier transform infrared spectroscopy; HABI-1=2-chloro-4-(octyloxy)benzaldehyde; HABI-2=2-(2-chloro-4-(octyloxy)phenyl)-1-methyl-4,5-diphenyl-1H-imidazole; HABI-Cl=2,2'-bis(2-chlorophenyl)-4,4',5,5'-tetraphenyl-2'H-1,2'-biimidazole; HABI-O-n-oct=2,2'-bis(2-chloro-4-(octyloxy)phenyl)-4,4',5,5'-tetraphenyl-2'H-1,2'-biimidazole; IR=infrared; MPa, megapascal; NMR=nuclear magnetic resonance spectroscopy; PA=photoacid (in certain embodiments, 2-(2-nitrophenyl) propyl 2-phenylacetate); PB=photobase (in certain embodiments:

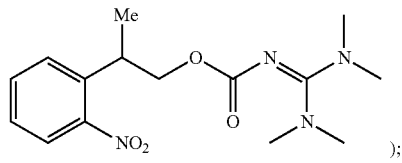 [SMILES: CC(COC(=O)N=C(N(C)C)N(C)C)c1ccccc1[N+](=O)[O-]]

);

PCL4MP=polycaprolactone tetra(3-mercaptopropionate); PETMP=Pentaerythritol tetrakis(3-mercaptopropionate); PMDETA=N,N,N',N'',N''-pentamethyldiethylenetriamine; RAFT=reversible addition-fragmentation chain transfer; TE-1=3-((4-(allyloxy)-4-oxobutanoyl)thio)propanoic acid; TEA=Triethylamine; TEDAE=thioester di-allyl ether (allyl 4-((3-(allyloxy)-3-oxopropyl)thio)-4-oxobutanoate); TEDI=thioester di-isocyanate; TEMPIC=Tris[2-(3-mercaptopropionyloxy)ethyl]isocyanurate; TMPTMP=trimethylolpropane tris(3-mercaptopropionate); UV=ultraviolet.

Compounds and Compositions

In certain embodiments, the invention includes a composition comprising at least one of the following:

(a) at least one multifunctional thioester containing monomer of Formula (I):

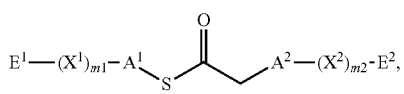

wherein in (I):

$A^1$ and $A^2$ are each independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_{12}$-$C_{15}$ heteroalkylene, optionally substituted $C_2$-$C_{15}$ heteroalkenylene and optionally substituted $C_2$-$C_{15}$ heteroalkynylene; $E^1$ and $E^2$ are each independently selected from the group consisting of:

wherein each instance of $Y^1$ is independently selected from the group consisting of O and $NR^1$; and each instance of $R^1$ is independently selected from the group consisting of H and $C_1$-$C_6$ alkyl;

m1 is 0 or 1; m2 is 0 or 1;

$X^1$ is

wherein: bond a is to $A^1$, bond b is to $E^1$, Q is $CH_2$ or

n is 0, 1, 2, 3, 4, 5 or 6;

$X^2$ is

wherein: bond a is to $A^2$, bond b is to $E^2$, Q is $CH_2$ or

and n is 0, 1, 2, 3, 4, 5 or 6;

each instance of $Y^2$, and $Y^3$ is independently selected from the group consisting of $CR^1_2$, O and $NR^1$; and each instance of $R^1$ is independently selected from the group consisting of H and $C_1$-$C_6$ alkyl;

(b) at least one multifunctional thiol monomer; and (c) at least one selected from the group consisting of a base and a nucleophile.

In certain embodiments, the multifunctional thioester containing monomer of Formula (I) is a monomer of Formula (Ia):

wherein $A^1$, $A^2$, $E^1$ and $E^2$ are defined as elsewhere herein.

In other embodiments, the multifunctional thioester containing monomer is selected from the group consisting of:

allyl 4-((3-(allyloxy)-3-oxopropyl)thio)-4-oxobutanoate

S-(2-isobyanatoethyl) 3-isocyanatopropanethioate

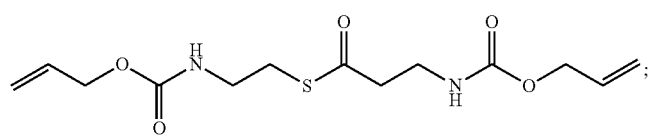

S-(2-(((allyloxy)carbonyl)amino)ethyl 3-(((allyloxy)carbonyl)amino)propanethioate

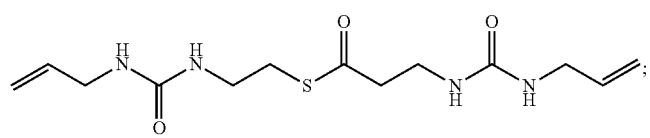

S-(2-(3-allylureido)ethyl) 3-(3-allylureido)propanethioate

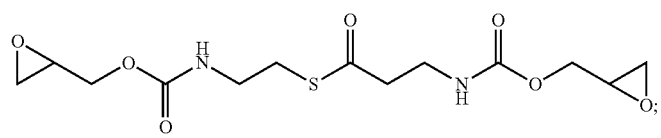

S-(2-(((oxiran-2-ylmethoxy)carbonyl)amino)ethyl 3-(((oxiran-2-ylmethoxy)carbonyl)amino)propanethioate

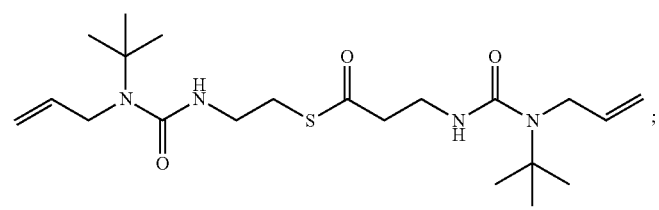

S-(2-(3-allyl-3-(tert-butyl)ureido)ethyl) 3-(3-allyl-3-(tert-butyl)ureido)propanethioate

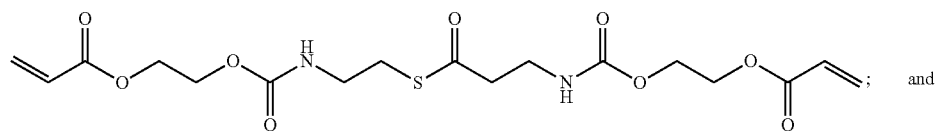 ; and 4,9,13-trioxo-3,14-dioxa-8-thia-5,12-diazahexadecane-1,16-diyl diacrylate

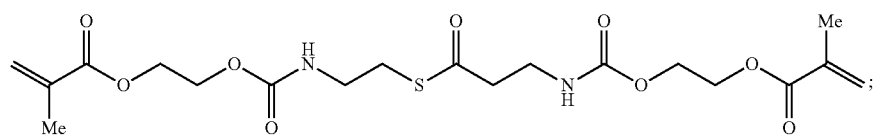

4,9,13-trioxo-3,14-dioxa-8-thia-5,12-diazahexadecane-1,16-diyl bis(2-methylacetylate)

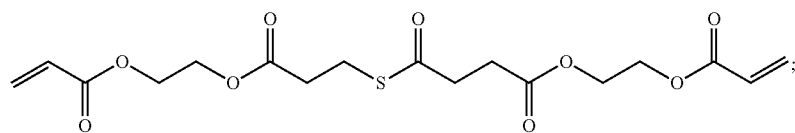

2-(acryloyloxy)ethyl 4-((3-(2-(acryloyloxy)ethoxy)-3-oxopropyl)thio)-4-oxobutanoate

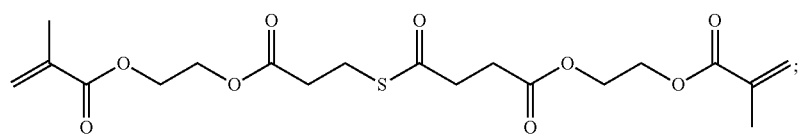

2-(methacryloyloxy)ethyl 4-((3-(2-(methacryloyloxy)ethoxy)-3-oxopropyl)thio)-4-oxobutanoate

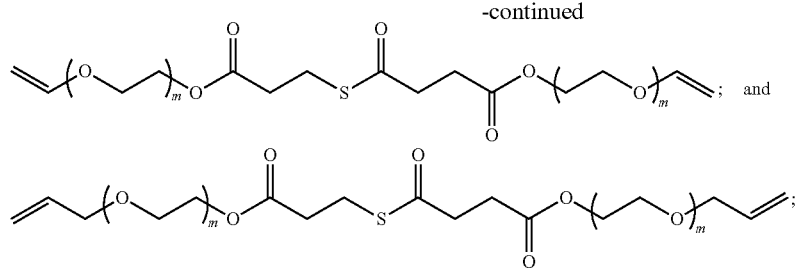
wherein m is 0, 1, 2, 3, 4, 5 or 6.
The multifunctional thiol monomer can be any monomer commonly employed in the art that comprises two or more thiol (—SH) terminal functionalities.
In certain embodiments, the multifunctional thiol monomer is selected from the group consisting of:
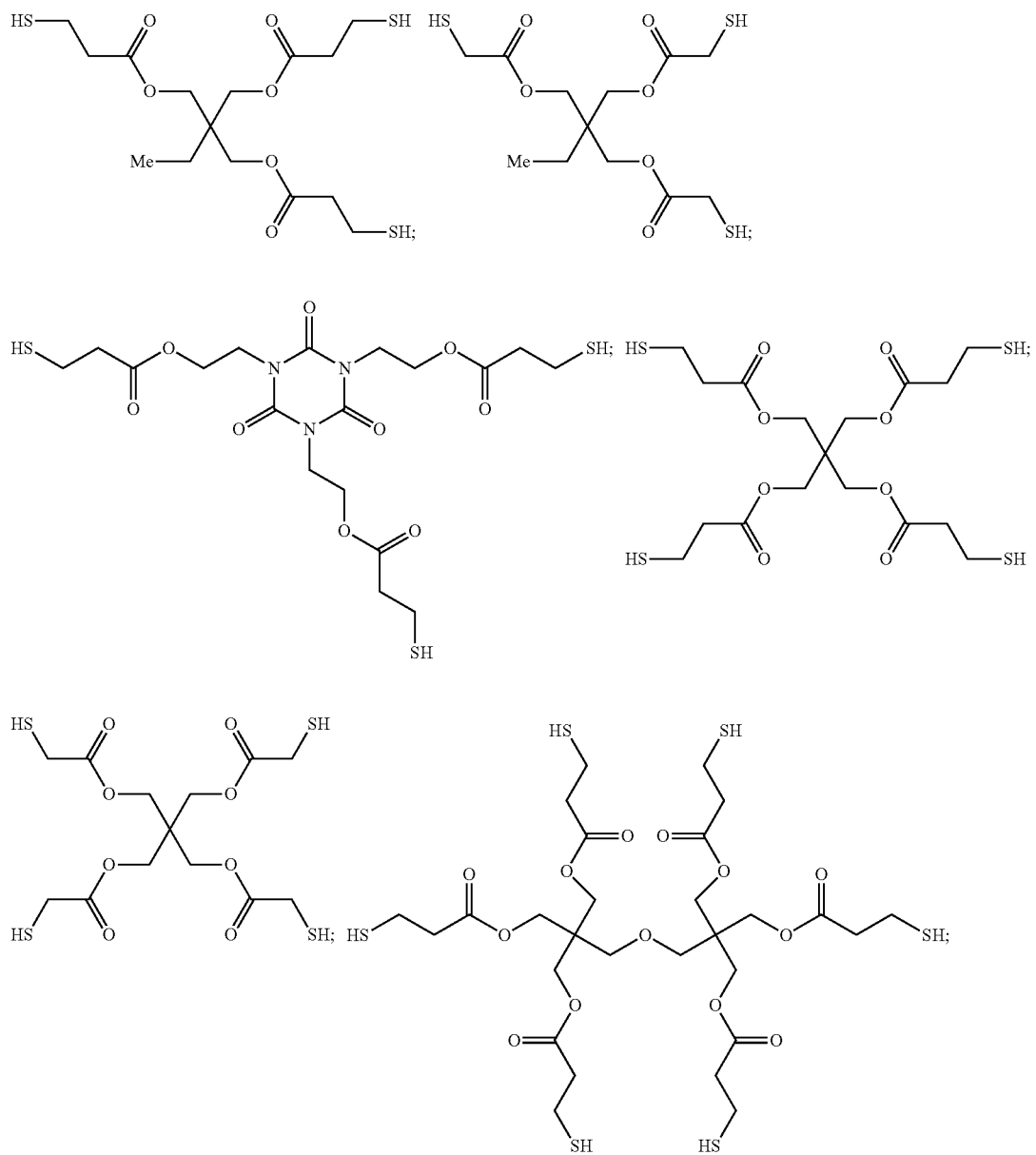

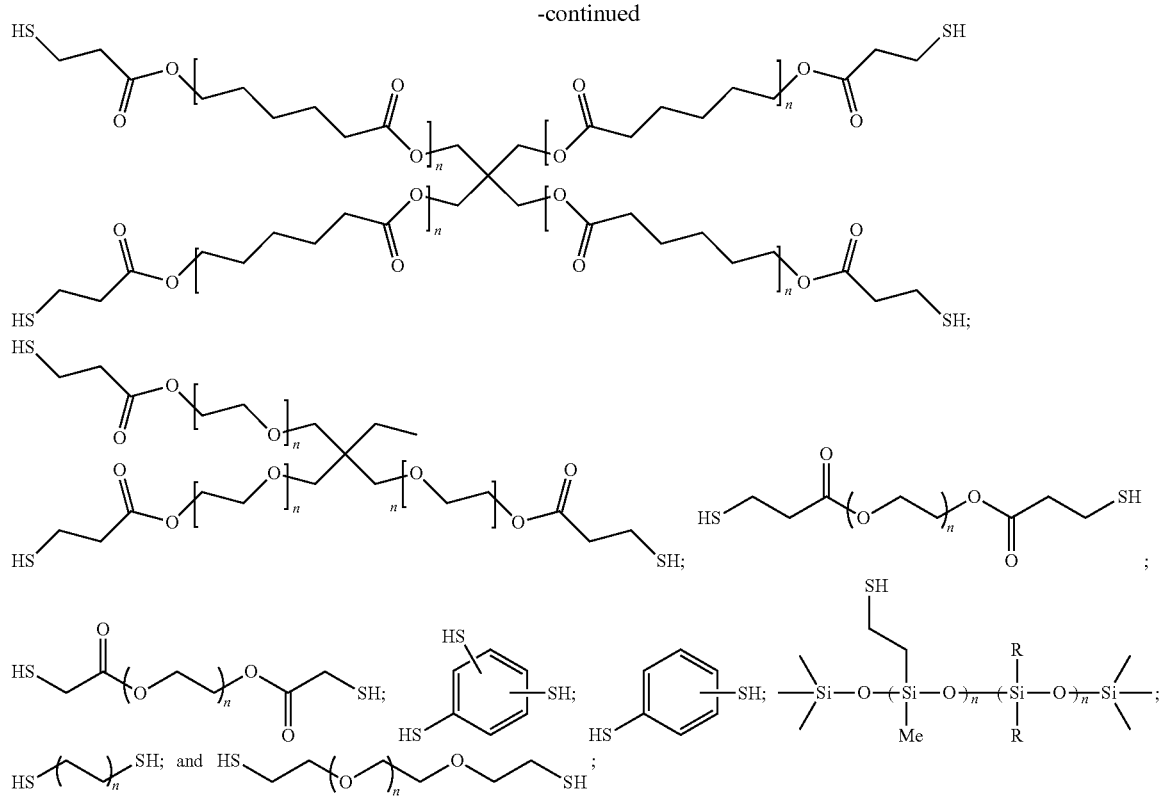

wherein each instance of n is an integer from 0 to 500.

In other embodiments, the multifunctional thiol monomer is selected from the group consisting of pentaerythritol tetramercaptopropionate (PETMP); ethylene glycol bis(3-mercaptopropionate) (EGBMP); trimethylolpropane tris(3-mercaptopropionate) (TMPMP); 2,4,6-trioxo-1,3,5-triazinatriy (triethyl-tris (3-mercapto propionate); 1,2-ethanedithiol; 1,3-propanedithiol; 1,4-butanedithiol; 1,5-pentanedithiol; 1,6-hexanedithiol; 1,8-octanedithiol; 1,9-nonanedithiol; 1,11-undecanedithiol; 1,16-hexadecanedithiol; 2,5-dimercaptomethyl-1,4-dithiane; pentaerythritol tetramercaptoacetate; trimethylolpropane trimercaptoacetate; glycol dimercaptoacetate; 2,3-dimercapto-1-propanol; DL-dithiothreitol; 2-mercaptoethylsulfide; 2,3-(dimercaptoethylthio)-1-mercaptopropane; 1,2,3-trimercaptopropane; toluenedithiol; benzenedithiol; biphenyldithiol; benzenedimethanethiol; xylylenedithiol; 4,4'-dimercaptostilbene and glycol dimercaptopropionate.

In certain embodiments, the base is selected such that pKa (base's conjugate acid) is equal to or greater than about [pKa (most acidic thiol group on the thiol monomer)−1 pKa unit]. In other embodiments, the nucleophile has a nucleophilicity value (N) greater than about 10. In yet other embodiments, the base has a conjugate acid with a pKa ranging from about 2 to about 15. In yet other embodiments, the base is a compound capable of deprotonating at least about 10% of the free thiol groups in the composition.

In certain embodiments, the base is selected from the group consisting of tetramethylguanidine (TMG), 1,8-Diazabicyclo[5,4,0]undec-7-ene (DBU), N,N-Diisopropylethylamine (DIPEA or Hunig's base), 4-tert-butyl pyridine, triethylamine (TEA), and N,N,N',N'',N''-pentamethyldiethylenetriamine (PMDETA).

In certain embodiments, the base is a thiolate containing compound. In other embodiments, the base is a thiolate salt. In yet other embodiments, the base is an alkylthiolate salt or an arylthiolate salt.

In certain embodiments, the nucleophile is selected from the group consisting of quinuclidine, 1,4-diazabicyclo[2.2.2]octane (DABCO), 4-Dimethylaminopyridine (DMAP), $PPh_3$ $P(nBu)_3$, $P(tBu)_3$, $PCy_3$, and $PMe_3$. In other embodiments, the nucleophile is an N-heterocyclic carbene. In yet other embodiments, the nucleophile is an N-heterocyclic carbene selected from the group consisting of:

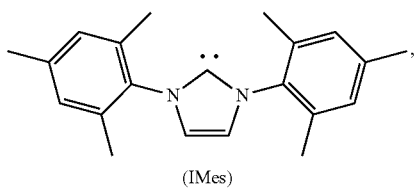

(IMes)

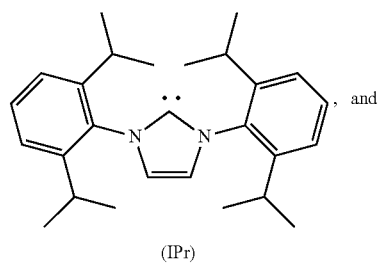

(IPr)

-continued

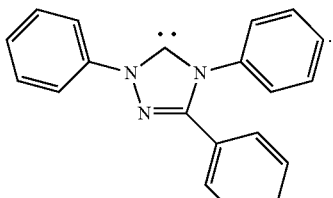

(Ender's carbene)

In certain embodiments, the composition comprises at least one pH-altering compound that alters the pH of the composition upon photo-excitation or thermal-excitation. In certain embodiments, the pH-altering compound is a photo-activatable or thermal-activatable acid, or photoactivatable or thermal-activatable base.

In certain embodiments, the composition comprises a photo-activatable base. In other embodiments, the photo-activatable base does not deprotonate at least about 10% of the free thiol groups in the composition in its inactive state (without photo-activation), and is capable of deprotonating at least about 10% of the free thiol groups in the composition after photo-activation.

In certain embodiments, the photo-activatable base is a basic molecule coupled to a photocleavable protecting group. In other embodiments, the photo-activatable base is activated upon exposure to light in the IR (700-1,000,000 nm), visible (400-700 nm) or UV (10-400 nm) ranges. In yet other embodiments, the photo-activatable base is activated upon exposure to light with a wavelength shorter than about 450 nm. In yet other embodiments, the photo-activatable base is any photo-activatable base known in the art, such as but not limited to those described in: Chem. Rev., 2013, 113, 119-191; ACS Macro Lett., 2016, 5, 229-233; Macromolecules, 2014, 47, 6159-6165; and ACS Macro Lett, 2014, 3, 315-318, which are incorporated by reference in their entireties herein. In yet other embodiments, the photo-activatable base is a compound of a general formula selected from the group consisting of:

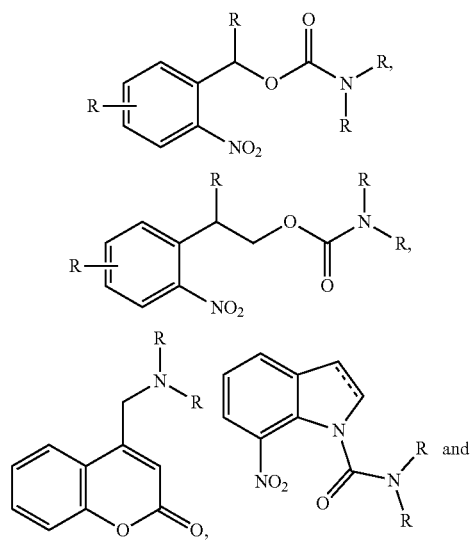

-continued

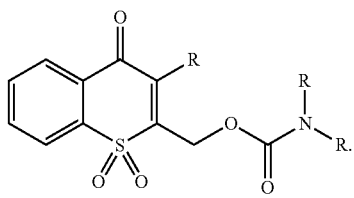

In yet other embodiments, the photo-activatable base is a compound selected from the group consisting of:

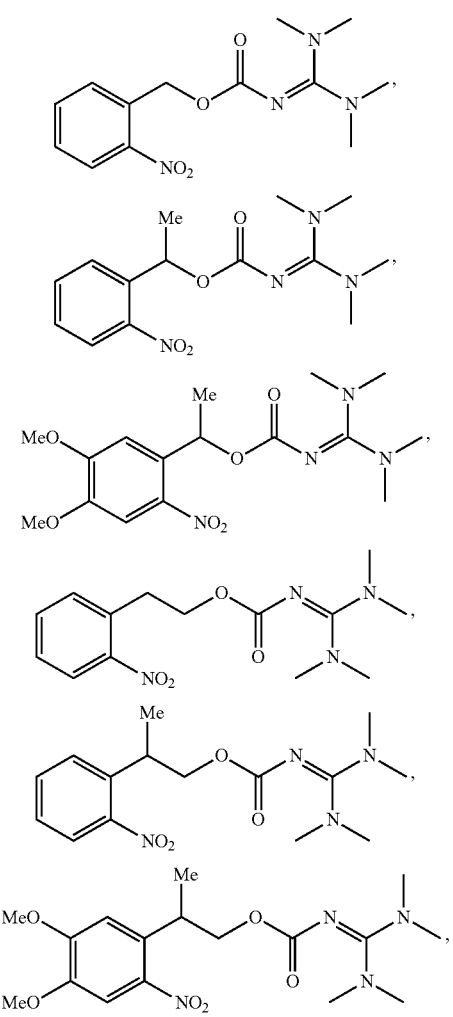

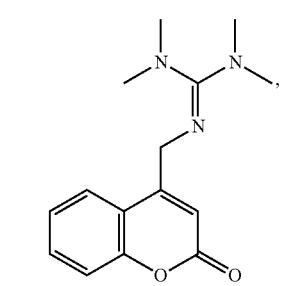

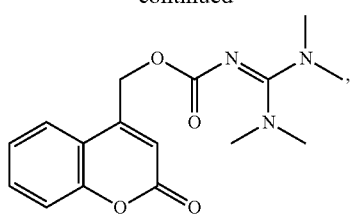
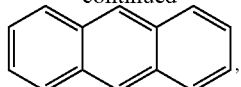
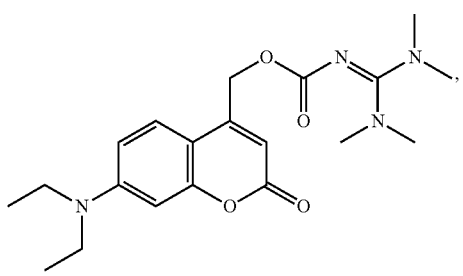
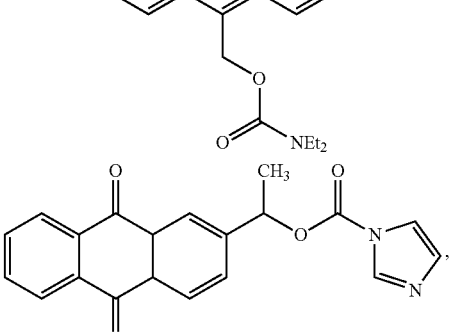
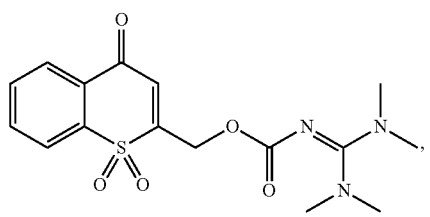
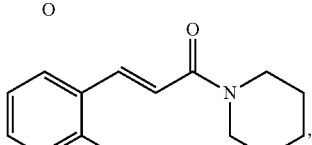
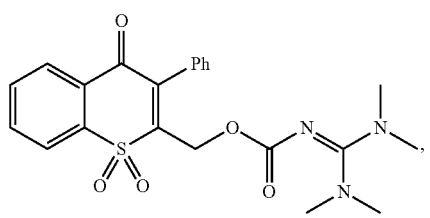
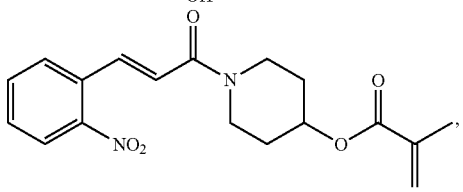
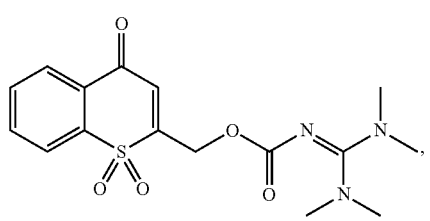
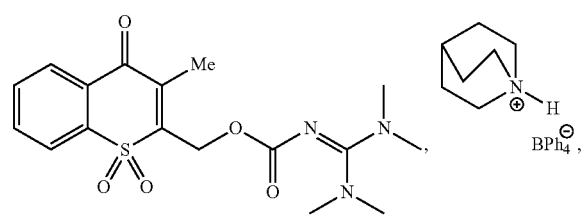

1,2-Diisopropyl-3-[Bis(dimethylamino)methylene]guanidium 2-(3-benzoylphenyl)propionate, 1,2-Dicyclohexyl-4,4,5,5-tetramethylbiguanidium n-butyltriphenylborate, and (Z)-{[Bis(dimethylamino) methylidene]amino}-N-cyclohexyl(cyclohexylamino)methaniminium tetrakis(3-fluorophenyl) borate.

In certain embodiments, the composition comprises a thermal-activatable base. In certain embodiments, the thermal-activatable base does not deprotonate at least about 10% of the free thiol groups in the composition in an inactive state (without thermal activation), and deprotonates at least about 10% of the free thiol groups in the composition after thermal activation.

In certain embodiments, the thermal-activatable base is a basic molecule coupled to a thermally cleavable protecting group. In other embodiments, the thermal-activatable base is activated upon exposure to temperatures of about 30° C. to about 200° C. In yet other embodiments, the thermal-activatable base is any thermally activated base known in the art, such as but not limited to those described in Angew. Chem. Int. Ed. 2005, 44, 4964-4968; Macromol. Rapid Commun., 2014, 35, 682-701; Catal. Sci. Technol, 2014, 4, 2466-2479; and J. Org. Chem., 2005, 70, 5335-5338, which are incorporated by reference in their entirety. In certain embodiments, the thermal-activatable base is a compound of a general formula selected from the group consisting of:

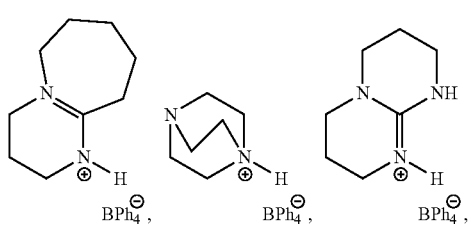
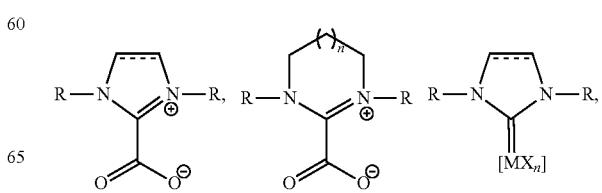

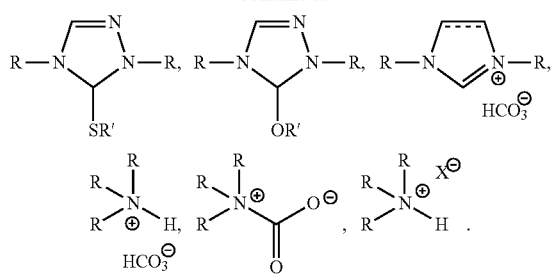
In yet other embodiments, the thermal-activatable base is a compound selected from the group consisting of:
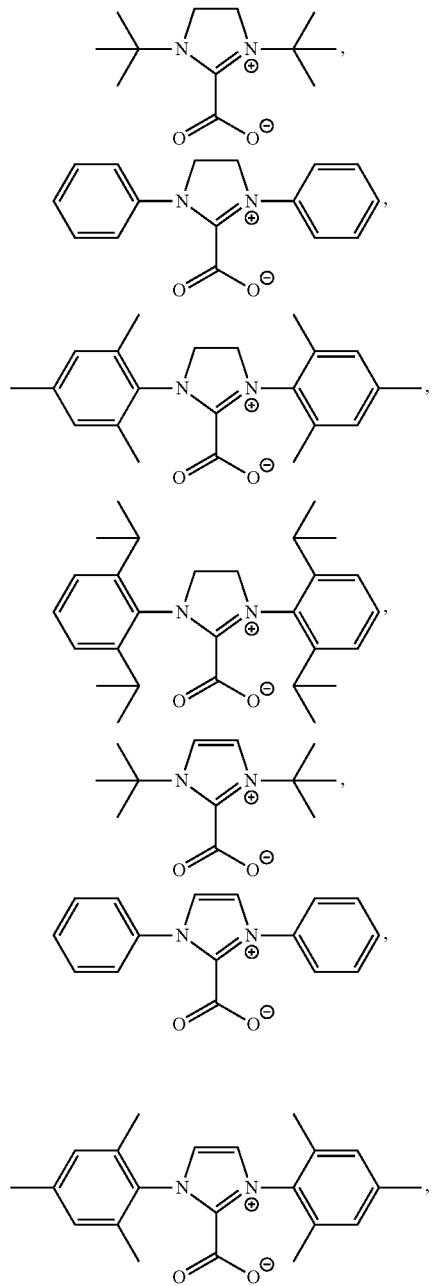
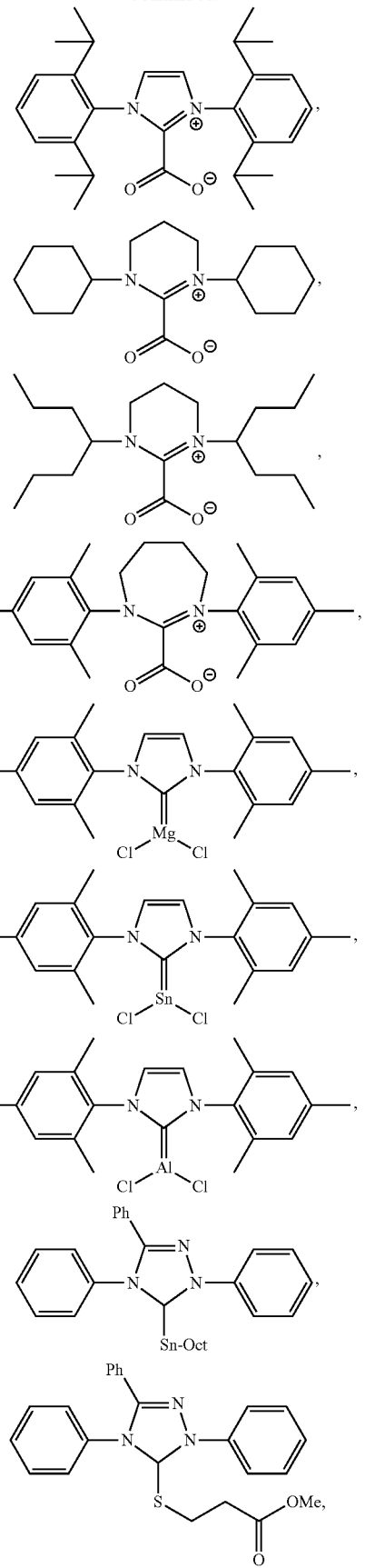

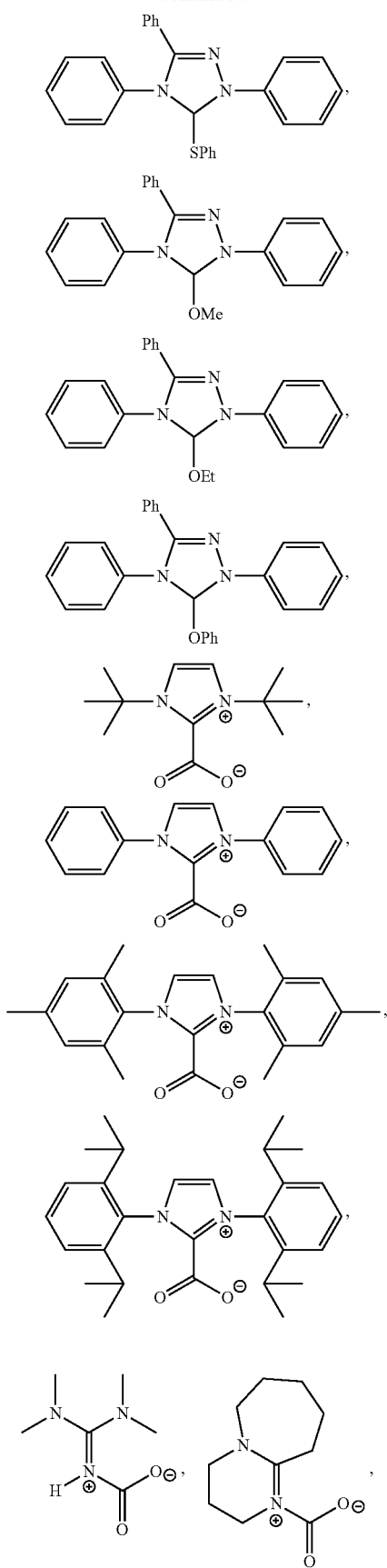

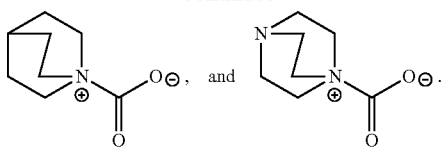

In certain embodiments, the composition further comprises a photo-activatable acid. In other embodiments, the photo-activatable acid has a pKa value greater than the pKa of the least acidic thiol group on the thiol monomer in an inactive state (without photo-activation), but undergoes a chemical and/or structural change or rearrangement upon exposure to light, thereby generating a compound that has a pKa value less than the pKa of the least acidic thiol on the thiol monomer. In yet other embodiments, the acid generated is of sufficient strength to neutralize the one or more bases and/or nucleophiles present in the composition. In yet other embodiments, the pH-altering compound is a compound comprising an acidic molecule coupled to a photocleavable protecting group. In yet other embodiments, the photo-activatable acid is activated upon exposure to light in the IR (700-1,000,000 nm), visible (400-700 nm) or UV (10-400 nm) ranges. In yet other embodiments, the photo-activatable acid is activated upon exposure to light with a wavelength shorter than about 450 nm. In yet other embodiments, the photo-activatable acid is any light activated acid known in the art, such as but not limited to those described in Hinsberg and Wallraff, *Lithographic Resists*, Kirk-Othmer Encyclopedia of Chemical Technology, Wiley-VCH, Weinheim, 2005, which is incorporated by reference in its entirety. In yet other embodiments, the photo-activatable acid is a compound selected from the group consisting of:

Bis(4-tert-butylphenyl)iodonium perfluoro-1-butanesulfonate, Bis(4-tert-butylphenyl)iodonium p-toluenesulfonate, Bis(4-tert-butylphenyl)iodonium, Boc-methoxyphenyldiphenylsulfonium triflate, (4-tert-Butylphenyl) diphenylsulfonium triflate, Diphenyliodonium hexafluorophosphate, Diphenyliodonium nitrate, Diphenyliodonium perfluoro-1-butanesulfonate, Diphenyliodonium p-toluenesulfonate, Diphenyliodonium triflate, (4-Fluorophenyl)diphenylsulfonium triflate, N-Hydroxynaphthalimide triflate, N-Hydroxy-5-norbornene-2,3-dicarboximide perfluoro-1-butanesulfonate, (4-Iodophenyl)diphenylsulfonium triflate, (4-Methoxyphenyl) diphenylsulfonium triflate, 2-(4-Methoxystyryl)-4,6-bis(trichloromethyl)-1,3,5-triazine, (4-Methylphenyl)diphenylsulfonium triflate, (4-Methylthiophenyl)methyl phenyl sulfonium triflate, (4-Phenoxyphenyl)diphenylsulfonium triflate, (4-Phenylthiophenyl) diphenylsulfonium triflate, Triarylsulfonium hexafluorophosphate salts, Triphenylsulfonium perfluoro-1-butanesulfonate, Triphenyl sulfonium triflate, Tris(4-tert-butylphenyl)sulfonium perfluoro-1-butanesulfonate, and Tris(4-tert-butylphenyl)sulfonium triflate.

In certain embodiments, the composition further comprises a thermal-activatable acid. In other embodiments, the thermal-activatable acid has a pKa value greater than the pKa of the least acidic thiol group on the thiol monomer in an inactive state (without thermal activation) but undergoes a chemical and/or structural change or rearrangement upon exposure to heat, thereby generating a compound which has a pKa value less than the pKa of the least acidic thiol on the thiol monomer. In yet other embodiments, the acid generated by thermal activation is of sufficient strength to neutralize the one or more bases and/or nucleophiles present in the composition. In yet other embodiments, the pH-altering compound is an acidic molecule coupled to a thermally cleavable protecting group. In yet other embodiments, the thermal-activatable acid is activated upon exposure to temperatures of about 30° C. to about 200° C. In yet other embodiments, the thermal-activatable acid is any thermally activated acid known in the art, such as but not limited to those described in Proc. SPIE 399, Advances in Resist Technology and Processing XVII, (23 Jun. 200), which is incorporated by reference in its entirety. In certain embodiments, the thermal-activatable acid is one or more compounds selected from the group consisting of:

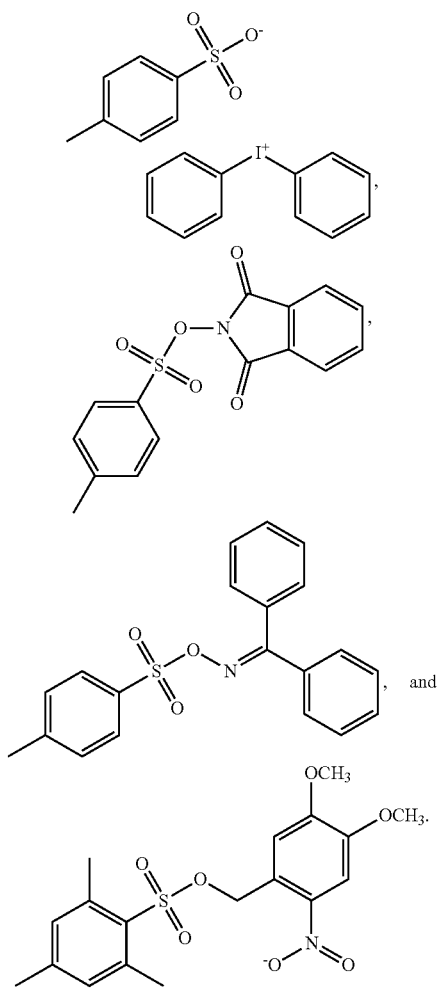

In certain embodiments, the composition further comprises one or more polymerization initiators. In other embodiments, the composition comprises one or more polymerization initiators selected from the group consisting of photoinitiators, thermal initiators and redox initiators.

In certain embodiments, the photoinitiator is reactive upon exposure to light in the IR (700-1,000,000 nm), visible (400-700 nm) or UV (10-400 nm). In other embodiments, the photoinitiator is activated upon exposure to a different light wavelength than the light wavelength used to activate any photo-excitation triggered pH-altering compound(s) present in the composition, thereby allowing for independent activation of the pH altering compound and the photoinitiator. In other embodiments, the photoinitiator is selected from the group consisting of Type-1 and Type-2 photoinitiators. In yet other embodiments, the photoinitiator is a compound belonging to a class selected from the group consisting of acyl phosphines, ketones, diimidazoles, acyl germaniums, thioketones, dithiocarbonates, trithiocarbonates, camphorquinones and camphoramines. In yet other embodiments, the photoinitiator is selected from the group consisting of: acetophenone, benzophenone, 2-phenylacetophenone, 2,2-dimethoxy-2-phenylacetophenone, Bis(2,4,6-trimethylbenzoyl)-phenylphosphineoxide, 2-Hydroxy-4'-(2-hydroxyethoxy)-2-methylpropiophenone, 2-methyl-(4-methylthienyl)-2-morpholinyl-1-propan-1-one, Diphenyl(2,4,6-trimethylbenzoyl)phosphine oxide, Ethyl (2,4,6-trimethylbenzoyl) phenyl phosphinate, lithium phenyl-2,4,6-trimethylbenzoylphosphinate,

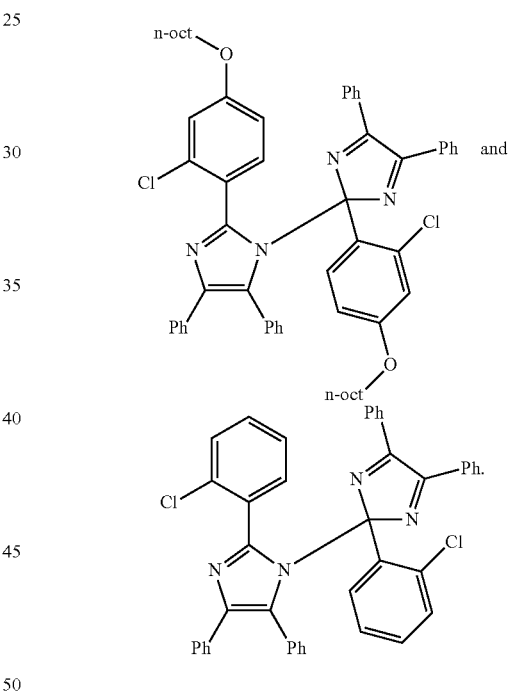

In certain embodiments, the thermal initiator is reactive upon exposure to temperatures of about 30° C. to about 200° C. In other embodiments, the thermal initiator is a compound selected from the group consisting of tert-Amyl peroxybenzoate, 4,4-Azobis(4-cyanovaleric acid), 1,1-Azobis(cyclohexanecarbonitrile), 2,2'-Azobisisobutyronitrile (AIBN), Benzoyl peroxide, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

In certain embodiments, the redox initiator is one or more compounds selected from the group consisting of: sodium iodide/hydrogen peroxide, potassium iodide/hydrogen peroxide, benzoyl peroxide/dimethylaniline, benzoyl peroxide/N,N-dimethyl p-toluidine, benzoyl peroxide/4-N,N-dimethylaminophenethyl alcohol, benzoyl peroxide/ethyl 4-dimethylaminobenzoate, glucose oxidase/oxygen/iron(II) sulfate and copper(II) sulfate/sodium ascorbate.

In certain embodiments, the composition comprises the at least one multifunctional thioester containing monomer and at least one multifunctional thiol monomer in a relative ratio such that the total number of thiol functionalities present on the at least one multifunctional thiol monomer within the composition is greater than the total number of $E^1$ and $E^2$ functionalities present on the at least one multifunctional thioester containing monomer. In certain non-limiting embodiments, the composition comprises more than 2 equivalents of trifunctional thiol monomer per 3 equivalents of difunctional thioester monomer; in other embodiments, the composition comprises more than 1 equivalent of tetrafunctional thiol monomer per 2 equivalents of difunctional thioester monomer.

Covalent Adaptable Network Polymers

In certain embodiments, the invention includes a composition comprising a cross-linked, CAN polymer comprising a plurality of thioester linkages and a plurality of free thiol (—SH) groups, and at least one exchange catalyst selected from a base and a nucleophile; wherein the base is a compound capable of deprotonating at least about 10% of the free thiol groups in the composition; and wherein the nucleophile has a nucleophilicity value (N) greater than about 10.

In certain embodiments, the at least one exchange catalyst is covalently bound to the CAN polymer. In other embodiments, the at least one exchange catalyst is not covalently bound to the CAN polymer.

In certain embodiments, the cross-linked CAN is formed through one or more processes selected from the group consisting of thiol-ene polymerization, thiol-alkyne polymerization, thiol-acrylate polymerization, thiol-methacrylate, acrylate polymerization, methacrylate polymerization, styrene polymerization, alcohol-isocyanate polymerization, thiol-isocyanate polymerization, thiol-epoxide polymerization, thiol-isothiocyanate polymerization, thiol-halide polymerization, thiol-malemide, thiol-activated ester polymerization, copper-catalyzed azide alkyne polymerization, strain-promoted azide alkyne polymerization, and epoxide-carboxylic acid polymerization.

In certain embodiments, the at least one exchange catalyst is a base, nucleophile, photo-activatable base, and/or thermal-activatable base as described elsewhere herein.

In certain embodiments, the cross-linked CAN further comprises at least one pH-altering compound selected from a photo-activatable acid and a thermal-activatable acid. In other embodiments, the photo-activatable acid and the thermal-activatable acid are compounds as described elsewhere herein.

In certain embodiments, a composition of the invention described elsewhere herein, comprising at least one multifunctional thioester containing monomer, at least one multifunctional thiol monomer and at least one of a base and a nucleophile, is capable of forming a cross-linked CAN polymer. The invention also provides a CAN polymer formed from a composition of the invention, but is not limited to only CAN polymers formed from the compositions described elsewhere herein. In certain embodiments, the CAN is formed through activation of at least one selected from the group consisting of a photoinitiator, thermal initiator and redox initiator, which initiates radical based thiol-ene polymerization between the at least one multifunctional thioester containing monomer and the at least one multifunctional thiol monomer.

In certain embodiments, the cross-linked CAN of the invention undergoes bond exchange. Without being limited to any single theory, the bond exchange occurs through nucleophilic attack on a thioester functionality by an unbound thiol group. This nucleophilic attack is catalyzed by the bases/nucleophiles in the composition.

In certain embodiments, the bond exchange imparts plasticity to the CANs of the invention. In certain embodiments, the CANs of the invention can be remolded and reformed after initial polymerization. The ability to undergo bond exchange allows for the compositions of the invention to respond to applied pressure and undergo stress relaxation. In certain embodiments, the bond exchange alleviates polymerization induced stress. In certain embodiments, the CANs compositions of the invention can self-repair through bond exchange.

In certain embodiments, the bond exchange is selectively activated or deactivated through exposure to light in the IR (700-1,000,000 nm), visible (400-700 nm) or UV (10-400 nm) ranges. In other embodiments, the bond exchange is activated or deactivated through exposure to light below 450 nm. In other embodiments, this photoswitching property occurs at ambient temperatures (about 18° C. to about 30° C.). In yet other embodiments, the photoswitching property occurs without applying heat.

In certain embodiments, the bond exchange is selectively activated or deactivated through exposure to heat. In other embodiments, the bond exchange is activated by exposure to temperatures of about 30° C. to about 200° C.

In certain embodiments, the bond exchange properties of the CANs are locally activated or deactivated through the use of localized irradiation with a light source, thereby allowing for spatial and/or temporal control of the rapid bond exchange properties. In other embodiments, the bond exchange properties of the CANs are locally activated or deactivated through the use of localized heating of the network, thereby allowing for spatial and temporal control of the rapid bond exchange properties.

In certain embodiments, the CAN (or a composition comprising the CAN) comprises a photo-activatable base or thermal-activatable base, wherein the CAN does not exhibit significant bond exchange before activation of the base (behaving like a thermoset) but does exhibit bond exchange after activation of the base. In other embodiments, activation of the base converts the CAN polymer from an elastic polymer to a plastic polymer.

In certain embodiments, the CAN (or a composition comprising the CAN) comprises a base and/or nucleophile and a photo-activatable acid or thermal-activatable acid, wherein the CAN polymer exhibits bond exchange before activation of the acid but does not exhibit significant bond exchange after activation of the acid. In other embodiments, activation of the acid converts the CAN polymer from a plastic polymer to an elastic polymer. Without being limited to any single theory, the activation of the acid neutralizes and/or deactivates the base and/or nucleophile, preventing deprotonation of the free thiol groups, thereby hindering or preventing catalysis of the rapid bond exchange.

In certain embodiments, the CAN polymers can be shaped or molded into substantially any shape desired for a given application. In other embodiments, the CAN polymers can be reshaped after molding. In yet other embodiments, the CAN polymers can be molded, and behave like a thermoset (cannot be reshaped), until a photo-activatable or thermal-activatable base is activated, thereby allowing for the CAN polymer to be reshaped. In yet other embodiments, the CAN polymers can be molded and reshaped/remolded until activation of a photo-activatable or thermal-activatable acid is activated, thereby setting the CAN polymer and preventing any further reshaping.

In certain embodiments, the CAN polymers can self-repair when damaged. In other embodiments, the CAN polymers can be separated into distinct pieces and reformed. In other embodiments, the CAN polymers can be reshaped to repair fractures, cracks and ruptures.

In other embodiments, the compositions of the invention are suitable for use in optical applications, for example as lenses. In yet other embodiments, the compositions of the invention are suitable for use as adhesives or bonding agents. In yet other embodiments, the compositions of the invention are suitable for use in 3D printing applications. In yet other embodiments, the compositions of the invention are suitable for use as hard coatings. Uses for the CANs of the invention are not limited to these examples and additional uses would be apparent to those skilled in the art.

In certain embodiments, the CANs of the invention are transparent. In other embodiments, the compositions are colorless. In yet other embodiments, the compositions further comprise one or more coloring agents or dyes.

In certain embodiments, the invention provides a solid material particle embedded in a CAN matrix. In other embodiments, the solid material particle is a silica particle. In other embodiments, the composition comprises silica particles embedded in a CAN matrix. In yet other embodiments, the silica particles can have an average diameter of about 0.1 µm to about 100 µm.

In certain embodiments, the CANs of the invention are insoluble in aqueous and/or organic solutions. In other embodiments, the CANs of the invention can be controllably degraded through the addition of one or more additives.

In certain embodiments, the CANs of the invention are degraded to soluble oligomers through addition of excess multifunctional thiol monomers and a suitable organic solvent capable of solvating the oligomers, in the presence of an active base and/or nucleophile as described elsewhere herein. Without being limited to any particular theory, in the presence of an excess of thiol monomer, the CAN polymers undergo bond exchange and form oligomers due to a deficit of "ene" monomers for the thiol monomers to react with. In certain embodiments, the oligomers can be solubilized in solvents such as, but not limited to, aqueous solutions, organic ketone solvents, organic ester solvents, chlorinated hydrocarbon solvents, aliphatic hydrocarbon solvents, aromatic solvents, organic alcohols, organic ether solvents, organic acetamide solvents, and sulfoxide/sulfone solvents. In other embodiments, the oligomers can be solubilized in one or more solvents selected from the group consisting of acetone, ethyl acetate, dichloromethane, chloroform, carbon tetrachloride, hexanes, toluene, benzene, xylenes, water, methanol, ethanol, isopropanol, 2-methyl tetrahydrofuran, tetrahydrofuran, diethyl ether, dimethylformamide, dimethylacetamide, dimethylsulfoxide and any combinations thereof. In certain embodiments, the oligomers have a molecular weight of about 0.5 to about 20 kDa. In certain embodiments, the CAN polymer composition is degraded through the addition of about 1 to about 100 equivalents of excess multifunctional thiol monomer. In other embodiments, the CAN polymer composition is degraded through the addition of about 5 to about 10 equivalents of excess multifunctional thiol monomer.

In certain embodiments, the soluble oligomers can be reformed into CAN polymer compositions through the addition of multifunctional thioester containing monomers followed. In certain embodiments, adding an amount of multifunctional thioester containing monomer restores the ratio of multifunctional thioester containing monomer to multifunctional thiol monomer in the original CAN polymer composition. In other embodiments, the reformed CAN polymers have identical physical properties to the original CAN polymers.

Kits

The invention includes a kit comprising a composition of the invention comprising at least one, or all of the following: (a) at least one multifunctional thioester containing monomer of Formula (I) or (Ia); (b) at least one multifunctional thiol monomer; (c) at least one selected from the group consisting of a base and a nucleophile; and an instructional material for use thereof.

In certain embodiments, the at least one base and nucleophile are bases and nucleophiles as described elsewhere herein. In certain embodiments, the base is a photo-activatable base or thermal-activatable base, as described elsewhere herein. In other embodiments, the kit further comprises a photo-activatable acid or thermal-activatable acid, as described elsewhere herein. In certain embodiments, the kit further comprises at least one selected from the group consisting of a photoinitiator, a thermal initiator and a redox initiator. In yet other embodiments, the kit further comprises a light source capable of producing light sufficient to activate at least one of the photoinitiator, the photo-activatable base and the photo-activatable acid. In other embodiments, the kit further comprises a heat source capable of producing heat sufficient to activate at least one of the thermal initiator, the thermal-activatable base and the thermal-activatable acid. The instructional material included in the kit comprises instructions for forming the CAN polymers of the invention, molding the CAN polymers of the invention, recycling the CAN polymers of the invention and selectively activating or deactivating the photoswitchable properties of the CAN polymers of the invention.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials

Unless described otherwise, the materials used in the experiments were obtained from commercial sources or obtained by methods known in the art, and used without further purification.

Pentaerythritol tetrakis(3-mercaptopropionate) (PETMP), tri(ethylene glycol) di(vinyl ether) (DVE-3), triethylamine (TEA), N,N,N',N',N"-pentamethyldiethylenetriamine (PMDETA), 1,8-diazabicyclo[5.4.0]undec-7-ene (DBU), 4-dimethylaminopyridine (DMAP), toluenesulfonic acid monohydrate (TsOH), allyl alcohol, trimethylolpropane tris(3-mercaptopropionate) (TMPTMP), methylhydroquinone and 3,3'-dithiodipropionic acid were purchased from Sigma-Aldrich. Dipentaerythritol hexa(3-mercaptopropionate) (Di-PETMP), ethoxylated-trimethylolpropan tri(3-Mercaptopropionate) (ETTMP 700 and ETTMP 1300), polycaprolactone tetra(3-mercaptopropionate) (PCL4MP) were donated from Bruno Bock. Irgacure 184, Irgacure 651 (DMPA) and Irgacure 907 were purchased from Ciba. Succinic anhydride and anhydrous sodium sulfate were purchased from Acros Organics and used as received. Irgacure 651 (DMPA) and Irgacure 819 were donated by BASF. Diallyl adipate was purchased from TCI. All reactants and solvents were used as received.

Polymer Film Preparation

Resins were prepared by combining the tetrathiol (PETMP), TEDAE, photoinitiator (DMPA), and a base catalyst (TEA, PMDETA, or DBU) in a glass vial and vortexing to dissolve the initiator. Unless otherwise noted, typical formulations incorporated a 2:1 ratio of thiol:ene functional groups, and between 0.02 and 0.08 equivalents of base per thiol group. Once the photoinitiator had completely dissolved, the resin was placed between glass slides treated with Rain-X (ITW Global Brands, Houston, Tex.) using 250 μm thick spacers (Small Parts Inc., Logansport, Ind.). The film was then cured with 365 nm light at approximately 5 mW/cm$^2$ for 5 minutes.

Figure 5:
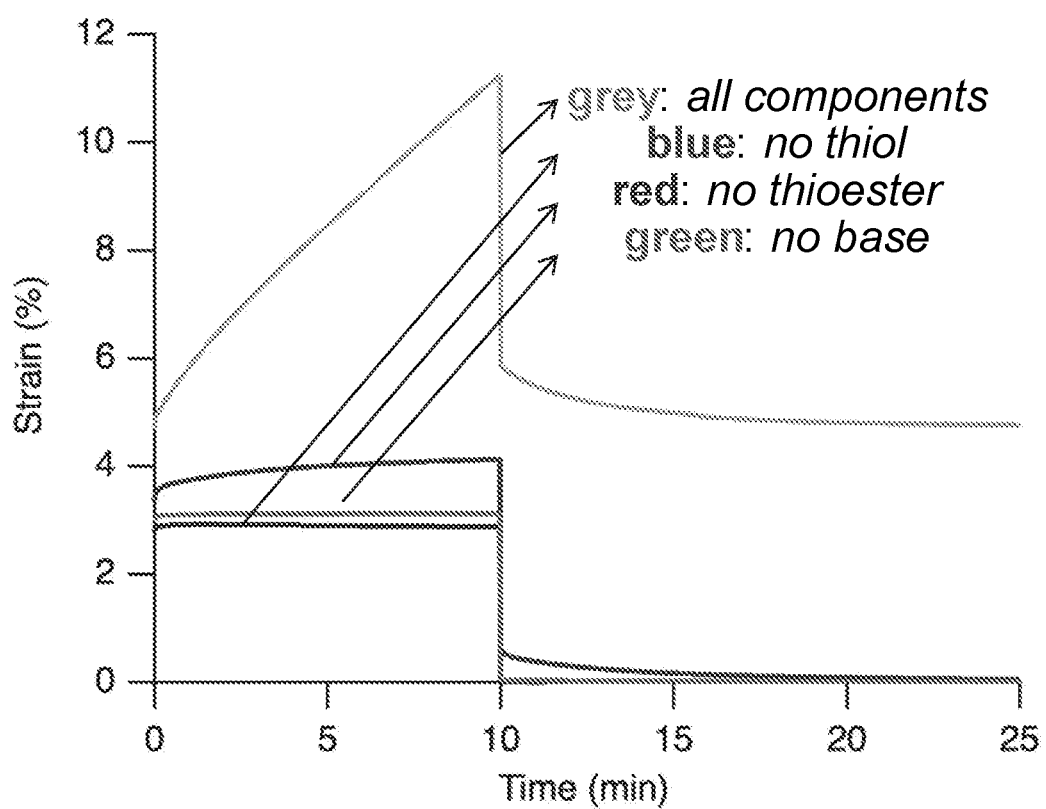
FIG. 5 is a graph showing results of creep experiments performed at ambient temperature, using one experimental and three control conditions. The complete formulation included PETMP, TEDAE, 2:1 ratio of thiol:ene groups, and 0.05 equivalents PMDETA per thiol group. Control formulations included absence of excess thiol, absence of base, and absence of thioester.

For the creep experiments shown in FIG. 5, the following formulations were used. The experimental formulation included PETMP, TEDAE, a 2:1 thiol:ene ratio, 0.05 eq PMDETA per thiol, and 0.01 eq DMPA per thiol. The control formulations were prepared similarly, but with the following adjustments. The "no thiol" condition included a 2:1 ene: thiol ratio, to ensure no thiol groups remained after polymerization, and to achieve a polymer with similar crosslinking density to the experimental condition. For the "no base" condition, no PMDETA was added. For the "no thioester" condition, tri(ethylene glycol) di(vinyl ether) (DVE-3) was used in place of TEDAE.

Stress Relaxation and Creep Experiments

All stress relaxation and creep experiments were performed in tensile elongation using a Q800 DMA (TA Instruments) or a RSA-G2 (TA Instruments). For stress relaxation, the built-in stress relaxation mode was used, with either a 10% or 20% strain for ambient temperature tests. For temperature stepping tests, which are performed repeatedly on the same sample, a 4% strain was used to avoid significant sample deformation between scans. Films were cut into rectangular sections and measured with calipers prior to loading into the DMA.

Dynamic Mechanical Analysis of the Glass Transition Temperature

The glass transition temperature was determined on a Q800 DMA (TA Instruments) using a ramp rate of 3° C./min and a frequency of 3 Hz, with a fixed oscillatory strain of 0.025%. Films were cut into rectangular sections and measured with calipers prior to loading into the DMA.

Pristine Photopolymer Preparation

The UV-curable thioester containing thiol-ene resins were prepared by dissolving DMPA or Irgacure 184 (1 mol % with respect to alkene groups) in a combination of thiol and allyl ether monomers. The resin was casted between glass slides with 250 μm thick spacers and subsequently irradiated by a BlackRay lamp (8 mW/cm$^2$ @365 nm) for 5 mins.

The UV-curable thiol-isocyanate resins were prepared by dissolving Irgacure 907 (0.55 wt % with respect to total monomers) in a combination of stoichiometric PETMP and thioester diisocyanate. The mixture was homogenized by a speedmixer for 90 sec (FlackTek Inc., model DAC 150.1 FV-K) and immediately casted and irradiated by a BlackRay lamp for 10 mins, subsequently being post-cured at 80° C. overnight.

The UV-curable disulfide containing thiol-ene resins were prepared by dissolving Irgacure 184 (1 mol % with respect to total monomers) in a combination of stoichiometric PETMP and DSDAE. The mixture was casted between glass slides and irradiated by a BlackRay lamp for 20 mins, subsequently being post-cured at 80° C. overnight.

Recycling Procedure

Polythioesters were recycled by degrading via thiol-excess thiol-thioester exchange reactions. Polymer samples were cut into ~20 cm$^2$ pieces, then mixed with a certain multiple equivalency of thiol monomers, an equal mass of reagent grade acetone and 20 wt % of TEA (50 mol % to thioestser groups) was added (both with respect to the total nonvolatile compounds). The mixture was stirred at ambient temperature without precautions to guard the reaction from atmospheric oxygen or moisture. Generally, the thiol-ene polymers completely disappeared within 3 hours. The oligomers were purified by removing the volatiles, particularly, by rotary evaporation followed by high vacuum at 85° C. until the formation of bubbles had ceased.

Repolymerizing Procedure

The reclaimed thioester containing thiol-ene resins were prepared by mixing devolatilized recycling oligomers with stoichiometric thioester diallyl ether monomers (with pre-dissolved 1 mol % DMPA). The mixture was polymerized under the same condition as the pristine samples (8 mW/cm$^2$ @365 nm, 5 mins).

The reclaimed thiol-isocyanate resins were prepared by speed-mixing Irgacure 907 (1.2 wt % with respect to thioester diisocyanate) with devolatilized thiourethane oligomers and stoichiometric thioester diisocyanate for 90 sec. The homogenized mixture was cured under the same conditions as the pristine samples (8 mW/cm$^2$ @365 nm for 10 mins, followed by a post-cure at 80° C. overnight).

The reclaimed disulfide containing thiol-ene resins were prepared by mixing devolatilized recycling oligomers with stoichiometric DSDAE (with pre-dissolved 1 mol % I184). The mixture was polymerized under the same condition as the pristine samples (8 mW/cm$^2$ @365 nm, 20 mins).

Photolithography Procedure

Micro-features from both pristine and recycled monomers were prepared by contact liquid photolithography. Irradiation was performed by a collimated UV light (50 mW/cm$^2$ @365 nm) through a photomasks (100 μm circles separated by 100 μm screening gaps). Pristine samples comprised stoichiometric PETMP-TEDAE monomers with 0.5 wt % 1184 and 0.3 wt % methylhydroquinone, and were irradiated for 120 sec. Recycled samples comprised stoichiometric recycled oligomers and TEDAE, with 0.5 wt % 1184 and 0.3 wt % methylhydroquinone (both with respect to unreacted moieties), and were irradiated for 80 sec. Immediately after irradiation, the unreacted compounds were washed away with ethanol.

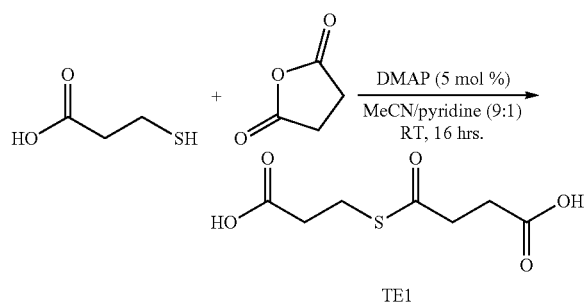

Synthesis of thioester 1 (TE1): To a 1.00 L round-bottomed flask equipped with a magnetic stir bar was added 50.0 g (500 mmol, 1.00 equiv) of succinic anhydride which was diluted with 450 mL of anhydrous acetonitrile followed by 50.0 mL of anhydrous pyridine (1.00 M total concentration, 9:1 v/v ratio, MeCN:pyridine) and stirred for ~5 minutes at room temperature to form a homogenous solution. Then, 43.5 mL (53.0 g, 500 mmol, 1.00 equiv) of 3-mercatopropionic acid was added in a single portion followed by 3.05 g (24.98 mmol, 0.05 equiv, 5.00 mol %) of DMAP. The reaction vessel was then sealed with a yellow cap under air and stirred at room temperature overnight (~12 hours). After this period the reaction mixture was concentrated to a thick residue which was dissolved in ~1.00 L of ethyl acetate (EtOAc), acidified with a 1 N aqueous HCl solution (to pH=1), and the aqueous layer was back-extracted with additional portions of EtOAc (250 mL, 2×); the combined organics were dried over $Na_2SO_4$, filtered, and concentrated. Note: a smaller version of this work-up procedure can be employed to check the conversion of this reaction before final work-up of the larger batch. The white solid obtained after evaporation of the solvent was dissolved into a minimal amount of dichloromethane (DCM, ~100 mL) with rapid stirring using a football shaped magnetic stir bar and mild heating with a heat gun; after complete dissolution, the desired product was precipitated using a large excess of hexanes (~1.00 L) which was added steadily to the stirring mixture. Filtration of the precipitated material and additional washes with smaller portions of hexanes (~250 mL, 2×) yielded 94.6 grams (92% yield) of the title compound (TE1) as a white solid which was used in all subsequent studies with no further purifications. This reaction has been successfully scaled up to a 1.00 mole scale (100 g of the succinic anhydride employed) with no changes in the stoichiometry, relative concentrations, reaction times, or work-up, which gave no significant changes in purity or yield of the final product.

TE1: 92% yield; white solid; $R_f$=n/a; $^1$H NMR (400 MHz, MeOD-$d_3$, 25° C.): δ=3.09 (t, J=5.4 Hz, 2H), 2.87 (t, J=5.4 Hz, 2H), 2.63-2.56 (m, 4H); $^{13}$C NMR (100 MHz, MeOD-$d_3$, 25° C.) 199.32, 175.57, 175.19, 39.34, 35.08, 29.72, 24.87.

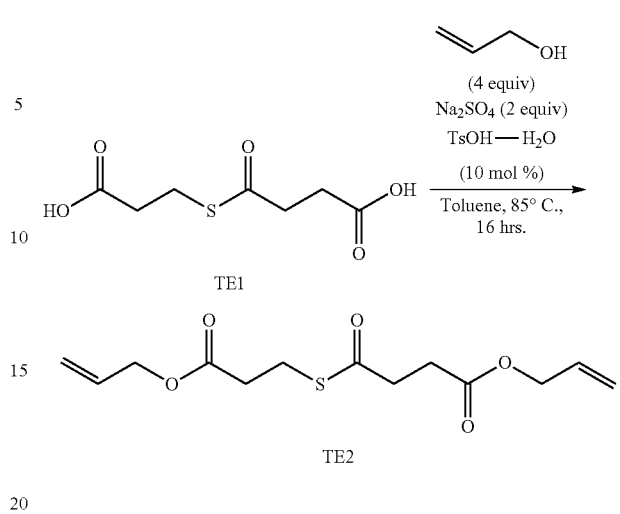

Synthesis of thioester 2 (TEDAE/TE2): To a 250 mL round-bottomed flask equipped with a magnetic stir bar was added 10.0 g (48.5 mmol, 1.00 equiv) of TE1 (synthesis of which is detailed above), 13.8 grams (97.0 mmol, 2.00 eq) of anhydrous sodium sulfate ($Na_2SO_4$), 922 mg (4.85 mmol, 0.10 equiv, 10.0 mol %) of p-toluenesulfonic acid monohydrate (TsOH—$H_2O$) and diluted with 100 mL (0.50 M) of reagent grade toluene. To this stirring suspension, 13.2 mL (11.3 g, 194 mmol, 4.00 equiv) of allyl alcohol was added in a single portion via pipette; the flask was equipped with a reflux condenser (open to air), placed into an oil bath, and heated to 85° C. with rapid stirring for 12 hours. After this time the reaction mixture was allowed to cool to room temperature and the solids were filtered, the filter cake was washed with additional portions of reagent grade toluene (25 mL, 2×), and concentrated to yield a clear syrupy residue (bath was placed at 60° C. to remove any traces of excess allyl alcohol). The crude residue was directly submitted to column chromatography (10%→20%→30% EtOAc/hexanes) and concentration of the fractions containing the desired material ($R_f$=0.19, TLC conditions: 10% EtOAc/hexanes) yielded 10.9 grams (79% yield) of the title compound (TEDAE) as a clear oil which was found to be sufficiently pure and was used in all subsequent studies with no further purifications.

TEDAE: 82% yield; non-viscous, clear oil; $R_f$=0.19 (TLC conditions: 10% EtOAc/hexanes); $^1$H NMR (400 MHz, CDCl$_3$, 25° C.): δ=5.95-5.85 (m, 2H), 5.34-5.21 (m, 4H), 4.60-4.57 (m, 4H), 3.14 (t, J=5.4 Hz, 2H), 2.89 (t, J=5.4 Hz, 2H), 2.70-2.63 (m, 4H); $^{13}$C NMR (100 MHz, CDCl$_3$, 25° C.) 197.56, 171.66, 171.39, 132.03, 132.01, 118.66, 118.60, 65.65, 65.61, 38.48, 34.45, 29.21, 24.07.

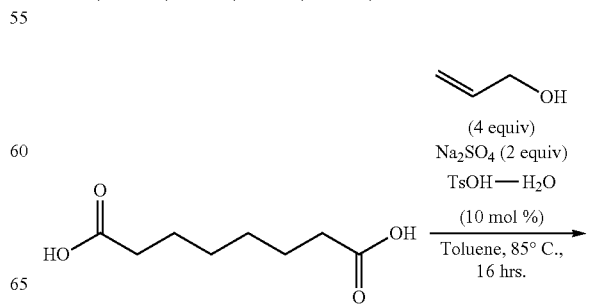

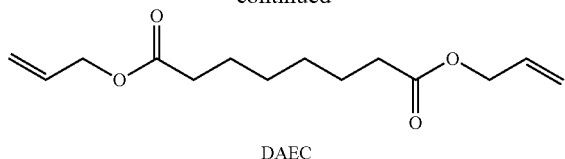

DAEC

Synthesis of diallylester control (DAEC): To a 250 mL round-bottomed flask equipped with a magnetic stir bar was added 10.0 grams (57.4 mmol, 1.00 equiv) of suberic acid, 16.3 grams (115 mmol, 2.00 eq) of anhydrous sodium sulfate (Na$_2$SO$_4$), 1.09 grams (5.74 mmol, 0.10 equiv, 10.0 mol %) of p-toluenesulfonic acid monohydrate (TsOH—H$_2$O), and this was diluted with 115 mL (0.50 M) of reagent grade toluene. To this stirring suspension, 15.6 mL (13.3 g, 230 mmol, 4.00 equiv) of allyl alcohol was added in a single portion via pipette; the flask was equipped with a reflux condenser (open to air), placed into an oil bath, and heated to 85° C. with rapid stirring for 12 hours. After this time the reaction mixture was allowed to cool to room temperature and the solids were filtered, the filter cake was washed with additional portions of reagent grade toluene (25 mL, 2×), and the filtrate was concentrated to yield a clear syrupy residue (bath was placed at 60° C. to remove any traces of excess allyl alcohol). The crude residue was dissolved in EtOAc (~200 mLs), transferred to a 500 mL separatory funnel, washed with an aqueous solution of NaHCO$_3$ (~100 mLs, 2×), then brine (~100 mLs, 1×). The combined organics were dried over Na$_2$SO$_4$, filtered, and concentrated to yield 12.6 grams (86% yield) of the title compound (DAEC) as a clear oil which was found to be sufficiently pure and was used in all subsequent studies with no further purifications. Note: often the material would have a small amount of an unknown precipitate suspended in the oil which could be easily removed by filtering the oil through a 0.2 μm syringe filter.

DAEC: 86% yield; non-viscous, clear oil; R$_f$=0.33 (TLC conditions: 10% EtOAc/hexanes, visualized by KMnO$_4$ stain); $^1$H NMR (400 MHz, CDCl$_3$, 25° C.): δ=5.96-5.86 (m, 2H), 5.33-5.21 (m, 4H), 4.58-4.56 (m, 4H), 2.32 (t, J=7.42 Hz, 4H), 1.67-1.60 (m, 4H), 1.38-1.30 (m, 4H); $^{13}$C NMR (100 MHz, CDCl$_3$, 25° C.) 132.42, 118.27, 65.10, 34.28, 28.87, 24.86.

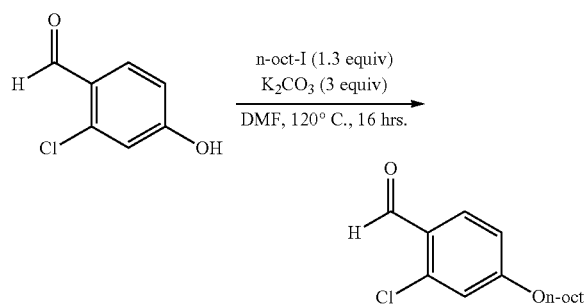

HABI-1: To a 500 mL round-bottomed flask equipped with a magnetic stir bar was added 5.00 grams (32.1 mmol, 1.00 equiv) of 2-chloro-4-hydroxybenzaldehyde which was diluted with 75.0 mL (0.43 M) of reagent grade DMF. To this stirring solution was added 7.52 mLs (10.0 grams, 41.7 mmol, 1.30 equiv) of 1-iodooctane, 13.3 grams (96.3 mmol, 3.00 equiv) of potassium carbonate (K$_2$CO$_3$), and this suspension was heated to 120° C. for 16 hours. After this time the suspension was allowed to room temperature and the solids were filtered, the filter cake was washed with additional small portions of EtOAc (~25.0 mLs, 3×), and the filtrate was concentrated to yield an orange residue. The crude residue was dissolved in EtOAc (~200 mLs), transferred to a 500 mL separatory funnel, washed with water (~100 mLs, 2×), then brine (~100 mLs, 1×). The combined organics were dried over Na$_2$SO$_4$, filtered, and concentrated to dryness. This crude residue was directly submitted to column chromatography (0%→5%→10% EtOAc/hexanes) and the fractions containing the desired compound (R$_f$=0.30, TLC conditions: 10% EtOAc/hexanes) were concentrated to yield 7.84 grams (91%) of the title compound as a slightly yellow oil.

HABI-1: 91% yield; slightly yellow oil; R$_f$=0.30 (TLC conditions: 5% EtOAc/hexanes); $^1$H NMR (400 MHz, CDCl$_3$, 25° C.): δ=10.32 (d, J=0.82 Hz, 1H), 7.88 (d, J=8.73, 1H), 6.92 (d, J=2.38, 1H), 6.87 (ddq, J=8.7, 2.4, 0.9, 0.8, 1H), 4.02 (t, J=6.55, 2H), 1.83-1.76 (m, 2H), 1.49-1.41 (m, 2H), 1.39-1.24 (m, 8H), 0.89 (t, J=6.79, 3H); $^{13}$C NMR (100 MHz, CDCl$_3$, 25° C.): δ=188.73, 164.40, 139.87, 131.12, 125.93, 115.78, 114.18, 68.98, 31.92, 29.39, 29.33, 29.06, 26.03, 22.79, 14.24.

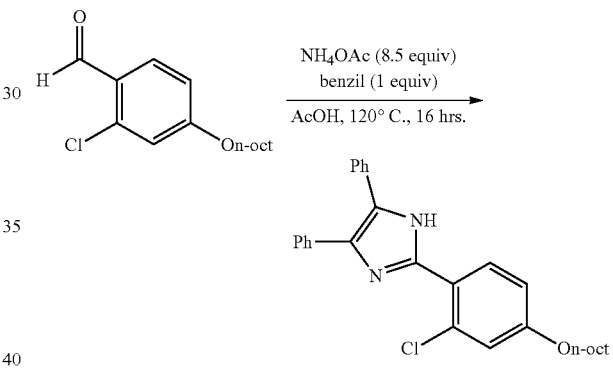

HABI-2: To a 250 mL round-bottomed flask equipped with a magnetic stir bar was added 7.84 grams (29.2 mmol, 1.00 equiv) of HABI-1, which was dissolved in 115 mLs (0.25 M) of glacial acetic acid. To this clear solution was added 6.14 grams (29.2 mmol, 1.00 equiv) of benzil, followed by 19.1 grams (249 mmol, 8.50 equiv) of ammonium acetate to form a suspension. The flask was equipped with a reflux condenser, placed under a mild vacuum for ~5 minutes, then opened to an atmosphere of argon; this procedure was repeated 3× times. The suspension was then heated to 120° C., forming a solution at ~100° C., and allowed to heat at this temperature for 16 hours. After this period the reaction mixture was allowed to cool to room temperature and the volatiles were removed under reduced pressure to give a crude residue. This residue was dissolved in DCM (~200 mLs), transferred to a 500 mL separatory funnel, washed with an aqueous solution of NaHCO$_3$ (~100 mLs, 2×), and brine (~100 mLs, 1×). The combined organics were dried over Na$_2$SO$_4$, filtered, and concentrated to give 13.1 grams (98%) yield of the title compound as a yellow/beige solid which was found to be sufficiently pure for experimental purposes and was utilized directly in the next step with no further purifications.

HABI-2: 98% yield; yellow/beige solid; R$_f$=0.30 (TLC conditions: 10% EtOAc/hexanes); $^1$H NMR (400 MHz, CDCl$_3$, 25° C.): δ=10.08 (bs, 1H), 8.34 (d, J=8.75 Hz, 1H), 7.67 (bs, 2H), 7.48 (bs, 2H), 7.42-7.24 (bm, 6H), 3.99 (t, J=6.55, 2H), 1.80 (m, 2H), 1.51-1.43 (m, 2H), 1.40-1.26 (m, 8H), 0.90 (t, J=6.73 Hz, 3H); $^{13}$C NMR (100 MHz, CDCl$_3$, 25° C.) 159.87, 143.60, 131.92, 130.45, 129.08, 128.48, 127.88, 127.24, 127.10, 120.69, 116.01, 114.45, 77.36, 77.36, 68.64, 31.95, 29.47, 29.37, 29.24, 26.12, 22.81, 14.26.

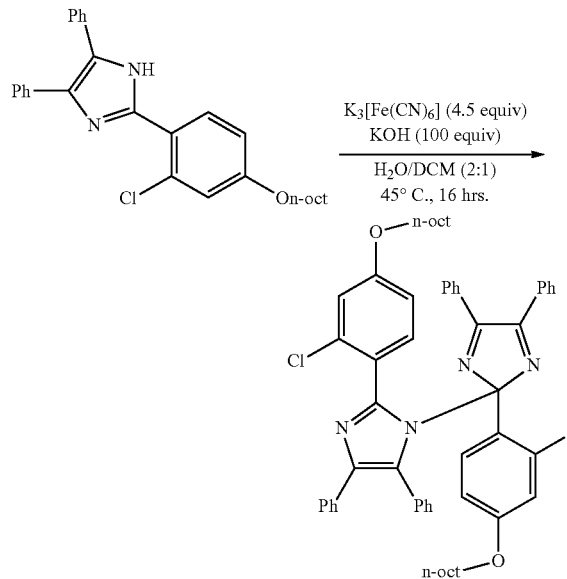

Precautions were taken to conduct this synthesis in the absence of any UV-light.

HABI-O-noct: To a 250 mL round-bottomed flask equipped with a magnetic stir bar and a 60.0 mL addition funnel was added 1.00 grams (2.18 mmol, 1.00 equiv) of HABI-2 and this was diluted with 31.0 mLs (~0.02 M) of reagent grade benzene. To a separate 100 mL round-bottomed flask equipped with a magnetic stir bar was added 2.44 grams (43.6 mmol, 20.0 equiv) of KOH, diluted with 31.0 mLs (~0.02 M, total dilution of ~0.04 M) of distilled water, and allowed to stir for ~10 minutes or until the solids had completely dissolved. After this period, 7.18 grams (21.8 mmol, 10.0 equiv) of potassium ferricyanide (K$_3$[Fe(CN)$_6$]) was added in a single portion and allowed to stir for an additional ~10 minutes or until the solids had completely dissolved. The fully homogenous KOH/K$_3$[Fe(CN)$_6$] solution was placed into the 60.0 mL addition funnel, washing with minimal amounts of water to assure complete transfer of the reagents. The entire flask was placed under a mild vacuum and opened to an atmosphere of argon (balloon, 1 atm), this procedure was repeated 3 times, keeping the argon filled balloon equipped to the reaction after the final cycle. The KOH/K$_3$[Fe(CN)$_6$] solution was then slowly added dropwise to the reaction with vigorous stirring over the course of 30 minutes. It was noted during this period that the biphasic reaction turned from a light-yellow solution into a bright blue/green biphasic solution upon complete addition of the reagents. The reaction was wrapped in tin foil and allowed to stir vigorously for 16 hours at room temperature. After this period the reaction was transferred to a 250 mL separatory funnel, the aqueous layer was removed and the organics were washed with distilled water (~100 mLs, 2×), brine (~100 mLs, 1×), dried over Na$_2$SO$_4$, filtered, and concentrated to yield a crude yellow/blue foam. The crude residue was directly submitted to column chromatography (5%→10% EtOAc/hexanes) and concentration of the fractions containing the desired material (R$_f$=0.20, TLC conditions: 10% EtOAc/hexanes) yielded 993 grams (99% yield) of the title compound (HABI-O-noct) as a clear oil which was found to be sufficiently pure and was used in all subsequent studies with no further purifications.

HABI-O-noct: 99% yield; yellow foam; R$_f$=0.20 (TLC conditions: 10% EtOAc/hexanes); $^1$H NMR (400 MHz, CDCl$_3$, 25° C.): δ=7.62 (d, J=8.3 Hz, 3H), 7.55 (t, J=7.4 Hz, 1H), 7.43 (dd, J=15.5, 7.4 Hz, 4H), 7.38-7.33 (m, 1H), 7.20-7.04 (m, 9H), 6.77-6.74 (m, 2H), 6.57 (d, J=8.9 Hz, 1H), 6.41 (d, J=8.9 Hz, 1H), 6.01 (dd, J=8.9, 2.6 Hz, 1H), 3.83-3.78 (m, 2H), 3.73-3.61 (m, 2H), 1.69 (p, J=7.1 Hz, 4H), 1.43-1.26 (m, 20H), 0.93-0.86 (m, 6H); $^{13}$C NMR (100 MHz, CDCl$_3$, 25° C.) 168.13, 165.05, 159.63, 159.53, 144.16, 138.21, 135.34, 135.25, 134.80, 133.22, 132.31, 132.28, 131.06, 131.00, 130.00, 129.95, 129.67, 129.10, 128.40, 127.86, 127.77, 127.74, 127.61, 127.11, 126.98, 126.88, 126.08, 116.89, 114.55, 113.08, 112.06, 110.80, 68.38, 68.22, 31.98, 31.93, 29.50, 29.42, 29.40, 29.36, 29.21, 29.07, 26.19, 26.02, 22.83, 22.78, 14.27, 14.24.

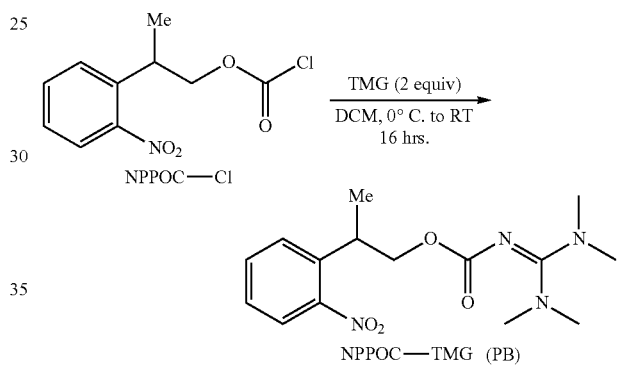

Synthesis of the TMG-appended photobase (PB): To a 100 mL round-bottomed flask equipped with a magnetic stir bar was added 2.00 grams (8.23 mmol, 1.00 equiv) of 2-(2-nitrophenyl)propyl chloroformate (~95% pure, obtained from Sigma-Aldrich) and diluted with 40.0 mLs (0.20 M) of reagent grade DCM. This stirring solution was cooled to 0° C. by the application of an ice bath and 1.03 mLs (946 mgs, 8.21 mmol, 2.00 equiv) of 1,1,3,3-tetramethylguanidine (TMG). This clear solution was allowed to stir for 1 hour at 0° C., then the ice bath was removed and the reaction was allowed to stir for 16 hours. After this period the reaction was quenched by the addition of brine (~50.0 mLs), transferred to a separatory funnel, washed with additional portions of brine (~50.0 mLs, 2×), and the combined organics were dried over Na$_2$SO$_4$, filtered, and concentrated to dryness. This crude residue was directly submitted to column chromatography (0%→1%→5% MeOH/DCM) and the fractions containing the desired compound (R$_f$=0.47, TLC conditions: 10% MeOH/DCM) were concentrated to yield 1.29 grams (98%) of the title compound (PB) as a slightly yellow oil. This oil was found to have solidified as a waxy off-white solid after several hours of cooling in a −20° C. freezer. Alternatively, seeding this viscous oil with a small quantity of a previously crystallized batch of NPPOC-TMG also greatly accelerated the speed of solidification.

PB: 98% yield; waxy off-white solid; R$_f$=0.47 (TLC conditions: 10% MeOH/DCM); H NMR (400 MHz, CDCl$_3$, 25° C.): δ=7.76-7.73 (m, 1H), 7.57-7.52 (m, 2H), 7.35-7.31 (m, 1H), 4.29 (d, J=7.16 Hz, 2H), 3.75-3.68 (m, 1H), 2.82 (s, 12H), 1.38 (d, J=6.94 Hz, 3H); $^{13}$C NMR (100 MHz, CDCl$_3$, 25° C.) 166.29, 160.29, 150.45, 138.49, 132.64, 128.58, 127.08, 68.49, 39.85, 34.01, 18.72.

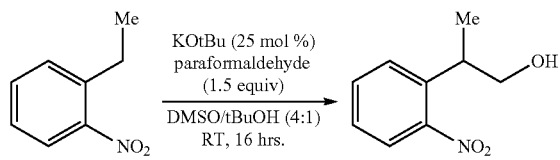 [SMILES: CCc1ccccc1[N+](=O)[O-] ; CC(CO)c1ccccc1[N+](=O)[O-]]

Synthesis of the photo-acid precursor (PA-OH): To a 100 mL round-bottomed flask equipped with a magnetic stir bar was added 5.00 grams (33.1 mmol, 1.00 equiv) of 1-ethyl-2-nitrobenzene using a Pasteur pipette and this was diluted with 30 mLs of reagent grade DMSO. To a separate 20 mL scintillation vial equipped with a magnetic stir bar was added 1.49 grams (49.7 mmol, 1.50 equiv) of paraformaldehyde followed by 929 mgs (8.27 mmol, 0.25 equiv, 25.0 mol %) of potassium tert-butoxide (KOtBu) and these were suspended in 9.00 mL of tert-butanol (t-BuOH). To this stirring suspension, 6.00 mLs of reagent grade DMSO was added and the suspension formed a not fully clear but manageable (easily transferrable) solution. This solution was pipetted into the stirring DMSO solution containing 1-ethyl-2-nitrobenzene (45 mLs total, total concentration 0.75 M, 4:1 DMSO/t-BuOH) and the reaction mixture was stirred at room temperature for 16 hours. After this period the reaction was diluted with water (~50 mLs), transferred to a separatory funnel, and extracted with EtOAc (~100 mLs, 2×). The combined organic layer was washed with water (~100 mLs, 2×), then brine (~100 mLs, 1×), dried over Na$_2$SO$_4$, filtered, and concentrated to dryness. This crude residue was directly submitted to column chromatography (10%→20%→30% EtOAc/hexanes) and the fractions containing the desired compound (R$_f$=0.25, TLC conditions: 30% EtOAc/hexanes) were concentrated to yield 5.66 grams (94%) of the title compound (PA-OH) as a yellow/orange oil which was found to be sufficiently pure and was used in all subsequent studies with no further purifications.

PA-OH: 94% yield; yellow/orange oil; R$_f$=0.25 (TLC conditions: 30% EtOAc/hexanes); $^1$H NMR (400 MHz, CDCl$_3$, 25° C.): δ=7.77 (dd, J=8.14, 1.37 Hz, 1H), 7.62-7.58 (m, 1H), 7.52 (dd, J=7.94, 1.49 Hz, 1H), 7.38 (ddd, J=7.27, 1.49 Hz, 1H), 3.86-3.76 (m, 2H), 3.58-3.50 (m, 1H), 1.70 (bs, 1H), 1.35 (d, J=6.92 Hz, 3H); $^{13}$C NMR (100 MHz, CDCl$_3$, 25° C.) 150.83, 138.21, 132.79, 128.31, 127.33, 124.24, 68.01, 36.49, 17.69.

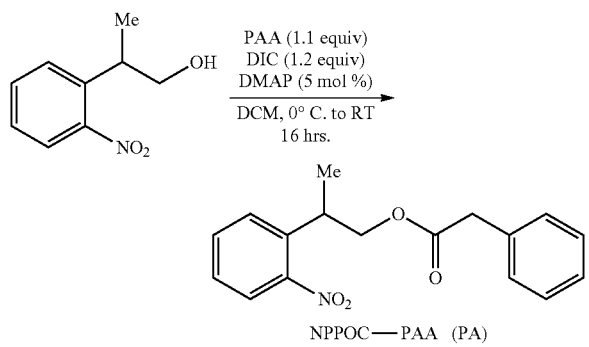

Synthesis of the photo-acid (PA): To a 100 mL round-bottomed flask equipped with a magnetic stir bar was added 1.00 grams (5.52 mmol, 1.00 equiv) of PA-OH and this was diluted with 20.0 mLs (0.30 M) of reagent grade DCM. To this was added 902 mgs (6.63 mmol, 1.20 equiv) of phenylacetic acid, 34.0 mgs (0.28 mmol, 0.05 equiv, 5.00 mol %) of DMAP, and this suspension was allowed to stir for ~10 minutes until it became a solution. The reaction was then added 1.04 mLs (836 mgs, 6.62 mmol, 1.20 equiv) of diisopropylcarbodiimide (DIC) was added dropwise; the reaction mixture was allowed to slowly warm to room temperature and stir for 16 hours. After this period a fine precipitate had formed which was vacuum filtered through a filter paper-topped Buchner funnel, washed with additional small portions of DCM (~10.0 mLs, 2×), and the combined filtrate was concentrated to give a cloudy thick residue. This residue was dissolved in a minimal amount of EtOAc (~20.0 mLs) and, again, filtered through a filter paper-topped Buchner funnel. The combined filtrate was concentrated to give an almost clear residue which was directly submitted to column chromatography (5%→10% EtOAc/hexanes) and the fractions containing the title compound (R$_f$=0.22, TLC conditions: 10% EtOAc/hexanes) were concentrated to give 1.64 grams (99%) of the title compound (PA) as a slightly yellow oil which was found to be sufficiently pure and was used in all subsequent studies with no further purifications.

PA: 99% yield; slightly yellow oil; R$_f$=0.22 (TLC conditions: 10% EtOAc/hexanes); $^1$H NMR (400 MHz, CDCl$_3$, 25° C.): δ=7.74 (ddd, J=8.1, 1.4, 0.4 Hz, 1H), 7.52-7.45 (m, 1H), 7.37-7.22 (m, 5H), 7.19-7.15 (m, 2H), 4.28-4.20 (m, 2H), 3.70 (h, J=7.0 Hz, 1H), 3.55 (d, J=2.9 Hz, 2H), 1.30 (d, J=6.98 Hz, 3H); $^{13}$C NMR (100 MHz, CDCl$_3$, 25° C.) δ=171.37, 150.50, 137.30, 133.92, 132.70, 129.37, 128.66, 128.30, 127.50, 127.18, 124.55, 68.60, 41.44, 33.15, 17.78.

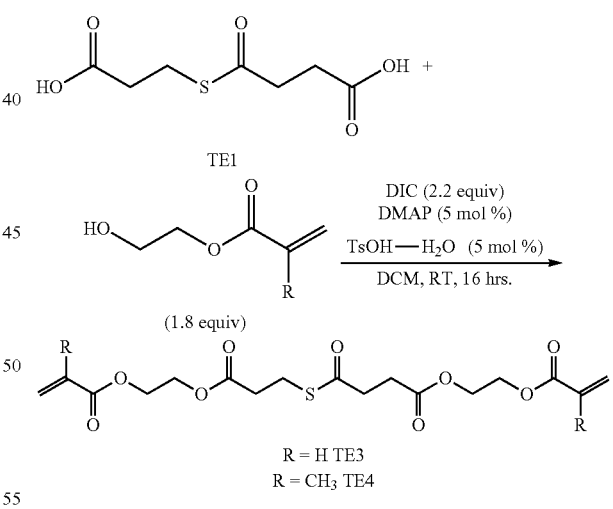

Synthesis of TE3: To a 250 mL round-bottomed flask equipped with a magnetic stir bar was added 5.00 grams (24.3 mmol, 1.00 equiv) of TE1 (synthesis of which is detailed above), 535 mgs (2.43 mmol, 10.0 mol %, 0.10 equiv) of 2,6-di-tert-butyl-4-methylphenol (BHT), and was diluted with 80.0 mLs (~0.30 M) of reagent grade DCM. To this suspension was added 148 mgs (1.22 mmol, 0.05 equiv, 5.00 mol %) of 4-dimethylaminopyridine (DMAP), 232 mgs (1.22 mmol, 0.05 equiv, 5.00 mol %) of p-toluenesulfonic acid monohydrate (TsOH—H$_2$O), 5.02 mLs (5.08 grams, 43.7 mmol, 1.80 equiv) of 2-hydroxyethyl acrylate (HEA), and this suspension was allowed to stir for ~5 minutes at room temperature. Finally, the reaction was initiated by the addition of 8.37 mLs (6.75 grams, 53.5 mmol, 2.20 equiv) of N,N'-diisopropylcarbodiimide (DIC) which was added in a single portion via syringe. After complete addition of the DIC the suspension formed a clear solution and after a few minutes a fine white solid was noted to precipitate (most likely DIU); this suspension was allowed to stir at room temperature overnight. After this period the reaction mixture was filtered, the filter cake was washed with small portions of EtOAc (~10.0 mLs, 2×), and the filtrate was concentrated to give a milky residue. The residue was again suspended in a small portion of EtOAc (~20.0 mLs), filtered, the filter cake was washed with additional small portions of EtOAc (~5.00 mLs, 2×), and the filtrate was reduced to yield a nearly clear residue. This residue was directly submitted to column chromatography (10%→20%→30% EtOAc/hexanes), the fractions containing the desired material ($R_f$=0.45, TLC conditions: 50% EtOAc/hexanes) was added 8.80 mgs (1000 ppm based on a 90% ideal yield) of BHT, and concentrated to yield 9.58 grams (98% yield) of a the title compound (TE3) as a clear oil which was found to be sufficiently pure and was used in all subsequent studies with no further purifications.

TE3: 98% yield; slightly viscous, clear oil; $R_f$=0.45 (TLC conditions: 50% EtOAc/hexanes); $^1$H NMR (400 MHz, CDCl$_3$, 25° C.): δ=6.46 (dd, J=17.3, 1.35 Hz, 2H), 6.16 (dd, J=17.3, 10.4 Hz, 2H), 5.91-5.88 (m, 2H), 4.40-4.34 (m, 8H), 3.15 (t, J=7.0 Hz, 2H), 2.91 (t, J=6.8 Hz, 2H) 2.69 (d, J=24.7 Hz, 4H); $^{13}$C NMR (100 MHz, CDCl$_3$, 25° C.) 197.43, 171.77, 171.47, 165.99, 165.98, 131.65, 131.63, 128.04, 62.63, 62.57, 62.25, 62.24, 38.38, 34.31, 29.06, 24.00.

Synthesis of TE4: The exact procedure outlined above for the synthesis of TE3 was utilized to form the thioester dimethacrylate (TE4) with no changes other than changing 2-hydroxyethyl acrylate (HEA) for 2-hydroxyethyl methacrylate (HEMA).

TE4: 9.72 grams; 93% yield; slightly viscous, clear oil; $R_f$=0.31 (TLC conditions: 30% EtOAc/Hexanes); $^1$H NMR (400 MHz, CDCl$_3$, 25° C.): δ=6.16-6.14 (m, 2H), 5.63-5.61 (m, 2H), 4.38-4.35 (m, 8H), 3.15 (t, J=7.01 Hz, 2H), 2.91 (t, J=7.18 Hz, 2H), 2.72-2.66 (m, 4H), 1.97 (s, 6H); $^{13}$C NMR (100 MHz, CDCl$_3$, 25° C.) 197.41, 171.77, 171.47, 167.22, 167.21, 135.99, 126.30, 126.28, 62.64, 62.58, 62.42, 62.41, 38.40, 34.34, 29.08, 24.02, 18.43.

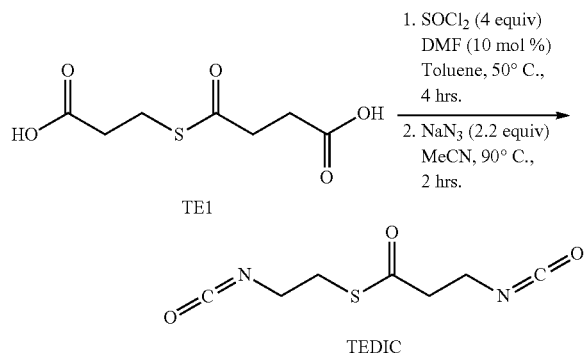

Synthesis of TEDIC: To a flame dried, 3-neck 500 mL round-bottomed flask equipped with a magnetic stir bar, reflux condenser (middle neck), and a mineral oil filled gas bubbler (connected to the top of the reflux condenser) feeding into a stirring, saturated aqueous solution of sodium bicarbonate (NaHCO$_3$), was added 25.0 grams (121 mmol, 1.00 equiv) of TE1 and this was diluted with 400 mLs (0.30 M) of dry toluene under an atmosphere of argon at room temperature. To this suspension was added 35.3 mLs (57.8 grams, 485 mmol, 4.00 equiv) of thionyl chloride via syringe and the suspension was allowed to stir at room temperature for ~10 minutes. After this period, 936 μLs (887 mgs, 12.1 mmol, 0.10 equiv, 10.0 mol %) of N,N-dimethylformamide (DMF) was added via syringe in a single portion, the flask was equipped with an oil bath, and heated to 50° C. Soon after the reaction had reached temperature, gas was noted to begin evolving (SO$_2$ and HCl) and the suspension slowly began to form a solution. After approximately 4 hours it was noted that gas had ceased evolving from the reaction (which is best seen from the aqueous sodium bicarbonate receiving flask) and the suspension had formed a clear solution. At this time the reaction mixture was cooled to room temperature and the volatiles were removed under reduced pressure at room temperature to give a viscous, often yellow or light brown residue. Additional portions of dry toluene (~50.0 mLs, 2×) were added to the residue, concentrated, and opened to argon each time; this step was performed twice to completely rid the residue of any residual thionyl chloride or related volatile byproducts. Due to the instability of the intermediate product, the obtained viscous oil was used immediately in the next step with no further purifications assuming full conversion to the anticipated product (121 mmol).

To a flame dried, 3-neck 500 mL round-bottomed flask under an atmosphere of argon, equipped with a magnetic stir bar, reflux condenser (middle neck), and 60 mL addition funnel (side neck) was added 17.4 grams (267 mmol, 2.20 equiv) of sodium azide (NaN$_3$) and this was diluted with 120 mLs (1.00 M) of dry acetonitrile (taking care to wash any NaN$_3$ from the side of the flask). The flask was then equipped with an oil bath and heated to 90° C. During the time it took to heat the suspension to reflux, the above obtained viscous oil (121 mmol, 1.00 equiv) was transferred to the closed 60 mL addition funnel via cannula. This process was accomplished by placing the 3-neck receiving flask under slightly reduced pressure while keeping the other flask under a positive pressure of argon; several additional small washes of the flask containing the thioester diacid chloride with MeCN were performed and transferred via cannula to the addition funnel using the same procedure. Once the oil bath had equilibrated and the NaN$_3$ suspension had begun refluxing, the solution containing the thioester diacid chloride was slowly added dropwise over the course of 2 hours, which resulted in the immediate and often intense formation of gas (N$_2$). The addition of the thioester diacid chloride to the sodium azide results in the exothermic and violent formation of gas. This addition should be monitored and performed slowly over the course of approximately 2 hours to maintain a controlled reaction.

Soon after concluding the addition of the thioester diacid chloride the evolution of gas had ceased and the reaction mixture was noted to have turned a deep brown with a fine precipitate (predominately NaCl with some residual NaN$_3$). At this point the reaction was removed from the heating source and allowed to cool to room temperature. Filtration of the precipitated solid through a Buchner funnel equipped with a paper filter and additional small washes of the solid with dry MeCN (~5 mLs, 3×) gave a deep brown filtrate which was concentrated under reduced pressure to yield a low viscosity brown oil. Although $^1$H-NMR, $^{13}$C-NMR, and IR revealed only the existence of the desired product, which when compared to an internal standard (1,3,5-trimethoxybenzene) gave a purity of >95%, the deep brown color was undesirable for use in neat resins. In order to rid the material of this color, the residue was placed into a 60.0 mL speed mixer cup and anhydrous magnesium sulfate ($MgSO_4$) was added to the mixture with intermittent speed mixed (~2000 rpm) until a damp, sand-like mixture was obtained.

This material was placed into a Soxhlet thimble and lowered into a Soxhlet extractor connected to a 1.00 L round bottomed flask equipped with a magnetic stir bar, ~1.00 grams of activated charcoal, and 500 mLs of reagent grade hexanes. The Soxhlet extractor was further equipped with a reflux condenser, the lower round bottomed flask was heated to reflux (75° C.), and the $MgSO_4$ mixture was allowed to be continuously extracted for 16 hours. After this time, it was noted that the sand-like $MgSO_4$ mixture was essentially free flowing and all of the TEDIC had been extracted. The receiving flask was then removed from the heat, allowed to cool to room temperature, filtered through a small pad of celite (packed with DCM), and washed with small portions of DCM (~20 mLs, 3×). The clear filtrate was concentrated under reduced pressure to yield 21.1 grams (87%, over 2 steps) of the title compound (TEDIC) as clear or slightly yellow low viscosity oil which was utilized directly with no further purifications.

TEDIC: 87% yield; clear to yellow oil; $R_f$=n/a; H NMR (400 MHz, $CDCl_3$, 25° C.): δ=3.65 (t, J=6.20 Hz, 2H), 3.50 (t, J=6.25 Hz, 2H), 3.17 (t, J=6.51 Hz, 2H), 2.88 (t, J=6.37 Hz, 2H).

A wide range of additional thioester monomers can be readily derived from the TEDIC monomer though procedures which would be known to those of ordinary skill in the art. Below is a scheme depicting of exemplary thioester monomers which can be derived from the TEDIC monomer core.

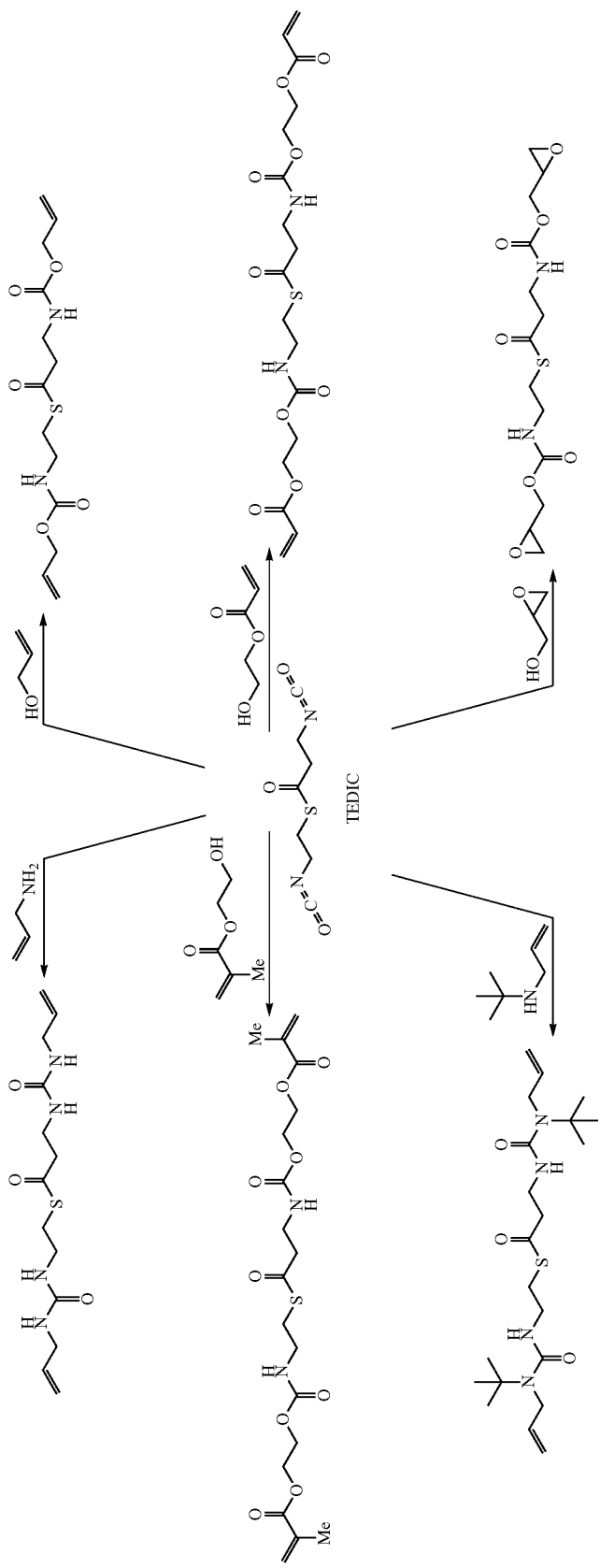

Characterizations

Fourier Transform Infrared Spectroscopy (FT-IR)

FT-JR spectra and reaction kinetics were obtained on a Nicolet 670. Samples placed between two glass slides (for thiol-ene systems) with 0.08 mm thick spacers, or between salt plates (for thiol-isocyanate systems). An Acticure 4000 lamp equipped with a 365 nm bandpass filter was used as light source. The conversions were determined by the decrease in peak area centered at 3085 $cm^{-1}$, 2570 $cm^{-1}$ and 810 $cm^{-1}$ for allyl ether, thiol and isocyanate, respectively.

Dynamic Mechanical Analysis (DMA)

DMA experiments were conducted on a TA Instruments Q800. Samples were cut into strips with approximate dimensions of 10×6×0.25 mm. Temperature was ramped at 3° C./min from −80° C. to 80° C. for rubbery samples, while from 20° C. to 150° C. for glassy materials, at a frequency of 1 Hz. The glass transition temperature (Tg) was assigned as the peak of the tan δ curve.

Tensile Test

A tensile tester with a 500 N load cell (MITS Corp., Eden Prairie, Minn.) was used to measure modulus for polythiourethane samples. Dog-bone shaped (ASTM D638-V, dimension 63.5 mm×9.5 mm×0.25 mm) samples were prepared by cutting from a 0.25 mm thick sample sheet. The samples were pulling at a rate of 0.75 mm/min.

Gel Permeation Chromatography (GPC)

The molecular weight and distribution were obtained by gel permeation chromatography (Tosoh EcoSEC HLC-8320). Dimethyl sulfoxide was used as the eluting solvent at 0.35 mL/min at 50° C. A refractive index detector was used, calibrated by PMMA standards.

Rheology

The viscosity of the recycled oligomer was measured on a TA instruments ARES rheometer. The liquid oligomers were placed between quartz plates (20 mm diameter, gap 0.1 mm). All oligomers behaved as Newtonian fluids in the detectable torque ranges.

Thermogravimetric Analysis (TGA)

The weight loss of polymer samples was obtained on a Perkin-Elmer Pyris 1. Sample filled platinum pans (~10 mg of samples) were heated from 55 to 800° C. at 10° C./min under nitrogen flow.

Rheometry

Frequency sweeps were performed on an ARES rheometer (TA instruments) with a temperature controlled stage installed, which served as the bottom plate under the sample. For the top plate, an 8 mm diameter quartz plate was used, with a mirror on the top fixture that directed light from a light guide through the sample. Quartz was employed rather than a standard metal plate to allow for irradiation of the sample to polymerize in situ, as well as to minimize temperature gradients through the sample. The polymerization was initiated using a mercury arc lamp (Acticure, EXFO) using a 365 nm filter and a light intensity of 3 mW/$cm^2$. During irradiation, the storage and loss moduli were monitored, using a constant strain of 5% and frequency of 5 rad/s. The time scan was stopped and lamp turned off once the modulus had reached a plateau value. Once the polymerization was completed, the temperature was equilibrated to the desired value and frequency scans were performed using between 1-5% strain over several orders of magnitude of frequency.

Computational Studies

Calculations were performed with Gaussian 09 computational chemistry package, using Trestles Supercomputer, XSEDE. Stationary geometries (reactants, transition states and products) were computed for all systems studied using density functional theory based on the M06 density functional and 6-31+G basis set. The M06 functional was chosen because it has been parameterized with experimental thermodynamic data, should provide a reliable description of the molecular structures for the reactions of interest. An adequate treatment of solvent is crucial to correctly describe reactions involving a polar TS, such as those involving nucleophilic attacks, which are of interest here. Therefore, the implicit polarized continuum solvation model (CPCM) was employed in all calculations to treat the solute-solvent electrostatic interactions. The modeled solvent was chosen as ethyl acetate to approximate the monomer/polymer environment containing ester functionality. Vibrational force constants were calculated at the M06/6-31+G level of theory to: 1) verify that the reactant and product structures have only positive vibrational modes, 2) confirm that each TS has only one imaginary mode and that it connects the desired reactant and product structures via Intrinsic Reaction Coordinate (IRC) calculations, and 3) compute entropies, zero-point energies (ZPE) and thermal corrections included in the reported free energies at 298K.

Figure 2:
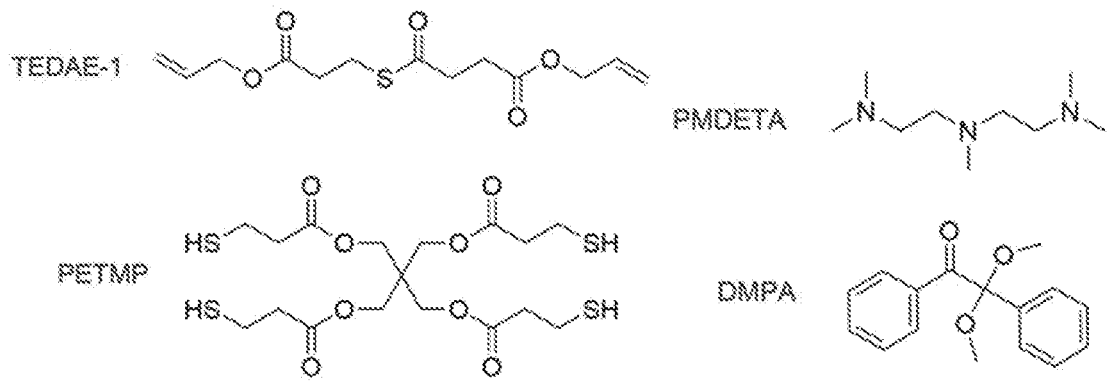
FIG. 2 is set of structures of exemplary ene and thiol monomers of the invention (TEDAE and PETMP, respectively), the base PMDETA, and initiator DMPA.
Figure 3:
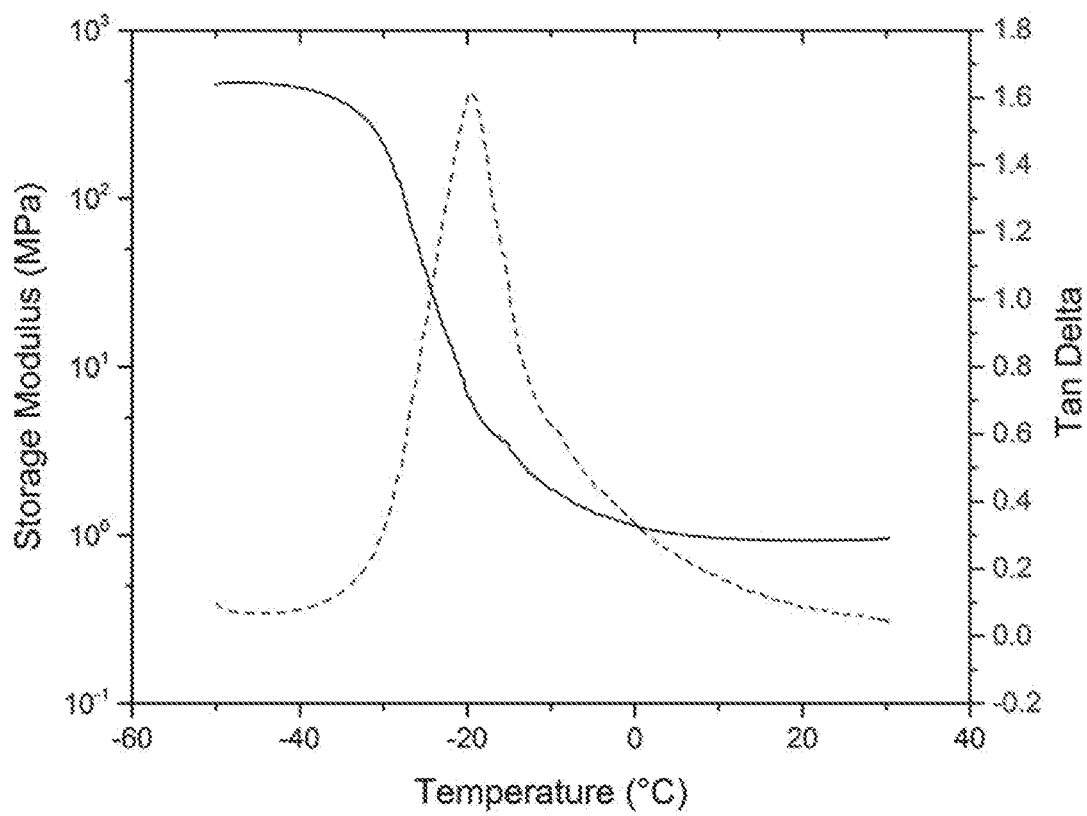
FIG. 3 is a graph of a DMA curve of a thioester-containing elastomer, showing tensile storage modulus (solid line) and tan delta (dashed line) as a function of temperature. The film was made with TEDAE, PETMP, a 2:1 ratio of thiol and ene groups, and 0.05 equivalents of PMDETA per thiol group. The glass transition temperature was measured as the peak of the tan delta curve at −19° C., and the rubbery modulus was measured at 20° C. as 1 MPa.
Figure 4:
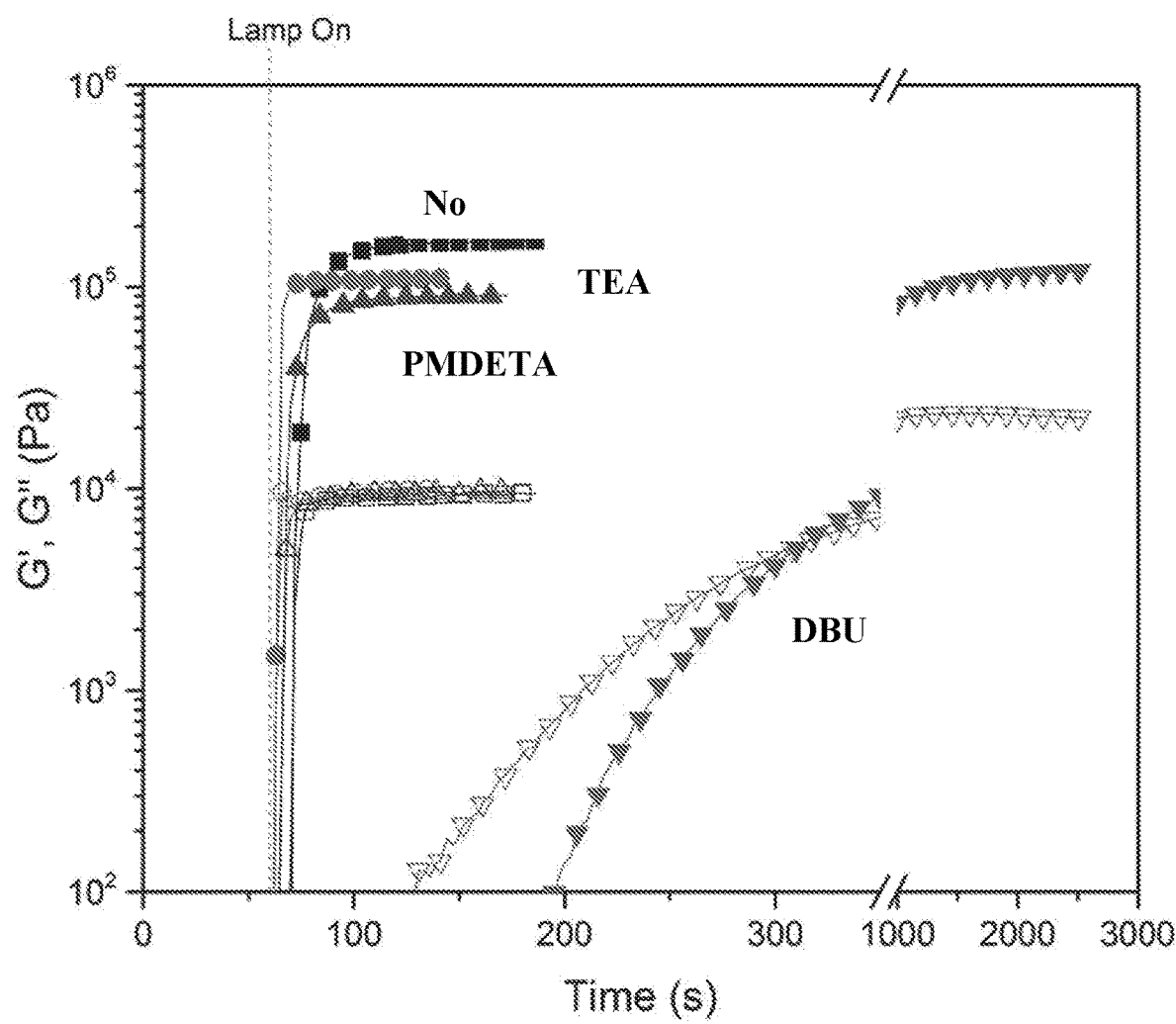
FIG. 4 is a graph of rheometer time sweep data, monitoring the thiol-ene polymerization in the presence of various base catalysts. The shear storage modulus (closed symbols) and loss modulus (open symbols) were recorded over time, using a strain of 5% and frequency of 5 rad/s. The samples were exposed to light at t≥60 s (indicated by a dashed line), using a 365 nm filter and light intensity of 3 mW/cm². The resin mixture contained PETMP, TEDAE, 2:1 thiol:ene, and either no catalyst or 0.05 equivalents of TEA, PMDETA, or DBU per thiol. While samples containing no base, TEA, or PMDETA, reached a final modulus after seconds of irradiation time, the sample containing DBU took nearly 50 minutes to reach a similar storage modulus as the others.

Example 1: Preparation of Covalent Adaptable Networks for Rapid Thiol-Thioester Exchange at Ambient Temperature A solvent-free thiol-ene networks was prepared via rapid photopolymerization on demand, while preserving a high free thiol concentration as needed to participate in exchange reactions after the polymerization is complete. The thioester-containing diene monomer, TEDAE (FIG. 2), is a low-viscosity, transparent liquid and can be synthesized in good yield by a two-step process (see Materials and Methods section). The Flory-Stockmayer predicted gel point for a network containing a tetrafunctional thiol and a diene with a 2:1 thiol:ene ratio is 82%; the "click" nature of the thiol-ene reaction ensures that quantitative conversion of the allyl ester is reached after only seconds of irradiation in thin films, so that gelation is achieved rapidly and reliably. The resulting films are low crosslinking density, low $T_g$ rubbers (FIG. 3). Liquid organic bases such as TEA, PMDETA, and DBU showed excellent solubility in the resins at the concentrations tested. Besides causing a slight decrease in modulus due to plasticization, the base catalysts generally had little impact on the polymerization or the film itself. DBU was observed to slow down the polymerization rate, but a similar modulus to the other formulations was achieved after extended light exposure (FIG. 4).

Figure 6:
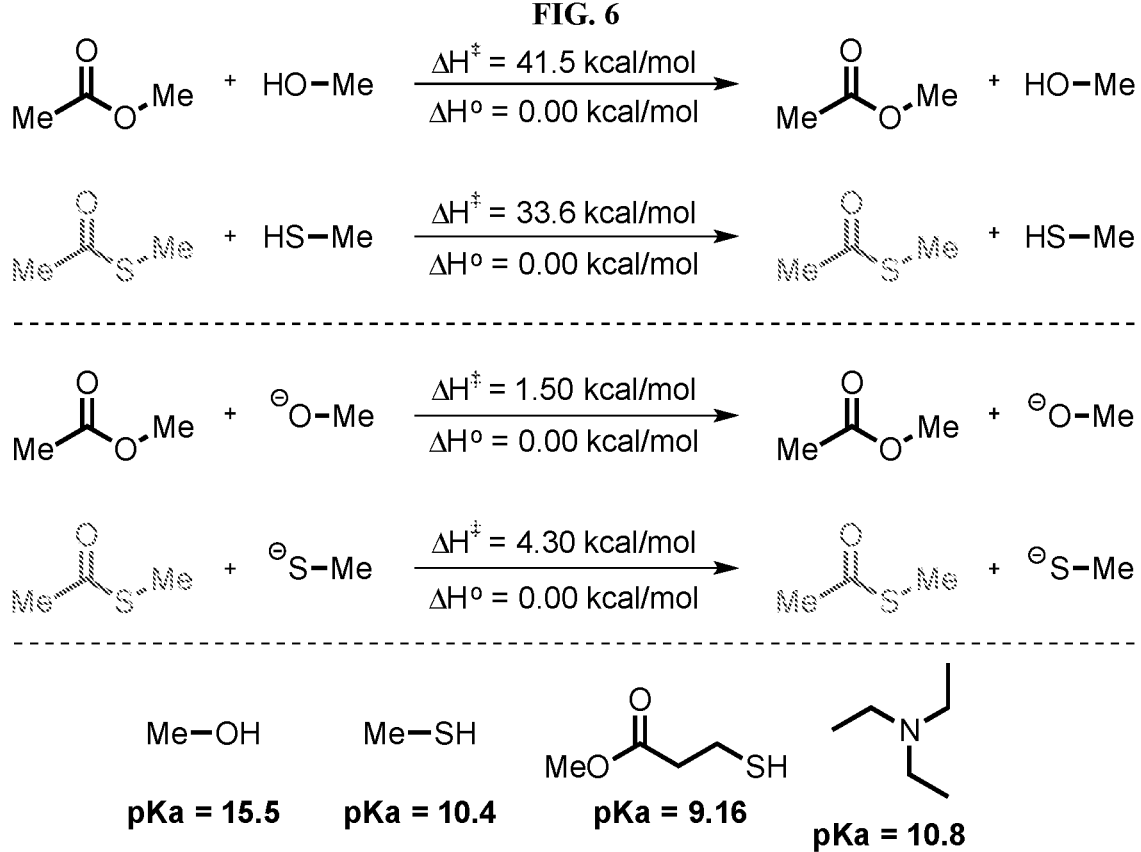
FIG. 6 is a set of schemes and calculated values of activation energy and enthalpy that show that the degenerate exchange of protonated alcohols or thiols with their ester analogs have very high kinetic barriers (top), whereas their deprotonated counterparts have very low kinetic barriers (middle). Evidently the thiol-thioester exchange occurs rapidly with mild organic base (such a TEA) due to the significantly lower pKa of thiols when compared to similar alcohols (bottom). Calculations were performed with Gaussian 09 computational chemistry package, using Trestles Supercomputer, XSEDE.
Figure 7:
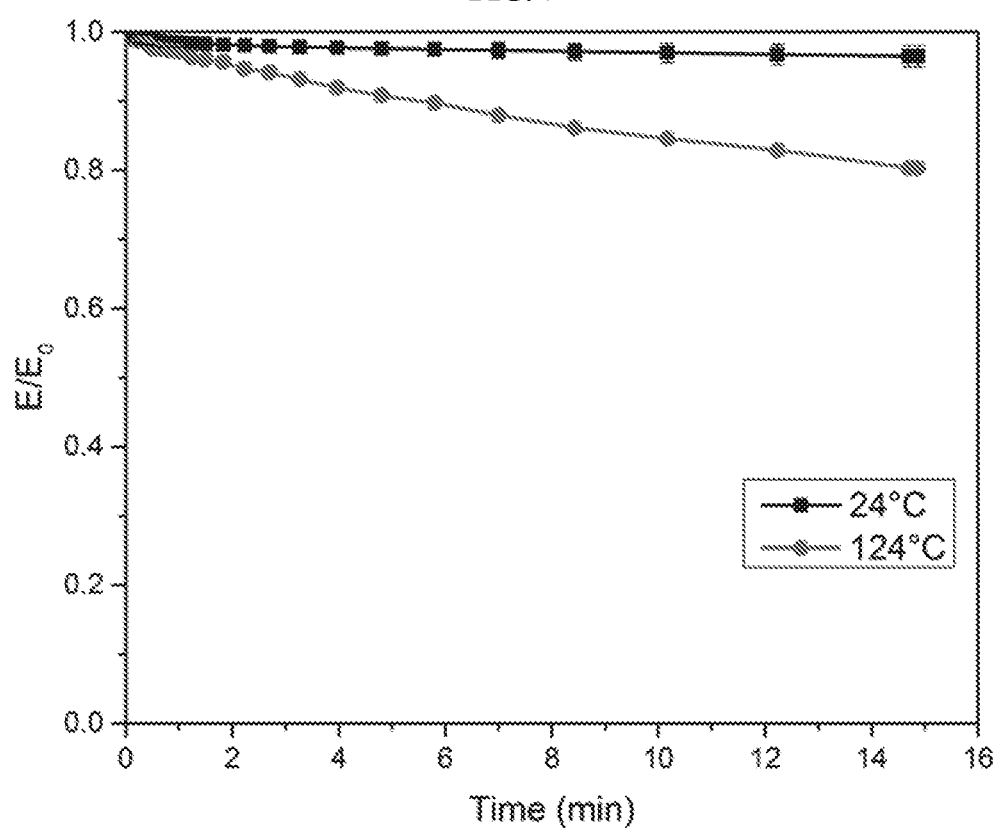
FIG. 7 is a graph of normalized tensile stress relaxation experiments without a base catalyst, using a fully-polymerized film with 2:1 thiol:ene groups, performed at 24° C. and 124° C. The formulation contained PETMP, TEDAE, and no base catalyst, and the samples were run at 4% strain while monitoring stress over time.

For thiol-thioester exchange to occur in networks, three elements are necessary: free thiol groups, a catalyst to deprotonate the thiol, and the thioester moiety. As demonstrated by creep experiments (FIG. 5), networks deficient in any one of these three components behaved as typical crosslinked elastomers with a recoverable compliance close to zero after 20 minutes recovery time. When thioester, free thiol, and base catalyst are all present, however, the material's creep behavior resembles that of an entangled polymer melt, with a linear increase in creep compliance with time and an equilibrium compliance of around 2.4 $MPa^{-1}$, as measured after 20 minutes of strain recovery (FIG. 5). In silico experiments revealed that the activation energy of a protonated aliphatic thiol attacking an aliphatic thioester was about 33.6 kcal/mol; however, if the thiol was deprotonated the activation energy dropped significantly to 4.3 kcal/mol (FIG. 6). An analogous trend in activation energies was observed for alcohol-ester exchange, but because thiols are much more easily deprotonated than analogous alcohols, thiol-thioester exchange reactions are more accessible at low temperatures as compared with corresponding transesterification reactions. If no base catalyst is present, the thiol-thioester exchange networks do exhibit stress relaxation at high temperatures (FIG. 7), where sufficient energy is present in the system to overcome the kinetic barriers for the exchange of protonated thiols and thioesters.

Figure 8A:
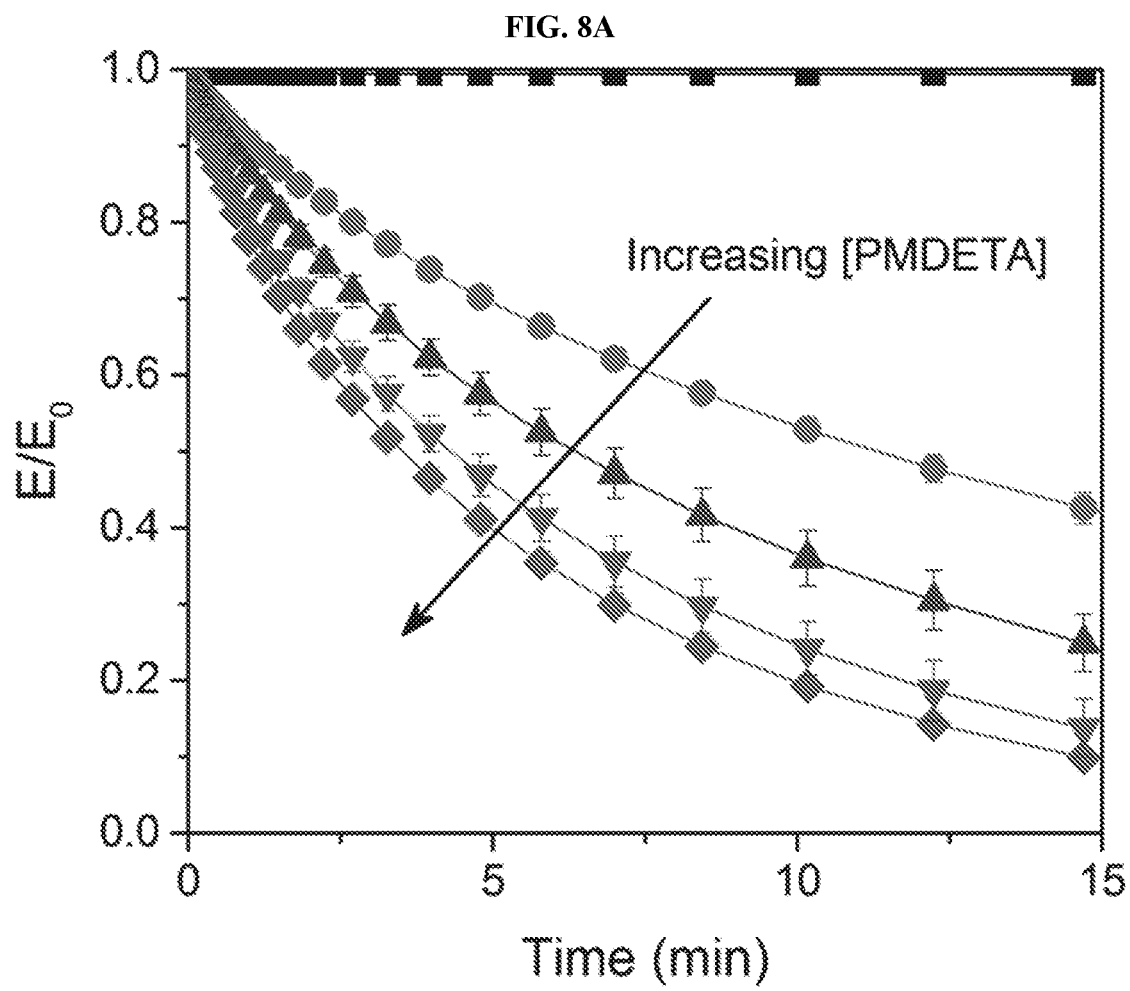
FIGS. 8A-8B are graphs showing the relationship of base concentration and stress relaxation. Increasing the concentration of PMDETA in the network increased the rate of stress relaxation (constant applied strain of 10%, FIG. 8A). A first order dependence of the base is noted in this system based on the normalized stress for each condition at t=15 min (FIG. 8B). General formulations: TEDAE (1.00 equiv), PETMP (1.00 equiv), PMEDTA (0.00 mol % [square], 8.00 mol % [circle], 16.0 mol % [up triangle], 24.0 mol % [down triangle], 32.0 mol % [diamond]), and DMPA (1.00 mol %).
Figure 8B:
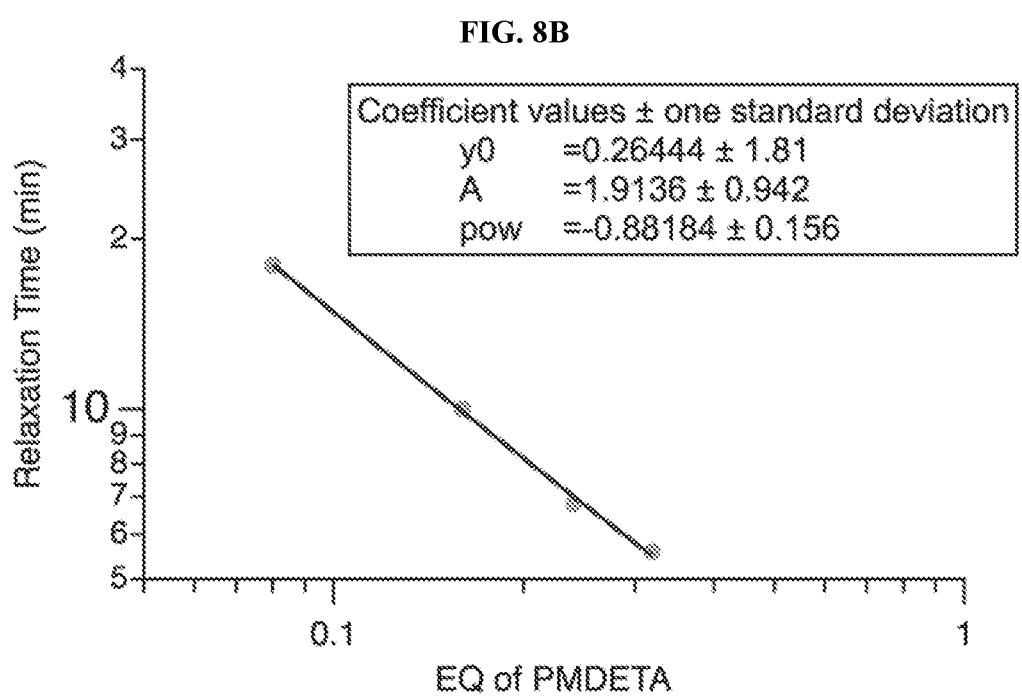
Figure 9:
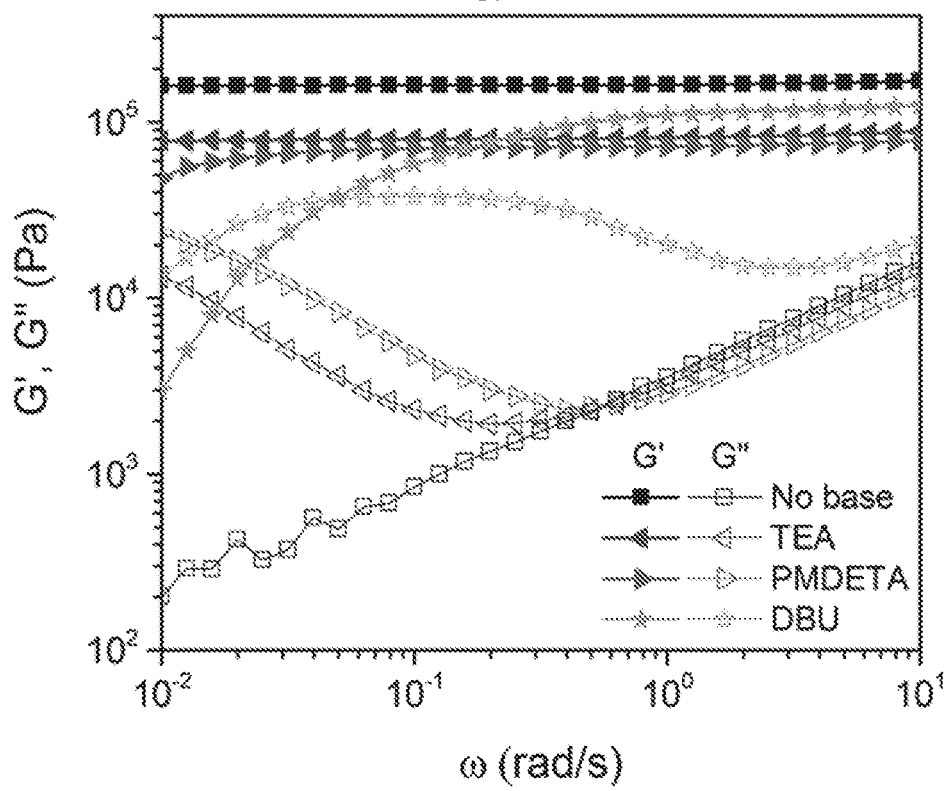
FIG. 9 is a graph showing frequency sweeps in shear of fully-cured samples; shown are the storage moduli (closed symbols) and loss moduli (open symbols) over four decades of frequency at 5% rotational strain. The following base catalysts, loaded at 0.05 molar equivalents per thiol, were studied: control with no base (square), TEA (left triangle), PMDETA (right triangle), and DBU (star).

Without being limited to any theory, because the activation energy of the exchange is low and the thiolate anion is regenerated following each exchange event, it follows that only a small percentage of thiol groups need to be deprotonated for significant bond reshuffling and consequent stress relaxation to take place. The choice of catalyst and loading levels determine the concentration of thiyl radicals within the network, which in turn affects the rate of the exchange reaction and the characteristic stress relaxation times. FIG. 8A shows the effect of the PMDETA concentration on stress relaxation. The relaxation time decreased by a factor of approximately two when the catalyst concentration was doubled (FIG. 8B), suggesting a near-first order dependence. Frequency sweep data in shear (FIG. 9) revealed storage and loss modulus profiles reminiscent of an entangled linear polymer melt, where a local minimum in G" is observed. With progressively stronger base catalysts, the storage and loss modulus curves shift towards higher frequencies. With the strongest base tested, DBU, a G'-G" crossover occurred within the observable frequency range, which is a phenomenon usually observed in linear polymer melts that can flow at sufficiently long time scales. When no catalyst is included, no local minimum in G" is observed, typically indicating an irreversibly crosslinked elastomer.

Figure 10A:
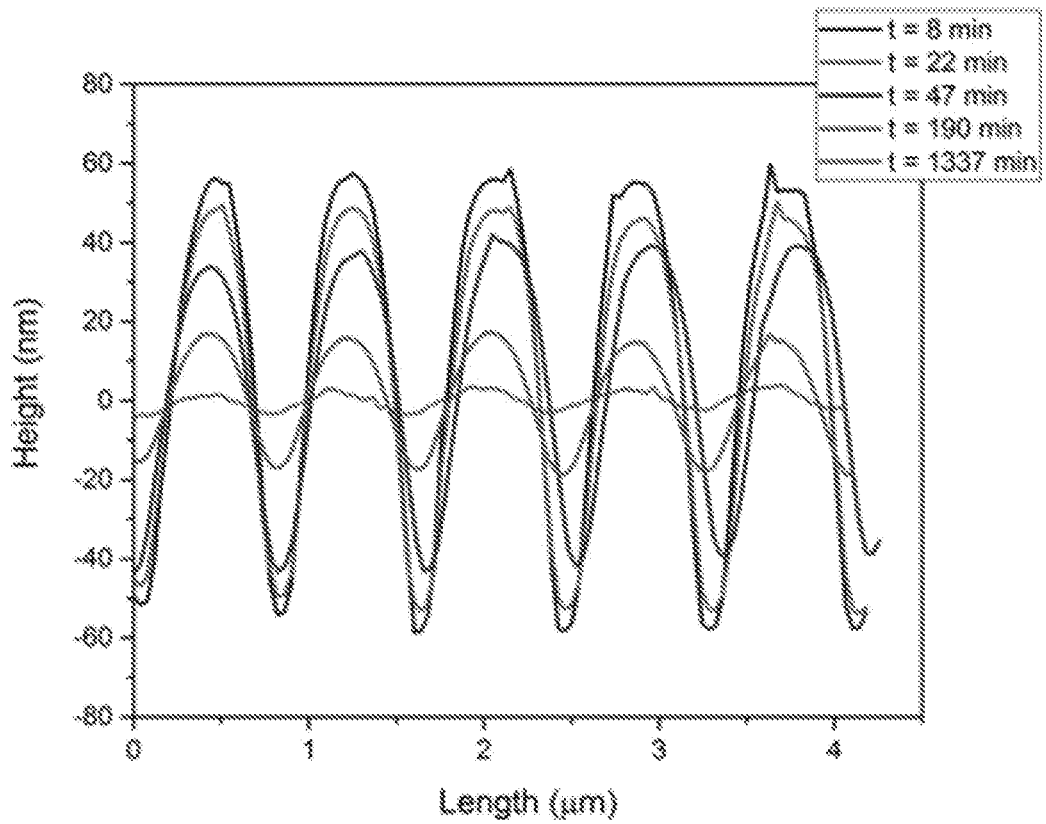
FIGS. 10A-10D are graphs and diagrams of nanoimprint lithography on a thioester-containing elastomer. The master silicon pattern had a depth of 220 nm and period of 880 nm. Imprinting was performed at 20 bar pressure for 10 minutes close to ambient temperature.
Figure 10B:
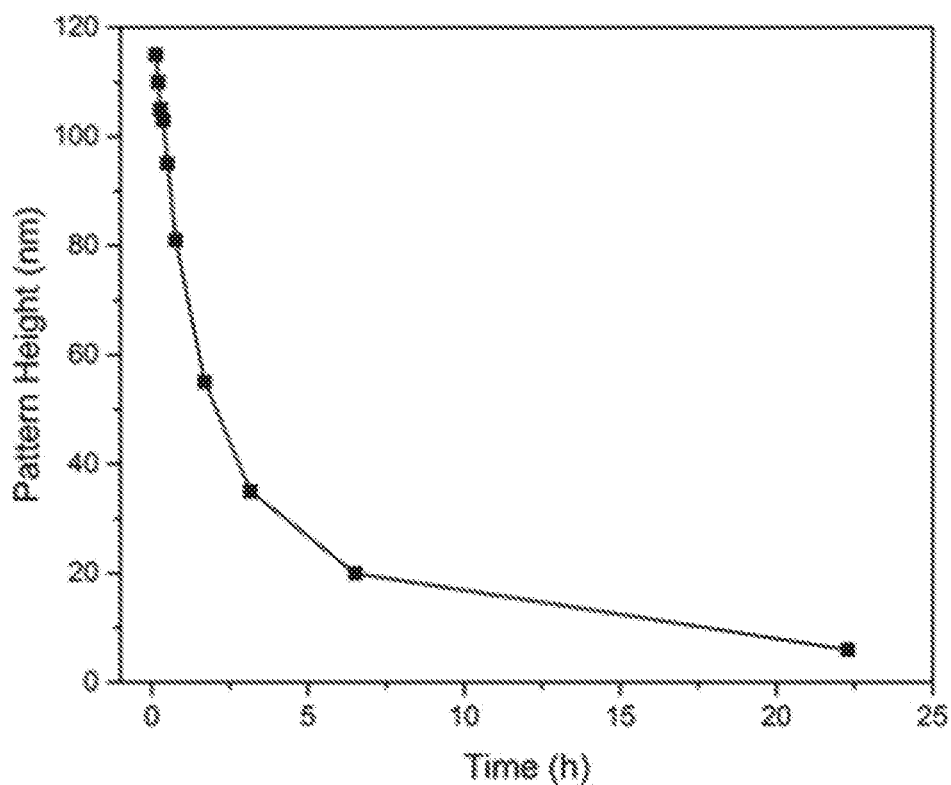
Figure 10C:
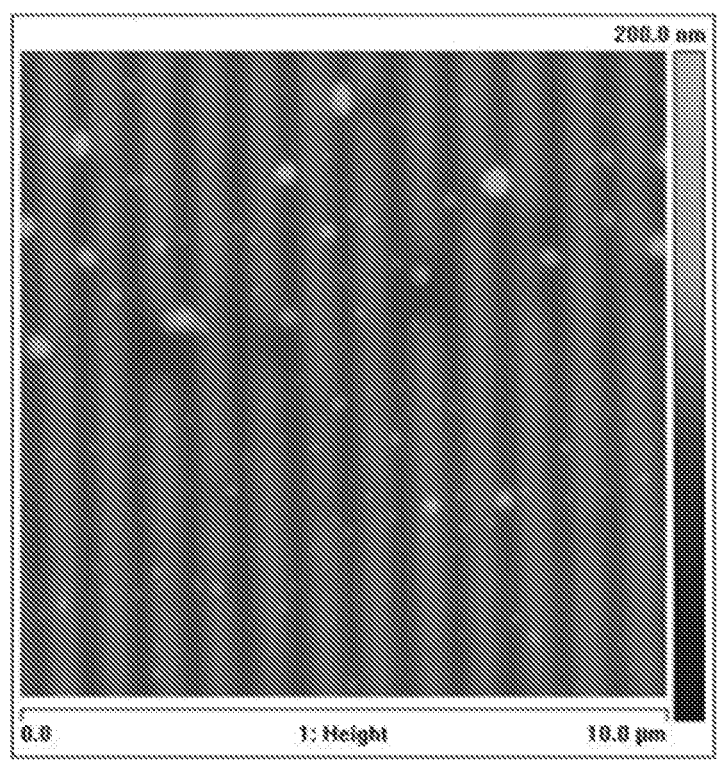
Figure 10D:
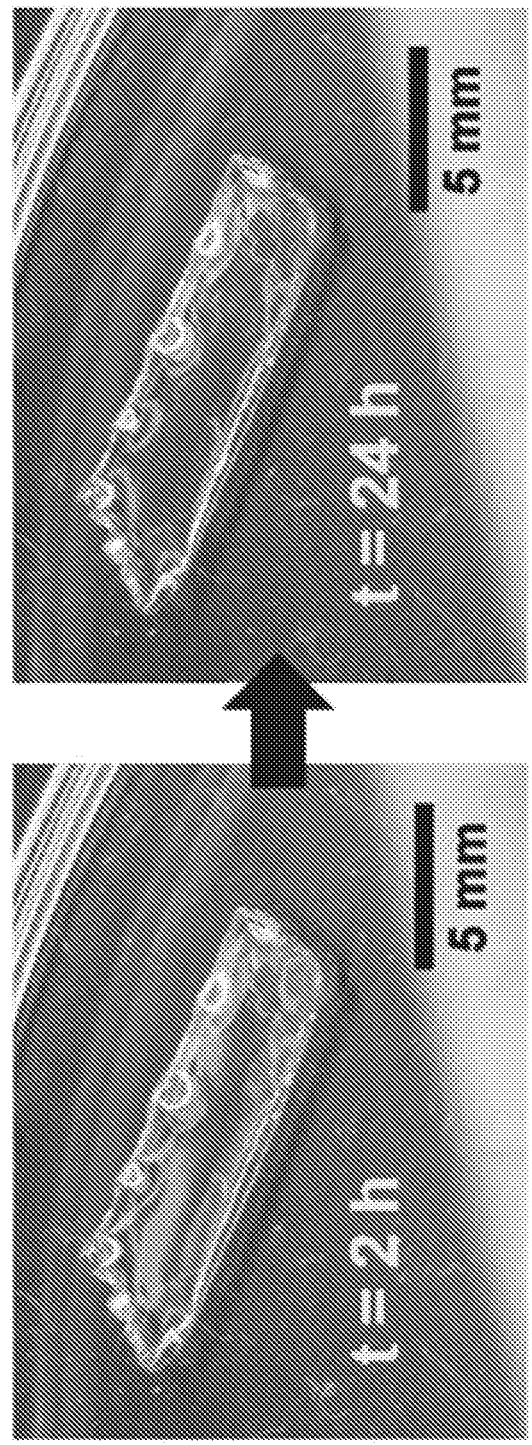

Example 2: Use of Thiol-Thioester Exchange Networks in Impression Materials and Nanoimprint Lithography at Ambient Temperatures A potential application for thiol-thioester exchange networks is in impression materials or nanoimprint lithography (NIL). A rubbery thioester-containing film with excess thiol and base catalyst was photopolymerized, then nanoimprinted for 10 minutes at 40 bar pressure close to ambient temperature, using a fluorinated silicon mold master (FIG. 10A). The silicon mold pattern had a feature height of 220 nm and period of 880 nm. Due to the high surface energy of the nanoscale topology, the continuous bond reshuffling between thiols and thioesters caused the pattern to gradually flatten over time, as evidenced by periodic monitoring of the surface by AFM (FIGS. 10A-10B) and an observation of optical changes visible to the eye (FIG. 10D). A control film that did not contain any base catalyst showed no detectable pattern transfer or shape change.

Example 3: Development of "ON/OFF" Switch for Thiol-Thioester Exchange

Figure 11:
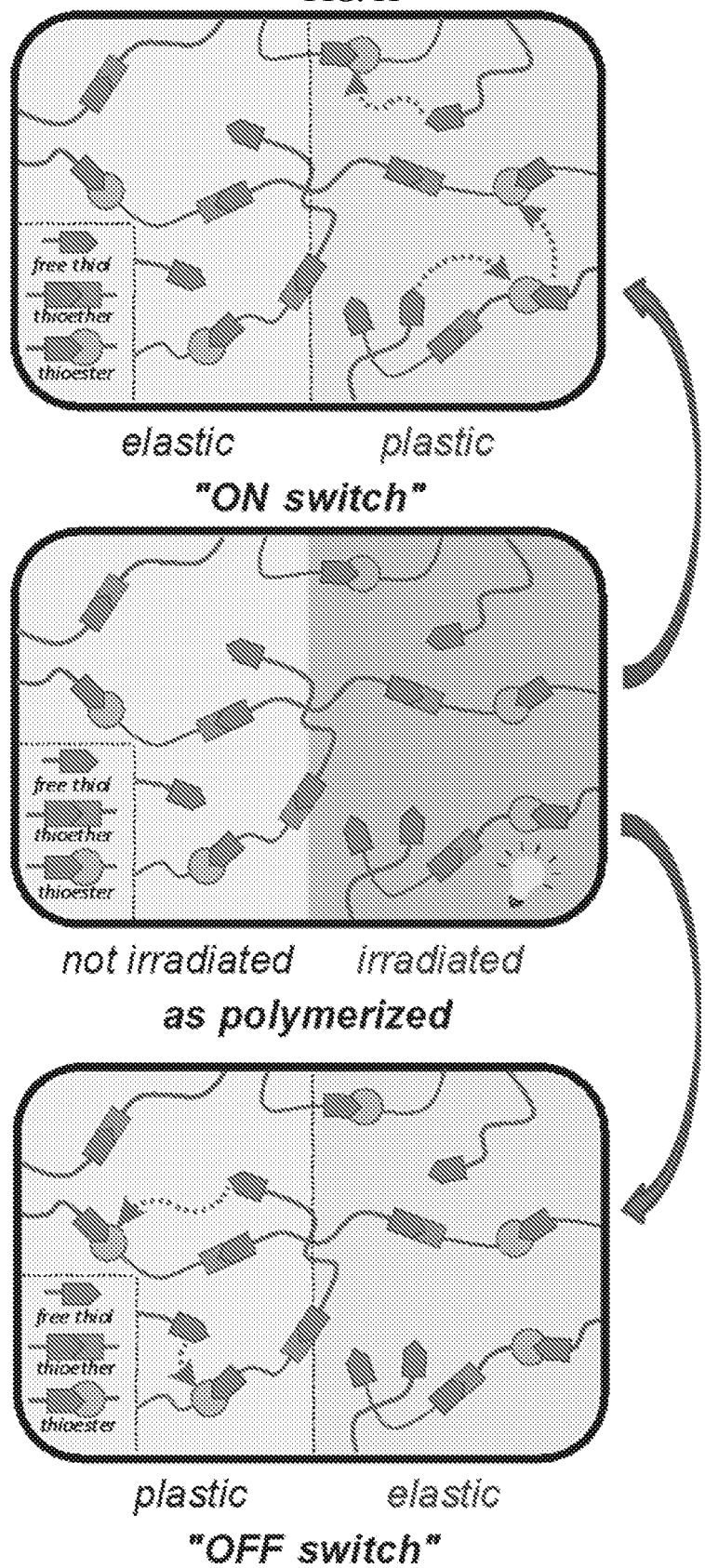
FIG. 11 is a diagram demonstrating the concept for a "ON" and "OFF" switch to control plasticity in a cross-linked network polymer.
Figure 12A:
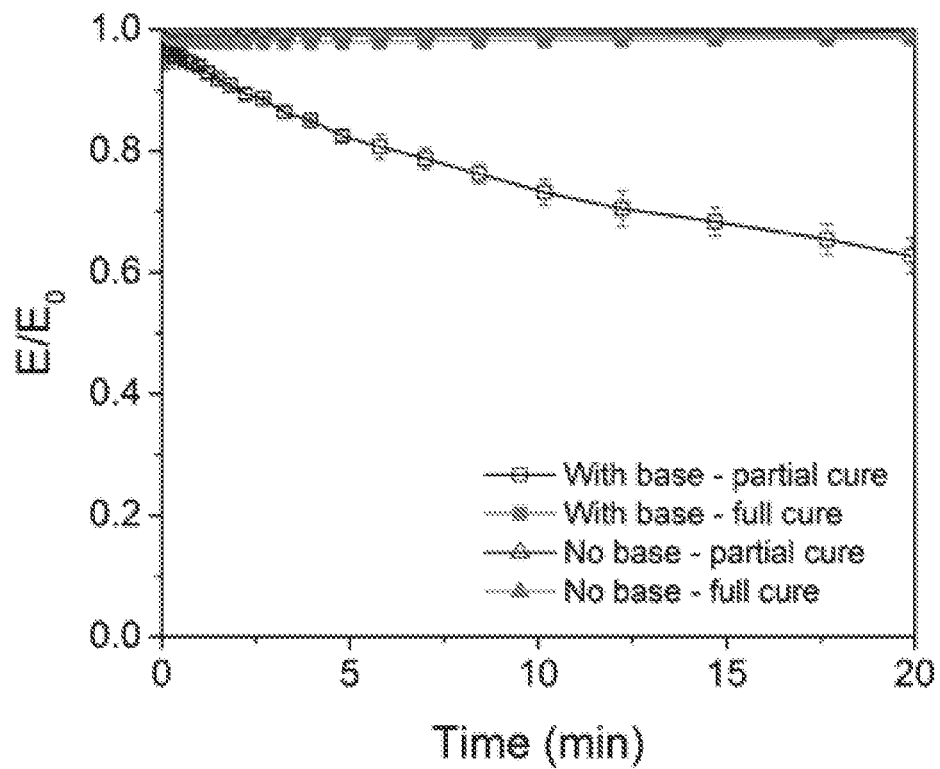
FIGS. 12A-12C are graphs and images demonstrating the dynamic behavior of the "ON/OFF" switches of the invention.
Figure 12B:
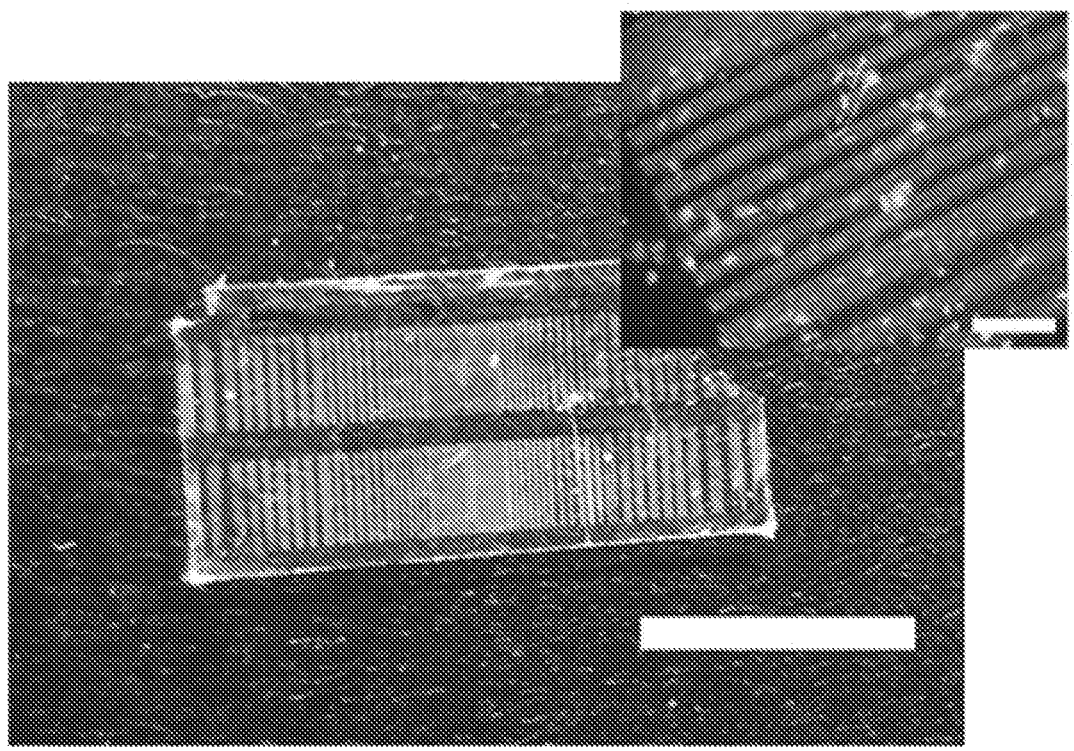
Figure 12C:
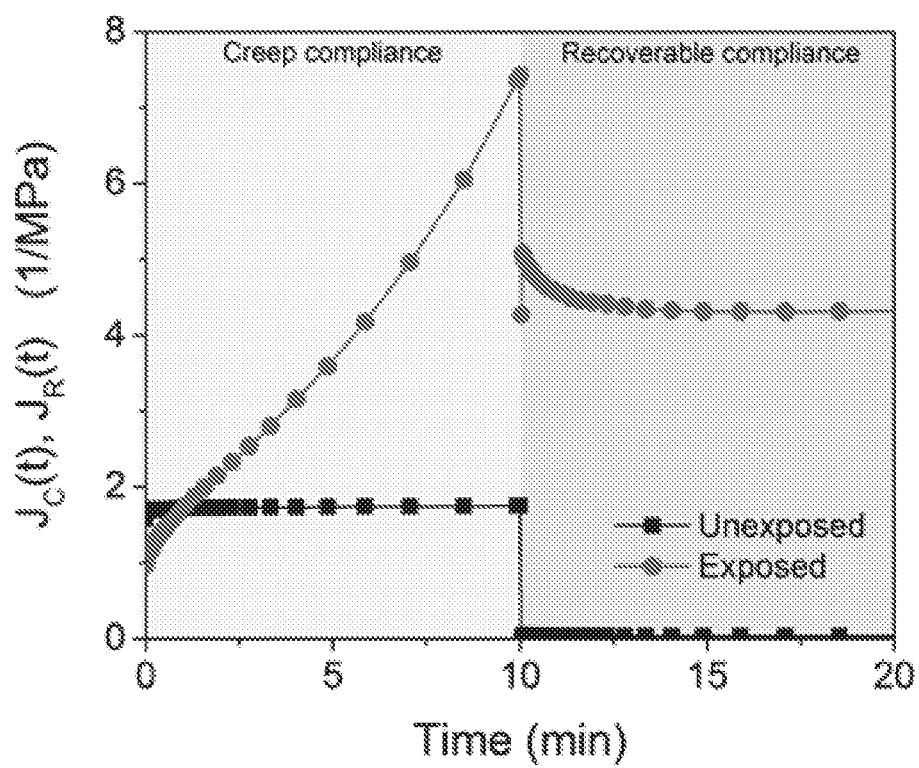

Thiol-thioester exchange occurs at room temperature only when free thiols, thioesters, and a base catalyst are present. Therefore, dynamic covalent network behavior can also be triggered "on" or "off" by the introduction or elimination of any one of the three components from the material (FIG. 11). The use of light exposure to turn "on" or "off" the exchange reactions allows for spatiotemporal control and patterning of dynamic behavior in polymer films. One method for providing an "off-switch" to bond rearrangement is to use a multi-stage cure with a stoichiometric thiol-ene formulation. Because the thiol-ene reaction is radical-mediated, when the light is turned off, radicals rapidly terminate and the polymerization ceases. Thus, in the first-stage exposure of a stoichiometric formulation of the thiol-ene network, the desired combination of thiol, thioester, and base, can be achieved where the polymer behaves as a crosslinked gel, but unreacted free thiols remain available to participate in exchange reactions. Subsequent light exposure, delivered at any time and location desired, completes the thiol-ene reaction, resulting in consumption of the remaining free thiols and preventing any additional network adaptation of stress relaxation associated with thiol-thioester exchange process. Tensile stress relaxation experiments, performed on the film after the first- and second-stage exposures, respectively, revealed that dynamic behavior only occurred in the partially-cured stoichiometric film, and only when base catalyst was present (FIG. 12A). Photopatterning of the second-stage cure was utilized in combination with nanoimprint lithography to create complex mixed-scale surface patterns, where only the areas that were not irradiated in the second-stage cure could adapt to the imprinted pattern (FIG. 12B). The nanoimprinted films were flood-cured shortly after imprinting to "fix" the surface pattern before imaging.

An "on-switch" was sought in order to provide an additional level of control over dynamic behavior in thioester networks. In choosing a photobase for this purpose, primary amines were avoided, since these are known to react irreversibly with thioesters to form amide bonds, as is the case in native chemical ligation. The photobase NPPOC-TMG, which is a nitrobenzyl-protected version of the strong organic base 1,1,3,3-tetramethylguanidine, was initially chosen. NPPOC-protected compounds have a very low absorbance above 400 nm and can be deprotected using 320-390 nm wavelength light. Thus, the visible light sensitive photoinitiator Irgacure 819 (I819) was included so that polymerization could be performed using 400-500 nm light, to avoid generating the base prematurely. Creep experiments were performed before and after a UV exposure of the previously polymerized film (320-390 nm, 15 mW/cm$^2$, 10 minutes). The results of the creep experiments (FIG. 4B) show that significant creep was observed only after the UV exposure, indicating that the photodeprotection of a base catalyst represents an effective way to externally control bond reshuffling within the network.

Figure 13:
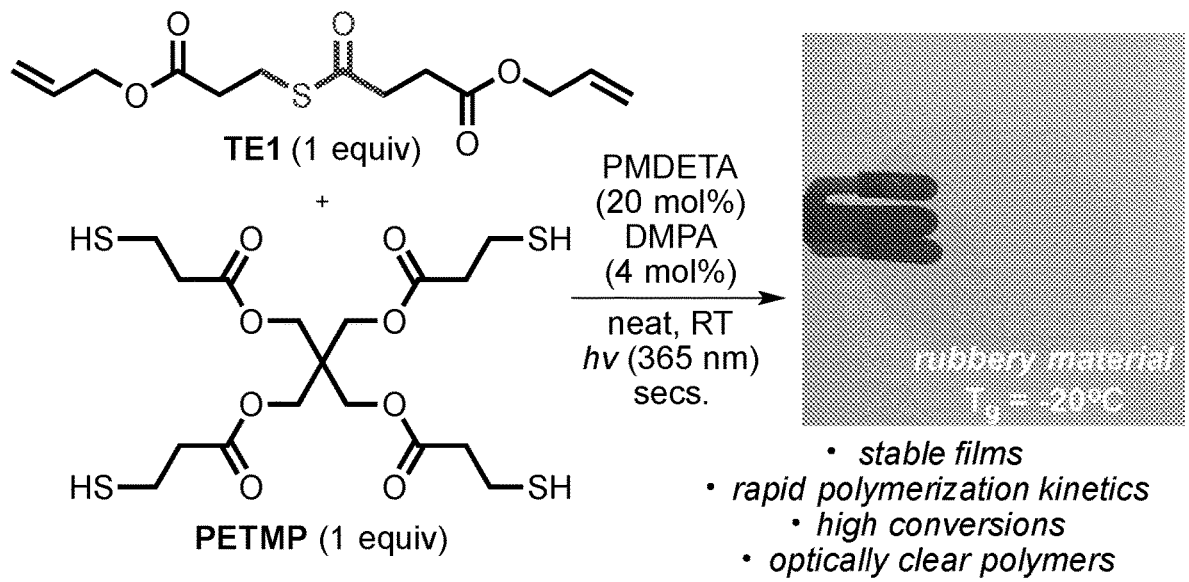
FIG. 13 is a scheme of a representative procedure for the preparation of a thioester containing network polymer via a photoinitiated thiol-ene reaction.
Figure 14A:
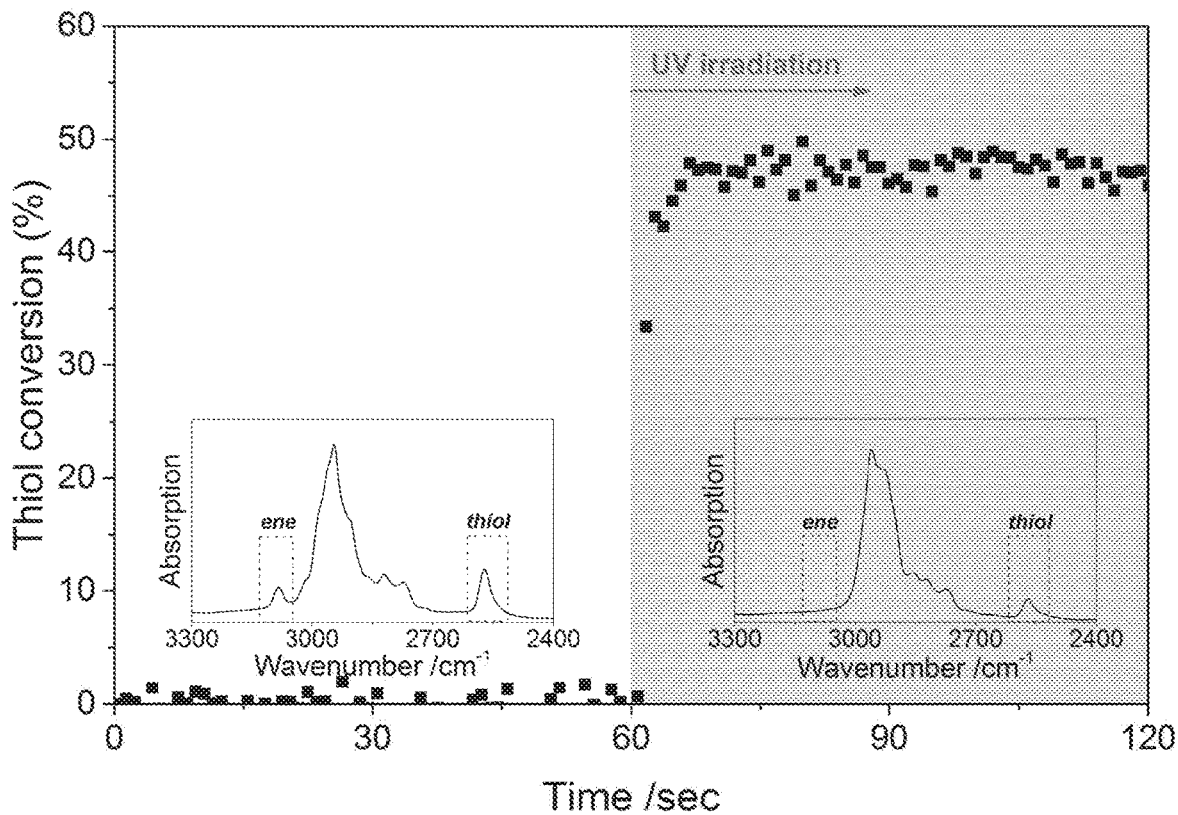
FIG. 14A is a graph of kinetics of the thiol-ene reaction with a thioester containing diene. General reaction conditions: TEDAE (1.00 equiv), PETMP (1.00 equiv), PMDETA (10.0 mol %), and DMPA (2.00 mol %) monitored by in situ IR. Light on at 60.0 seconds and continuously irradiated; 365 nm LED (50.0 mW/cm²).
Figure 14B:
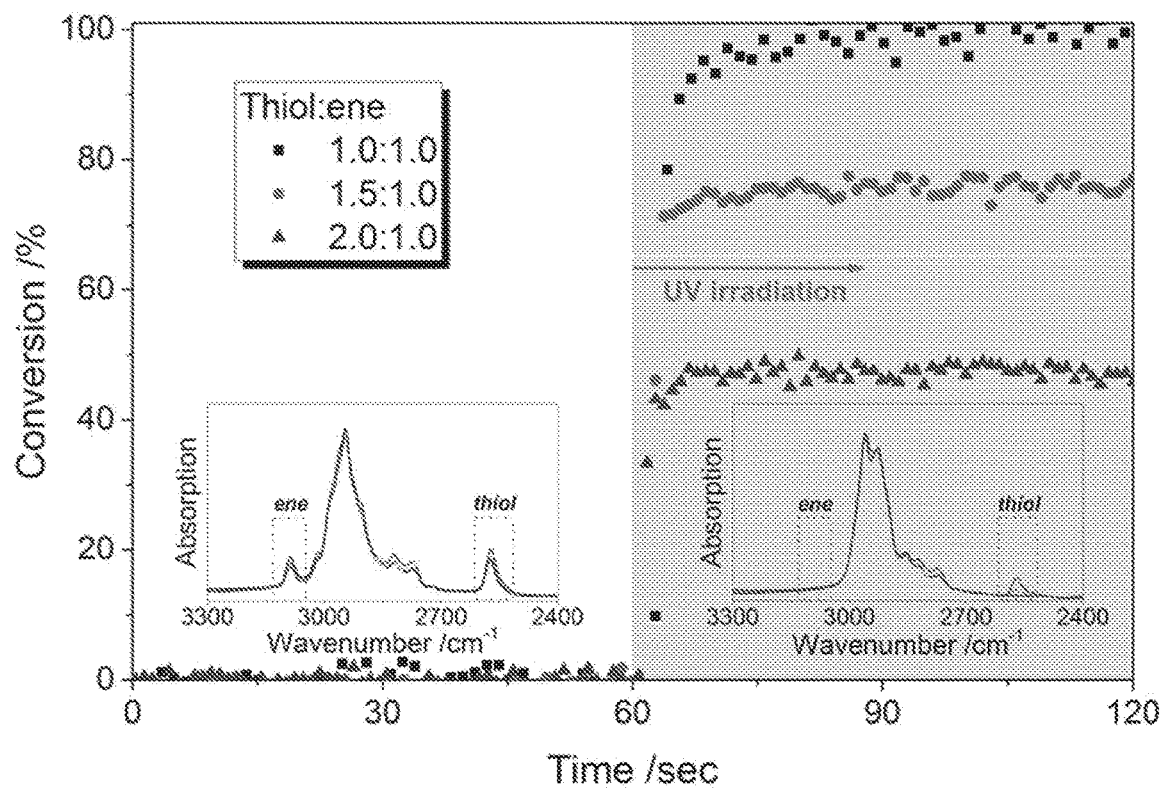
FIG. 14B is a set of graphs of different thiol-ene formulations, which show that varying amounts of thiol can remain unreacted in the network based on initial stoichiometry. General reaction conditions: TEDAE (1.00 equiv [100% xs thiol], 1.50 equiv [50.0% xs thiol], or 2.00 equiv [0.00% xs thiol]), PETMP (1.00 equiv), PMDETA (10.0 mol %), and DMPA (2.00 mol %) monitored by in situ IR. Light on at 60.0 seconds and continuously irradiated; 365 nm LED (50.0 mW/cm²).

Example 4: Preparation of Thioester Containing Network Polymers Via Photoinitiated Thiol-Ene Reaction To a 10.0 mL speed mixer vial was added 250 mgs (0.87 mmol, 1.00 equiv) of TE1, 427 mgs (0.87 mmol, 1.00 equiv, "100% excess thiol") of pentaerythritol tetra(3-mercaptopropionate) (PETMP), and 36.4 µL (30.2 mgs, 0.17 mmol, 0.20 equiv, 20.0 mol %) of N,N,N',N",N"-pentamethyldiethylenetriamine (PMDETA) each via Pasteur pipettes. This clear resin was then manually mixed with a pipette tip for ~2 minutes to make a homogenous mixture. Following this, approximately 8.91 mgs (3.48×10$^{-2}$ mmol, 0.04 equiv, 4.00 mol %) of 2,2-dimethoxy-2-phenylacetophenone (DMPA), which had been crushed with the flat side of a spatula to form a fine powder, was added and the resin was further manually mixed with a pipette tip for an additional ~2 minutes to form a homogeneous mixture. At this time the clear resin was poured between two glass slides treated with Rain-X (ITW Global Brands, Houston, Tex.) using 250 µm thick spacers (Small Parts Inc., Logansport, Ind.). The material was irradiated (365 nm, 5.00 µW/cm$^2$, room temperature) for ~10 minutes to give the thiol excess thioester containing network polymer (FIG. 13). The conversion was found to be essentially quantitative by in situ IR, revealing complete consumption of the "ene" species (FIG. 14A). Moreover, it was shown that, due to the quantitative nature of the thiol-ene reaction, any excess of either reactant (ene or thiol) is remained unreacted in the final network polymer (FIG. 14B). This procedure generally formed circular samples which were cut utilizing a single edge straight razor blade to form the required rectangular samples. Note: this represented the +thioester+base+free SH formulation utilized in FIG. 5 (black squares).

+thioester+base−free SH formulation: The representative procedure outlined above was modified to a 2:1 ene:thiol ratio (as opposed to 1:2 ene:thiol) to ensure that all free thiol was consumed and a similar crosslinking density was preserved (FIG. 5, red squares)

+thioester−base+free SH formulation: The representative procedure outlined above was utilized, however, PMDETA was not added to the resin (FIG. 5, blue upward triangles)

−thioester+base+free SH formulation: The representative procedure outlined above was utilized, however, tri(ethylene glycol) divinyl ether (CAS: 765-12-8), which contained no thioester linkage, was employed in the stead of TE1; relative stoichiometry of ene:thiol (1:2) was maintained (FIG. 5, green downward triangles).

Figure 15A:
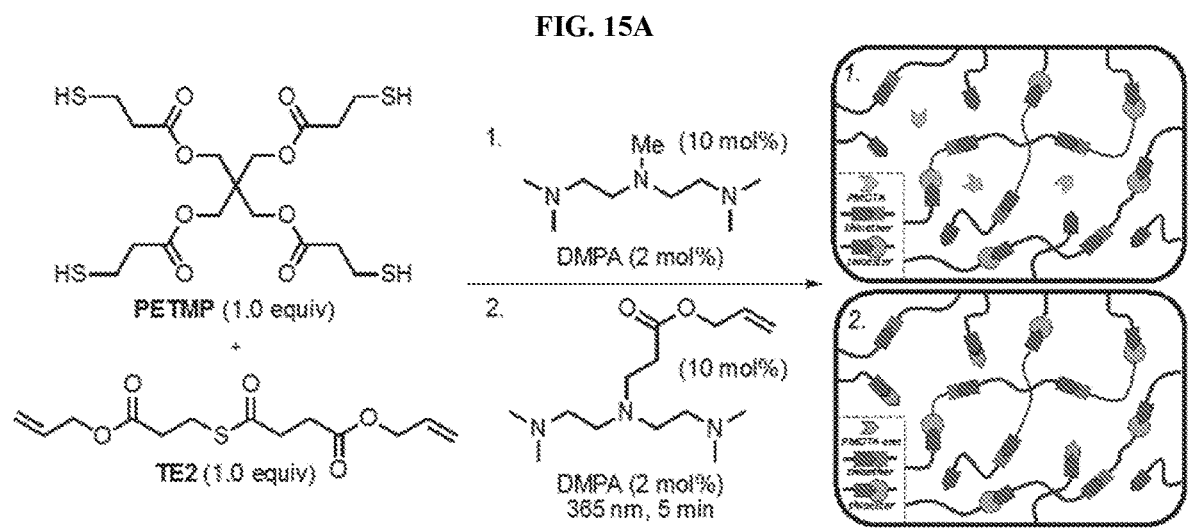
FIGS. 15A-15B are a scheme and graph showing that tethering the base to the network evidently does not affect the rate of relaxation when compared to the free base (constant applied strain of 10%). General formulation: 1) blue line—TEDAE (1.00 equiv), PETMP (1.00 equiv), PMDETA (10.0 mol %), DMPA (2.00 mol %); 2) grey line—TEDAE (1.00 equiv), PETMP (1.00 equiv), PMDETA-ene (10.0 mol %), DMPA (2.00 mol %). Although the tethered base gave slightly faster kinetics, the difference is minimal.
Figure 15B:
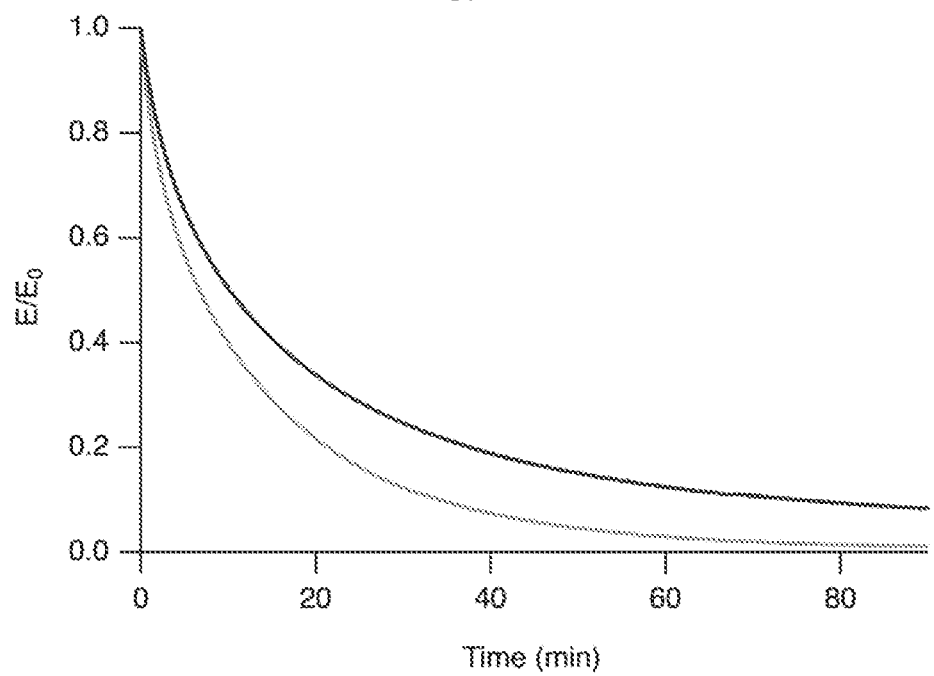
Figure 16:
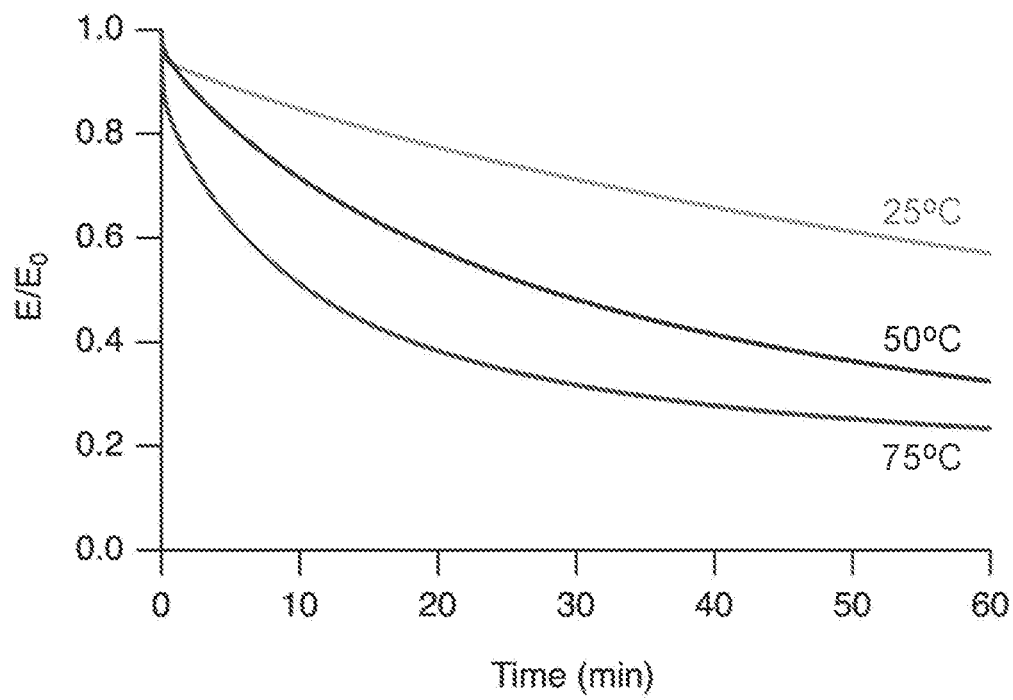
FIG. 16 is a graph showing that increasing the temperature accordingly increases the rate of stress relaxation with basic catalysts; stress relaxation (constant applied strain of 10%) experiment performed at 25° C., 50° C., and 75° C. Higher crosslink densities were utilized for these experiments. General formulation: TEDAE (1.50 equiv), PETMP (1.00 equiv), PMDETA (10.0 mol %), and DMPA (2.00 mol %).
Figure 17A:
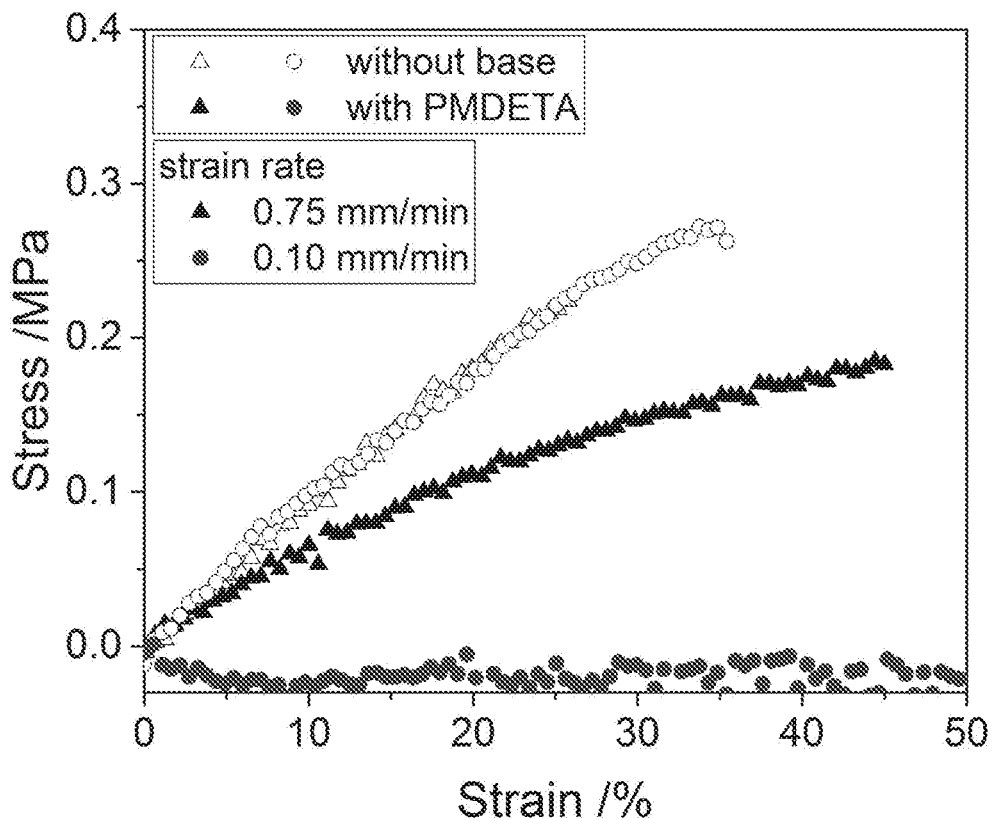
FIG. 17A is a graph comparing samples with base relax stress when strained (0.75 and 0.10 mm/min) and samples without base quickly build up stress (0.75 and 0.10 mm/min). When slower strain rates (0.10 mm/min) were applied, no stress was built up. General formulation: TEDAE (1.00 equiv), PETMP (1.00 equiv), PMDETA (0.00 mol % or 10.0 mol %), and DMPA (2.00 mol %).
Figure 17B:
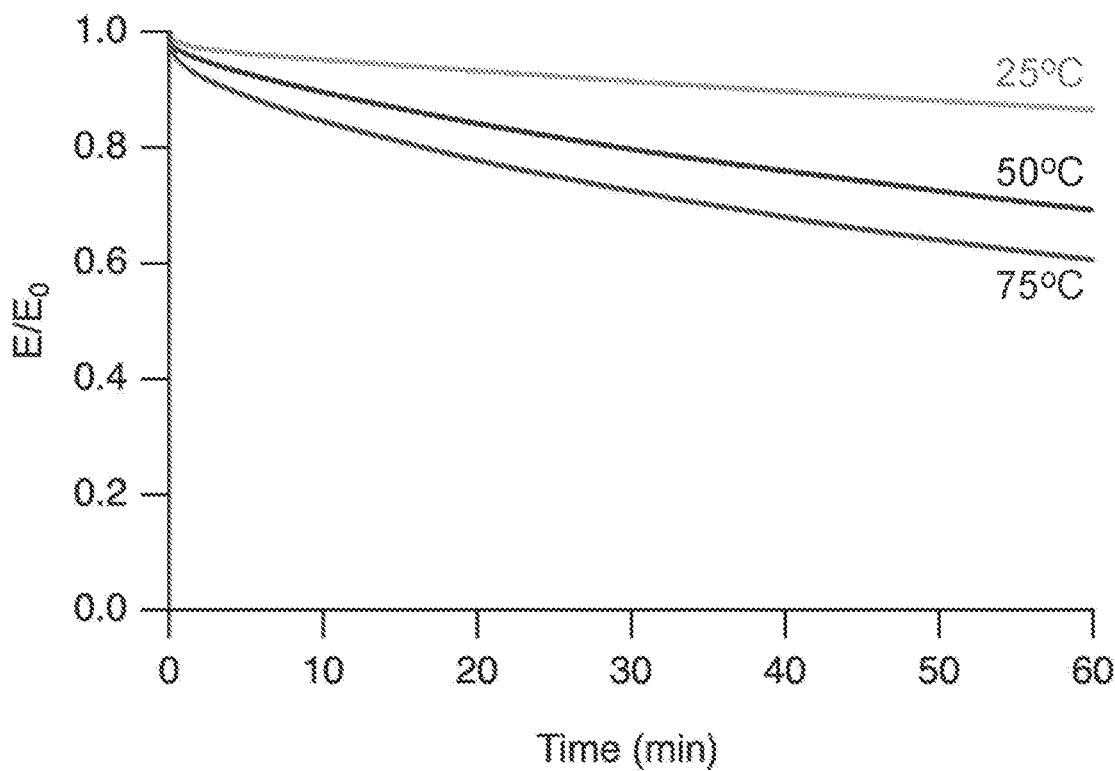
FIG. 17B is a graph showing that increasing the temperature slightly increases the rate of stress relaxation with nucleophilic catalysts; stress relaxation at 25° C., 50° C., and 75° C., 10% strain. Higher crosslink densities were utilized for these experiments; also, DMAP was used as other nucleophiles, such as quinuclidine, were found to sublime out of the polymer at higher heats. General formulation: TEDAE (1.50 equiv), PETMP (1.00 equiv), DMAP (10.0 mol %), and DMPA (2.00 mol %).

The network containing free thiol, thioester, and a weak organic base (PMDETA), rapidly underwent rearrangement at room temperature; the creep behavior resembled that of an entangled polymer melt with a linear increase in creep compliance with time and an equilibrium compliance of 2.4 $MPa^{-1}$. Removal of any of these three components (thiol, thioester, or base) resulted in networks which behaved as typical cross-linked elastomers with a recoverable compliance close to zero after a 20-minute recovery time. Increasing the concentration of base (PMDETA, FIGS. 8A-8B) resulted in more rapid rearrangement of the network, presumably due to the proportionately higher concentration of thiolate present. Covalent attachment of the base (PMDETA) to the network did not affect the ability of the network to relax stress (FIG. 15A-15B). Depending on the rate at which the network was strained little to no stress was built up within the polymer (FIG. 16). Heating the network increased the rate of stress relaxation, presumably due to increased kinetics of mobility at higher temperatures (FIGS. 17A-17B).

Example 5: Formation of a Plano-Convex Lens from Recycled Polymer

Figure 18A:
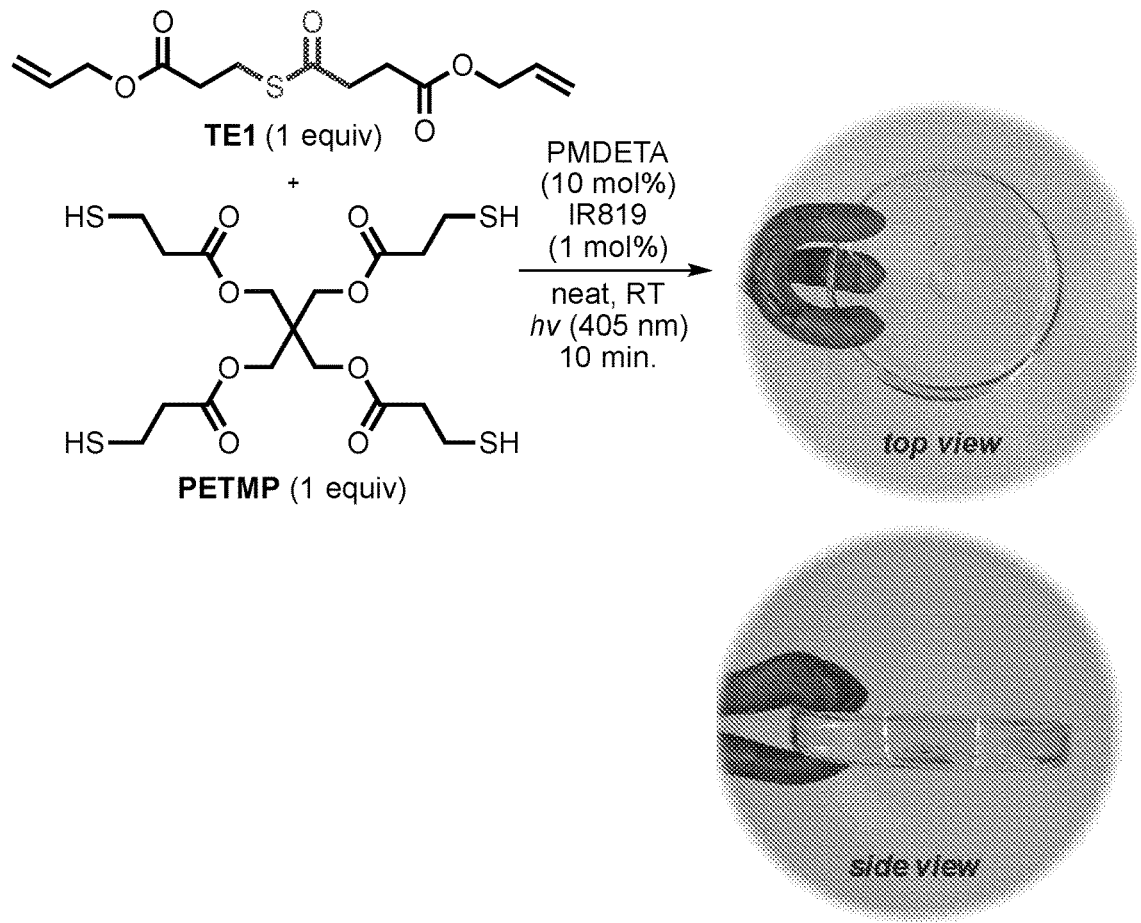
FIGS. 18A-18D are a set of images showing a representative procedure for the formation of a plano-convex lens from recycled polymer.

To a 20.0 mL speed mixer vial was added 4.00 grams (13.9 mmol, 1.00 equiv) of TE1, 6.82 grams (13.9 mmol, 1.00 equiv) of PETMP, 292 µLs (243 mgs, 1.39 mmol, 0.10 equiv, 10.0 mol %) of PMDETA, and 58.0 mgs (0.14 mmol, 0.01 equiv, 1.00 mol %) of IR819. This thick residue was manually mixed with a pipette tip until all of the solids (IR819) had dissolved and the clear, slightly yellow residue was loaded into a 16 mL syringe and pushed through a syringe filter (45.0 µm) into a 25.0 mL petri dish. This residue was allowed to settle at room temperature for approximately 1 hour. After this period the dish was placed into a shallow ice bath and irradiated (405 nm, 50.0 $mW/cm^2$, room temperature) for 10 minutes. The now polymerized sample was allowed to reach room temperature and removed from the petri dish (FIG. 18A).

Figure 18B:
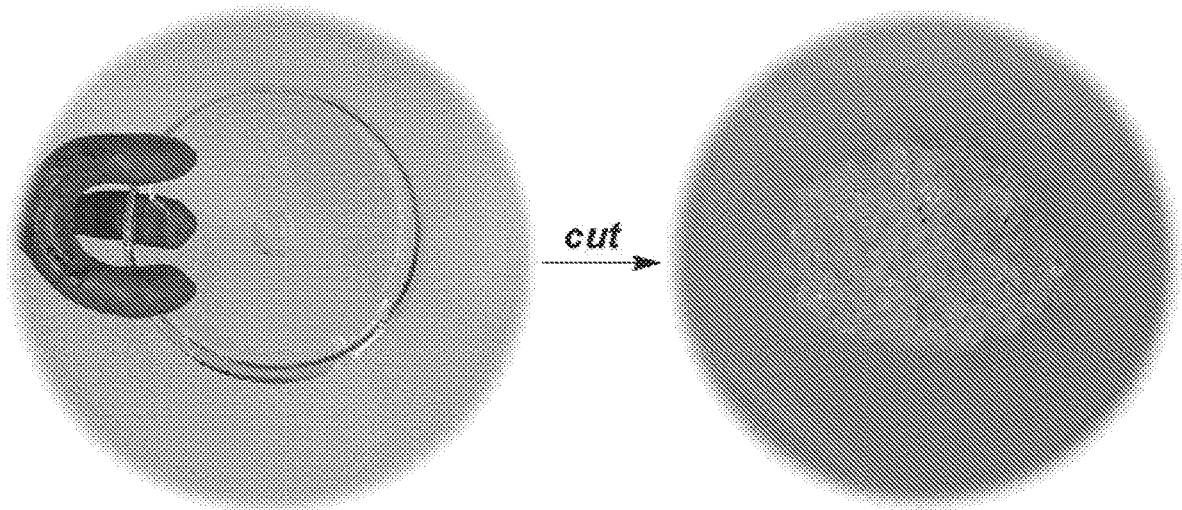

The polymerized sample was cut into length-wise strips and then further cut into small cubes to form "cut" material. This was done using a single edge straight razor blade. A small amount of this cut sample was utilized to show that the thiol-ene polymerization reaction had reached full conversion by FT-IR. (FIG. 18B)

Figure 18C:
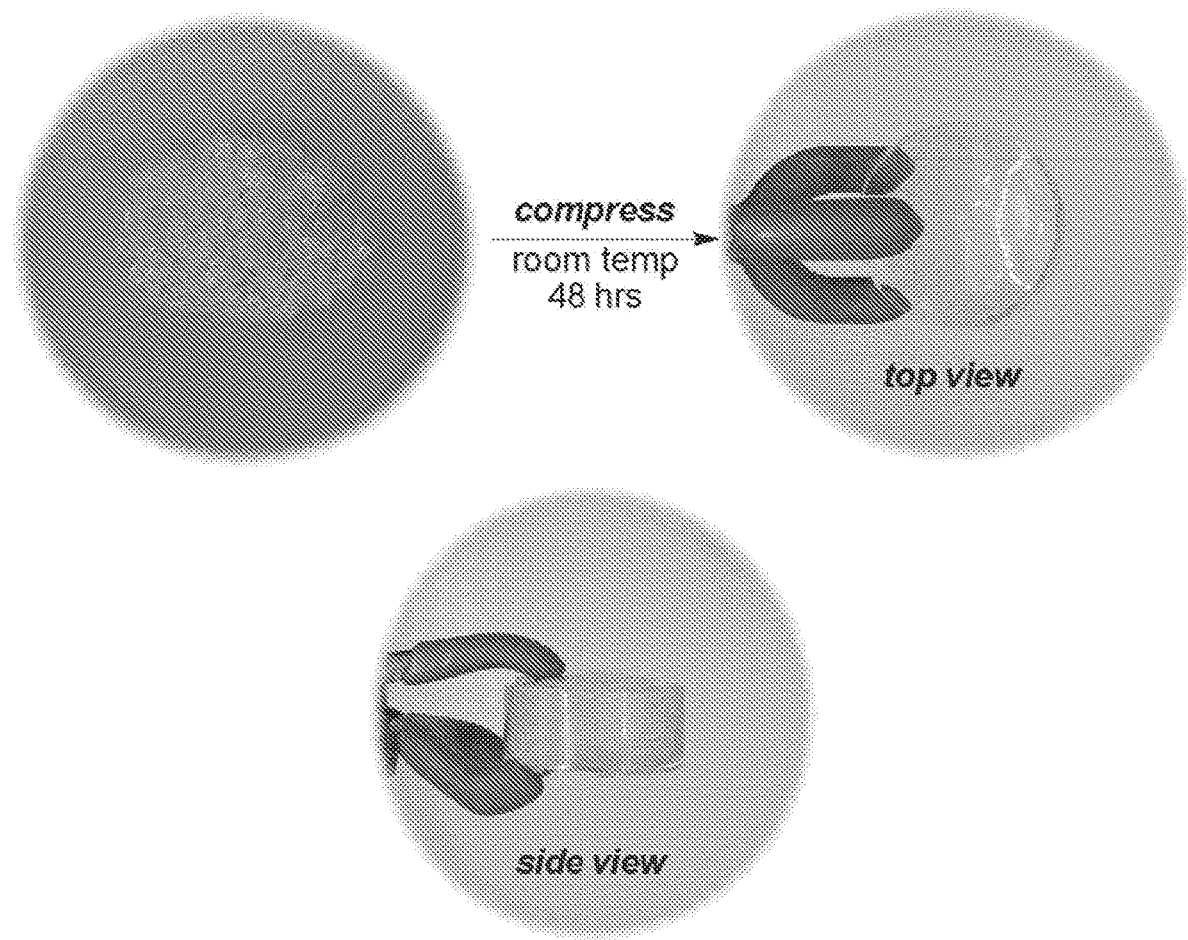

A 60.0 mL plastic syringe, which had been soaked in isopropanol and sonicated for ~1 hour, was loaded with the polymeric cut material. The plunger was pressed down firmly to contact the cut material and several rubber bands were wrapped around both ends of the syringe to further compress the material. This syringe was left at room temperature for 48 hours (2 days) to form the puck of healed material. To remove the puck, the syringe was cut down the side and the puck was easily removed. (FIG. 18C)

Figure 18D:
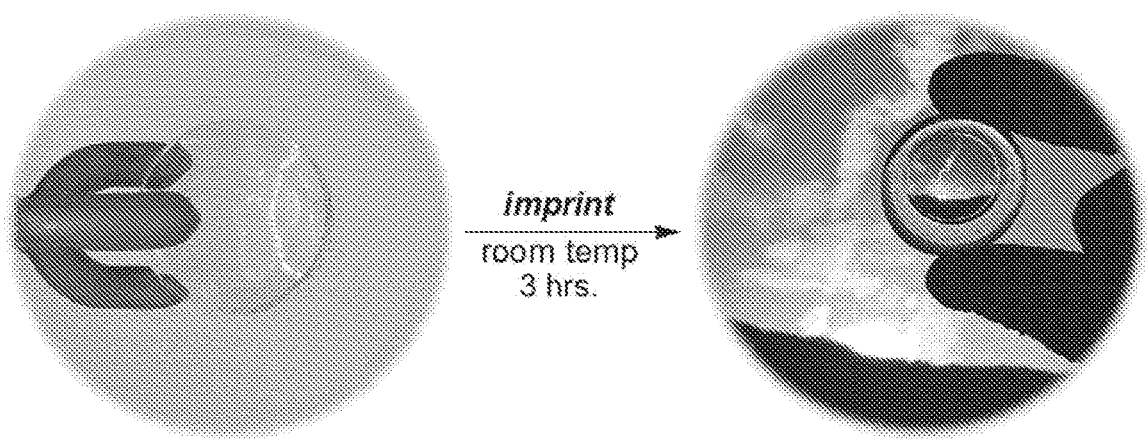

The healed material was placed on top of an optically flat surface (Optosigma BK-7, λ/10) and then a UV-fused silica plano-convex lens (Thorlabs, Ø½", f=4.0 mm) was placed on top of the material followed by a lens cleaning tissue paper (Thorlabs). This sandwich of material was compressed for three hours under mild pressure at room temperature. Upon removal of the lens from the material a plano-concave lens was formed which, if not further imprinted upon, was indefinitely stable. (FIG. 18D)

Example 6: Preparation of a Thioester Containing Network Polymers with Different Catalysts To a 10.0 mL speed mixer vial was added 250 mgs (0.87 mmol, 1.00 equiv) of TEDAE, 427 mgs (0.87 mmol, 1.00 equiv, "100% excess thiol") of pentaerythritol tetra(3-mercaptopropionate) (PETMP), and varying basic or nucleophilic catalyst (0.03 mmol, 0.03 equiv, 3.00 mol %) each via Pasteur pipettes. This clear resin was then manually mixed with a pipette tip for ~2 minutes to make a homogenous mixture. Following this, approximately 8.91 mgs ($3.48 \times 10^2$ mmol, 0.02 equiv, 2.00 mol %) of 2,2-dimethoxy-2-phenylacetophenone (DMPA), which had been crushed with the flat side of a spatula to form a fine powder, was added and the resin was further manually mixed with a pipette tip for an additional ~2 minutes to form a homogeneous mixture. At this time the clear resin was poured between two glass slides treated with Rain-X (ITW Global Brands, Houston, Tex.) using 250 µm thick spacers (Small Parts Inc., Logansport, Ind.). The material was irradiated (365 nm, 5.00 $\mu W/cm^2$, room temperature) for ~10 minutes to give the thiol excess thioester containing network polymer.

Figure 19A:
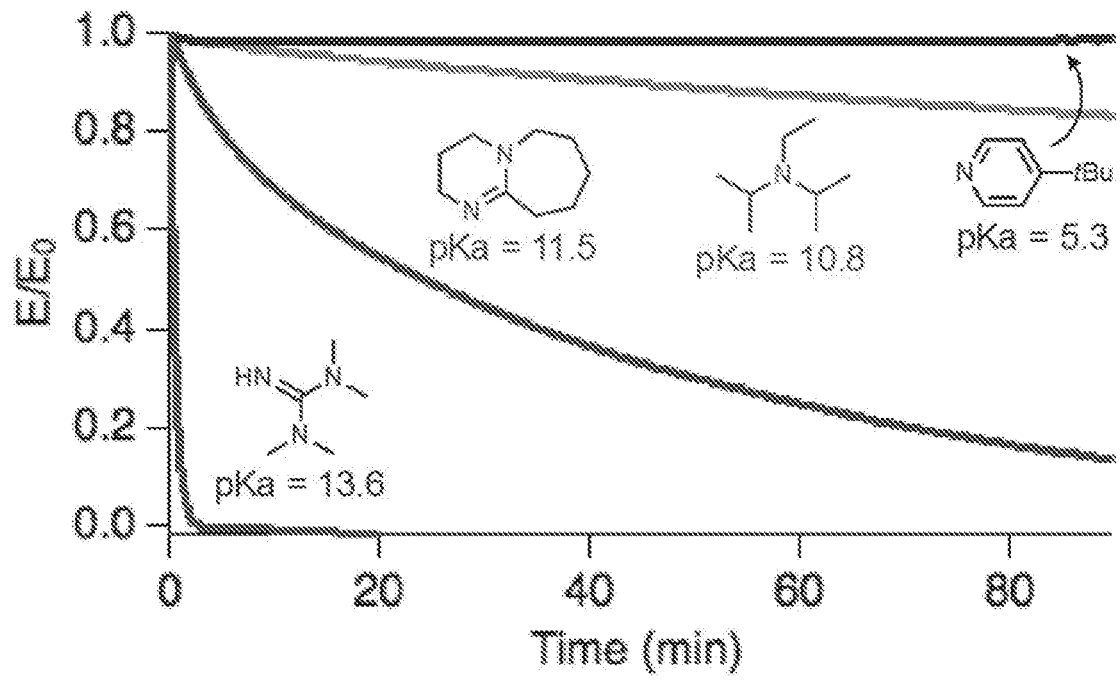
FIG. 19A is a graph showing that increasing the pKa of the organic base in the network accordingly increases the rate of stress relaxation (constant applied strain of 10%). General formulations: TEDAE (1.00 equiv), PETMP (1.00 equiv), organic base (3.00 mol %), and DMPA (2.00 mol %).
Figure 19B:
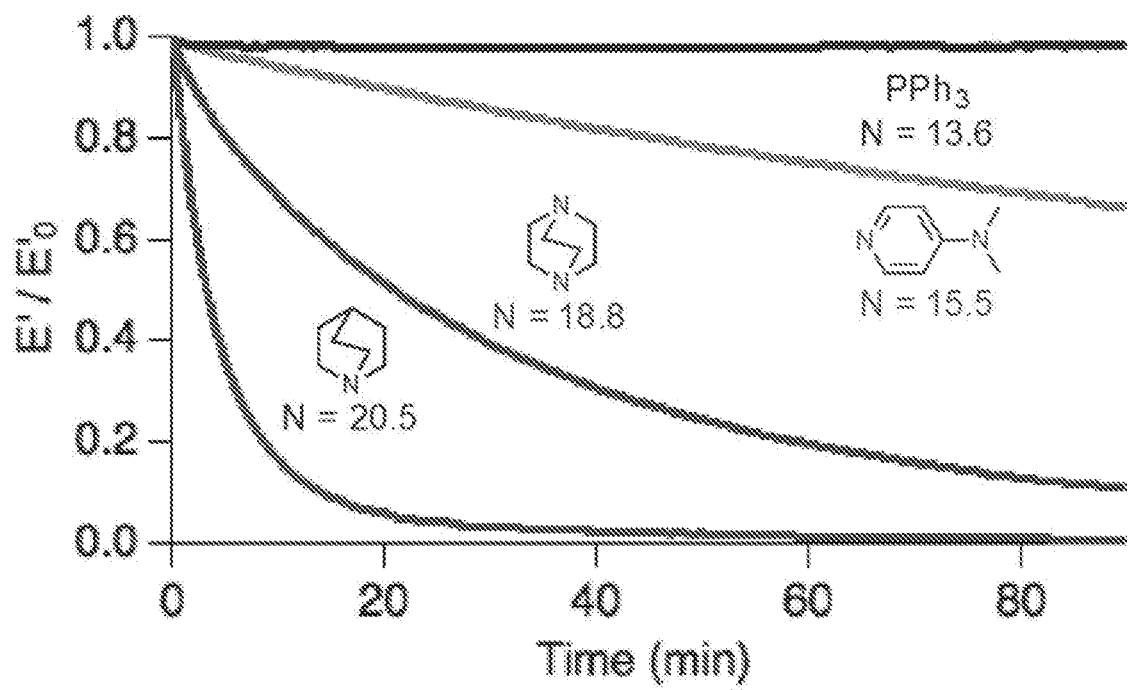
FIG. 19B is a graph showing that increasing the nucleophilicity of the catalyst in the network accordingly increases the rate of stress relaxation (constant applied strain of 10%). General formulations: TEDAE (1.00 equiv), PETMP (1.00 equiv), nucleophilic catalyst (3.00 mol %), and DMPA (2.00 mol %). All nucleophilicity values taken from Baidya, et al., 2007, Angew. Chem. Int. Ed. 46:6176, and are values obtained in MeCN.
Figure 20A:
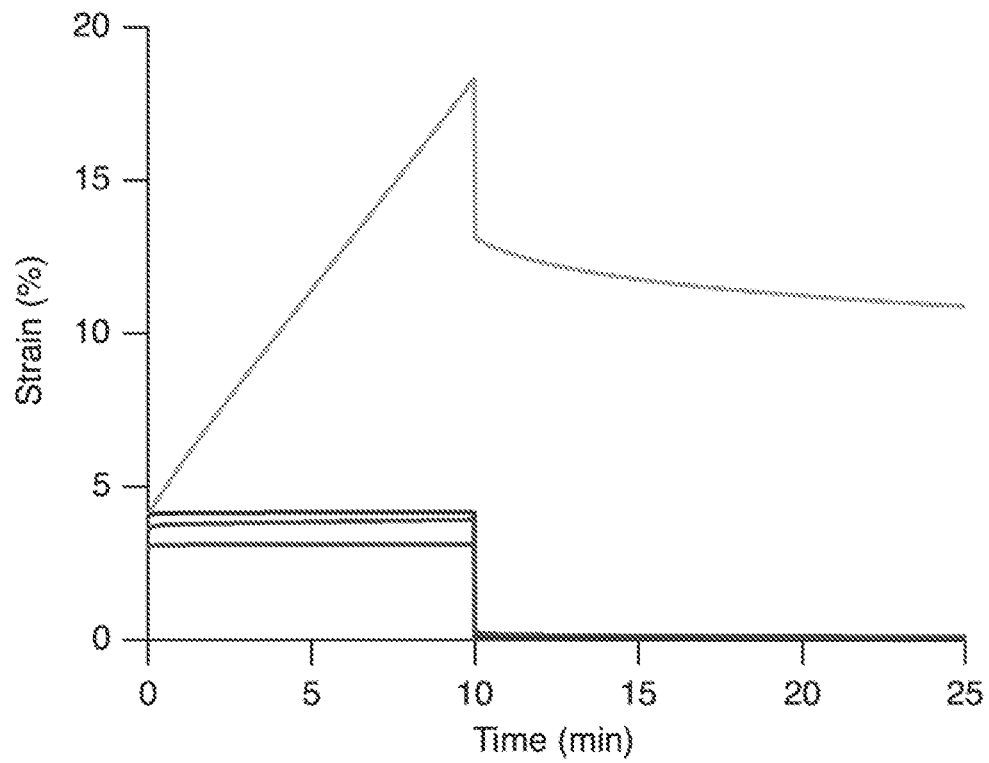
FIG. 20A is a graph of the creep compliance showing the requirement for free thiol, thioester, and nucleophile in the network for rearrangement/relaxation/remolding to occur. General formulations: all components (top line)—TEDAE (1.00 equiv), PETMP (1.00 equiv), quinuclidine (5.00 mol %), and DMPA (2.00 mol %); w/o thiol (bottom line)—TEDAE (1.00 equiv), PETMP (0.25 equiv), quinuclidine (5.00 mol %), and DMPA (2.00 mol %); w/o thioester (second from bottom line)—DAEC (1.00 equiv), PETMP (1.00 equiv), quinulicidine (5.00 mol %), and DMPA (2.00 mol %); w/o base (second from top line)—TEDAE (1.00 equiv), PETMP (1.00 equiv), and DMPA (2.00 mol %).
Figure 20B:
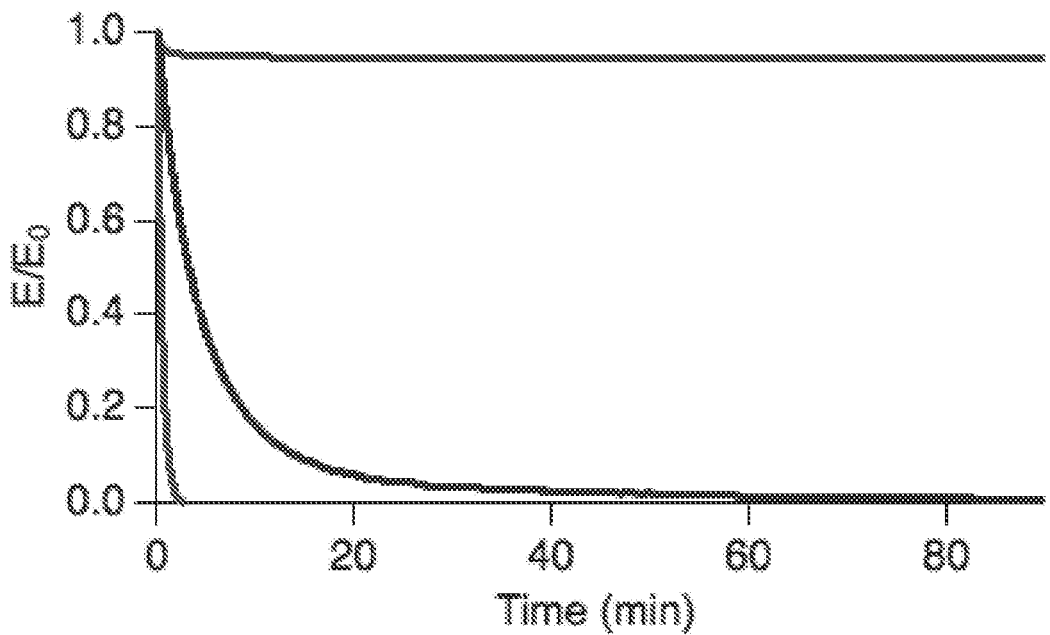
FIG. 20B is a graph comparing the rate of stress relaxation of networks containing no catalyst (green), quinuclidine (blue), and TMG (red) (constant applied strain of 10%). General formulations: TEDAE (1.00 equiv), PETMP (1.00 equiv), amine catalyst (0.00 mol % or 3.00 mol %), and DMPA (2.00 mol %).

The networks were formed essentially instantaneously via a thiol-ene photopolymerization (FIGS. 19A-19B), which allowed for screening of various catalysts to observe their effect on the rate of exchange. While holding the concentration of each catalyst the same (3.0 mol %, ~0.6 wt %), basic catalysts with varying pKa values (5.3-13.6) were evaluated by comparing their normalized rates of stress relaxation (constant applied strain of 10%, 90 minutes, RT, FIG. 19A). More basic amines, such as DBU or TMG, were found to relax stress more rapidly than less basic amines, such as 4-tert-butylpyridine or Hunig's base. As the pKa of the free thiol in the network is approximated to be ~10.4 (based on the pKa of 3-methyl mercaptopropionate), only those above this threshold showed significant stress relaxation. Despite the expected requirement for thiolate generation, the apparent catalytic activity of DABCO (pka=8.8, 3.0 mol %) to relax stress in the system was surprising as it is not a strong enough base to deprotonate the free thiol to a significant degree under most conditions. However, DABCO is a strong nucleophile (N=18.8, MeCN). The importance of nucleophilicity was corroborated by screening catalysts of relatively low basicity and high nucleophilicty in the polymer system (FIG. 19B). Catalysts such as PPh$_3$ (N=13.6, MeCN) showed no discernable relaxation, whereas more nucleophilic catalysts such as DMAP, DABCO, and quinuclidine (N=15.5, 18.8, and 20.5, MeCN) showed increasingly rapid relaxation in accordance to their nucleophilicity. Quinuclidine, the most potent nucleophile investigated, showed the highest rate of relaxation, however, as it is also a modestly strong base, it could potentially operate through both basic and nucleophilic mechanisms. Creep experiments showed that free thiol, thioester, and the nucleophilic catalyst were required for flow to occur within the network; exclusion of any of these components resulted networks that resembled typical cross-linked elastomers (FIG. 19A). Although TMG outstripped all other catalysts to induce plasticity in the networks at ambient temperatures (FIG. 19B), basic catalysts, such as DBU, were shown by in situ IR to significantly retard the kinetics of the thiol-ene free radical polymerization at higher concentrations (FIG. 20A), whereas, non-basic, nucleophilic catalysts, such as quinuclidine, did not (FIG. 20B). It is possible that deeper cures and indefinitely stable films are feasible utilizing non-basic, nucleophilic catalysts, such as quinuclidine or DABCO, as they do not perturb the optical thickness of the resin nor do they form a significant amount of thiolate which can slowly form disulfide crosslinks.

Example 7: Preparation of a Thioester Network Containing a UV-Releasable Base ("On Switch")

Figure 21:
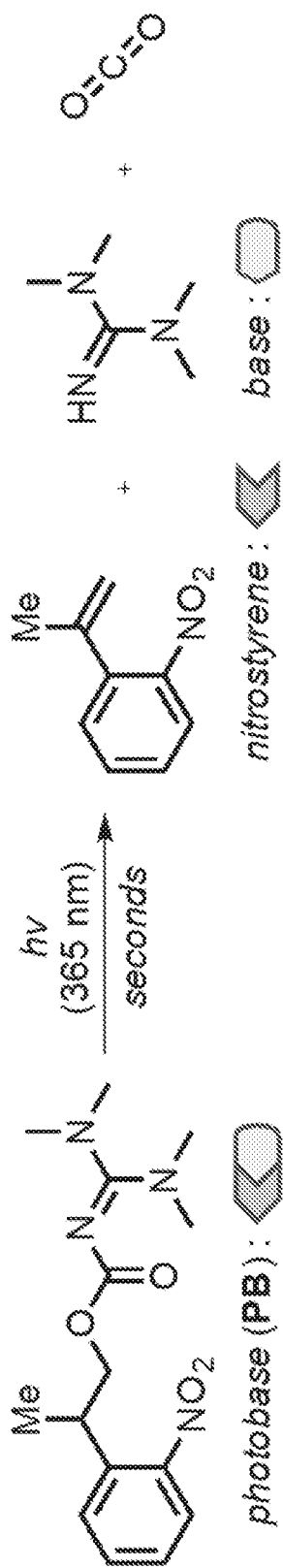
FIG. 21 is a scheme showing the photorelease of the base, tetramethylguanidine, which serves as a photoactivatable "ON" switch.
Figure 22A:
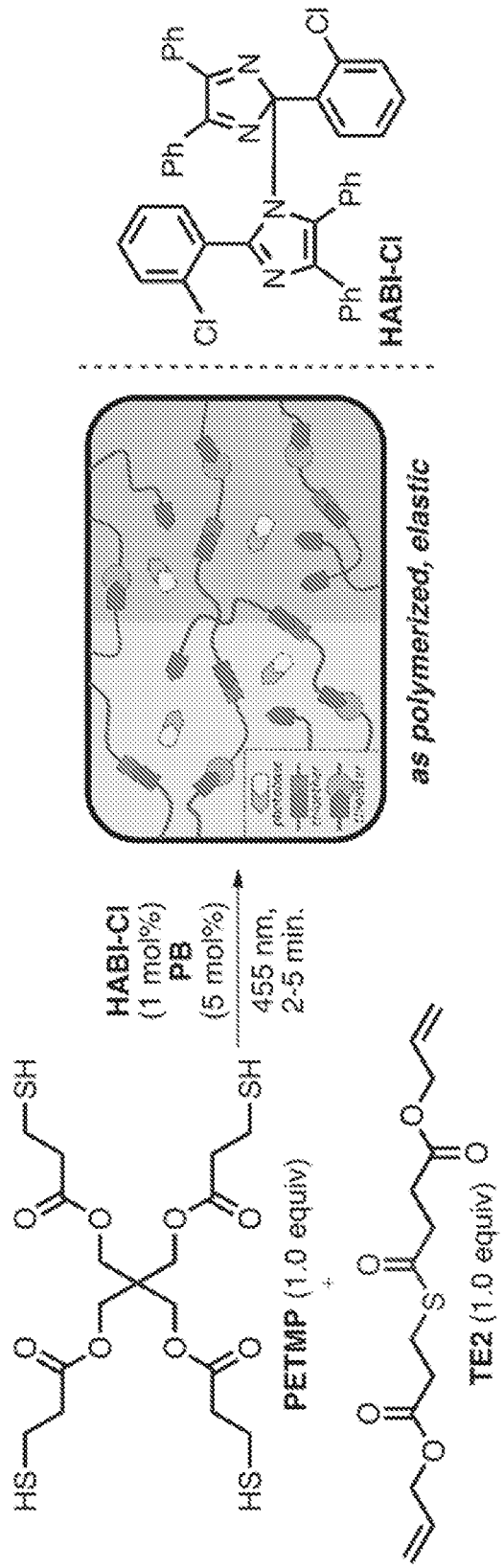
FIGS. 22A-22B are schemes of an exemplary thiol-ene formulation comprising the photoactivatable base.
Figure 22B:
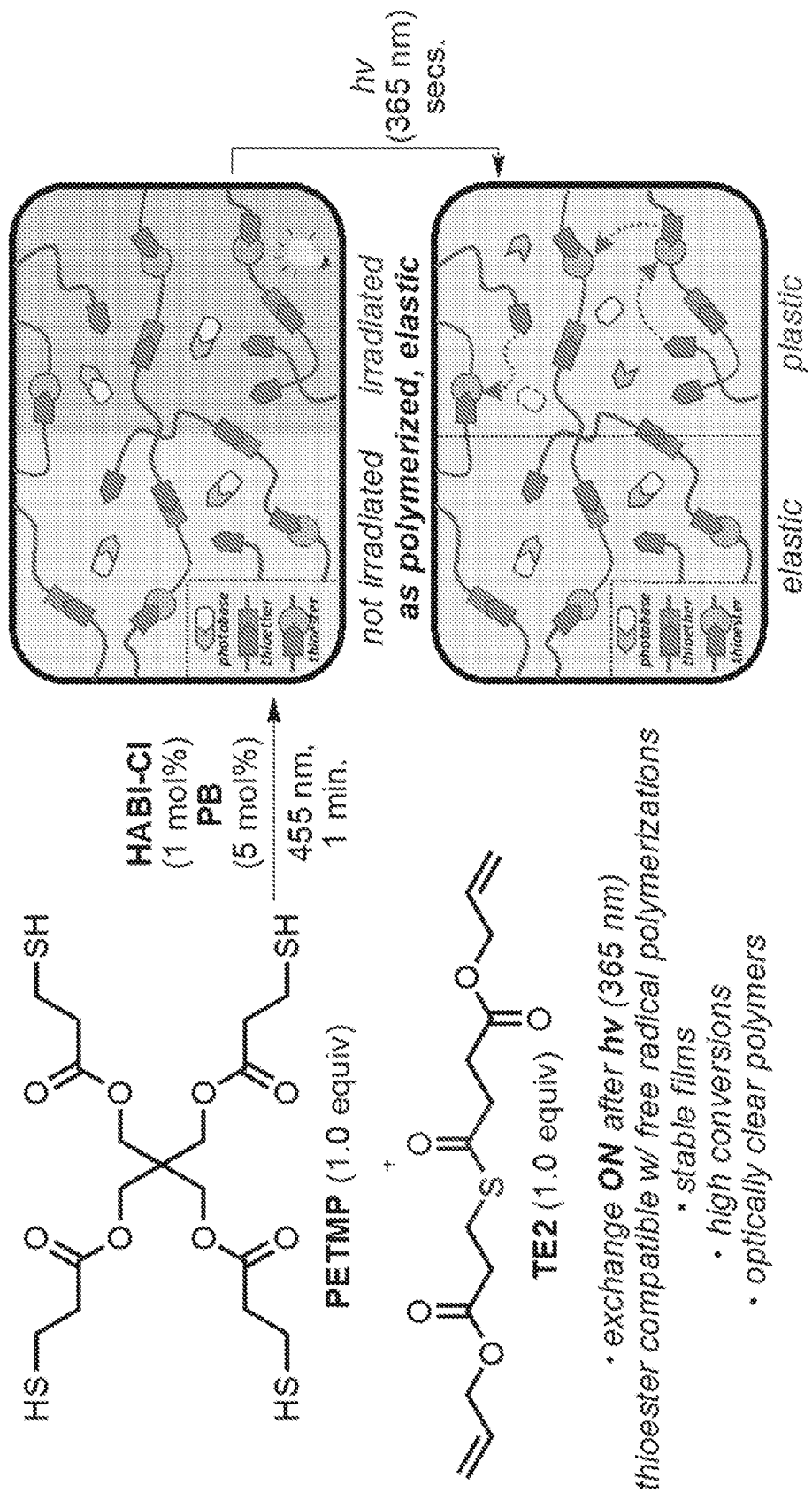
Figure 23:
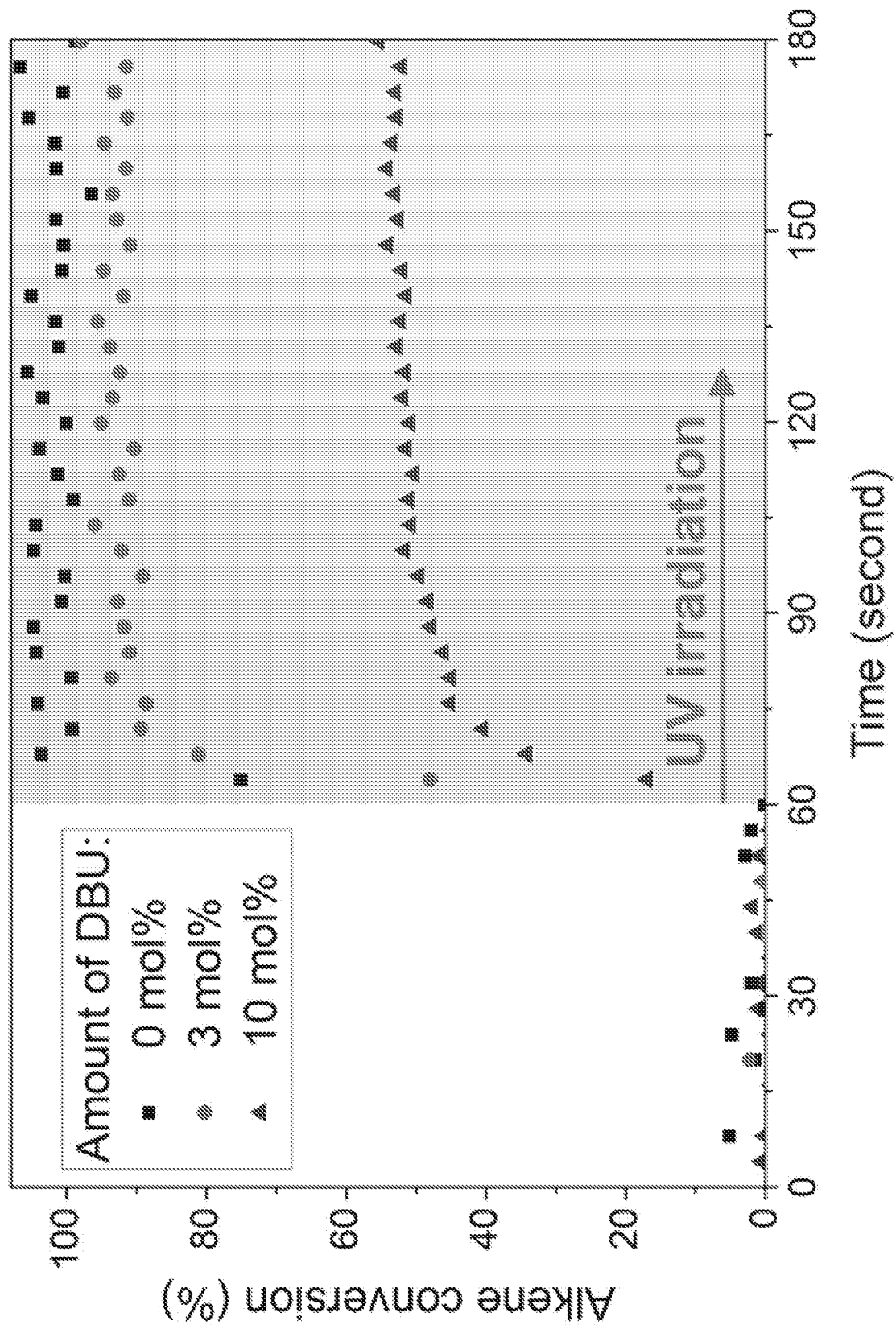
FIG. 23 is a graph showing the kinetics of the thiol-ene reaction between TEDAE and PETMP in the presence of varying amounts of DBU (0.00 mol %, 3.00 mol %, and 10.0 mol %) showing significant inhibition of the thiol-ene reaction at higher concentrations of DBU. General reaction conditions: TEDAE (1.00 equiv), PETMP (1.00 equiv), DBU (0.00 mol %, 3.00 mol %, or 10.0 mol %), and DMPA (2.00 mol %) monitored by in situ IR. Light on at 60.0 seconds and continuously irradiated; 365 nm LED (50.0 mW/cm$^2$).

To a 10.0 mL speed mixer vial was added 250 mgs (0.87 mmol, 1.00 equiv) of TEDAE, 427 mgs (0.87 mmol, 1.00 equiv, "100% excess thiol") of pentaerythritol tetra(3-mercaptopropionate) (PETMP), and 14.0 mgs (0.04 mmol, 0.05 equiv, 5.00 mol %) of NPPOC-TMG (PB, FIG. 21). This suspension was then manually mixed with a pipette tip for ~10 minutes with mild heating and sonication to make a completely homogenous mixture. Following this, approximately 5.73 mgs (8.70×10$^{-3}$ mmol, 0.01 equiv, 1.00 mol %) of HABI-Cl was added and the resin was placed onto a hot plate set at 60° C. for ~10 minutes with sporadic manually mixing using a pipette tip until most of the HABI-Cl had dissolved. At this time the cloudy yellowish resin was filtered through a cotton plugged Pasteur pipette onto a glass slide treated with Rain-X (ITW Global Brands, Houston, Tex.) using 250 µm thick spacers (Small Parts Inc., Logansport, Ind.) which was sandwiched between another Rain-X treated glass slide. The material was irradiated (455 nm, 30.0 µW/cm$^2$, room temperature) for ~2-5 minutes to give the photobase containing network polymer (FIGS. 22A-22B). Irradiation of this resin with 455 nm light gave rapid formation of the network (~1 minute), which was noted to go to full conversion in the "ene" species (FIG. 23). The conversion was found to be essentially quantitative by IR, revealing complete consumption of the "ene" species while an evident concentration of thiol remained.

Example 8: Temporally Controlled Stress Relaxation of a Thioester Containing Network Polymer with a UV-Releasable Base ("On Switch")

A small strip of fully cured material formed from a photoinitiated thiol-ene polymerization (preparation detailed above) was placed onto the DMA (TA Instruments RSA-G2) and a light guide equipped with a collimating lens attached to a mercury lamp (365 nm filter) was placed in close proximity (~5.00 cm) to the front side of the sample. A stress relaxation experiment was started and irradiation (365 nm, 75.0 mW/cm$^2$, room temperature) of the sample took place 5 minutes, 10 minutes, and 15 minutes after the experiment had begun. In each case the sample was continuously irradiated, once started, for the duration of the experiment (30 minutes total).

Figure 24A:
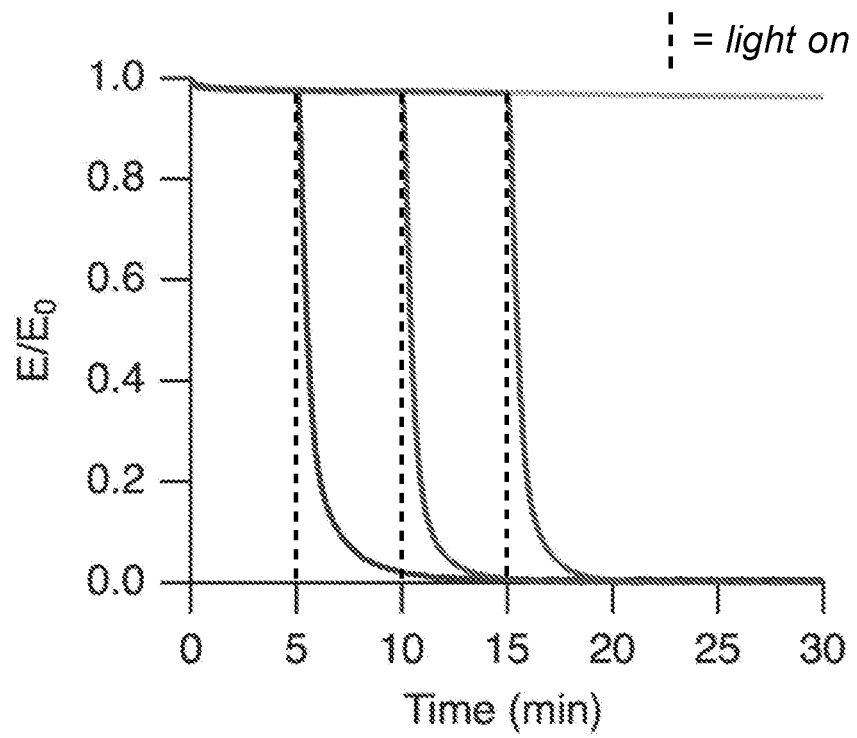
FIG. 24A is a graph showing photoinitiated stress relaxation in a network polymer with temporal control (10% strain, light on at 5, 10, and 15 minutes, continuously irradiated, 365 nm, 75 mW/cm$^2$). Line at top—not irradiated control.
Figure 24B:
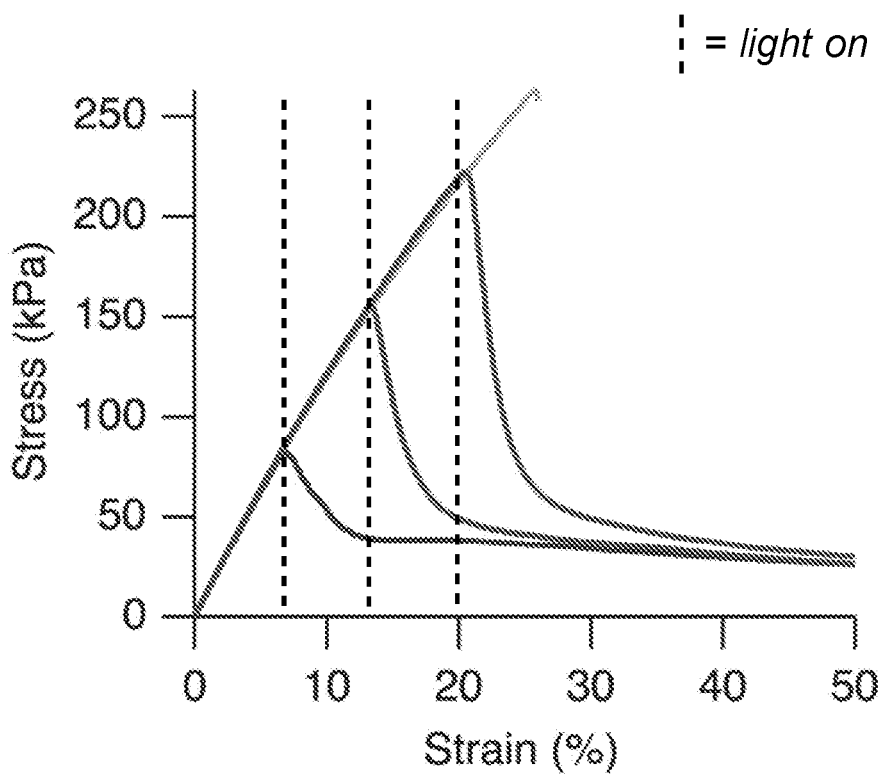
FIG. 24B is a graph showing temporal control over mechanical properties of a network polymer (0.25 mm/min, light on at 6, 12, and 20% strain, continuously irradiated, 365 nm, 75 mW/cm$^2$). Upward sloping line—not irradiated control (yielded at ~26% strain).
Figure 25:
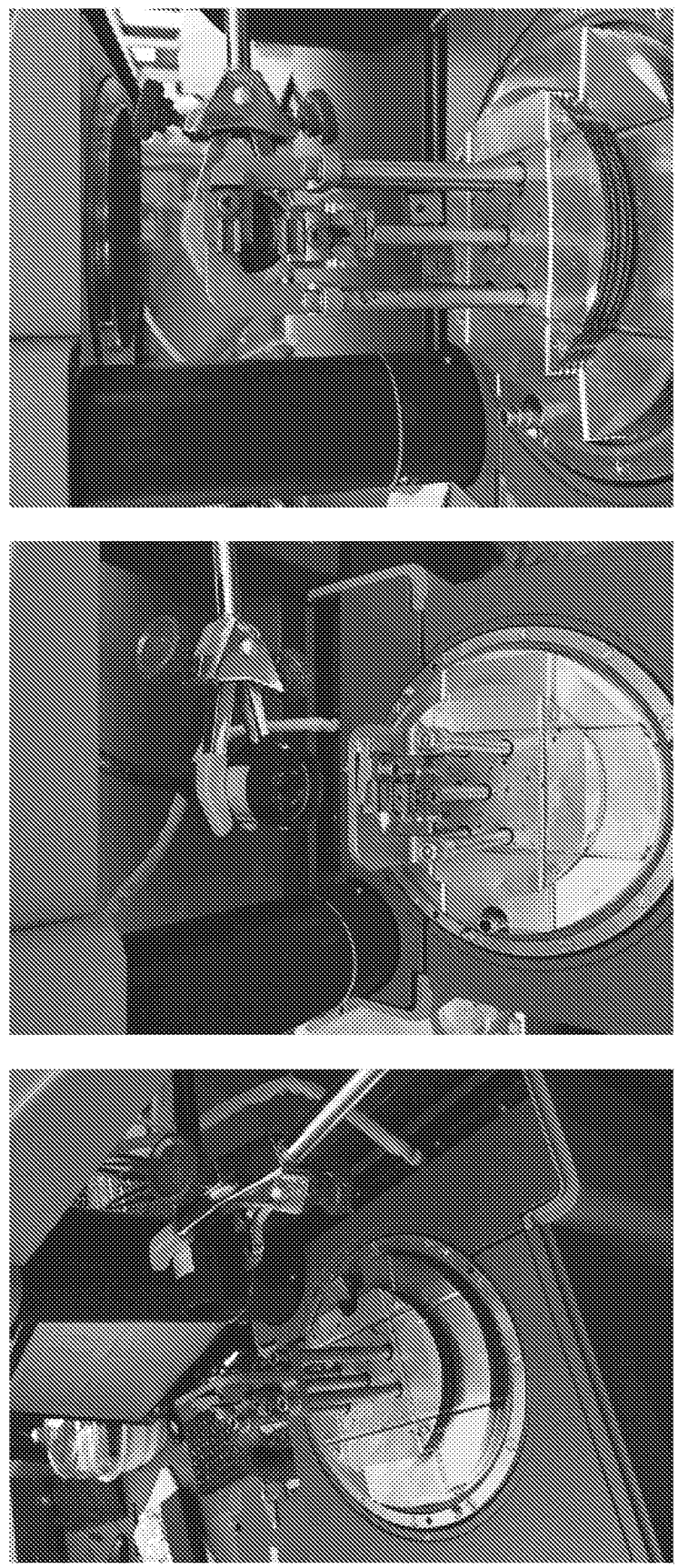
FIG. 25 is a set of images of the dynamic mechanical analysis setup used to analyze the network polymers comprising the photoactivatable base/"ON" switch.

Before further irradiation these networks acted as typical cross-linked thermosets, showing essentially no stress relaxation over the course of one hour, however, upon irradiation (365 nm, ~75 mw/cm$^2$, 10 minutes after experiment started, FIG. 24A) the basic catalyst was rapidly released, partaking in thiol-thioester exchange and relaxing all stress in the network. Further evidence of temporal control over the release of the base was demonstrated by releasing the base 20 and 30 minutes after starting the experiment (FIG. 24B), in all three cases essentially all stress had been relaxed ~5 minutes after beginning irradiation Example 9: Preparation of a Thioester Network Containing a UV-Releasable Acid ("Off Switch")

Figure 26:
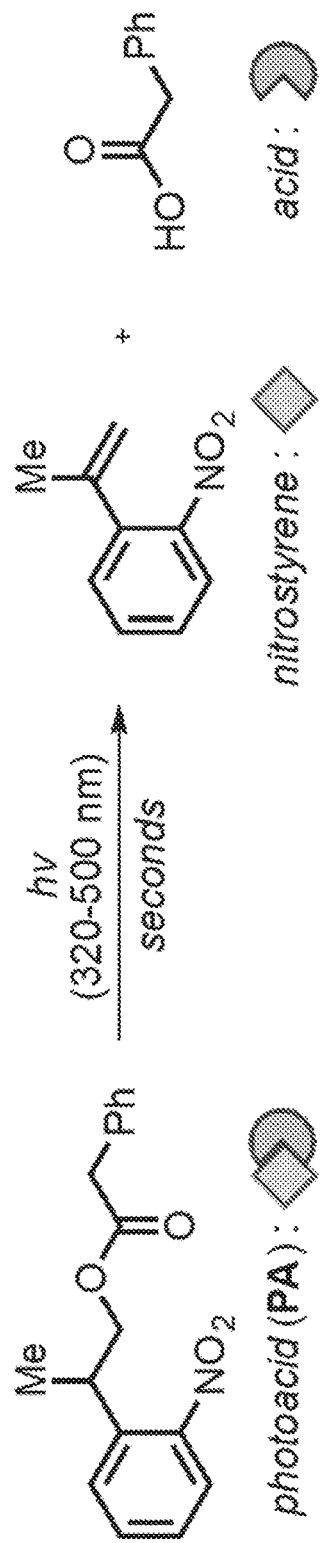
FIG. 26 is a scheme showing the photorelease of phenylacetic acid, which serves as a photoactivatable "OFF" switch, deactivating the base present within the network polymer.
Figure 27A:
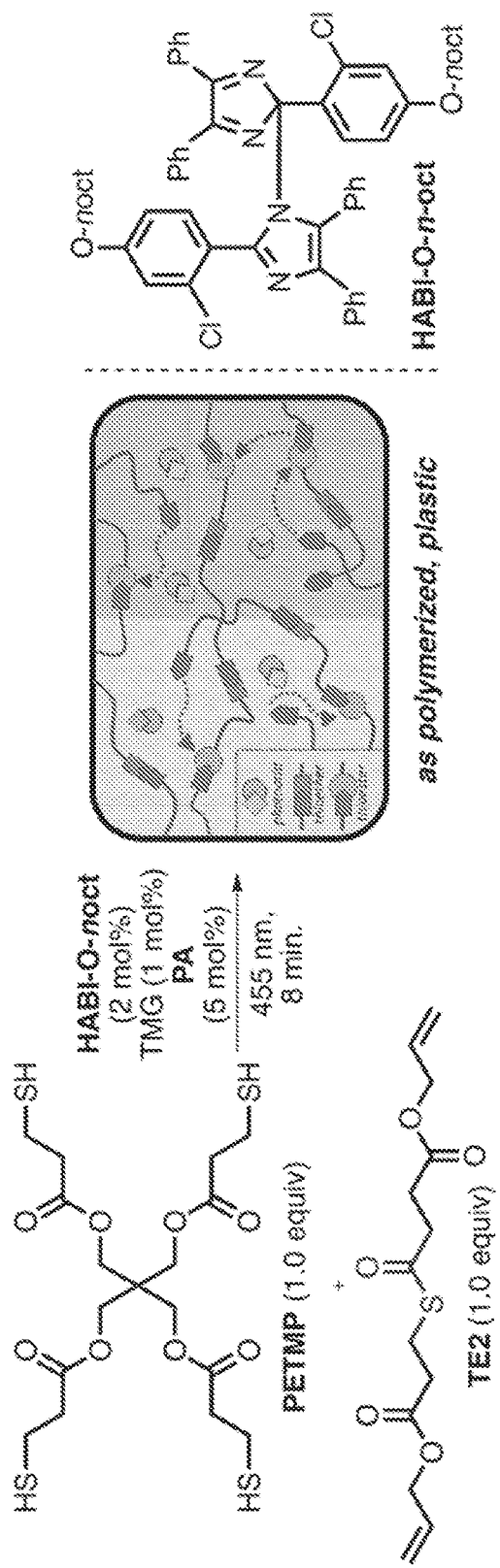
FIGS. 27A-27B are schemes of an exemplary thiol-ene formulation comprising the photoactivatable acid.
Figure 27B:
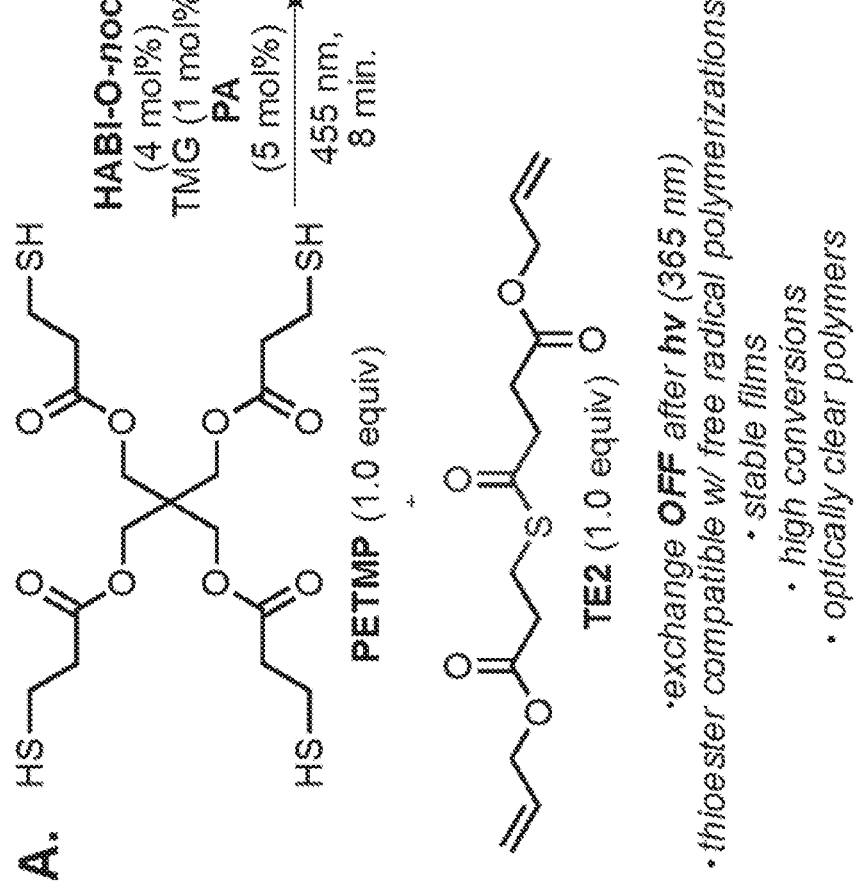
Figure 28:
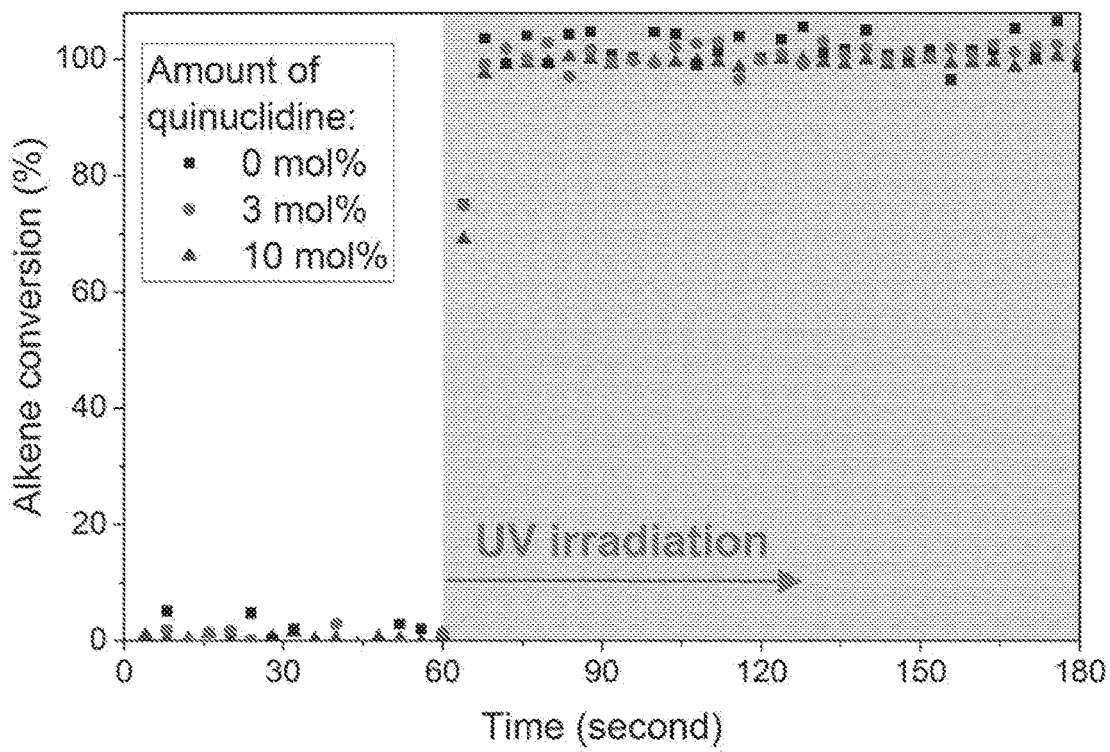
FIG. 28 is a graph showing the kinetics of the thiol-ene reaction between TEDAE and PETMP in the presence of varying amounts of quinuclidine (0.00 mol %, 3.00 mol %, and 10.0 mol %) showing no inhibition of the thiol-ene reaction. General reaction conditions: TEDAE (1.00 equiv), PETMP (1.00 equiv), quinuclidine (0.00 mol %, 3.00 mol %, or 10.0 mol %), and DMPA (2.00 mol %) monitored by in situ IR. Light on at 60.0 seconds and continuously irradiated; 365 nm LED (50.0 mW/cm$^2$).
Figure 29:
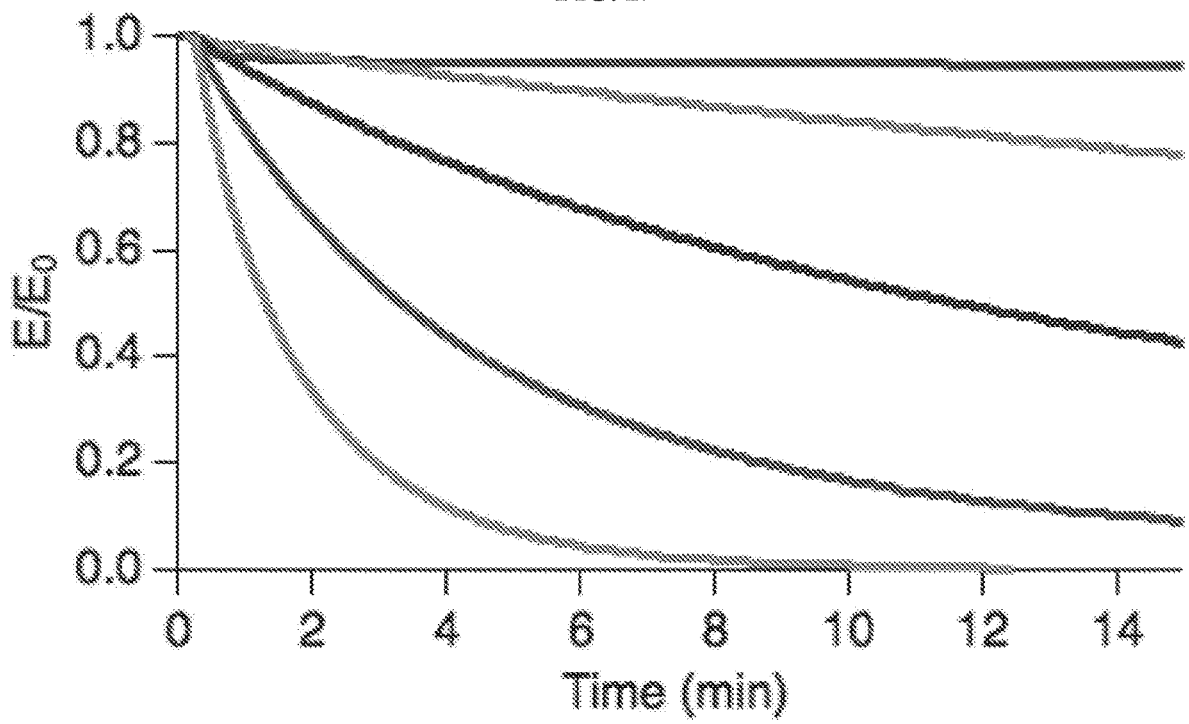
FIG. 29 is a graph showing that increasing the concentration of quinuclidine in the network accordingly increases the rate of stress relaxation (constant applied strain of 10%, left). A first order dependence of the nucleophile is noted in this system based on the normalized stress for each condition at t=15 min (right). General formulations: TEDAE (1.00 equiv), PETMP (1.00 equiv), quinuclidine (0.00 mol % [top], 0.50 mol % [second from top], 1.00 mol % [third from top], 3.00 mol % [fourth from top], 6.00 mol % [curved bottom line]), and DMPA (2.00 mol %).
Figure 30:
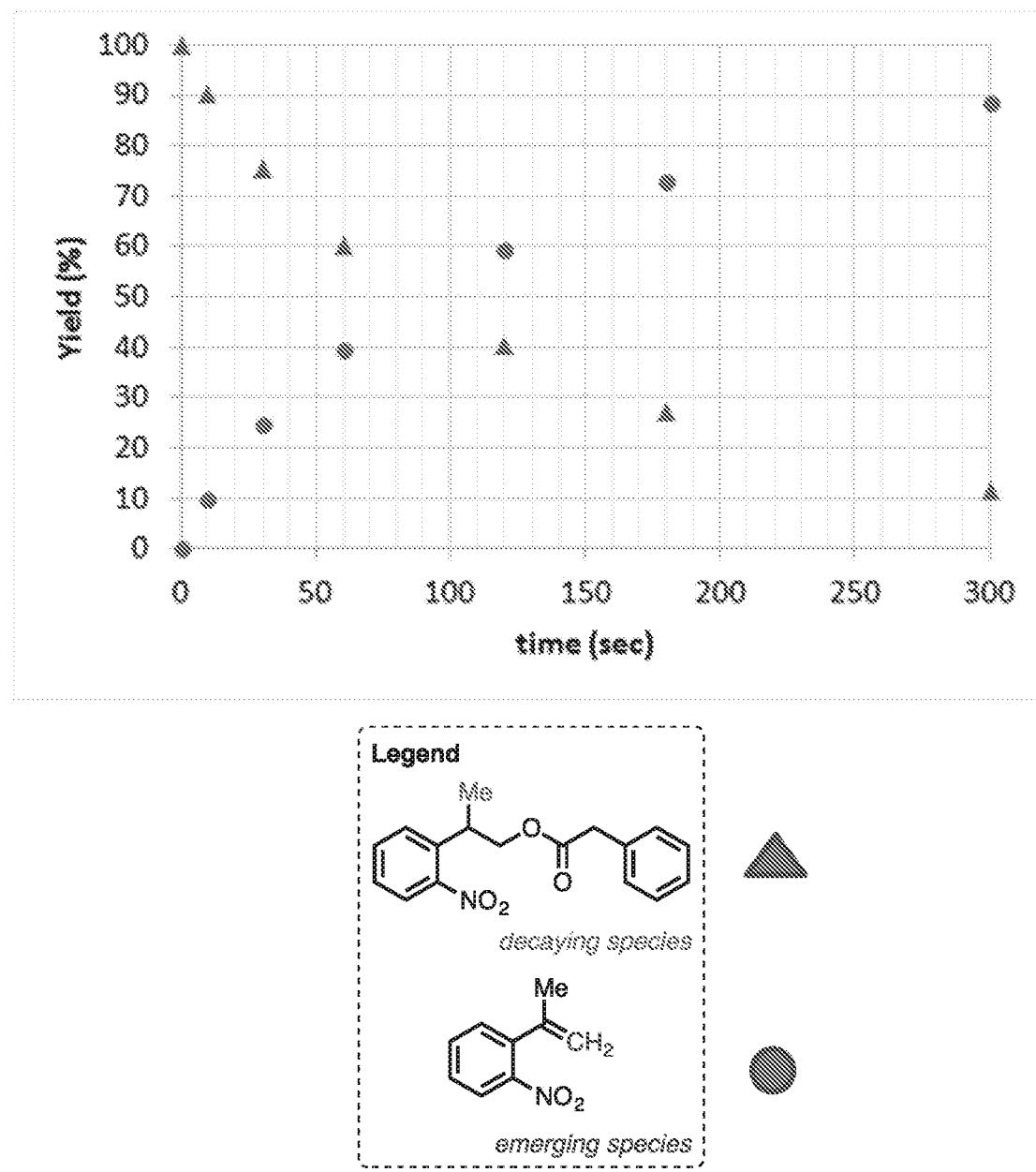
FIG. 30 is a graph of a time-course over 5 minutes (300 sec) for the photo-triggered released of phenylacetic acid from PA by $^1$H-NMR. General reaction conditions: PA (1.00 equiv), 1,3,5-trimethoxybenzene (0.50 equiv, internal standard), MeCN-d$_3$ (0.10 M), ~75.0 mW/cm$^2$, 365 nm, RT.

To a 10.0 mL speed mixer vial was added 500 mgs (1.74 mmol, 1.00 equiv) of TEDAE, 849 mgs (1.74 mmol, 1.00 equiv, "100% excess thiol") of pentaerythritol tetra(3-mercaptopropionate) (PETMP), 2.20 µLs (2.02 mgs, 1.74×10-2 mmol, 0.01 equiv, 1.00 mol %) of TMG, and 26.0 mgs (8.70×10-2 mmol, 0.05 equiv, 5.00 mol %) of NPPOC-phenylacetic acid (NPPOC-PAA, PA, FIG. 26) (FIGS. 28A-28B). The acid generating NPPOC-PAA was chosen due to its desirable kinetics for the release of acid in solution upon exposure UV light (FIG. 28). This suspension was then manually mixed with a pipette tip for ~5 minutes with mild heating and vortexing to make a completely homogenous mixture. Following this, approximately 63.6 mgs (6.96× 10-2 mmol, 0.04 equiv, 4.00 mol %) of HABI-O-noct was added and the resin was further manually mixed with a pipette tip for an additional ~5 minutes to form a homogeneous mixture (due to the increased solubility of HABI-O-noct in the resin, when compared to HABI-Cl, only mild, intermediate heating and vortexing was required). At this time the yellowish resin was poured between two glass slides treated with Rain-X (ITW Global Brands, Houston, Tex.) using 250 µm thick spacers (Small Parts Inc., Logansport, Ind.). The material was irradiated (455 nm, 50.0 µW/cm$^2$, room temperature) for 8 minutes (4 minutes each side, timed) to give the photo-acid containing network polymer. Irradiation of this resin with 455 nm light gave rapid formation of the network (8 minutes), which was noted to go to full conversion in the "ene" species (FIG. 29). The conversion was found to be essentially quantitative by IR, revealing complete consumption of the "ene" species while an evident concentration of thiol remained.

Example 10: Temporally Controlled Stress Relaxation of a Thioester Containing Network Polymer with a UV-Releasable Acid ("Off Switch")

A small strip of fully cured material formed from a photoinitiated thiol-ene polymerization (preparation detailed above) was placed onto the DMA (TA Instruments RSA-G2) and a light guide equipped with a collimating lens attached to a mercury lamp (320-500 nm filter) was placed in close proximity (~5.00 cm) to the sample. A stress relaxation experiment was started and irradiation (365 nm, 75.0 mW/cm$^2$, room temperature) of the sample took place 5, 20, and 60 seconds after the stress experiment had started. In each case the sample was continuously irradiated for 120 seconds and the light was turned off after this period. The stress relaxation experiment was then run the remainder of the period (15 minutes total).

Figure 31A:
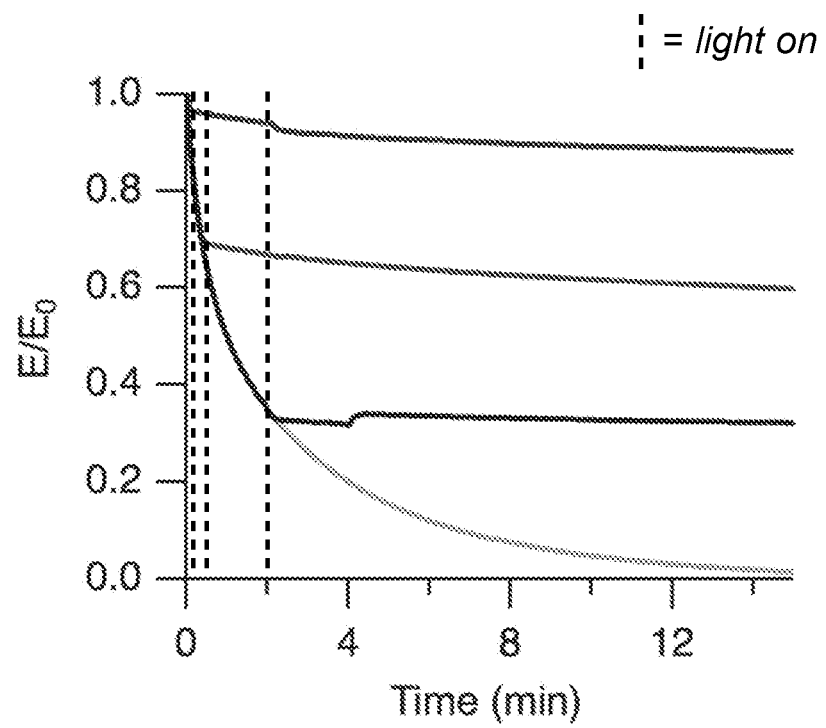
FIG. 31A is a graph showing photoinitiated fixation in a network polymer with temporal control (10% strain, light on at 5 [top], 20 [second from top], and 120 [third from top] seconds, irradiated for 120 seconds, 320-500 nm, 75 mW/cm$^2$, a small thermal recovery was noted in each case after the light was turned off). Curved bottom line—not irradiated control.
Figure 31B:
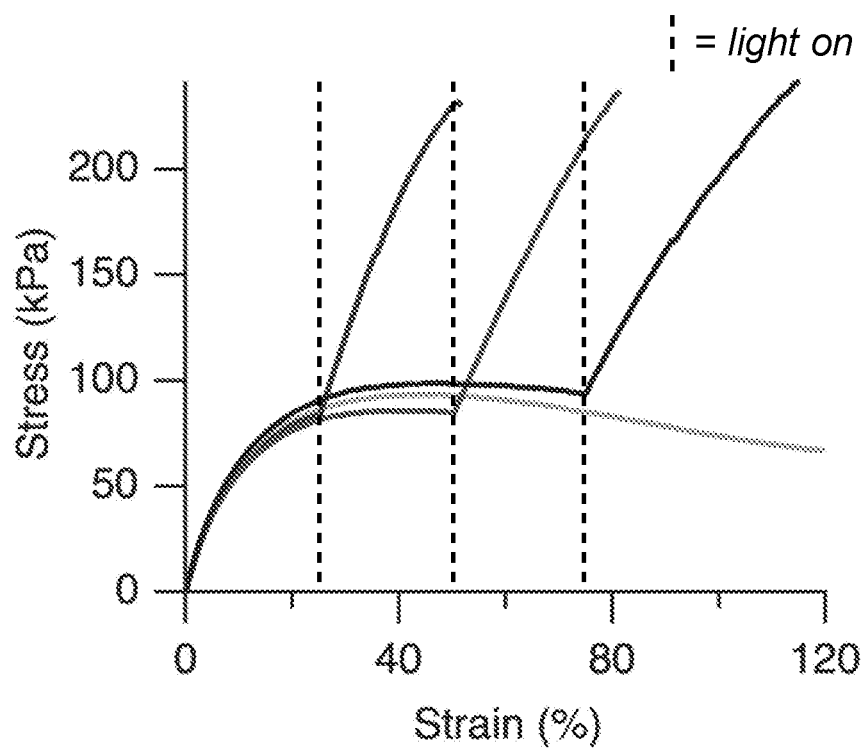
FIG. 31B is a graph showing temporal control over mechanical properties of a network polymer (0.25 mm/min, light on at 25 [left], 50 [middle], and 75% [right] strain, irradiated continuously, 320-500 nm, 75 mW/cm$^2$). Downward sloping line—not irradiated control.
Figure 32:
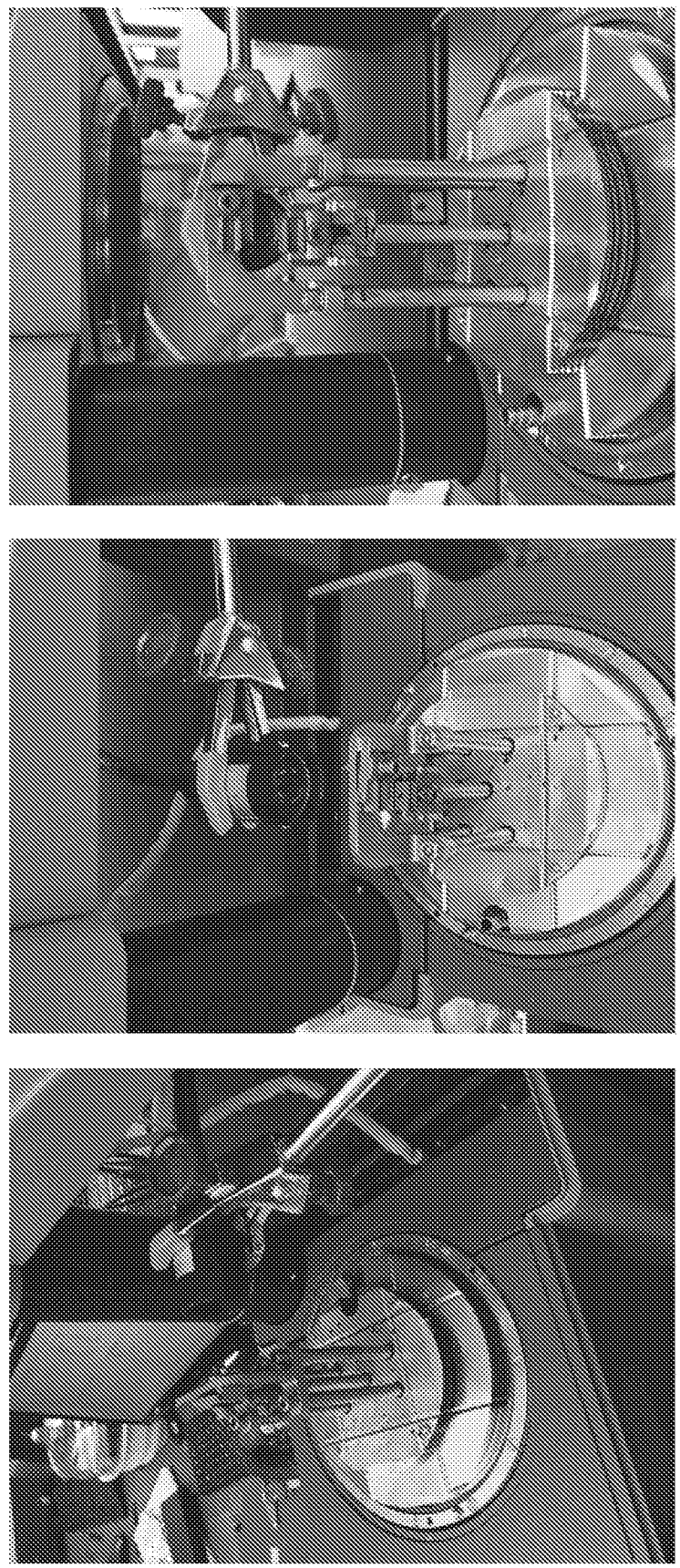
FIG. 32 is a set of images of the dynamic mechanical analysis setup used to analyze the network polymers comprising the photoactivatable acid/"OFF" switch.

These samples aged significantly, decreasing in the rate of stress relaxation as a function of time once polymerized. Therefore, only a small portion of the material was polymerized at a time (placing the remaining bulk of the un-polymerized material into a −20° C. freezer). A static 10-minute aging period following polymerization was employed to allow for homogeneous aging across multiple runs. The sample was loaded onto the DMA during this aging period and the stress relaxation experiment was started promptly at the end of this phase. Any leftover polymerized material was discarded. This procedure was repeated several times to obtain the data shown in FIGS. 31A and 31B, placing the bulk of the un-polymerized material back into the −20° C. freezer in-between use.

Example 11: Degradation and Recycling of CANs at Ambient Temperatures

Figure 33A:
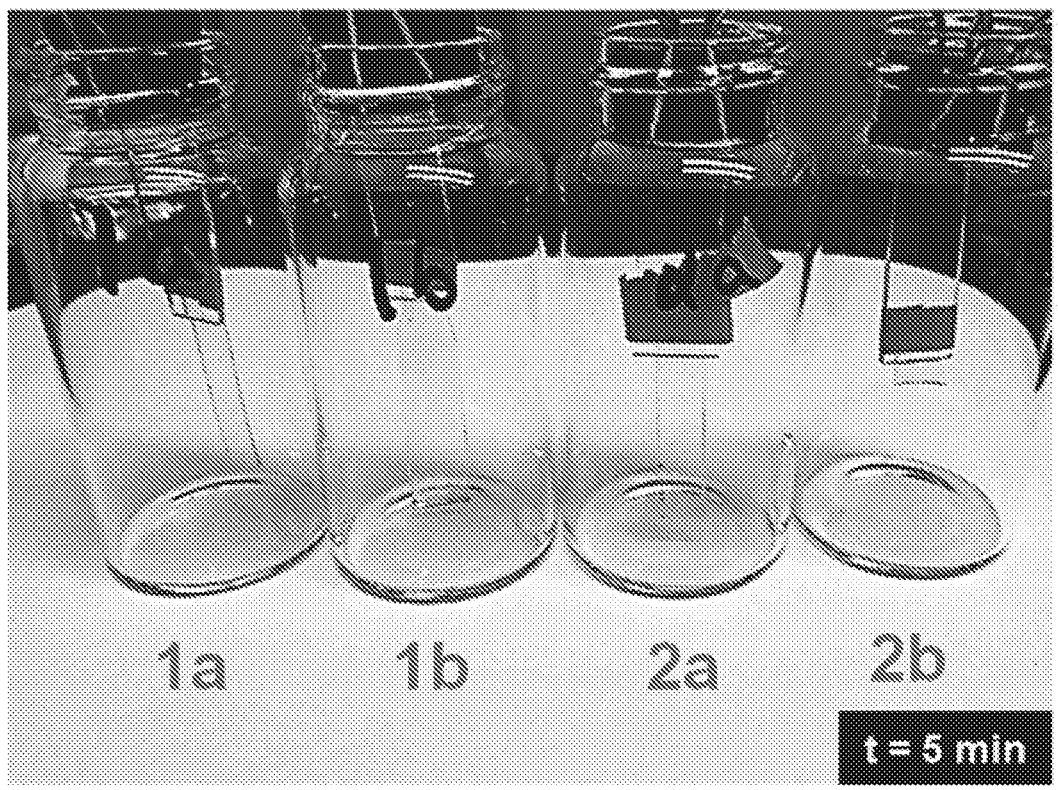
FIGS. 33A-33B are images of swelling and depolymerization tests at ambient temperature. Four thioester-containing samples and one control sample were prepared, using TEDAE or DVE-3, respectively, as the diene monomer. The 250 μm thick films did not contain any base catalyst as polymerized. Thioester-containing films were each suspended in a vial containing one of the following stirred solutions: ethanol (1a), mercaptoethanol (1b), ethanol with 5 wt % TEA (2a), and mercaptoethanol with 5 wt % TEA (2b). The control film was suspended in a separate vial containing mercaptoethanol and 5 wt % TEA (3b). Within seconds, the thioester-containing film had depolymerized and dissolved completely in vial 2b, while the films remained intact under all other tested conditions. Conditions 1b and 3b caused the films to swell, but no polymerization was observed even after 24 hours soaking time, due to the absence of base catalyst (1b) or the absence of thioester (3b).
Figure 33B:
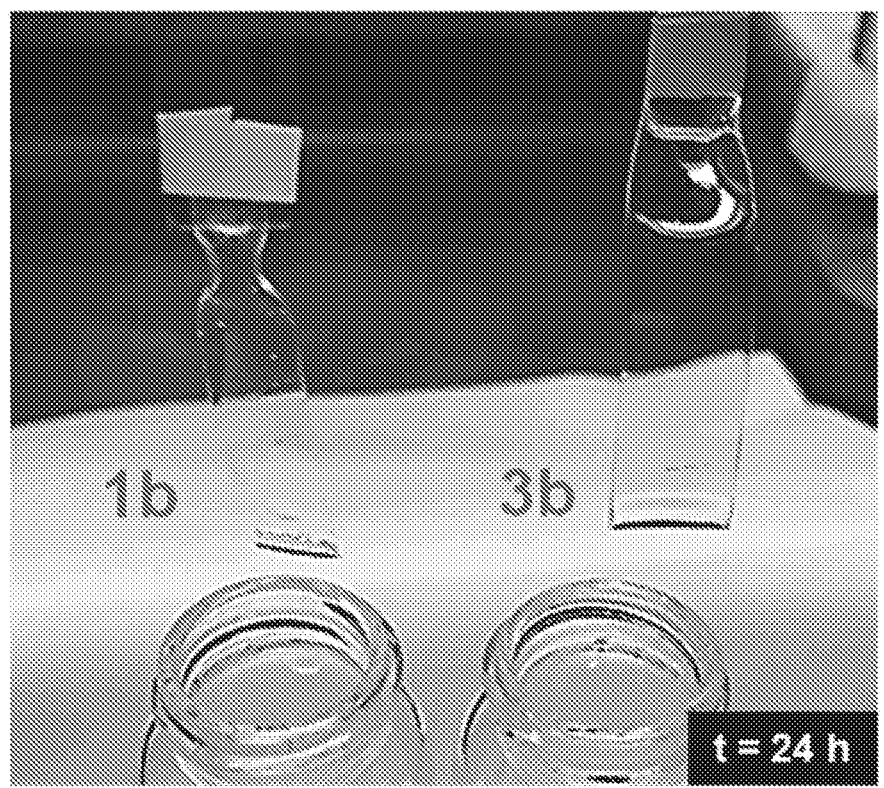

Bond reshuffling reactions with fast kinetics at ambient conditions allow for polymer recycling. In contrast to the present invention, thermosets cannot be readily dissolved or remolded once polymerized, leading to the disadvantage that thermosets are primarily single-use and nearly impossible to recycle or reuse. A chemoselective exchange, such as the thiol-thioester reaction, addresses this issue by enabling an on-demand solution-based depolymerization of the network. Thiol-thioester exchange CANs can be completely dissolved within seconds by mercaptoethanol in the presence of a base catalyst (FIG. 33A) where neither base nor residual thiol need to be initially present in the recyclable network. The large excess of monofunctional thiol from the solution rapidly exchanges with network thioesters, forming end-capped oligomers that then quickly dissolve. Following activation energy trends, no significant depolymerization was observed when either the thioester or the base catalyst was not present, or when ethanol was used instead of mercaptoethanol, even after 24 hours of soak time (FIG. 33B). These results suggest that thioester-containing polymers may be dissolved and recycled only when the correct conditions are introduced, otherwise behaving as an ideal, insoluble crosslinked network polymer.

Example 12: Preparation of Pristine Polymers for Degradation and Recycling

Figure 34:
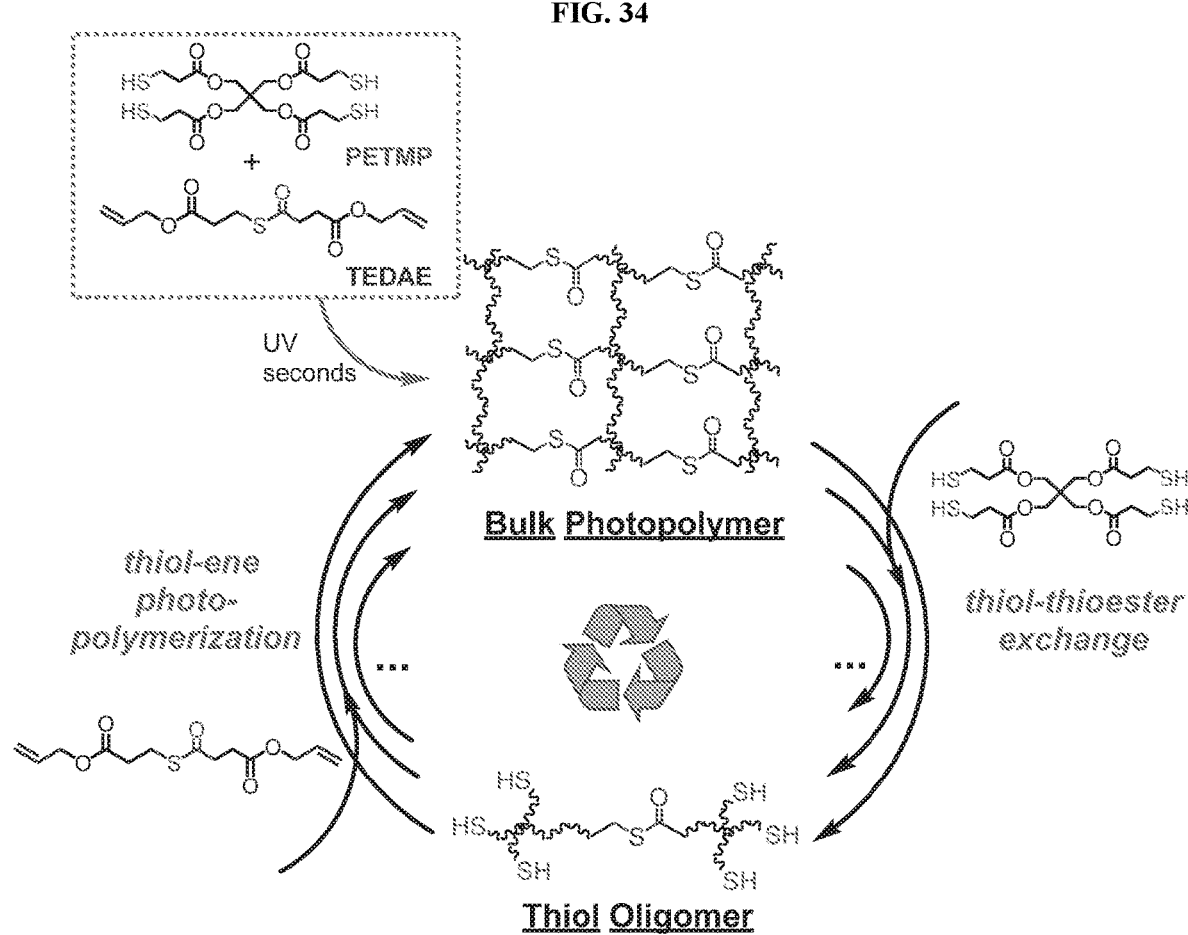
FIG. 34 is a reaction scheme for recycling and repolymerizing crosslinked photopolymers by both radical-mediated thiol-ene and anion-mediated thiol-thioester exchange reactions. In particular, the pristine polymer is originally prepared by photo-induced thiol-ene polymerization between stoichiometric tetra-thiol and thioester-containing diallyl ethers. The bulk photopolymer is degraded into thiol oligomers, by exchanging with a specific amount of tetra-thiols under basic condition. Subsequently, these oligomers are polymerized with thioester-containing diallyl ether by thiol-ene reaction. Three representative complete cycles are demonstrated here to indicate the capacity for full property recovery.
Figure 35A:
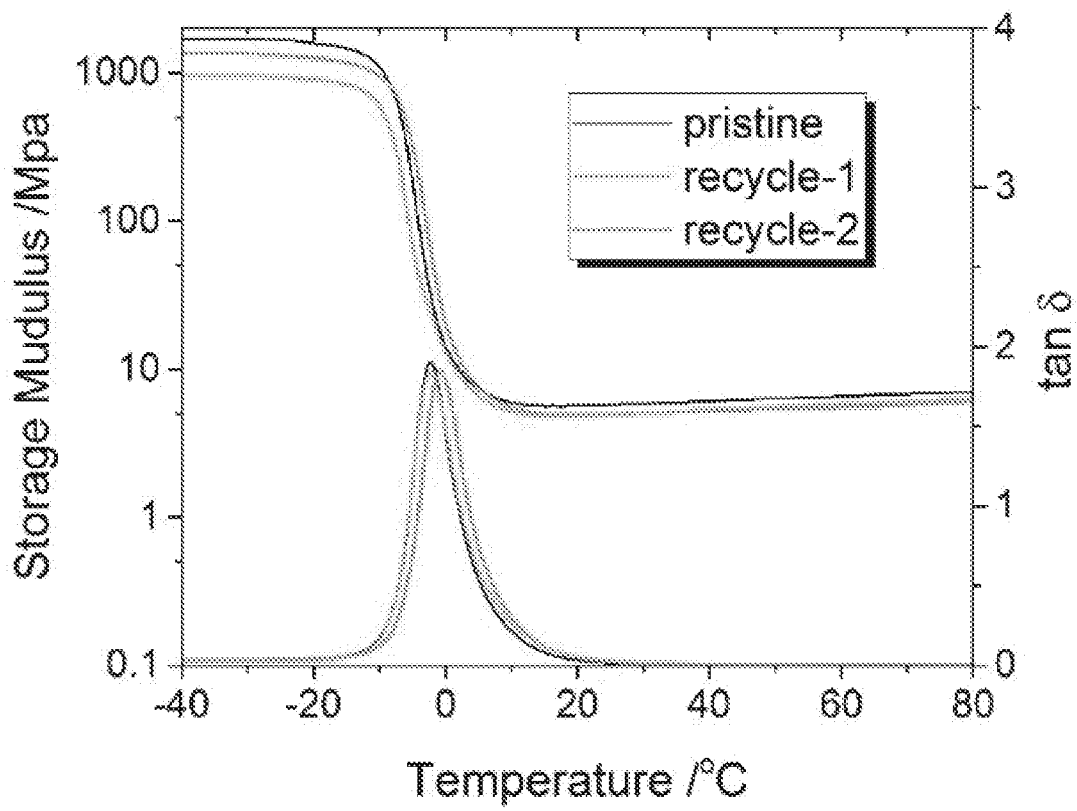
FIG. 35A is a graph of dynamic mechanical analysis (DMA) of pristine PETMP-TEDAE polymer, and reclaimed polymers from oligomer 2 (Table 1) and TEVAE. The glass transition temperature occurs at −2° C., and the rubbery modulus is 6 MPa.
Figure 35B:
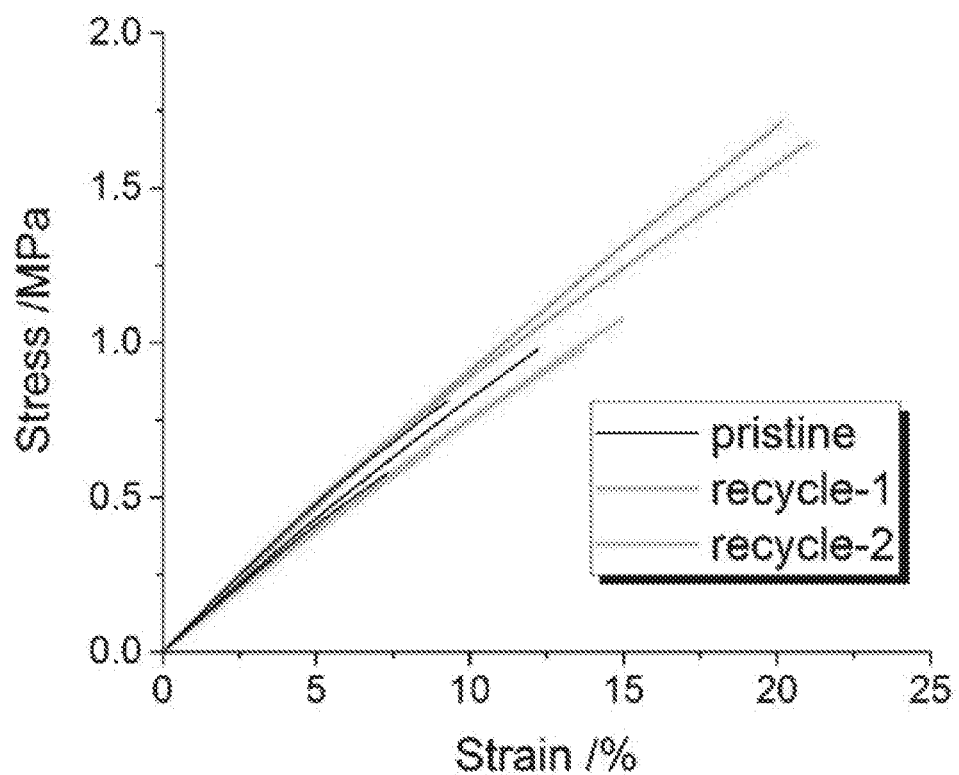
FIG. 35B is a graph of tensile stress-strain curves of pristine PETMP and TEDAE polymer, and reclaimed polymer from oligomer 2 (Table 1) and stoichiometric TEDAE.
Figure 35C:
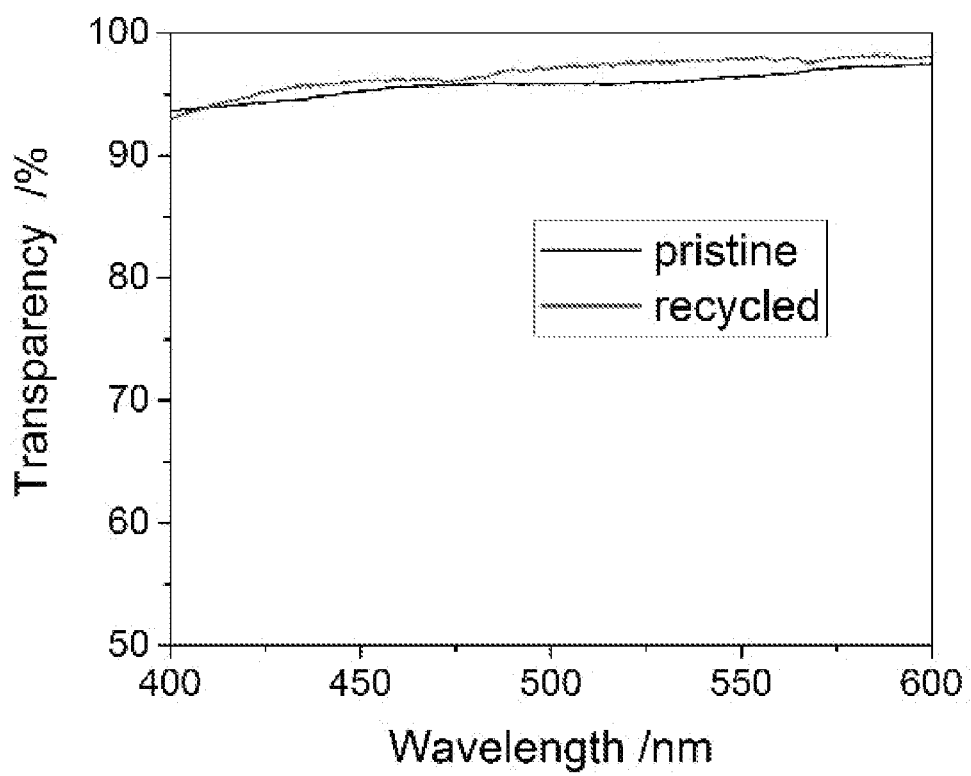
FIG. 35C is a graph comparing transparency of pristine and recycled PETMP-TEDAE photopolymers. Film thickness is 0.25 mm.

Stoichiometric thiol-ene polymerizations between tetra-thiol (PETMP) and di-ene (TEDAE) monomers were used for the preparation of pristine polymers, with a catalytic amount of photoinitiator (DMPA) added prior to UV light exposure. The thiol-allyl ether radical polymerization proceeded rapidly and generated optically clear, colorless and tack-free films, after just seconds of irradiation. As illustrated in FIG. 34, the crosslinked polythioester contains a thioester linkage in each of its repeating units, which is covalently stable in neutral or slightly acidic conditions. However, with the presence of excess PETMP, the thiol-thioester exchange reaction occurred rapidly only when accompanied by simultaneous addition of a catalytic amount of triethylamine. Acetone in equivalent mass to nonvolatile compounds was added to improve the mass transfer of solid/liquid phases. The film disappeared completely, and a colorless non-viscous solution of dissolved oligomers was obtained. The devolatilized solution gives a viscous liquid, to which a stoichiometric (thiol:ene) amount of TEDAE is added and directly repolymerized by a thiol-ene reaction. Three rounds of such operations were conducted without noticeable changes in the properties of both oligomers and polymers. FIG. 35A shows that both the pristine and reclaimed polymers have a consistent glass transition temperature of −2° C., as well as a rubbery modulus of 6 MPa. Further, tensile tests show those polymers break at ~15% strain on average and a Young's modulus of ~8 MPa, as shown in FIG. 35B. Both pristine and recycled polymers are colorless and transparent, as shown in FIG. 35C.

Example 13: Degradation and Recycling Using Various Oligomer Compositions

Systematic study of both the degradation and repolymerization process was then explored. The equilibrated balance between thiols and thioesters enables polythioesters to remain at thermodynamically minimized states, which are independent of the reaction route used to incorporate them into the polymer. A thiol-excess off-stoichiometric polymer formed from PETMP and TEDAE, has the same molecular topology as a stoichiometric polymer that has exchanged with the same excess amount of thiols. Based on the Flory-Stockmayer equation, networks are formed from tetra-thiol/di-ene monomers with no higher than two molar equivalents of extra thiol groups (i.e., the off-stoichiometric ratio r must be no less than 0.333). To avoid oligomers that are too viscous to handle, a series of formulations with five, seven and nine molar equivalents of thiols were designed, in which the ene:thiol stoichiometric ratios are 0.167, 0.125 and 0.100, respectively, as listed in Table 1.

Figure 36:
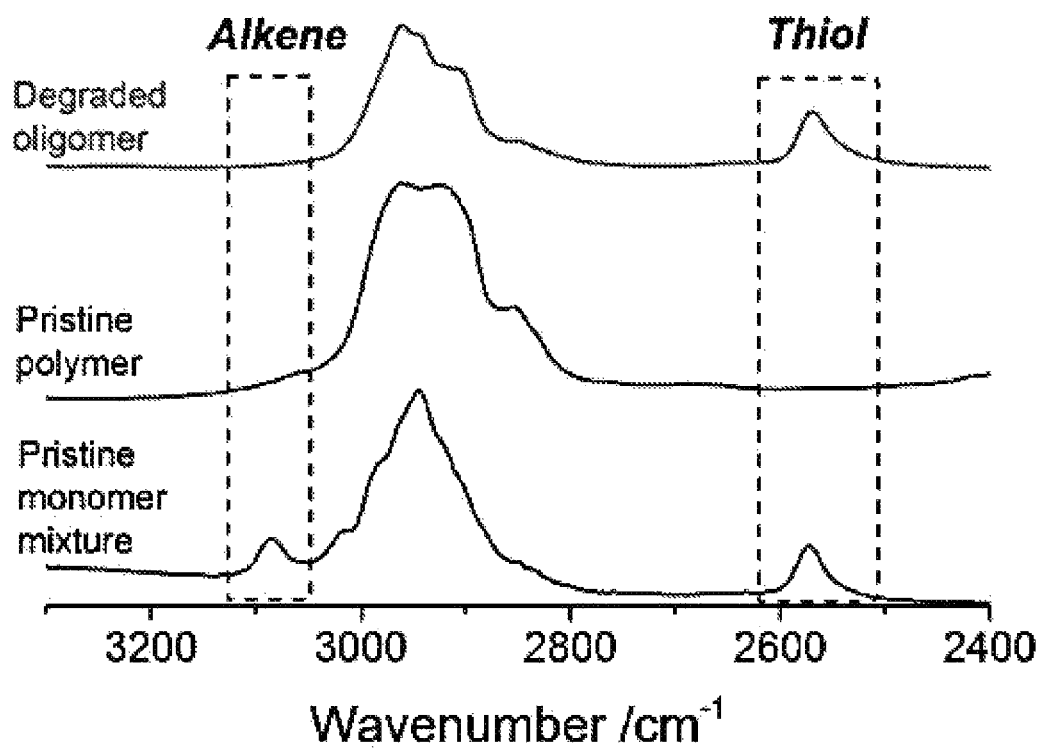
FIG. 36 Fourier transform infrared spectra of the pristine PETMP-TEDAE monomer mixture, pristine polymer and degraded oligomer (stoichiometric number of 0.125, oligomer 2 from Table 1).
Figure 37A:
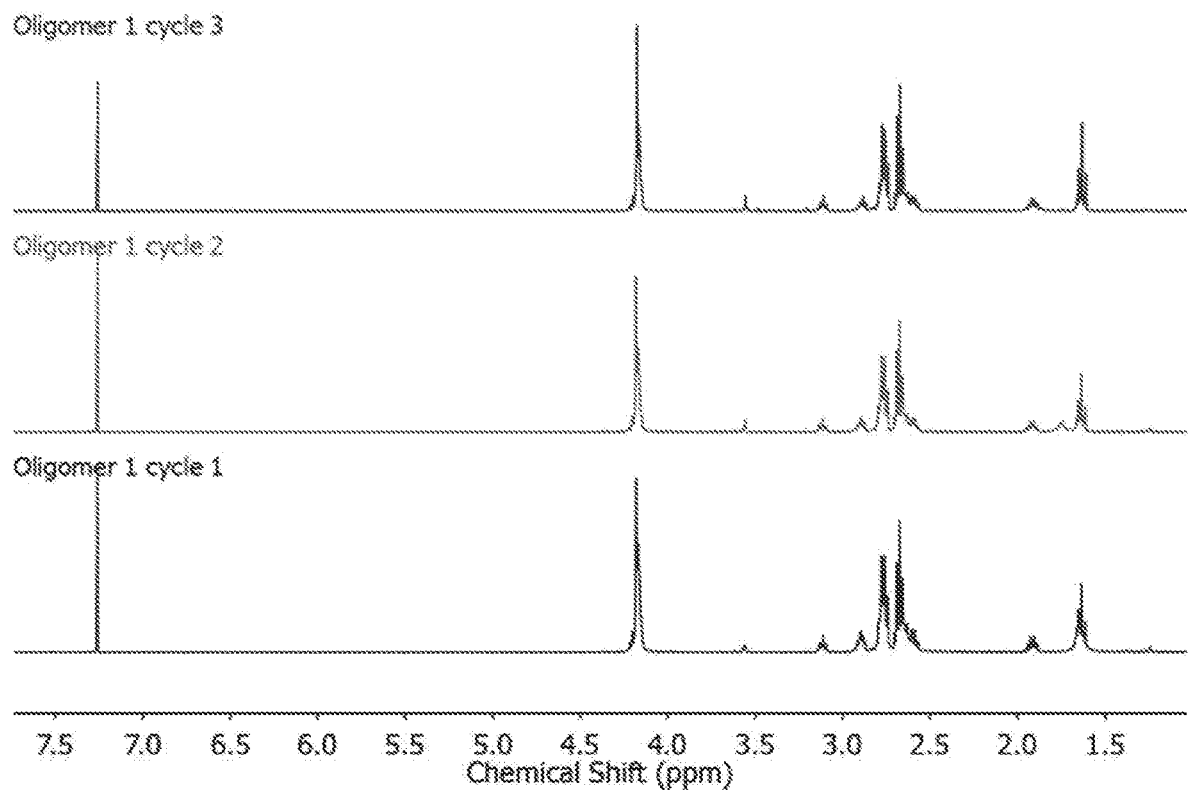
FIG. 37A is a set of $^1$H NMR spectra of recycled oligomer 1 (Table 1) for various cycles. Oligomer was obtained by degrading in excess PETMP with a stoichiometric number of 0.167 in acetone with catalytic amount of TEA, and then dried under vacuum.
Figure 37B:
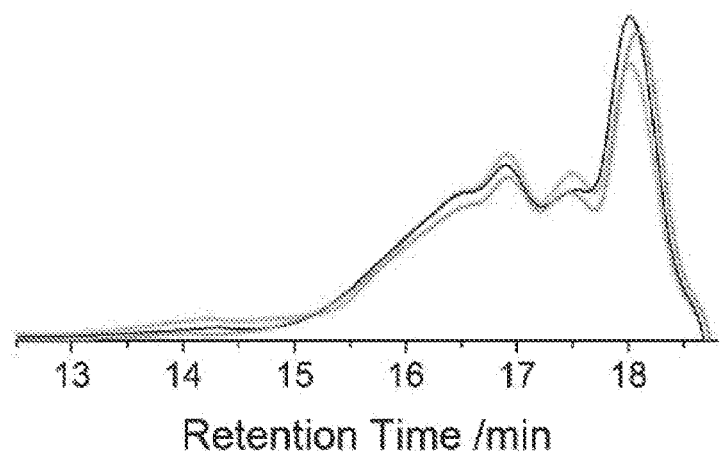
FIG. 37B is a graph of a number gel permeation chromatography profiles of oligomer 2 (Table 1) at various rounds of recycling. Oligomer was obtained by degrading in excess PETMP with a stoichiometric number of 0.125 in acetone with catalytic amount of TEA, and then dried under vacuum.

In each round of degradation, the polymer samples disappeared within three hours and the solvent removed oligomers were of consistent viscosity. From oligomer 1, 2 and 3, the larger off-stoichiometric ratio led to lower molecular weight oligomeric molecules, which exhibited decreased viscosities from 3.2, 2.2 and 1.2 Pa·s, decreasing as the stoichiometric ratio increased. As shown in FIG. 36, the thiol groups in the oligomers were confirmed by FT-IR spectra. Further, the chemical structures were consistent between recycling rounds, which was confirmed by both $^1$H NMR (FIG. 37A) and GPC (FIG. 37B). The expected typical Flory distribution was observed for the oligomers, where the fraction of higher molecular weight components decreased exponentially, as expected for step-growth polymers/oligomers formed at relatively low conversions.

TABLE 1

Formulations consisting of recycled thioester containing thiol oligomers degrading PETMP-TEDAE polymers in an excess of PETMP. Samples were mixed with particular multiple equivalencies of thiol monomers, an equal mass of acetone and 20 wt % of TEA with respect to the total of nonvolatile compounds, at ambient for 3 h.

| Oligomer Entry | Stoichiometric number | Ratio of functionality thiol:thioester | Viscosity/Pa · s |
| --- | --- | --- | --- |
| Oligomer 1 | 0.167 | 10 | 1.2 ± 0.1 |
| Oligomer 2 | 0.125 | 14 | 2.2 ± 0.2 |
| Oligomer 3 | 0.1 | 18 | 3.2 ± 0.2 |

Example 14: Degradation and Recycling Polymerization Kinetics

Figure 38:
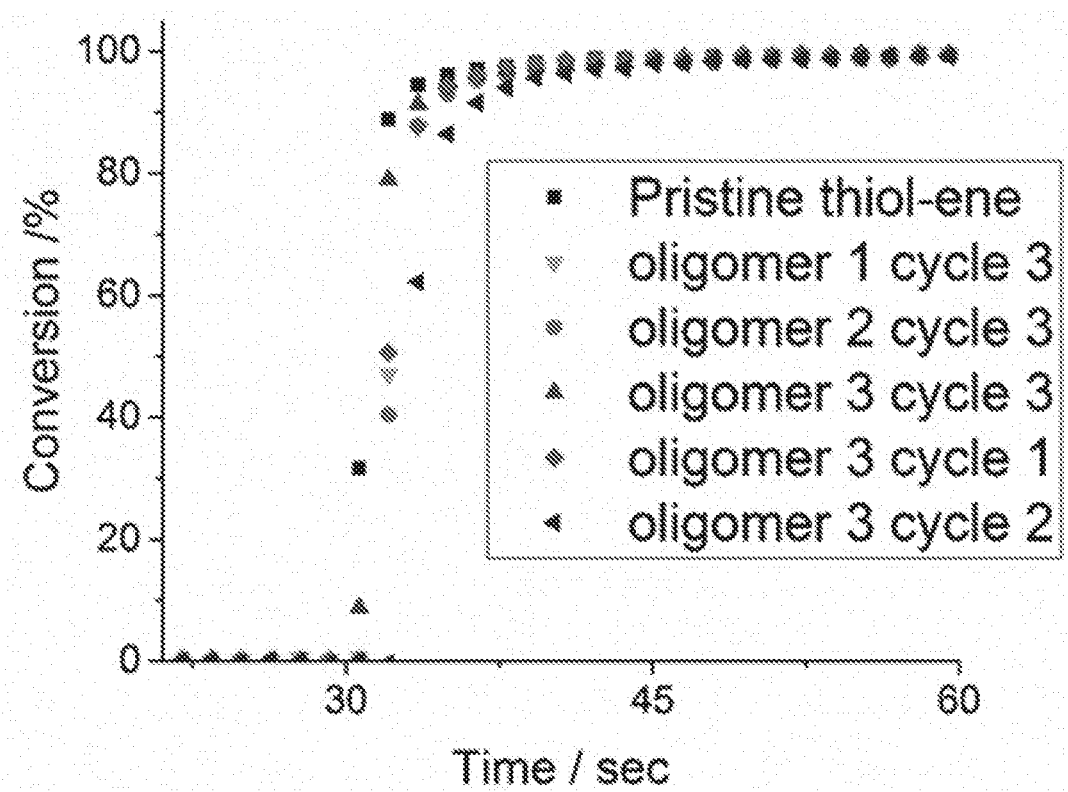
FIG. 38 is a graph of reaction kinetics profiles of stoichiometric thiol-ene polymerization for pristine PETMP-TEDAE, as well as various oligomers with TEDAE. Formulations of oligomers are listed in Table 1. Irradiation conditions: 1 mol % DMPA to thiol or alkene groups, 5 mW/cm$^2$@365 nm, light turned on at 30 sec. The thiol peak centered at 2570 cm$^{-1}$ was used to determine reaction conversions.

The reaction kinetics were studied by monitoring the decrease of reactive functionalities in real-time FT-IR. As shown in FIG. 38, under mild irradiation conditions (5 mW/cm² @365 nm) the thiol-allyl ether polymerizations occurred very rapidly. More than 90% conversion was achieved within 3-5 seconds under very mild initiation conditions, during which one or two FT-IR scans were acquired. A kinetic profile was observed by overlaying many oligomer formulations together with the pristine sample, which indicated the consistency in reaction rates. The PETMP-TEDAE system produced rubbery materials, thus the absence of vitrification allowed a constant reaction rate, even from monomers with various viscosities.

Example 15: Recycled Polymer Stability Testing

Figure 39:
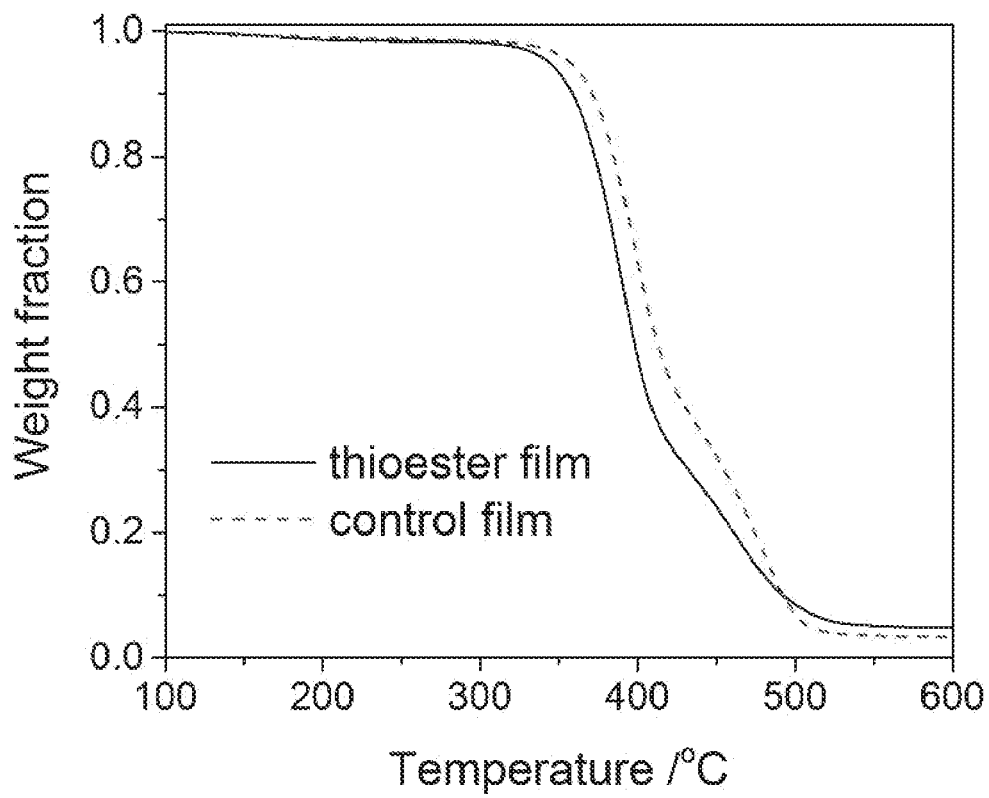
FIG. 39 is a graph of thermogravimetric analysis of pristine PETMP-TEDAE and PETMP-diallyl adipate. The samples were ramped at 10° C./min under $N_2$.

PETMP and TEDAE are both aliphatic ester based monomers, which give hydrophobic polymers. By immersing the polymer samples in deionized water and examining the sample mass change over time, a stability test was performed to examine stability relative to a control sample which was polymerized from stoichiometric PETMP and diallyl adipate. As listed in Table 2, no substantial difference was seen between the polythioester and the control group, indicating the durability of recyclable thioester containing polymers. Further, thermal stability was demonstrated as no detectable weight loss was observed up to 320° C. under $N_2$, as shown in FIG. 39. Though extremely dynamic under exchange conditions, the thioester groups bring no discernable harm to the stability and durability over solvent and heat.

TABLE 2

Water swelling and stability tests in neutral deionized water at ambient temperature. The thioester film was prepared from stoichiometric PETMP and TEDAE, while the control film was made from stoichiometric PETMP and diallyl adipate.

| | Weight change 1 day | Weight change 3 days | Weight change 1 week |
|---|---|---|---|
| Thioester film | 0.9% (±0.1%) | 0.8% (±0.1%) | 0.7% (±0.1%) |
| Control film | 0.8% (±0.1%) | 0.8% (±0.1%) | 0.6% (±0.1%) |

Example 16: Tunability of Recyclable Polymers

Figure 40:
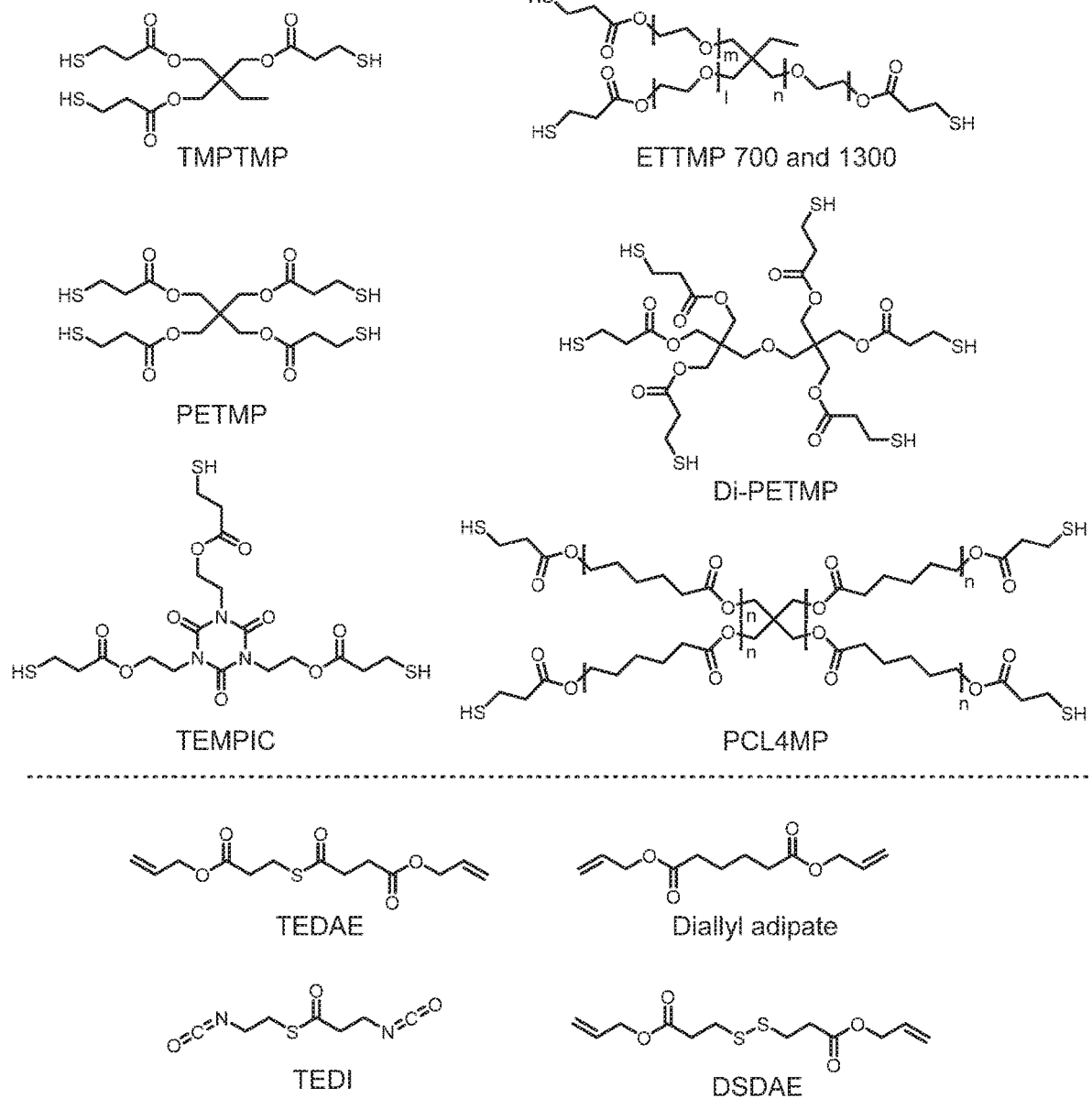
FIG. 40 is a set of structures of exemplary monomers of the invention. Pentaerythritol tetrakis(3-mercaptopropionate) (PETMP); trimethylolpropane tris(3-mercaptopropionate) (TMPTMP); dipentaerythritol hexa(3-mercaptopropionate) (Di-PETMP); ethoxilated-trimethylolpropan tri(3-Mercaptopropionate) (ETTMP 700 and ETTMP 1300); polycaprolactone tetra(3-mercaptopropionate) (PCL4MP); diallyl adipate; thioester containing diallyl ether (TEDAE); thioester containing diisocyanate (TEDI); disulfide diallyl ether (DSDAE).
Figure 41:
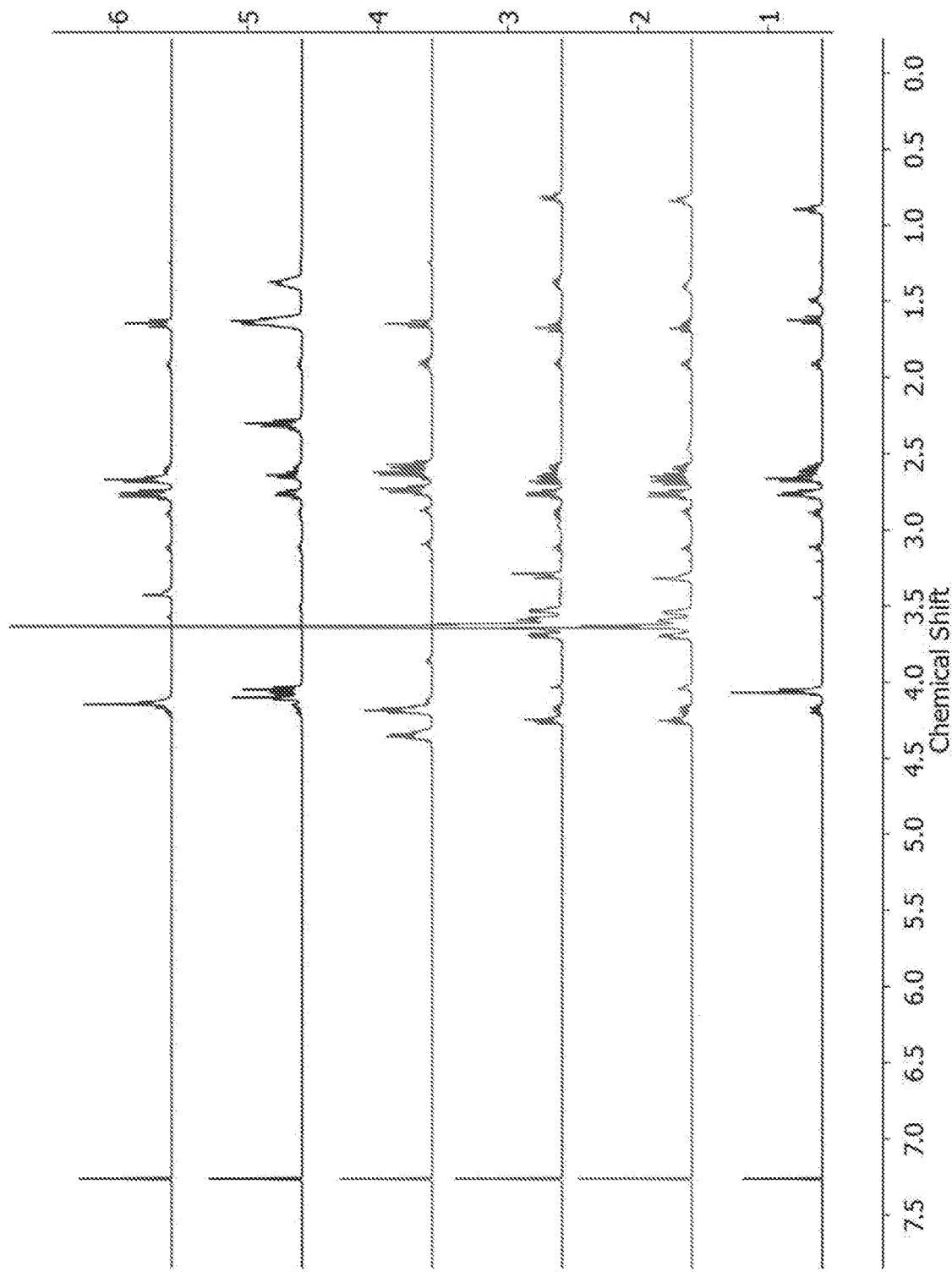
FIG. 41 is a set of $^1$H NMR spectra of oligomers recycled from polymers prepared by various thiol monomers and TEDAE. (1) TMPTMP; (2) ETTMP 700; (3) ETTMP 1300; (4) TEMPIC; (5) PCL4MP; (6) Di-PETMP. The stoichiometric ratio between thiols and thioesters used for recycling are listed in Table 3.

In step-growth reactions, the network structures are readily adjustable by simple changes to the monomer structures, and thus, material properties are precisely tunable. Polymers comprising various thiol monomers (FIG. 40) polymerized with stoichiometric TEDAE were synthesized (Table 3). Both chemical structure and functionality of the thiol monomers were found to affect the polymer properties. Structurally similar tri-thiol (TMPTMP), tetra-thiol (PETMP) and hexa-thiol (Di-PETMP) monomers generated polymers with small increases in Tg going from −4 to −2 to 7, with rubbery moduli of 3.5, 6.0 and 8.6 MPa, respectively. The tri-thiol with a stiff ring-structured core (TEMPIC) generated an increased Tg as compared to that of TMPTMP, while the flexible polyethylene glycol based thiols (ETTMP 700 and 1300) generated softer materials. After degradation by exchange with the respective thiol monomers, the oligomers were recovered (NMR spectra of oligomers are shown in FIG. 41). The viscosity of the oligomers varied predictably in regards to the respective monomer structures. For example, the TEMPIC oligomer had a viscosity of 108 Pa·s while the ETTMP oligomers had a viscosity of 1 Pa·s. By altering one of the two reactive components, it was possible to design recyclable thiol-ene polymers for a range of particular material applications.

TABLE 3

Formulations of recyclable polymers prepared by various thiol monomers with TEDAE.

| | Thiol monomers | Tg/° C. | Rubbery modulus/ MPa | Recycling stoichiometry ratio ene:thiol | Recycled oligomer viscosity/ Pa·s |
|---|---|---|---|---|---|
| Tri-thiol | TMPTMP | −4 | 3.5 | 0.25 | 4.1 ± 0.2 |
| | TEMPIC | 6 | 1.7 | 0.25 | 108 ± 4 |
| | ETTMP700 | −22 | 1.8 | 0.25 | 1.4 ± 0.1 |
| | ETTMP1300 | −28 | 1.3 | 0.25 | 1.8 ± 0.1 |
| Tetra-thiol | PETMP | −2 | 6.0 | 0.167 | 11 ± 1 |
| | PCL4SH | −23 | 2.4 | 0.167 | 3.8 ± 0.1 |
| Hex-thiol | Di-PETMP | 7 | 8.6 | 0.1 | 32 ± 2 |

Example 17: Thiol-Isocyanate Glassy Recyclable Polymers

Figure 42:
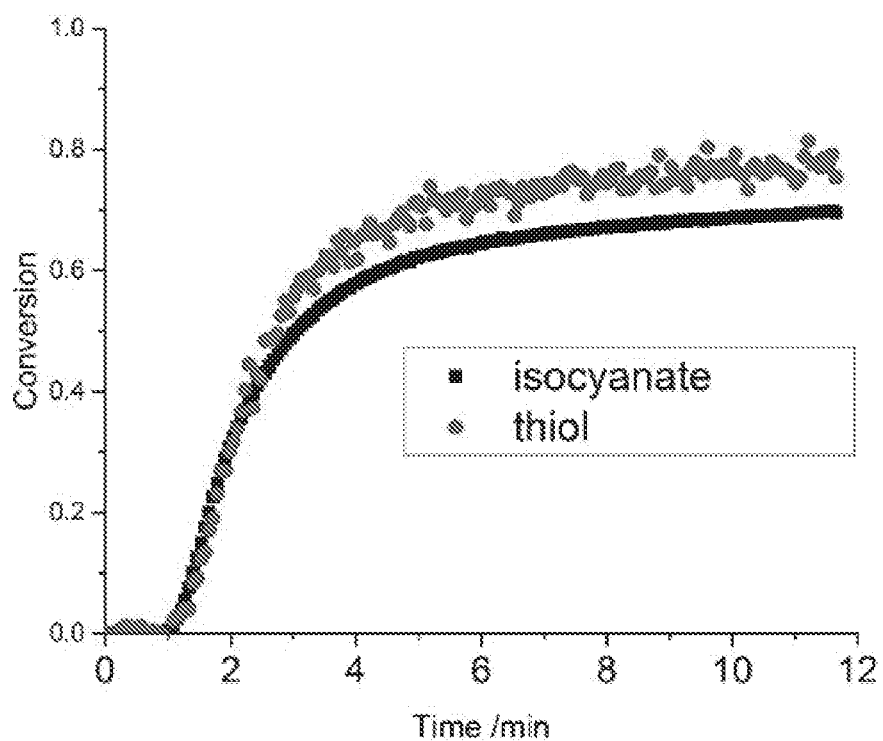
FIG. 42 is a graph of the reaction kinetics of monomer conversion between stoichiometric PETMP and TEDI. 1 mol % Irgacure 907 in stoichiometric PETMP-TEDI. Irradiation conditions: 5 mW/cm$^{-2}$ with 365 nm filter. The light was turned on at 1 min.
Figure 43:
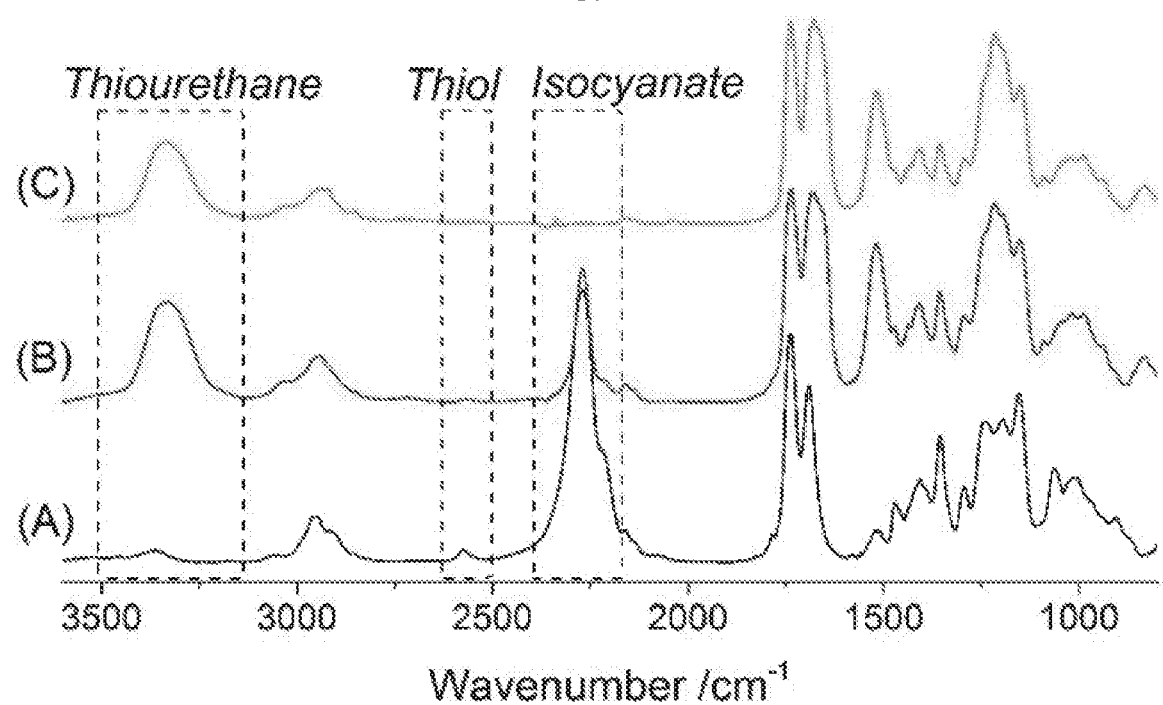
FIG. 43 is an FT-IR spectra of the polythiourethane prepared from stoichiometric reaction of PETMP and TEDI. (A) Stoichiometric monomer mixture; (B) Polymer cured after 10 min irradiation under 5 mW/cm$^{-2}$@365 nm at ambient; (C) Polymer post-cured at 80° C. overnight. 1 mol % Irgacure 907 was used as initiator.
Figure 44:
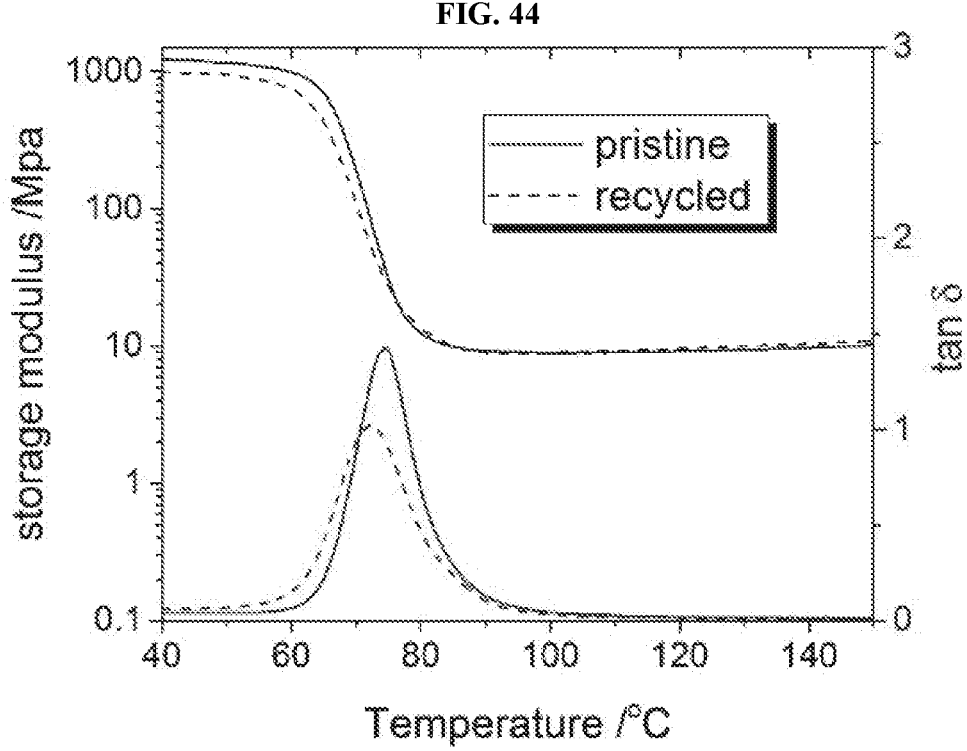
FIG. 44 is a dynamic mechanical analysis of pristine PETMP-TEDI and recycled polythiourethane. The glass transition temperature is approximately 74° C., and the rubbery modulus is approximately 9 MPa.
Figure 45:
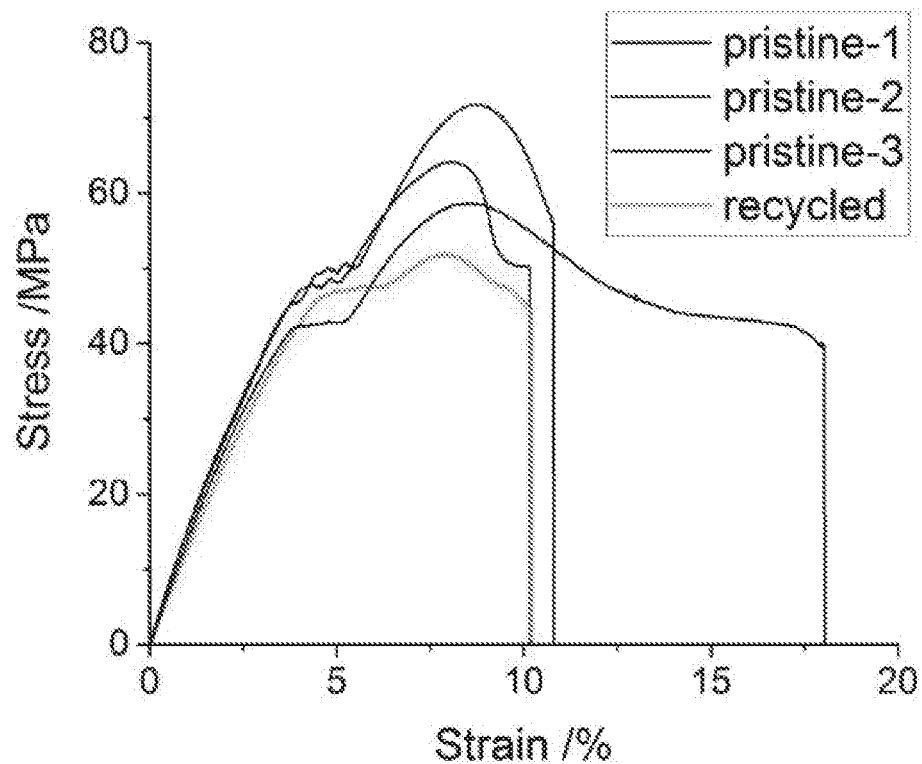
FIG. 45 is a set of stress-strain curves of polythiourethane prepared from stoichiometric PETMP and TEDI, as well as the reclaimed polymer prepared from oligomer (isocyanate/thiol stoichiometric number of 0.125) and TEDI. 63.5 mm×9.5 mm×0.25 mm dogbone samples were straining at 0.75 mm/min at ambient.

Irgacure 907 was used as a photolabile base to photopolymerize PETMP with a thioester containing di-isocyanate monomer (TEDI). The polymerization occurred rapidly under mild irradiation conditions (5 mW/cm² @365 nm, FIG. 42) but slowed down as the polymer vitrified. The reaction conversion was limited at ~70% conversion but the reaction was fully completed when post-curing at 80° C., as confirmed by FT-IR spectra (FIG. 43). Degraded oligomers were obtained by exchanging with extra PETMP under similar conditions as those reported in Examples 11-13. The pristine isocyanate containing polymer showed a Tg of 74° C., while the reclaimed polythiourethanes have a Tg of 73° C., as verified by DMA (FIG. 44). Both pristine and reclaimed polymers had a rubbery modulus of approximately 9 MPa, indicating nearly identical network structures. Further, the tensile test showed that the Young's modulus was close to 1.5 GPa (FIG. 45), which is suitable for applications such as hard coatings.

Figure 46:
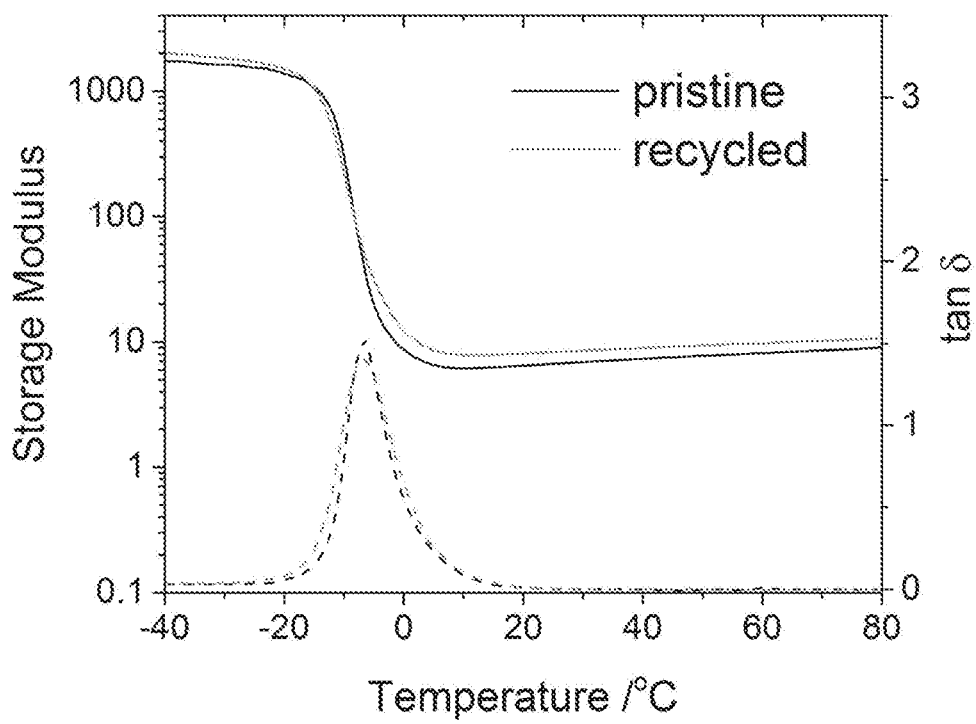
FIG. 46 is a dynamic mechanical analysis of pristine and recycled PETMP-DSDAE. The glass transition temperature is about −6° C., and the rubbery modulus is about 9 MPa.
Figure 47:
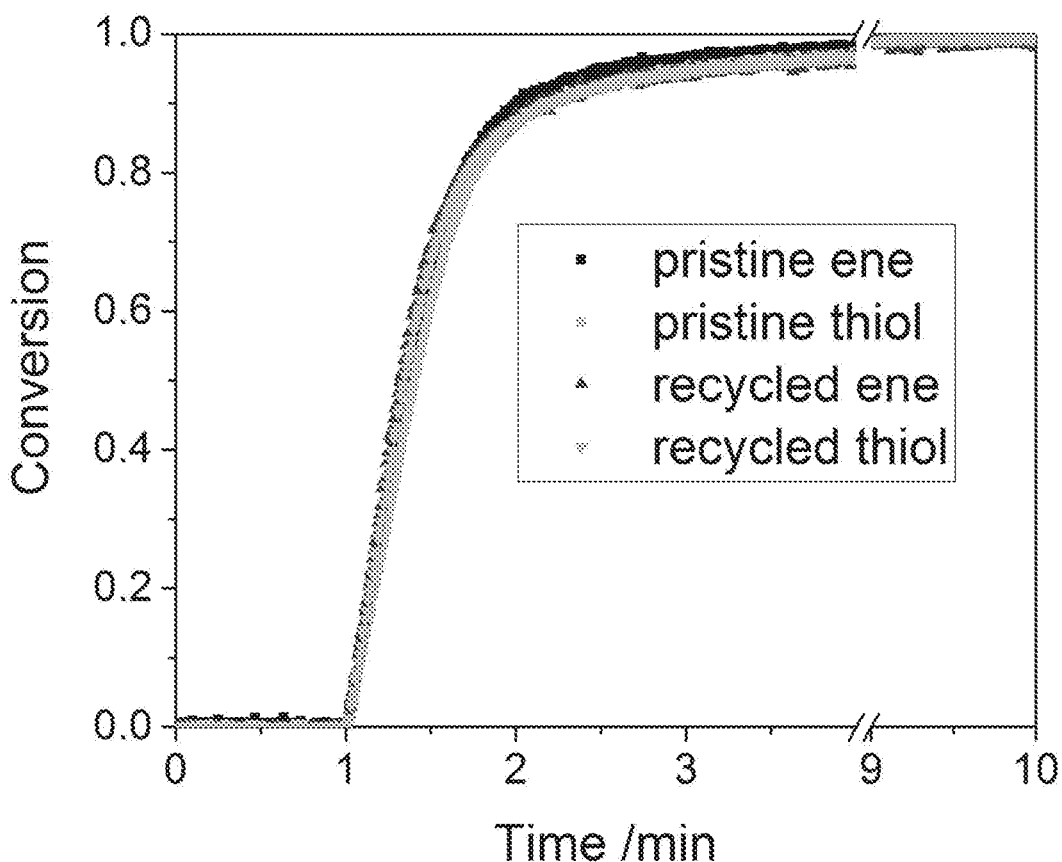
FIG. 47 is a graph of the reaction kinetics of disulfide polymer between stoichiometric PETMP and DSDAE. 1 mol % Irgacure 184 in stoichiometric PETMP-DSDAE. Irradiation conditions: 10 mW/cm$^{-2}$ with 365 nm filter. The light was turned on at 1 min.

Example 18: Anionic Mediated Disulfide Exchange Reactions for the Recycling of Thiol-Ene Photopolymers A disulfide containing diallyl ether monomer (DSDAE) was synthesized by Fisher esterification between 3,3'-dithiodipropionic acid and allyl alcohol. Stoichiometric PETMP-DSDAE with 1 mol % Irgacure 184 as the photoinitiator yielded transparent, tack-free, crosslinked polymers after 10 min of UV irradiation. Similar to the thioester system, the disulfide polymer completely degraded into oligomers in the presence of excess PETMP (stoichiometric number of 0.125) and catalytic amount of TEA in acetone after reacting overnight. The reclaimed disulfide polymer possessed nearly identical mechanical properties as the pristine samples, with a Tg of −6° C. and a rubbery modulus of 9 MPa (FIG. 46). Further, the reaction kinetics of the recycled polymer and the pristine polymer were found to be identical. As shown in FIG. 47, both the pristine and the recycled systems demonstrated a rapid reaction rate, reaching full conversion in a thiol/ene stoichiometric manner within 10 mins of irradiation.

Example 19: Silica Particle-Polymer Composites

Figure 48:
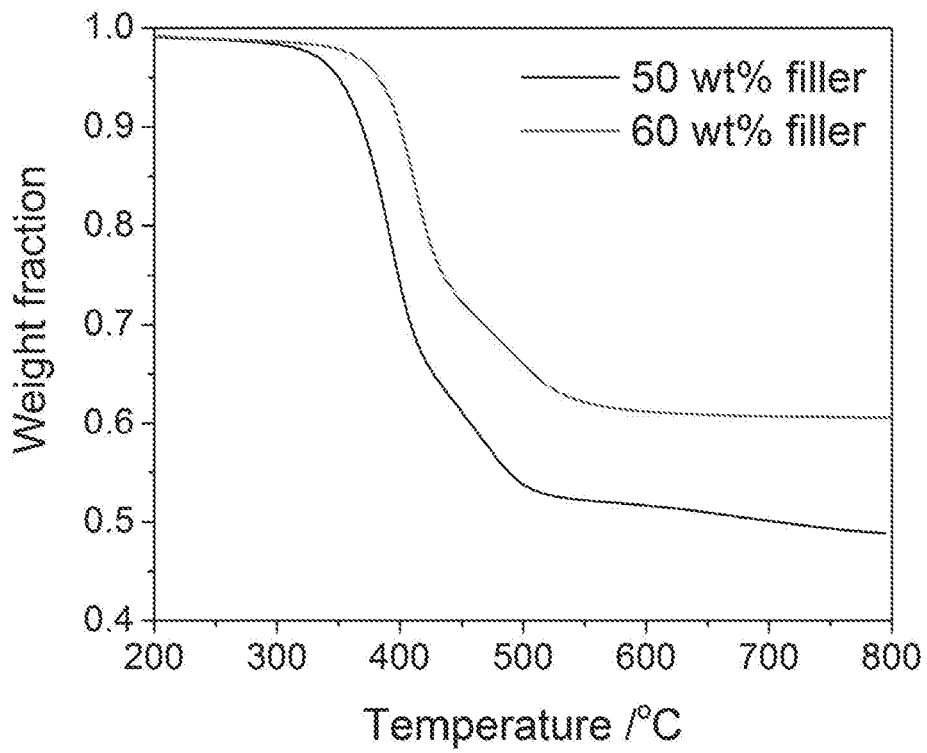
FIG. 48 is a thermogravimetric analysis of composite thioester polymers with various particle loadings. The samples were ramped at 10° C./min under $N_2$.
Figure 49:
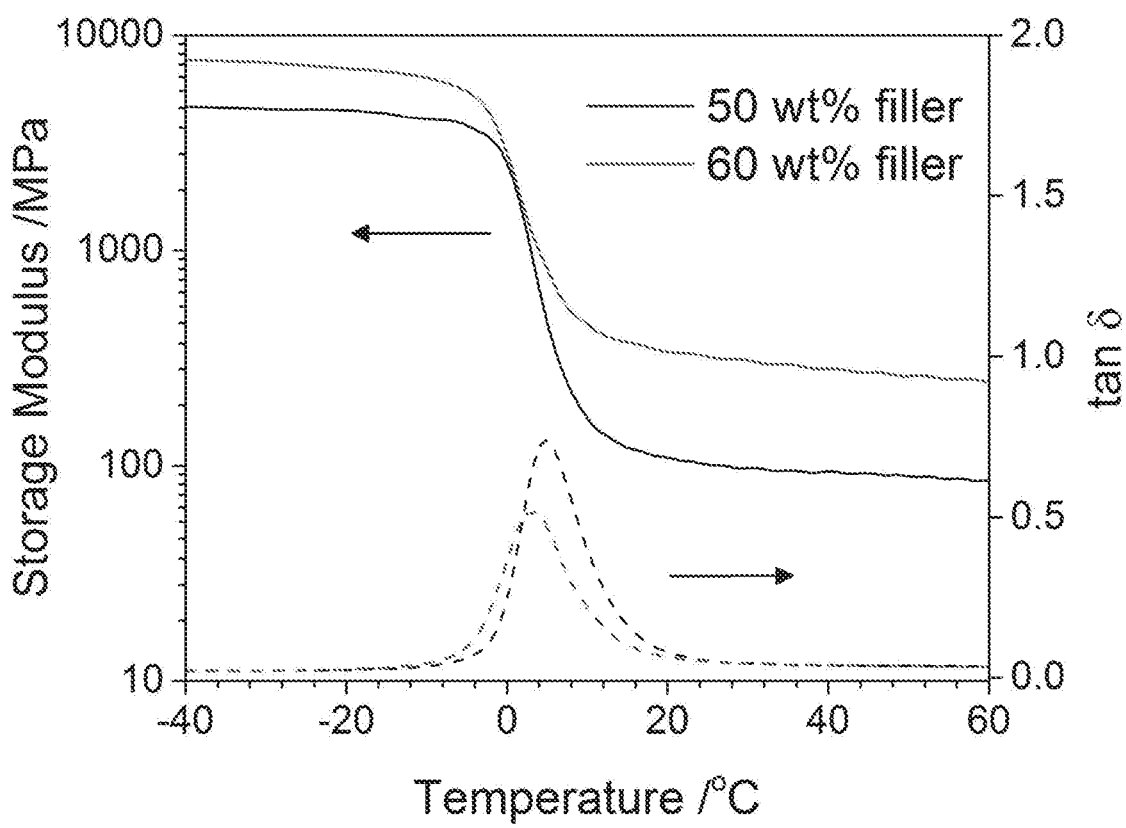
FIG. 49 is a dynamic mechanical analysis of composite thioester photopolymers. 50 wt % and 60 wt % silica particles were polymerized in PETMP-TEDAE matrix, with 1 mol % DMPA with respect to monomers.

Filler-reinforced composites are commonly employed with photopolymers in order to obtain enhanced mechanical properties, including increased tensile modulus. PETMP-TEDAE polymers loaded with various amount of silica particles (diameter 0.4 μm) were prepared, and their compositions were confirmed by TGA analysis (FIG. 48). Samples loaded with 50 wt % and 60 wt % particles showed weight losses of 50% and 40%, respectively. The rubbery modulus of 50 wt % and 60 wt % particle loading composites were found to be 94 MPa and 282 MPa, respectively, both of which were significantly higher than the pure PETMP-TEDAE polymer (6 MPa), as shown in FIG. 49. The composites degraded completely under the same conditions as the neat polymer, and both silica particles and thiol oligomers were recovered by centrifugation and subsequent drying under vacuum.

Example 20: Photolithography Applications of Recyclable Polymers

Figure 50A:
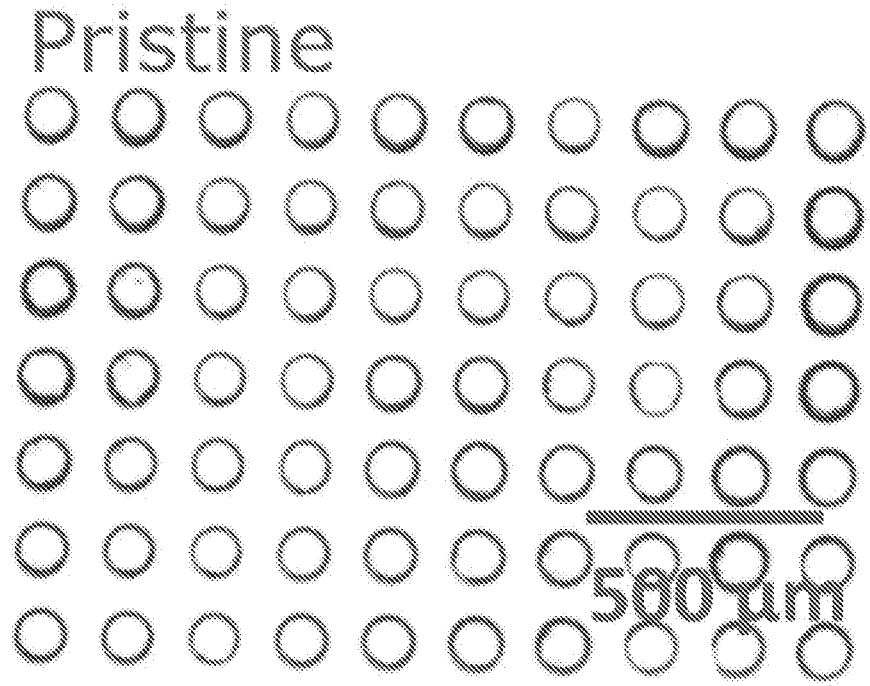
FIGS. 50A-50B are a set of images of contact liquid photolithography of pristine (FIG. 50A) and recycled (FIG. 50B) PETMP-TEDAE polymers. Both pristine and recycled samples consist of stoichiometric PETMP-TEDAE monomers with 0.5 wt % 1184 and 0.3 wt % methylhydroquinone with respective to polymerizable components. Photomasks are with 100 μm circles separated by 100 μm screening gaps. Collimated UV light (50 mW/cm$^2$ @365 nm) is shown on pristine samples for 120 sec, while on recycled samples for 80 sec.
Figure 50B:
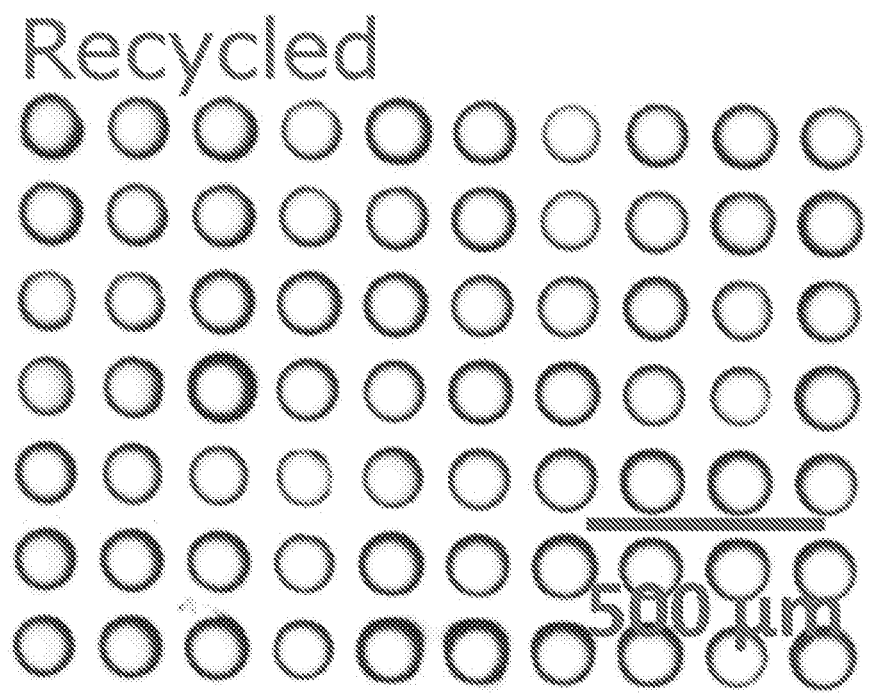

As shown in FIGS. 50A and 50B, both pristine and recycled PETMP-TEDAE polymers were prepared as cylinders with 100 μm in diameter and 80 μm in height, on glass slides. The recycled samples required less curing time than pristine samples as a result, potentially due to the increased viscosity. Both of the surface features were degradable under similar conditions as the bulk films. This implementation in photolithography, can be used in fabricating materials such as optical devices, functional surfaces and 3D objects.

Example 21: Shrinkage Stress Test

Figure 51:
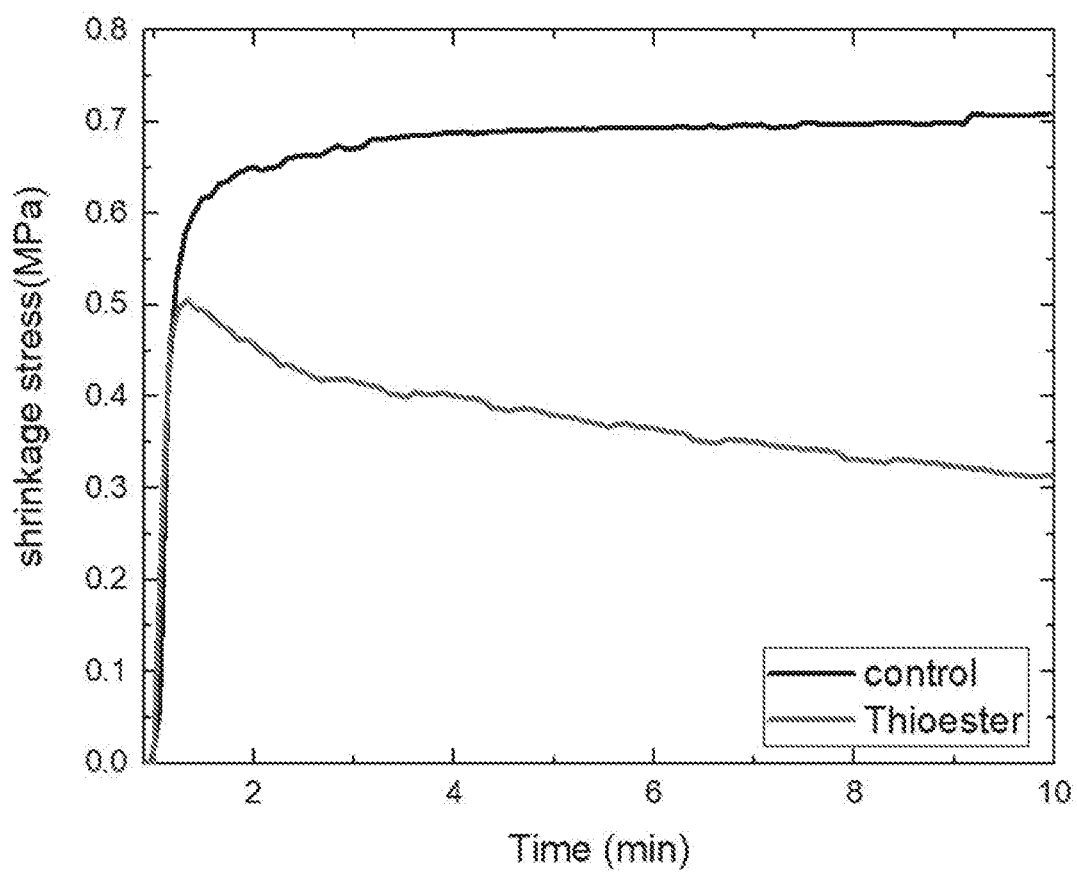
FIG. 51 is a graph showing polymerization induced stress measured for a thioester network (bottom line) comprising TEDAE (1.0 eq), PETMP (1.1 eq) and TMG (0.03 eq) and a control polymer network (top line) comprising DAEC (1.0 eq), PETMP (1.1 eq) and TMG (0.03 eq).

Polymerization induced stress was measured for a thioester polymer network (bottom line) comprising TEDAE (1.0 eq), PETMP (1.1 eq) and TMG (0.03 eq) and a control polymer network (top line) comprising DAEC (1.0 eq), PETMP (1.1 eq) and TMG (0.03 eq) (FIG. 51). In situ polymerization shrinkage stress measurements were performed utilizing a tensometer (American Dental Association Health Foundation, ADAHF-PRC). Briefly, samples were placed between two silanized glass rods (6 mm in diameter, 1 mm in thickness). During the measurement, tensile force generated by bonded shrinking led to a deflection of the cantilever beam. This deflection was measured by a linear variable differential transformer (LVDT) and then converted to force based on a beam calibration constant. Shrinkage stress was calculated using the deflection force divided by the cross-sectional sample area. The simultaneous conversion measurement was recorded by the FTIR spectrometer connected via fiber optic cables. Samples were irradiated for 100 s (365 nm 30 mW cm$^{-2}$). Shrinkage stress was monitored for 8 minutes after the light source was switched off to obtain the final shrinkage stress at ambient temperature. The TEDAE containing network demonstrated a lower ultimate stress and continued to decrease over time. The control (DAEC) network reached a higher ultimate stress and did not decrease over time.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A composition comprising a cross-linked CAN polymer comprising a plurality of thioester linkages and a plurality of free thiol groups, and further comprising at least one exchange catalyst selected from the group consisting of a base and a nucleophile, wherein the base is selected from the group consisting of a photo-activatable base and a thermal-activatable base, wherein the polymer network undergoes bond exchange through nucleophilic attack on at least one thioester linkage by at least one free thiol group, optionally wherein the at least one exchange catalyst is covalently bound to the CAN polymer; and optionally wherein the composition further comprises an acid selected from the group consisting of a photo-activatable acid and a thermal-activatable acid, wherein the CAN polymer comprises at least one polymerized multifunctional thioester containing monomer of Formula (I):

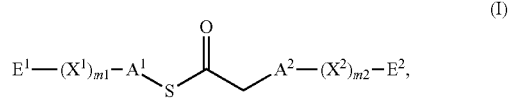

wherein in (I):

$A^1$ and $A^2$ are each independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_{12}$-$C_{15}$ heteroalkylene, optionally substituted $C_2$-$C_{15}$ heteroalkenylene, and optionally substituted $C_2$-$C_{15}$ heteroalkynylene;

$E^1$ and $E^2$ are each independently selected from the group consisting of:

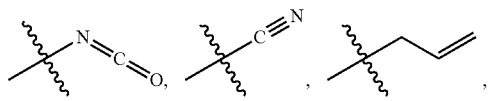

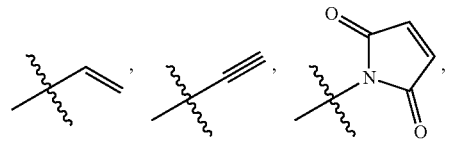

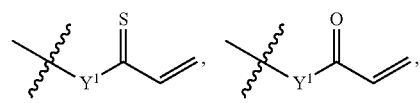

-continued

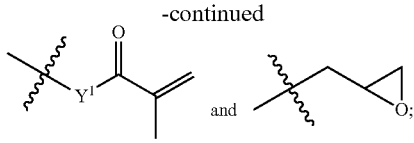

wherein each instance of $Y^1$ is independently selected from the group consisting of O and $NR^1$; and each instance of $R^1$ being independently selected from the group consisting of H and $C_1$-$C_6$ alkyl;
m1 is 0 or 1;
m2 is 0 or 1;
$X^1$ is

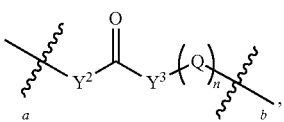

wherein:
bond a is to $A^1$,
bond b is to $E^1$,
Q is $CH_2$ or

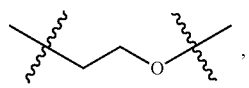 [SMILES: *CCO*]

and
n is 0, 1, 2, 3, 4, 5 or 6;
$X^2$ is

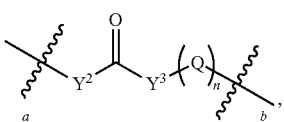

wherein:
bond a is to $A^2$,
bond b is to $E^2$,
Q is $CH_2$ or

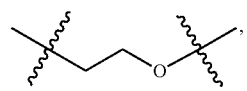 [SMILES: *CCO*]

and
n is 0, 1, 2, 3, 4, 5 or 6;
each instance of $Y^2$, and $Y^3$ is independently selected from the group consisting of $CR^1_2$, O and $NR^1$; and
each instance of $R^1$ is independently selected from the group consisting of H and $C_1$-$C_6$ alkyl.

2. The composition of claim 1, wherein the base has a conjugate acid with a pKa from about 2 to about 15, or the nucleophile has a nucleophilicity value (N) greater than about 10.

3. The composition of claim 1, wherein the CAN polymer is formed through one or more processes selected from the group consisting of thiol-ene polymerization, thiol-alkyne polymerization, thiol-acrylate polymerization, thiol-methacrylate, acrylate polymerization, methacrylate polymerization, styrene polymerization, alcohol-isocyanate polymerization, thiol-isocyanate polymerization, thiol-epoxide polymerization, thiol-isothiocyanate polymerization, thiol-halide polymerization, thiol-malemide, thiol-activated ester polymerization, copper-catalyzed azide alkyne polymerization, strain-promoted azide alkyne polymerization, and epoxide-carboxylic acid polymerization.

4. The composition of claim 1, wherein at least one applies:
(a) the photo-activatable base is a compound selected from the group consisting of:

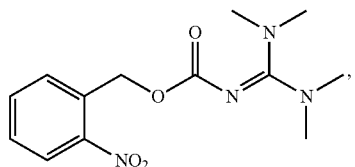

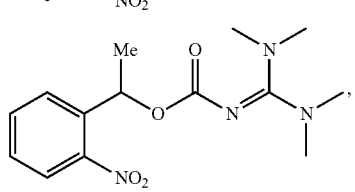

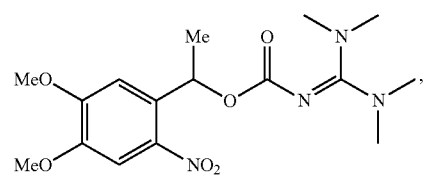

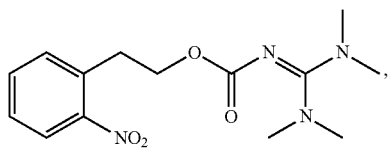

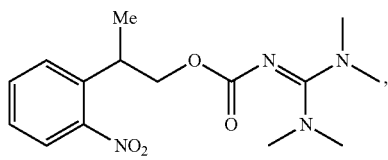

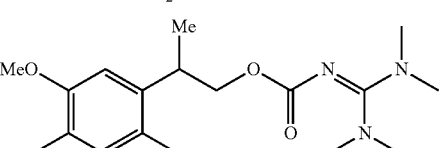

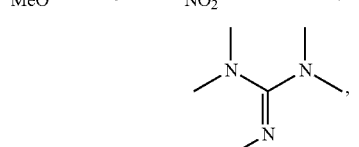

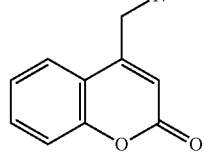

87

-continued

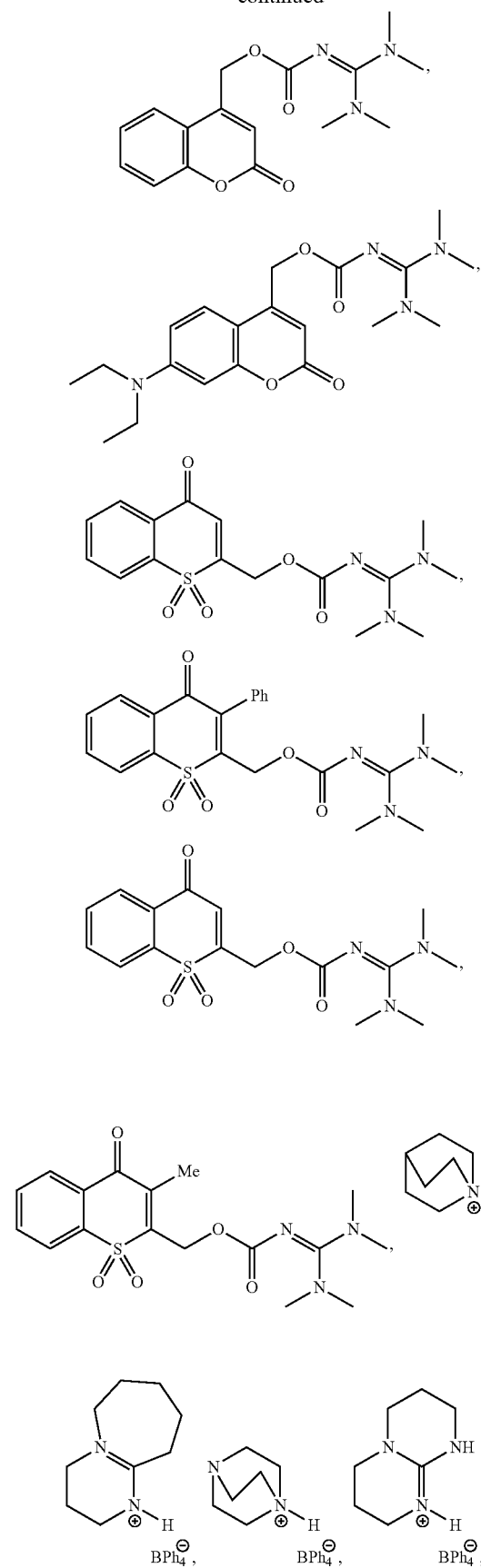

88

-continued

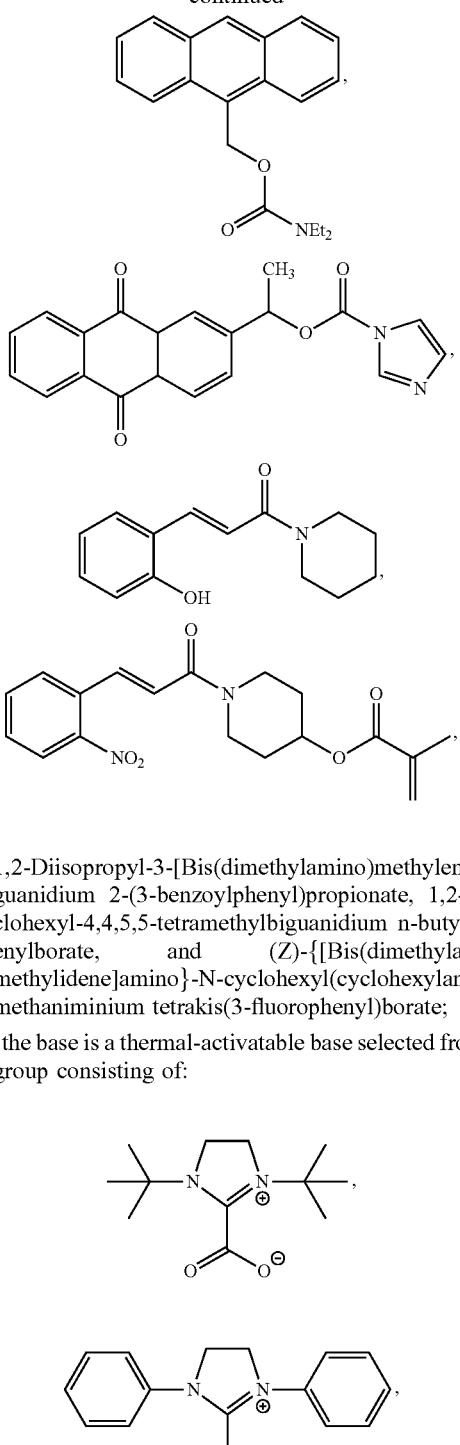

1,2-Diisopropyl-3-[Bis(dimethylamino)methylene] guanidium 2-(3-benzoylphenyl)propionate, 1,2-Dicyclohexyl-4,4,5,5-tetramethylbiguanidium n-butyltriphenylborate, and (Z)-{[Bis(dimethylamino)methylidene]amino}-N-cyclohexyl(cyclohexylamino) methaniminium tetrakis(3-fluorophenyl)borate;

(b) the base is a thermal-activatable base selected from the group consisting of:

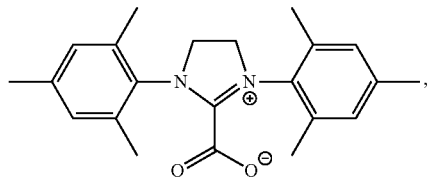

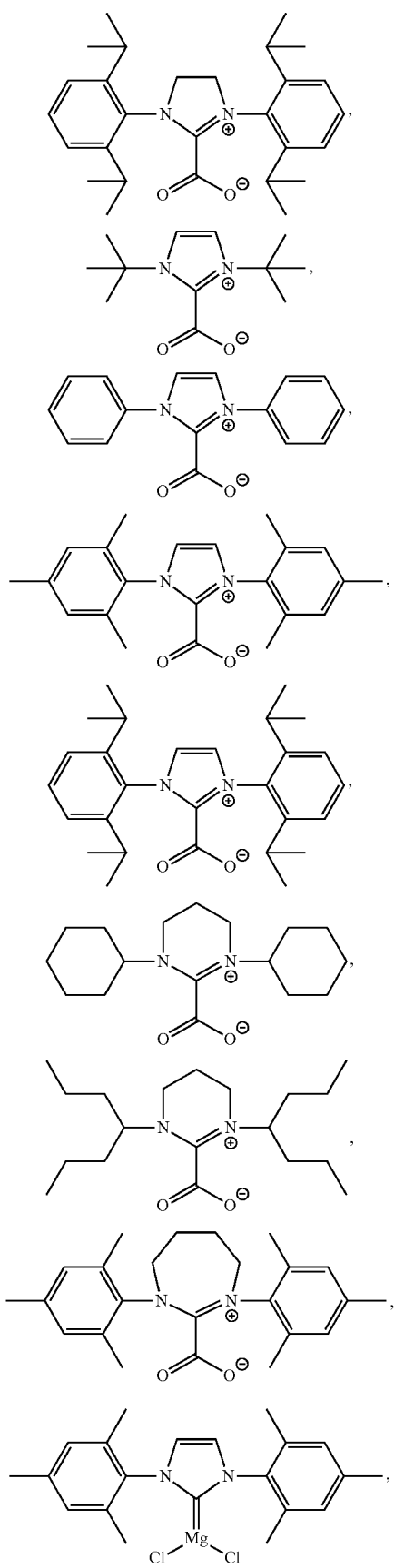
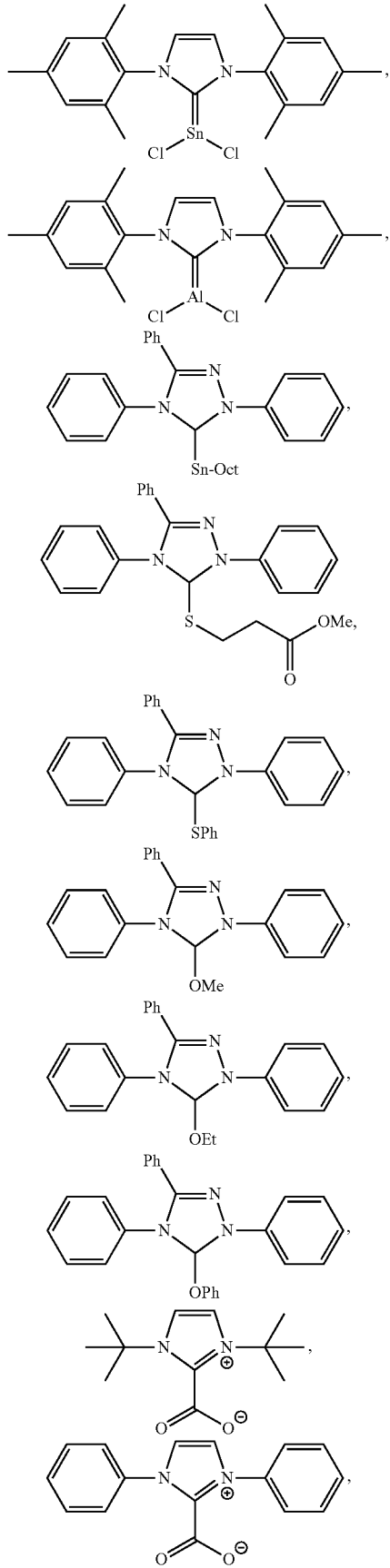

-continued

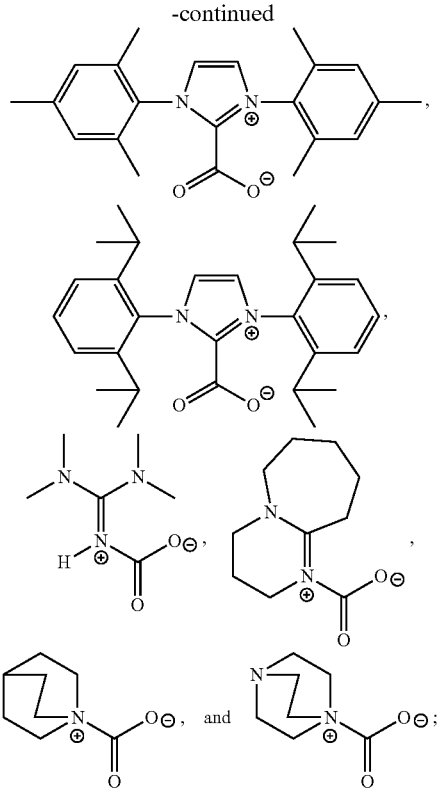

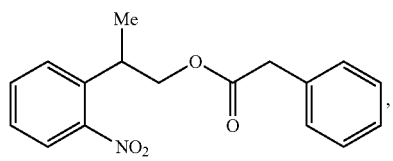

(c) the photo-activatable acid is a compound selected from the group consisting of:

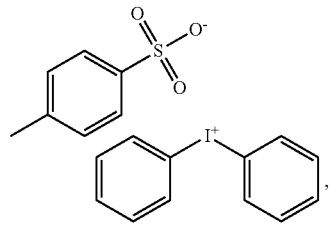

Bis(4-tert-butylphenyl)iodonium perfluoro-1-butanesulfonate, Bis(4-tert-butylphenyl)iodonium p-toluenesulfonate, Bis(4-tert-butylphenyl)iodonium, Boc-methoxyphenyldiphenylsulfonium triflate, (4-tert-Butylphenyl)diphenylsulfonium triflate, Diphenyliodonium hexafluorophosphate, Diphenyliodonium nitrate, Diphenyliodonium perfluoro-1-butanesulfonate, Diphenyliodonium p-toluenesulfonate, Diphenyliodonium triflate, (4-Fluorophenyl)diphenylsulfonium triflate, N-Hydroxynaphthalimide triflate, N-Hydroxy-5-norbornene-2,3-dicarboximide perfluoro-1-butanesulfonate, (4-Iodophenyl)diphenylsulfonium triflate, (4-Methoxyphenyl) diphenylsulfonium triflate, 2-(4-Methoxystyryl)-4,6-bis(trichloromethyl)-1,3,5-triazine, (4-Methylphenyl) diphenylsulfonium triflate, (4-Methylthiophenyl) methyl phenyl sulfonium triflate, (4-Phenoxyphenyl) diphenylsulfonium triflate, (4-Phenylthiophenyl) diphenylsulfonium triflate, Triarylsulfonium hexafluorophosphate salts, Triphenylsulfonium perfluoro-1-butanesufonate, Triphenylsulfonium triflate, Tris(4-tert-butylphenyl)sulfonium perfluoro-1-butanesulfonate, and Tris(4-tert-butylphenyl)sulfonium triflate; or (d) the thermal-activatable acid is selected from the group consisting of:

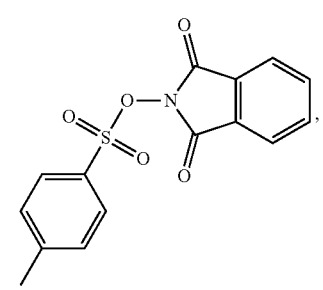

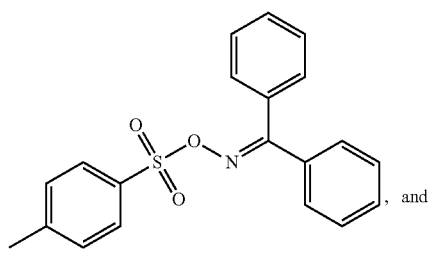

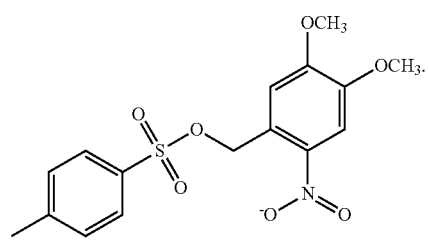

5. The composition of claim 1, wherein the CAN polymer does not exhibit significant bond exchange before activation of the base, and wherein the CAN polymer exhibits bond exchange after activation of the base.

6. The composition of claim 1, wherein the CAN polymer exhibits bond exchange before activation of the acid and wherein the CAN polymer does not exhibit significant bond exchange after activation of the acid.

7. The composition of claim 1, wherein the at least one polymerized multifunctional thioester containing monomer is a monomer of Formula (Ia):

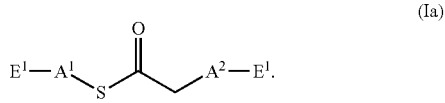

8. The composition of claim 1, wherein the at least one polymerized multifunctional thioester containing monomer is selected from the group consisting of:
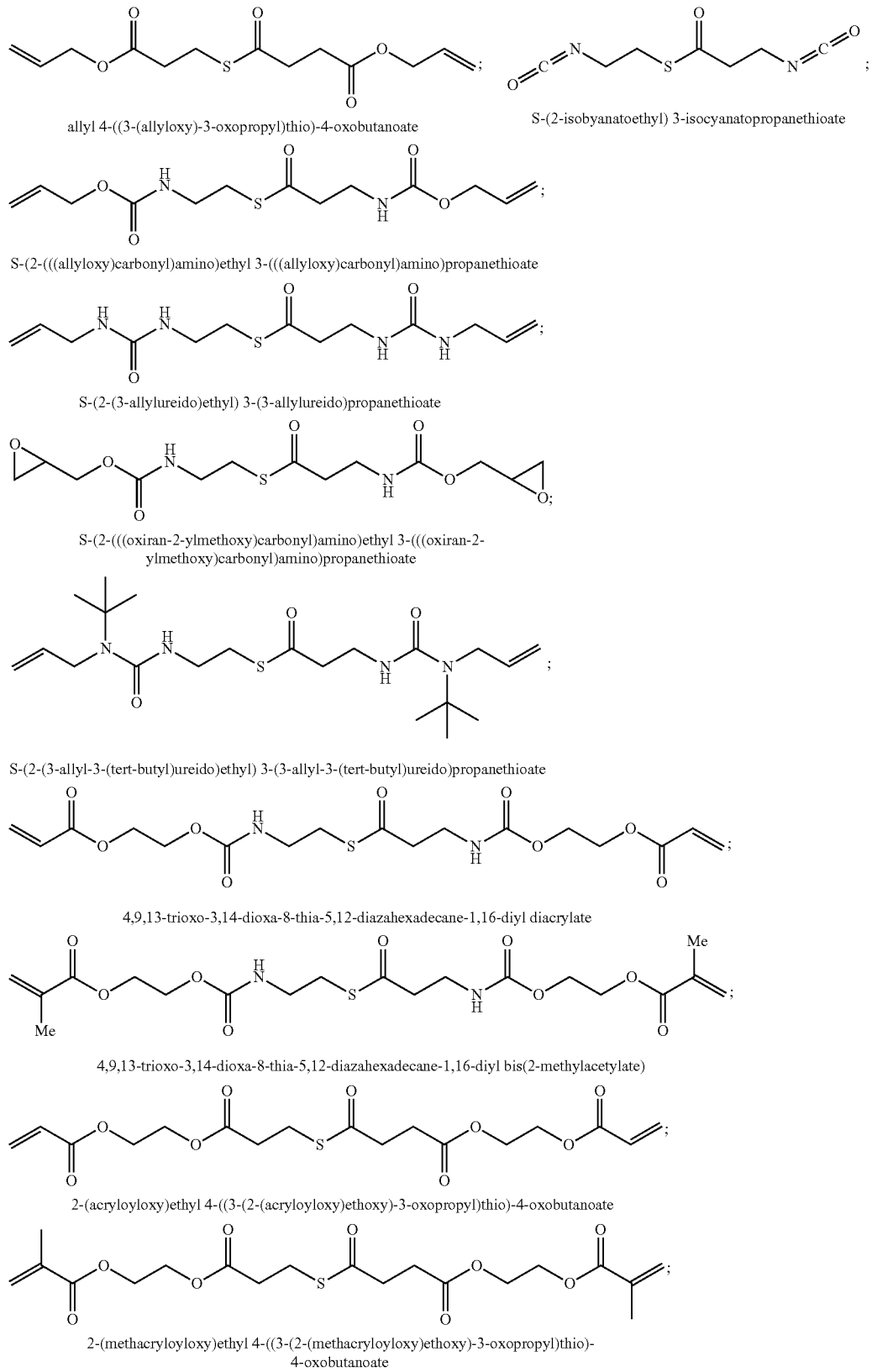

-continued
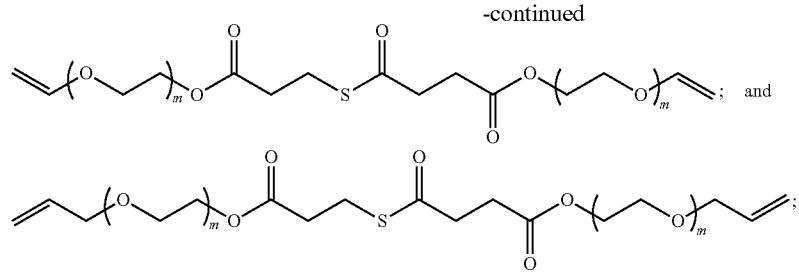
wherein each occurrence of m is independently selected from the group consisting of 0, 1, 2, 3, 4, 5, and 6.